US012481107B2

(12) United States Patent
Wu et al.

(10) Patent No.: US 12,481,107 B2
(45) Date of Patent: Nov. 25, 2025

(54) PHOTONIC COMPUTING PLATFORM

(71) Applicant: Lightelligence PTE. Ltd., Singapore (SG)

(72) Inventors: Jianhua Wu, Quincy, MA (US); Zhan Su, Boston, MA (US); Hui Chen, Wellesley Hills, MA (US); Huaiyu Meng, Medford, MA (US); Yichen Shen, Cambridge, MA (US)

(73) Assignee: Lightelligence PTE. Ltd., Singapore (SG)

( * ) Notice: Subject to any disclaimer, the term of this patent is extended or adjusted under 35 U.S.C. 154(b) by 0 days.

(21) Appl. No.: 17/546,436

(22) Filed: Dec. 9, 2021

(65) Prior Publication Data

US 2022/0179159 A1 Jun. 9, 2022

Related U.S. Application Data

(60) Provisional application No. 63/253,704, filed on Oct. 8, 2021, provisional application No. 63/123,338, filed on Dec. 9, 2020.

(51) Int. Cl.
*G02B 6/42* (2006.01)
*G02B 6/124* (2006.01)
(Continued)

(52) U.S. Cl.
CPC ............ *G02B 6/4204* (2013.01); *G02B 6/34* (2013.01); *G02B 6/4206* (2013.01);
(Continued)

(58) Field of Classification Search
CPC ........ G02B 6/4214; G02B 6/34; G02B 6/124; G02B 6/12004; G02B 6/42; G02B 6/4204;
(Continued)

(56) References Cited

U.S. PATENT DOCUMENTS 8,168,939 B2   5/2012   Mack et al.
8,772,704 B2   7/2014   Mack et al.
(Continued)

FOREIGN PATENT DOCUMENTS

CN   108700707   10/2018
TW   201346360   11/2013
(Continued)

OTHER PUBLICATIONS

International Search Report and Written Opinion of the International Searching Authority for International Application No. PCT/US2021/062654, dated Apr. 11, 2022.
(Continued)

*Primary Examiner* — Michelle R Connelly
(74) *Attorney, Agent, or Firm* — Fish & Richardson P.C.

(57) ABSTRACT

A method for assembling a photonic computing system includes attaching a photonic source to a support structure, and attaching a photonic integrated circuit to the support structure. The photonic source includes a first laser die on a substrate configured to provide a first optical beam, and a second laser die on the substrate configured to provide a second optical beam. The photonic integrated circuit includes a first waveguide and a first coupler coupled to the first waveguide, and a second waveguide and a second coupler coupled to the second waveguide. The method includes attaching a plurality of beam-shaping optical elements to the support structure, the substrate, or the photonic integrated circuit, in which the attaching includes aligning a first beam-shaping optical element during attachment so that the first optical beam is coupled to the first coupler, and aligning a second beam-shaping optical element during attachment so that the second optical beam is coupled to the second coupler.

21 Claims, 91 Drawing Sheets

(51) Int. Cl.
*G02B 6/34* (2006.01)
*G06E 1/00* (2006.01)
*G02B 7/00* (2021.01)
*G02B 27/62* (2006.01)
*G06N 3/067* (2006.01)

(52) U.S. Cl.
CPC ......... *G02B 6/4214* (2013.01); *G02B 6/4227* (2013.01); *G02B 6/4244* (2013.01); *G02B 6/4271* (2013.01); *G06E 1/00* (2013.01); *G02B 6/124* (2013.01); *G02B 6/4269* (2013.01); *G02B 6/4286* (2013.01); *G02B 7/003* (2013.01); *G02B 27/62* (2013.01); *G06N 3/0675* (2013.01)

(58) Field of Classification Search
CPC .. G02B 6/4206; G02B 6/4227; G02B 6/4244; G02B 6/4271; G02B 6/4269; G02B 6/4286; G02B 7/003; G02B 27/62; H01S 5/026; H01S 5/005; G06E 1/00; G06N 3/0675
See application file for complete search history.

(56) References Cited

U.S. PATENT DOCUMENTS

| | | | |
|---|---|---|---|
| 9,787,054 B2 | 10/2017 | Shi et al. | |
| 9,933,585 B2 | 4/2018 | Zhang et al. | |
| 9,971,107 B2* | 5/2018 | Mekis | G02B 6/4213 |
| 10,054,737 B2* | 8/2018 | Kobrinsky | H01L 23/49827 |
| 10,146,020 B1 | 12/2018 | Yasumura et al. | |
| 10,656,426 B2 | 5/2020 | Pierer et al. | |
| 10,705,302 B2* | 7/2020 | Ji | G02B 6/30 |
| 10,788,632 B2* | 9/2020 | Wang | G02B 6/4208 |
| 11,564,312 B2* | 1/2023 | Verslegers | H05K 1/0203 |
| 2006/0239612 A1* | 10/2006 | De Dobbelaere | G02B 6/42 385/37 |
| 2013/0160266 A1* | 6/2013 | Pezeshki | G02B 6/4244 29/407.09 |
| 2014/0270629 A1 | 9/2014 | Dutt et al. | |
| 2016/0285233 A1* | 9/2016 | Victoria | H01S 5/141 |
| 2017/0115458 A1* | 4/2017 | Mekis | G02B 6/4208 |
| 2017/0194308 A1* | 7/2017 | Evans | H04B 10/506 |
| 2017/0279537 A1 | 9/2017 | Kim et al. | |
| 2017/0351293 A1 | 12/2017 | Carolan et al. | |
| 2018/0120433 A1 | 5/2018 | Eichenholz et al. | |
| 2018/0287336 A1* | 10/2018 | Victoria | H01S 5/0233 |
| 2018/0348455 A1* | 12/2018 | Yasumura | G02B 6/29316 |
| 2019/0123109 A1 | 4/2019 | Xie et al. | |
| 2019/0212511 A1* | 7/2019 | Mack | G02B 26/105 |
| 2019/0214365 A1* | 7/2019 | Gu | H04B 10/801 |
| 2019/0221994 A1* | 7/2019 | Mahgerefteh | G02B 6/305 |
| 2019/0354894 A1 | 11/2019 | Lazovich et al. | |
| 2019/0370652 A1 | 12/2019 | Shen et al. | |
| 2020/0069225 A1* | 3/2020 | Vizbaras | H01S 5/4062 |
| 2020/0091124 A1 | 3/2020 | Liao et al. | |
| 2020/0110992 A1 | 4/2020 | Hosseinzadeh et al. | |
| 2020/0310142 A1* | 10/2020 | O'Brien | G02B 19/0052 |
| 2020/0319416 A1* | 10/2020 | Patel | G02B 6/4248 |
| 2020/0333530 A1 | 10/2020 | Lin et al. | |
| 2020/0348468 A1 | 11/2020 | Ring et al. | |
| 2021/0018678 A1* | 1/2021 | Yu | G02B 6/12004 |
| 2021/0173238 A1 | 6/2021 | Hosseinzadeh et al. | |
| 2021/0201126 A1 | 7/2021 | Meng et al. | |
| 2021/0341765 A1 | 11/2021 | Lu et al. | |
| 2022/0244465 A1* | 8/2022 | Winzer | G02B 6/43 |

FOREIGN PATENT DOCUMENTS

| | | |
|---|---|---|
| TW | 201901208 | 1/2019 |
| TW | 202038400 A | 10/2020 |
| WO | WO 2020/191217 | 9/2020 |

OTHER PUBLICATIONS

Billah et al., "Hybrid integration of silicon photonics circuits and InP lasers by photonic wire bonding", *Optica*, vol. 5, No. 7, pp. 876-883 (Jul. 2018).

Carroll et al., "Photonic Packaging: Transforming Silicon Photonic Integrated Circuits into Photonic Devices", *Applied Sciences*, vol. 6, No. 426 (2016).

Lindenmann et al., "Photonic wire bonding: a novel concept for chip-scale interconnects", *Optics Express*, vol. 20, No. 16, pp. 17667-17677 (Jul. 30, 2012).

Moscoso-Mártir et al., "Hybrid Silicon Photonics Flip-Chip Laser Integration with Vertical Self-Alignment", *2017 Conference on Lasers and Electro-Optics Pacific Rim 2017*, Optica Publishing Group, Paper s2069 (2017).

Soganci et al., "Flip-chip optical couplers with scalable I/O count for silicon photonics", *Optics Express*, vol. 21, No. 13, Pp. 16075-16085 (Jul. 1, 2013).

Zagaglia et al., "Comparing Laser Hybrid-Integration and Fiber Coupling With Standard Grating Couplers on Si-PICs", *IEEE Photonics Technology Letters*, vol. 31, No. 1, pp. 66-69 (Jan. 1, 2019).

Office Action in Taiwan Appln. No. 110145902, dated Feb. 20, 2023, 100 pages (with English translation).

International Preliminary Report on Patentability in International Appln. No. PCT/US2021/062654, mailed on Jun. 22, 2023, 46 pages.

Office Action in Taiwan Appln. No. 110145902, dated Oct. 24, 2023, 11 pages (with English translation).

\* cited by examiner

Wafer Bonding

TSV reveal

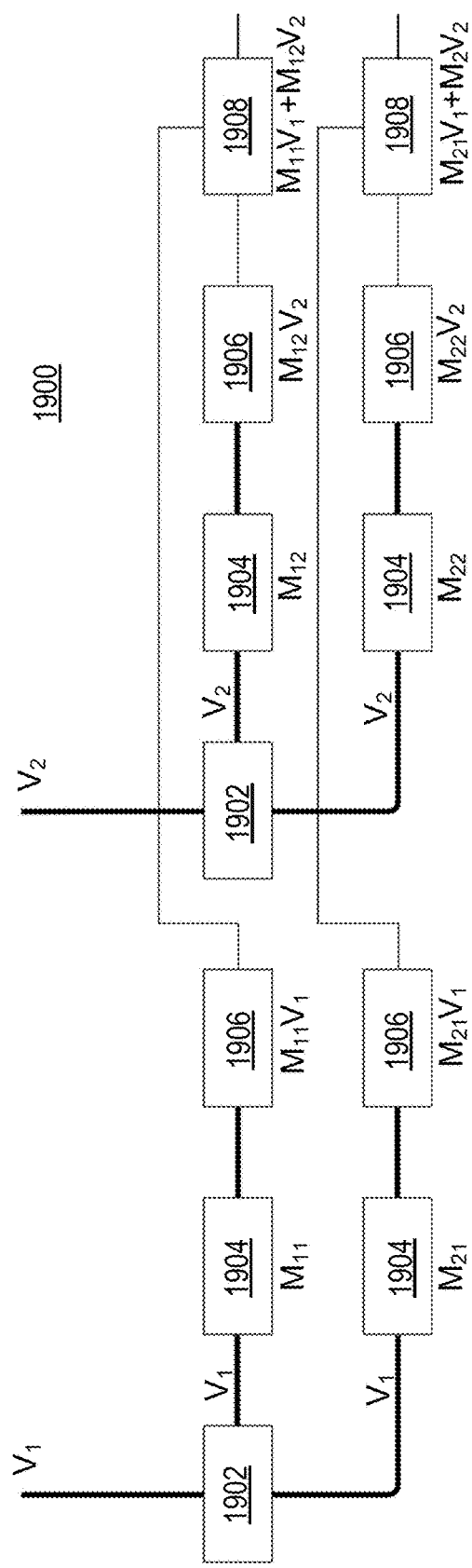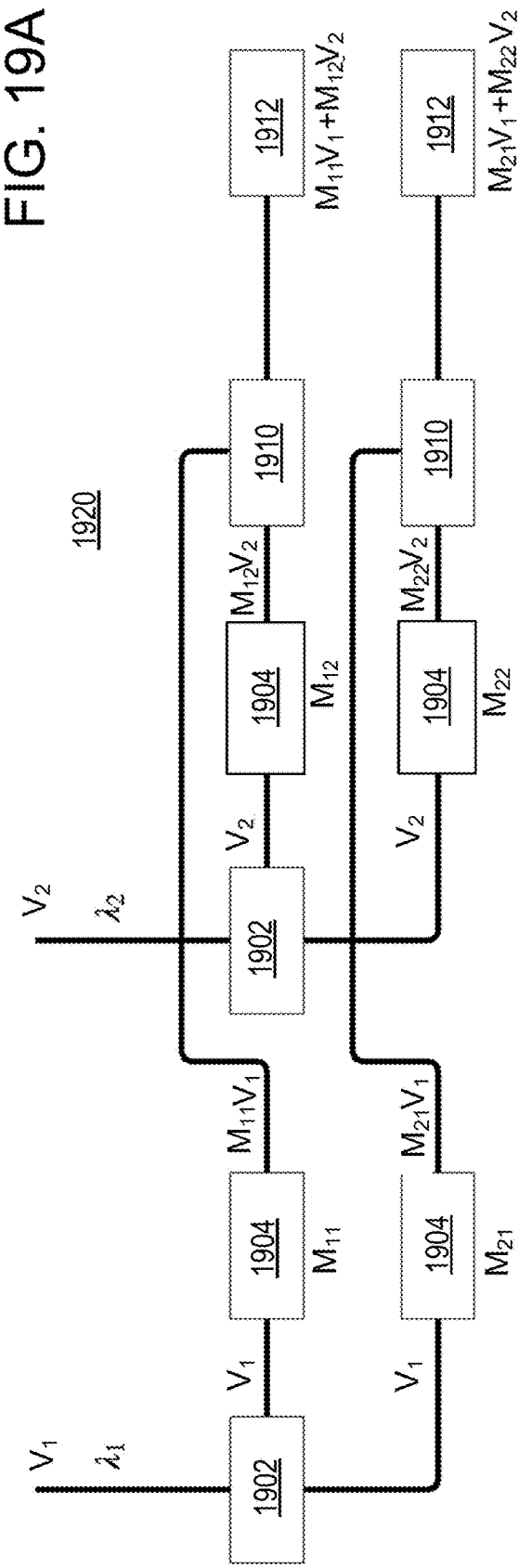

$$\vec{V} = \begin{bmatrix} V_0 \\ V_1 \\ V_2 \\ V_3 \end{bmatrix} \qquad U = \begin{bmatrix} U_{00} & U_{01} & U_{02} & U_{03} \\ U_{10} & U_{11} & U_{12} & U_{13} \\ U_{20} & U_{21} & U_{22} & U_{23} \\ U_{30} & U_{31} & U_{32} & U_{33} \end{bmatrix}$$

$$\vec{V} = 2^0 \overbrace{\begin{bmatrix} V_{0,bit0} \\ V_{1,bit0} \\ V_{2,bit0} \\ V_{3,bit0} \end{bmatrix}}^{\vec{V}_{bit0}} + 2^1 \overbrace{\begin{bmatrix} V_{0,bit1} \\ V_{1,bit1} \\ V_{2,bit1} \\ V_{3,bit1} \end{bmatrix}}^{\vec{V}_{bit1}} + 2^2 \overbrace{\begin{bmatrix} V_{0,bit2} \\ V_{1,bit2} \\ V_{2,bit2} \\ V_{3,bit2} \end{bmatrix}}^{\vec{V}_{bit2}} + 2^3 \overbrace{\begin{bmatrix} V_{0,bit3} \\ V_{1,bit3} \\ V_{2,bit3} \\ V_{3,bit3} \end{bmatrix}}^{\vec{V}_{bit3}}$$

$$U \cdot \vec{V} = 2^0 \, U \cdot \vec{V}_{bit0} + 2^1 \, U \cdot \vec{V}_{bit1} + 2^2 \, U \cdot \vec{V}_{bit2} + 2^3 \, U \cdot \vec{V}_{bit3}$$

FIG. 49B

PHOTONIC COMPUTING PLATFORM

CROSS-REFERENCE TO RELATED APPLICATIONS

This application claims priority to U.S. Provisional Application 63/123,338, filed on Dec. 9, 2020, and U.S. Provisional Application 63/253,704, filed on Oct. 8, 2021. The entire disclosures of the above applications are hereby incorporated by reference.

TECHNICAL FIELD

This disclosure relates to photonic computing platforms.

BACKGROUND

Computation performed on electronic data, encoded in analog or digital form on electrical signals (e.g., voltage or current), is typically implemented using electronic computing hardware, such as analog or digital electronics implemented in integrated circuits (e.g., a processor, an application-specific integrated circuit (ASIC), or a system on a chip (SoC)), electronic circuit boards, or other electronic circuitry. Optical signals have been used for transporting data, over long distances, and over shorter distances (e.g., within data centers). Operations performed on such optical signals often take place in the context of optical data transport, such as within devices that are used for switching or filtering optical signals in a network. Use of optical signals in computing platforms has been more limited.

SUMMARY

In general, in a first aspect, a method for assembling a photonic computing system is provided. The method includes: attaching a photonic source to a support structure, and attaching a photonic integrated circuit to the support structure. The photonic source includes: a first laser die on a substrate configured to provide a first optical beam, and a second laser die on the substrate configured to provide a second optical beam. The photonic integrated circuit includes: a first waveguide and a first coupler coupled to the first waveguide, and a second waveguide and a second coupler coupled to the second waveguide. The method includes attaching a plurality of beam-shaping optical elements to the support structure, the substrate, or the photonic integrated circuit, in which the attaching includes: providing, using the first laser die, the first optical beam, aligning a first beam-shaping optical element during attachment so that the first optical beam is coupled to the first coupler, providing, using the second laser die, the second optical beam, and aligning a second beam-shaping optical element during attachment so that the second optical beam is coupled to the second coupler.

Embodiments of the method can include one or more of the following features. Aligning the first beam-shaping optical element during attachment of the first beam-shaping optical element can include translating the first beam-shaping optical element with respect to the support structure, the substrate, or the photonic integrated circuit.

The translation can be substantially within a plane parallel to a common plane.

Aligning the first beam-shaping optical element during attachment of the first beam-shaping optical element can include monitoring feedback indicating a coupling efficiency of the first beam into the first waveguide through the first coupler.

Aligning the second beam-shaping optical element during attachment of the second beam-shaping optical element can occur after attachment of the first beam-shaping optical element has been completed.

The photonic source includes a third laser die on the substrate that can provide a third optical beam. The first laser die can be configured to provide the first optical beam from a first emitting location, the second laser die can be configured to provide the second optical beam from a second emitting location, and the third laser die can be configured to provide the third optical beam from a third emitting location. The first, second, and third emitting locations can be substantially aligned along a line.

The photonic source can include a fourth laser die on the substrate configured to provide a fourth optical beam from a fourth emitting location. The first, second, third, and fourth emitting locations can be substantially aligned along a plane.

The first laser die and the second laser die can be oriented such that the first optical beam and the second optical beam are substantially aligned along a plane.

The first, second, and third laser dies can be oriented such that the first, second, and third optical beams are substantially aligned along a plane.

The photonic source can include a chip-on-submount structure that includes a laser diode bar that includes a plurality of laser dies, including the first and second laser dies, attached to a structure that includes at least one of a heatsink or a thermoelectric cooler.

The chip-on-submount structure can be attached to a structure that includes the thermoelectric cooler. The method can include providing a thermoelectric cooler controller that is configured to control a temperature of the thermoelectric cooler.

The first and second beam-shaping optical elements can include lenses.

The first and second couplers can include waveguide grating couplers coupled to the respective first and second waveguides.

The first and second couplers can include edge couplers coupled to the respective first and second waveguides.

The support structure can include an interposer that provides electrical signal paths for electrical signals from the photonic integrated circuit.

The interposer can include an optoelectronic interposer that provides optical signal paths for optical signals from the photonic integrated circuit.

The method can include attaching the interposer to an LGA substrate.

The photonic integrated circuit can be attached to the optoelectronic interposer in a controlled collapse chip connection.

The support structure can include an LGA substrate.

The method can include electrically coupling a first electronic integrated circuit to a top side of the photonic integrated circuit, and electrically coupling a second electronic integrated circuit to a bottom side of the photonic integrated circuit.

The second electronic integrated circuit can include a digital storage module, and the first electronic integrated circuit can include a hybrid digital/analog integrated circuit that is configured to provide analog control signals for controlling photonic computing elements in the photonic integrated circuit and send/receive digital data to/from the digital storage module.

The photonic integrated circuit can include a substrate. The method can include providing conductive vias that pass through the substrate of the photonic integrated circuit to enable electrical signals to be transmitted between the first electronic integrated circuit and the second electronic integrated circuit through the conductive vias.

In another general aspect, an apparatus includes: a photonic source attached to a support structure, in which the photonic source includes: a first laser die on a first substrate in which the first laser die is configured to provide a first optical beam, and a second laser die on the first substrate or a second substrate in which the second laser die is configured to provide a second optical beam. The apparatus includes a photonic integrated circuit attached to the support structure, in which the photonic integrated circuit includes: a first waveguide and a first coupler coupled to the first waveguide, and a second waveguide and a second coupler coupled to the second waveguide. The apparatus includes a plurality of beam-shaping optical elements attached to at least one of the support structure, the first substrate, respective first and second substrates, or the photonic integrated circuit. The beam-shaping optical elements include: a first beam-shaping optical element configured to couple the first optical beam to the first coupler on the photonic integrated circuit, and a second beam-shaping optical element configured to couple the second optical beam to the second coupler on the photonic integrated circuit.

Embodiments of the apparatus can include one or more of the following features. The apparatus can further include a beam-redirecting optical element attached to the photonic integrated circuit, the beam-redirecting element configured to redirect the first optical beam into the first coupler and to redirect the second optical beam into the second coupler.

The beam-redirecting element can include a first surface that is configured to reflect the first optical beam into the first coupler, and a second surface that is configured to reflect the second optical beam into the second coupler.

The first surface of the beam-redirecting element can overlap the second surface of the beam-redirecting element.

The beam-redirecting optical element can include a prism.

The beam-redirecting optical element can include a mirror.

The photonic source can include a third laser die disposed on the substrate and configured to provide a third optical beam. The first laser die can be configured to provide the first optical beam from a first emitting location, the second laser die can be configured to provide the second optical beam from a second emitting location, and the third laser die can be configured to provide the third optical beam from a third emitting location. The first, second, and third emitting locations can be substantially aligned along a line.

The photonic source can include a fourth laser die on the substrate, and the fourth laser die can be configured to provide a fourth optical beam from a fourth emitting location. The first, second, third, and fourth emitting locations can be substantially aligned along a plane.

The photonic source can include at least eight laser dies on the first substrate or respective substrates, including the first and second laser dies, with the first substrate or the respective substrates attached to one or more heatsink structures.

The laser dies can be configured to provide optical beams from corresponding emitting locations that are substantially aligned along a plane.

The first and second beam-shaping optical elements can include lenses.

The first and second couplers can include waveguide grating couplers coupled to the respective first and second waveguides.

The first and second couplers can include edge couplers coupled to the respective first and second waveguides.

The support structure can include an optoelectronic interposer that provides: electrical signal paths for electrical signals from the photonic integrated circuit, and optical signal paths for optical signals from the photonic integrated circuit.

The photonic integrated circuit can be attached to the optoelectronic interposer in a controlled collapse chip connection.

The apparatus can further include an electronic integrated circuit.

The photonic integrated circuit can include optoelectronic computing elements, and the electronic integrated circuit can include control circuitry configured to provide electronic control signals for controlling the optoelectronic computing elements.

The optoelectronic computing elements can include at least one optical modulator that modulates an optical signal based on at least one of the electronic control signals.

The electronic integrated circuit can be attached to the optoelectronic interposer in a controlled collapse chip connection.

The electronic integrated circuit can be attached to the photonic integrated circuit in a controlled collapse chip connection.

The apparatus can further include a high bandwidth memory (HBM) stack of two or more dynamic random access memory (DRAM) integrated circuits attached to the optoelectronic interposer The first laser die can be configured to such that the first optical beam has a first wavelength, the second laser die can be configured such that the second optical beam has a second wavelength, the first wavelength can be different from the second wavelength, and the photonic integrated circuit can include a wavelength division multiplexed computation module that concurrently processes a first optical signal derived from the first optical beam and a second optical signal derived from the second optical beam.

In another general aspect, an apparatus includes: a photonic source attached to a support structure, in which the photonic source includes a laser module that is configured to provide an optical beam. The apparatus includes a photonic integrated circuit attached to the support structure, in which the photonic integrated circuit includes: a first waveguide and a coupler coupled to the first waveguide, and optoelectronic circuitry that is in optical communication with the first waveguide and is configured to receive one or more electrical signals from one or more control electrodes. The apparatus includes at least one beam-shaping optical element attached to the support structure, the photonic source, or the photonic integrated circuit. The beam-shaping optical element is configured to couple the optical beam to the coupler on the photonic integrated circuit. The apparatus includes a digital electronic module in electrical contact with the photonic integrated circuit; and an electrical integrated circuit in electrical contact with the photonic integrated circuit. The electrical integrated circuit includes analog circuitry and digital circuitry, in which the analog circuitry is in electrical contact with at least one of the one or more control electrodes. The photonic integrated circuit further includes a plurality of metal paths through at least a portion of the photonic integrated circuit configured to provide electrical contact between the digital circuitry in the electrical integrated circuit and the digital electronic module.

Embodiments of the apparatus can include one or more of the following features. The digital electronic module can be in electrical contact with the photonic integrated circuit on a same surface as the electrical integrated circuit.

The digital electronic module can be in electrical contact with a first surface of the photonic integrated circuit, the electrical integrated circuit is in electrical contact with a second surface of the photonic integrated circuit, the second surface is opposite the first surface.

The digital electronic module can include a stack of two or more dynamic random access memory (DRAM) dies.

The support structure can include a substrate including an array of surface-mount electrical contacts in communication with electrical contacts of the photonic integrated circuit.

In another general aspect, a method for assembling a photonic computing system is provided. The method includes: attaching a plurality of laser dies to a first support structure, in which each laser die is configured to generate an optical beam; and attaching a photonic integrated circuit to the first support structure. The photonic integrated circuit includes: a plurality of optical waveguides configured to carry optical signals, in which a set of multiple input values are encoded on respective optical signals carried by the optical waveguides, a plurality of couplers, each coupler coupled to a corresponding waveguide; an optical network includes a plurality of optical splitters or directional couplers; and an array of optoelectronic circuitry sections, in which each optoelectronic circuitry section is configured to receive an optical wave from one of the output ports of the optical network. Each optoelectronic circuitry section includes: at least one photodetector configured to detect at least one optical wave from an operation; and at least one conductive path integrated in the photonic integrated circuit electrically coupled to the photodetector and electrically coupled to an electrical output port. The method includes attaching a plurality of beam-shaping optical elements to the first support structure or the photonic integrated circuit, in which each beam-shaping optical element is associated with a laser die and a coupler, and the attaching includes aligning each beam-shaping optical element to cause the optical beam generated by the corresponding laser die to be coupled, through the corresponding coupler, to the corresponding waveguide.

Embodiments of the method can include one or more of the following features. Attaching the plurality of laser dies to the support structure can include attaching the plurality of laser dies to a second support structure that includes at least one of a heatsink or a thermoelectric cooler, and attaching the second support structure to the first support structure.

Aligning each beam-shaping optical element during attachment of the beam-shaping optical element can include monitoring feedback indicating a coupling efficiency of the corresponding optical beam into the corresponding waveguide through the corresponding coupler.

The method can include sequentially aligning the beam-shaping optical elements, in which a second beam-shaping optical element is aligned based on monitoring the feedback indicating the coupling efficiency after completion of alignment of a first beam-shaping optical element based on monitoring the feedback indicating the coupling efficiency, and a third beam-shaping optical element is aligned based on monitoring the feedback indicating the coupling efficiency after completion of alignment of the second beam-shaping optical element based on monitoring the feedback indicating the coupling efficiency.

The method can include electrically coupling a first electronic integrated circuit to a top side of the photonic integrated circuit, and electrically coupling a second electronic integrated circuit to a bottom side of the photonic integrated circuit.

The second electronic integrated circuit can include a digital storage module, and the first electronic integrated circuit can include a hybrid digital/analog integrated circuit that is configured to provide analog control signals for controlling photonic computing elements in the photonic integrated circuit and send/receive digital data to/from the digital storage module.

The photonic integrated circuit can include a substrate, and the method can include providing conductive vias that pass through the substrate of the photonic integrated circuit to enable electrical signals to be transmitted between the first electronic integrated circuit and the second electronic integrated circuit through the conductive vias.

Each optoelectronic circuitry section can include a Mach-Zehnder Interferometer configured to perform a multiplication operation between (1) a value based on one of the input values scaled by the optical network and (2) an electrical value provided by an electrical input port electrically coupled to the hybrid digital/analog integrated circuit. The hybrid digital/analog integrated circuit can be configured to provide the electrical value to the electrical input port of the optoelectronic circuitry section.

The method can include: attaching the first support structure to an LGA substrate. Attaching the plurality of laser dies to the first support structure can be performed after the first support structure is attached to the LGA substrate.

In another general aspect, an apparatus includes: a first support structure; a plurality of laser dies that are attached to the first support structure, in which each laser die is configured to generate an optical beam; and a photonic integrated circuit that is attached to the first support structure. The photonic integrated circuit includes: a plurality of optical waveguides configured to carry optical signals, in which a set of multiple input values are encoded on respective optical signals carried by the optical waveguides; a plurality of couplers, each coupler coupled to a corresponding waveguide; an optical network includes a plurality of optical splitters or directional couplers; and an array of optoelectronic circuitry sections, in which each optoelectronic circuitry section is configured to receive an optical wave from one of the output ports of the optical network. Each optoelectronic circuitry section includes: at least one photodetector configured to detect at least one optical wave from an operation; and at least one conductive path integrated in the photonic integrated circuit electrically coupled to the photodetector and electrically coupled to an electrical output port. The apparatus includes a plurality of beam-shaping optical elements that are attached to the support structure or the photonic integrated circuit, in which each beam-shaping optical element is associated with a laser die and a coupler, and is configured to cause the optical beam generated by the corresponding laser die to be coupled, through the corresponding coupler, to the corresponding waveguide.

Embodiments of the apparatus can include one or more of the following features. The apparatus can include a second support structure that includes at least one of a heatsink or a thermoelectric cooler, in which the plurality of laser dies are attached to the second support structure, and the second support structure is attached to the first support structure.

The photonic integrated circuit can include a feedback photodetector and a tap waveguide associated with one of the optical waveguides, and the tap waveguide can be configured to provide a portion of the optical power being coupled into the corresponding optical waveguide to the feedback photodetector. The apparatus can include feedback monitor circuitry that is configured to monitor a feedback signal generated by the feedback photodetector.

The apparatus can include a first electronic integrated circuit electrically coupled to a top side of the photonic integrated circuit, and a second electronic integrated circuit electrically to a bottom side of the photonic integrated circuit.

The second electronic integrated circuit can include a digital storage module, and the first electronic integrated circuit can include a hybrid digital/analog integrated circuit that is configured to provide analog control signals for controlling photonic computing elements in the photonic integrated circuit and send/receive digital data to/from the digital storage module.

The photonic integrated circuit can include a substrate and conductive vias that pass through the substrate. The conductive vias can enable electrical signals to be transmitted between the first electronic integrated circuit and the second electronic integrated circuit through the conductive vias.

Each optoelectronic circuitry section can include a Mach-Zehnder Interferometer configured to perform a multiplication operation between (1) a value based on one of the input values scaled by the optical network and (2) an electrical value provided by an electrical input port electrically coupled to the hybrid digital/analog integrated circuit. The hybrid digital/analog integrated circuit can be configured to provide the electrical value to the electrical input port of the optoelectronic circuitry section.

The couplers can include at least one of a guided-mode resonance coupler or an edge coupler.

The plurality of laser dies can be configured to generate optical beams that have multiple wavelengths, including at least two optical beams that have different wavelengths, and the photonic integrated circuit can include a wavelength division multiplexed computation module that concurrently processes a first optical signal having a first wavelength and representing a first value, and a second optical signal having a second wavelength and representing a second value.

In another general aspect, a method for assembling a photonic computing system is provided. The method includes: attaching a plurality of laser dies to a first support structure, in which each laser die is configured to generate a laser beam; and attaching a photonic integrated circuit to the first support structure. The photonic integrated circuit includes: a plurality of input waveguides configured to carry input optical signals, a plurality of couplers, each coupler coupled to a corresponding input waveguide, and a plurality of operation photodetectors, in which each operation photodetector is configured to detect an optical signal derived from an operation based on at least one input optical signal. The photonic integrated circuit includes: a plurality of feedback photodetectors, in which each feedback photodetector is associated with an input waveguide, and a plurality of tap waveguides, in which each tap waveguide is associated with an input waveguide and is configured to provide a portion of the optical power coupled into the input waveguide to the feedback photodetector. The method includes attaching a plurality of beam-shaping optical elements to the first support structure or the photonic integrated circuit, in which each beam-shaping optical element is associated with one of the laser dies and one of the couplers; and driving the laser dies to generate laser beams sequentially or in parallel. The method includes using each feedback photodetector to generate a feedback signal to indicate a coupling efficiency of the laser beam into the corresponding waveguide through the corresponding coupler; and aligning each beam-shaping optical element to cause the laser beam generated by the corresponding laser die to be coupled through the corresponding coupler to the corresponding input waveguide in the photonic integrated circuit, in which the aligning of the beam-shaping optical element is based on the feedback signal generated by the corresponding feedback photodetector.

Embodiments of the method can include one or more of the following features. The aligning of the beam-shaping optical element can include aligning the beam-shaping optical element to maximize the coupling of the laser beam into the corresponding waveguide Attaching a plurality of laser dies can include attaching at least eight laser dies. The photonic integrated circuit can be configured to perform operations on input vectors each having at least eight parallel bits, and each bit can be represented by a modulated version of the laser beam generated by one of the laser dies.

The beam-shaping optical elements can include lenses.

In another general aspect, an apparatus includes: a photonic integrated circuit attached to a support structure by an array of first conducting structures on a first surface of the photonic integrated circuit. The photonic integrated circuit includes: a waveguide and a coupler configured to couple an optical beam into the waveguide; and an electronic integrated circuit attached to the photonic integrated circuit by an arrangement of second conducting structures that are coupled to the photonic integrated circuit and to the electronic integrated circuit. The arrangement of second conducting structures provide electrical communication between the electronic integrated circuit and the photonic integrated circuit. The photonic integrated circuit further includes: a plurality of conductive vias through at least a portion of the photonic integrated circuit extending from the arrangement of second conducting structures to the first surface of the photonic integrated circuit.

Embodiments of the apparatus can include one or more of the following features. The coupler can be in proximity to the first surface of the photonic integrated circuit.

The photonic integrated circuit can further include optoelectronic computing elements including at least one optoelectronic computing element coupled to the waveguide.

The optoelectronic computing elements can be in one or more layers of the photonic integrated circuit that are closer to the first surface than to the arrangement of second conducting structures.

The arrangement of second conducting structures can include a plurality of backside redistribution layers (RDLs) in proximity to a second surface of the photonic integrated circuit.

The arrangement of second conducting structures can include a plurality of backside redistribution layers (RDLs) in proximity to a surface of the electronic integrated circuit.

The photonic integrated circuit can further include optoelectronic computing elements including at least one optoelectronic computing element coupled to the waveguide.

The electronic integrated circuit can include control circuitry configured to provide electronic control signals for controlling the optoelectronic computing elements.

The optoelectronic computing elements can include at least one optical modulator that modulates an optical signal based on at least one of the electronic control signals.

The support structure can include a land grid array substrate that includes an array of contacts on a surface of the land grid array substrate that provide electrical connectivity to the array of first conducting structures on the first surface of the photonic integrated circuit.

The apparatus can further include a photonic source configured to provide the optical beam.

The photonic source can be attached to a portion of the land grid array substrate or an interposer attached to the land grid array substrate.

The coupler can include an edge coupler.

The land grid array substrate can define an opening, and a portion of a module can be inserted within a portion of the opening and be attached to the first surface of the photonic integrated circuit.

The portion of the module can include an optical connector coupled to the photonic source.

The coupler can include a waveguide grating coupler.

The module can include a digital storage module.

The digital storage module can include a high bandwidth memory (HBM) stack of two or more dynamic random access memory (DRAM) integrated circuits.

The coupler can include a waveguide grating coupler.

The coupler can include an edge coupler.

In another general aspect, an apparatus includes: an electronic integrated circuit; and a photonic integrated circuit that includes: a plurality of conductive vias through at least a portion of the photonic integrated circuit, in which the conductive vias extend to a first surface of the photonic integrated circuit facing away from the electronic integrated circuit, and the conductive vias are configured to provide electrical conductive paths for the electronic integrated circuit to a component coupled to the first surface of the photonic integrated circuit.

Embodiments of the apparatus can include one or more of the following features. A plurality of the conductive vias can be configured to provide electrical contact to a substrate for the electronic integrated circuit, in which the photonic integrated circuit is disposed between the electronic integrated circuit and the substrate.

The substrate can include a land grid array substrate that includes an array of contacts on a surface of the land grid array substrate that provide electrical connectivity to an array of conducting structures on the first surface of the photonic integrated circuit.

The apparatus can include the land grid array substrate.

The photonic integrated circuit can include: a waveguide, a coupler configured to couple an optical beam into the waveguide, and optoelectronic computing elements including at least one optoelectronic computing element coupled to the waveguide.

The electronic integrated circuit can include control circuitry configured to provide electronic control signals for controlling the optoelectronic computing elements in the photonic integrated circuit.

The apparatus can include a photonic source configured to provide the optical beam.

The apparatus can include a storage device electrically coupled to the first surface of the photonic integrated circuit. The electronic integrated circuit can be electrically coupled to a second surface of the photonic integrated circuit, and the electronic integrated circuit can be electrically coupled to the storage device through at least some of the conductive vias.

The storage device can include a high bandwidth memory (HBM) stack of two or more dynamic random access memory (DRAM) integrated circuits.

In another general aspect, a method for fabricating an integrated optoelectronic device is provided, the method includes: forming a plurality of layers of a photonic integrated circuit, including forming a plurality of redistribution layers (RDLs) on a layer at which ends of conductive vias are exposed. The method includes forming a plurality of layers of an electronic integrated circuit, including forming a plurality of redistribution layers (RDLs) on a layer at which electronic signals are provided. The method includes bonding together a plurality of the RDLs of the photonic integrated circuit and a plurality of the RDLs of the electronic integrated circuit.

Implementations of the method can include one or more of the following features. Forming the plurality of layers of the photonic integrated circuit can further include: forming in one or more layers a waveguide and a coupler coupled to the waveguide, and forming in one or more layers optoelectronic computing elements including at least one optoelectronic computing element coupled to the waveguide. The method can include forming the conductive vias through a plurality of layers including the one or more layers in which the waveguide, coupler, and optoelectronic computing elements are formed.

Forming the plurality of layers of the electronic integrated circuit can further include forming in one or more layers circuitry configured to provide the electronic signals.

The method can further include removing a portion of the photonic integrated circuit to expose ends of the conductive vias and to expose the coupler.

The method can further include attaching the exposed ends of the conductive vias to a support structure by an array of conducting structures.

The support structure can include a land grid array substrate that includes an array of contacts on a surface of the land grid array substrate that provide electrical connectivity to the array of conducting structures.

The method can further include forming an opening in the land grid array substrate, and attaching a module to a surface of the photonic integrated circuit with a portion of the module inserted within a portion of the opening.

The module can include a photonic source positioned to provide an optical beam to the coupler.

The module can include a high bandwidth memory (HBM) stack of two or more dynamic random access memory (DRAM) integrated circuits.

The coupler can include a waveguide grating coupler.

Forming the conductive vias can occur before forming the optoelectronic computing elements.

In another general aspect, a method for fabricating an integrated optoelectronic device is provided, the method includes: forming a plurality of layers of a photonic integrated circuit; and forming a plurality of redistribution layers on a surface of the photonic integrated circuit on which ends of conductive vias are exposed, in which a plurality of first electrical contacts are formed on a surface of the redistribution layers. The method includes forming a plurality of layers of an electronic integrated circuit; and forming a plurality of redistribution layers on a surface of the electronic integrated circuit on which electronic signals are provided, in which a plurality of second electrical contacts are formed on a surface of the redistribution layers. The method includes bonding together the first electrical contacts of the redistribution layers on the photonic integrated circuit and the second electrical contacts of the redistribution layers on electronic integrated circuit.

Forming the plurality of layers of the photonic integrated circuit can further include: forming in one or more layers a waveguide and a coupler coupled to the waveguide, forming in one or more layers optoelectronic computing elements including at least one optoelectronic computing element coupled to the waveguide, and forming the conductive vias through a plurality of layers including the one or more layers in which the waveguide, coupler, and optoelectronic computing elements are formed.

Implementations of the method can include one or more of the following features. Forming the plurality of layers of the electronic integrated circuit can further include forming in one or more layers circuitry configured to provide the electronic signals.

The method can further include removing a portion of the photonic integrated circuit to expose ends of the conductive vias and to expose the coupler.

The method can further include attaching the exposed ends of the conductive vias to a support structure by an array of conducting structures.

The support structure can include a land grid array substrate that includes an array of contacts on a surface of the land grid array substrate that provide electrical connectivity to the array of conducting structures.

The method can further include forming an opening in the land grid array substrate, and attaching a module to a surface of the photonic integrated circuit with a portion of the module inserted within a portion of the opening.

The module can include a photonic source positioned to provide an optical beam to the coupler.

The coupler can include a waveguide grating coupler.

Forming the conductive vias can occur before forming the optoelectronic computing elements.

In another general aspect, a method includes: operating an electronic integrated circuit; and operating a photonic integrated circuit having a first surface coupled to the electronic integrated circuit. The method includes at least one of (i) transmitting electric signals from the electronic integrated circuit to another electronic component through one or more conductive vias that pass through the photonic integrated circuit from the first surface of the photonic integrated circuit to a second surface of the photonic integrated circuit, or (ii) at the electronic integrated circuit, receiving electric signals transmitted from another electronic component through one or more conductive vias that pass through the photonic integrated circuit from a second surface of the photonic integrated circuit to the first surface of the photonic integrated circuit.

Operating the photonic integrated circuit can include operating optoelectronic computing elements in the photonic integrated circuit. Operating the electronic integrated circuit can include: generating electronic control signals for controlling the optoelectronic computing elements in the photonic integrated circuit, and transmitting data to a storage device coupled to the second surface of the photonic integrated circuit. Transmitting data to the storage device can include transmitting the data through one or more conductive vias that pass through the photonic integrated circuit from the first surface of the photonic integrated circuit to the second surface of the photonic integrated circuit.

In another general aspect, an artificial neural network computation system includes any of the apparatuses described above.

In another general aspect, a system includes at least one of a robot, an autonomous vehicle, an autonomous drone, a medical diagnosis system, a fraud detection system, a weather prediction system, a financial forecast system, a facial recognition system, a speech recognition system, a metaverse generator, or a product defect detection system. The at least one of a robot, an autonomous vehicle, an autonomous drone, a medical diagnosis system, a fraud detection system, a weather prediction system, a financial forecast system, a facial recognition system, a speech recognition system, a metaverse generator, or a product defect detection system includes any of the apparatuses described above.

In another general aspect, a system can include a mobile phone or a portable computer, in which the mobile phone or portable computer includes any of the apparatuses described above.

Aspects can have one or more of the following advantages. The techniques described herein enable a multi-laser photonic source to be integrated into a photonic computing platform in a manner that provides efficient alignment of the individual lasers within the photonic source. An advantage of integrating a multi-laser photonic source into a photonic computing platform is the relatively large number of optical channels (e.g., at the same or different wavelengths) that can be provided for performing photonic computing operations. For example, a multi-laser photonic source such as a set of laser dies mounted on a substrate, or a laser chip-on-submount (CoS) bar, can be integrated in a manner that enables a reduced optical path length between each laser in the photonic source and a corresponding optical waveguide within a photonic integrated circuit (PIC) that hosts an array of photonic computing elements.

The techniques are able to reduce or avoid the need for certain types of optical connectors, such as fiber arrays, for external and internal optical connections. Such optical connectors can present a challenge for integrating a relatively large number of optical connections. The techniques are also compatible with various thermal dissipation mechanisms that result in more controllable thermal environment than other techniques for integrating lasers within a photonic integrated circuit. The resulting system provides enhanced system performance, reduced system complexity, and a more compact product. The photonic computing platform can be configured as a system-in-package, for example, and/or can be provided in the form of a chiplet or another kind of module that is further integrated with other system components. The techniques also simplify the manufacture processes, which is scalable to volume production, and potentially reduce both the cost and the development cycle time.

The details of one or more embodiments of the subject matter described in this specification are set forth in the accompanying drawings and the description below. Other features, aspects, and advantages of the invention will become apparent from the description, the drawings, and the claims.

Unless otherwise defined, all technical and scientific terms used herein have the same meaning as commonly understood by one of ordinary skill in the art to which this invention belongs. In case of conflict with patent applications or patent application publications incorporated herein by reference, the present specification, including definitions, will control.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

FIGS. 19A and 19B are schematic diagrams of example system configurations.

FIG. 49B is a mathematical representation of the operation of the ANN computation system of FIG. 49A.

DETAILED DESCRIPTION

Figure 1:
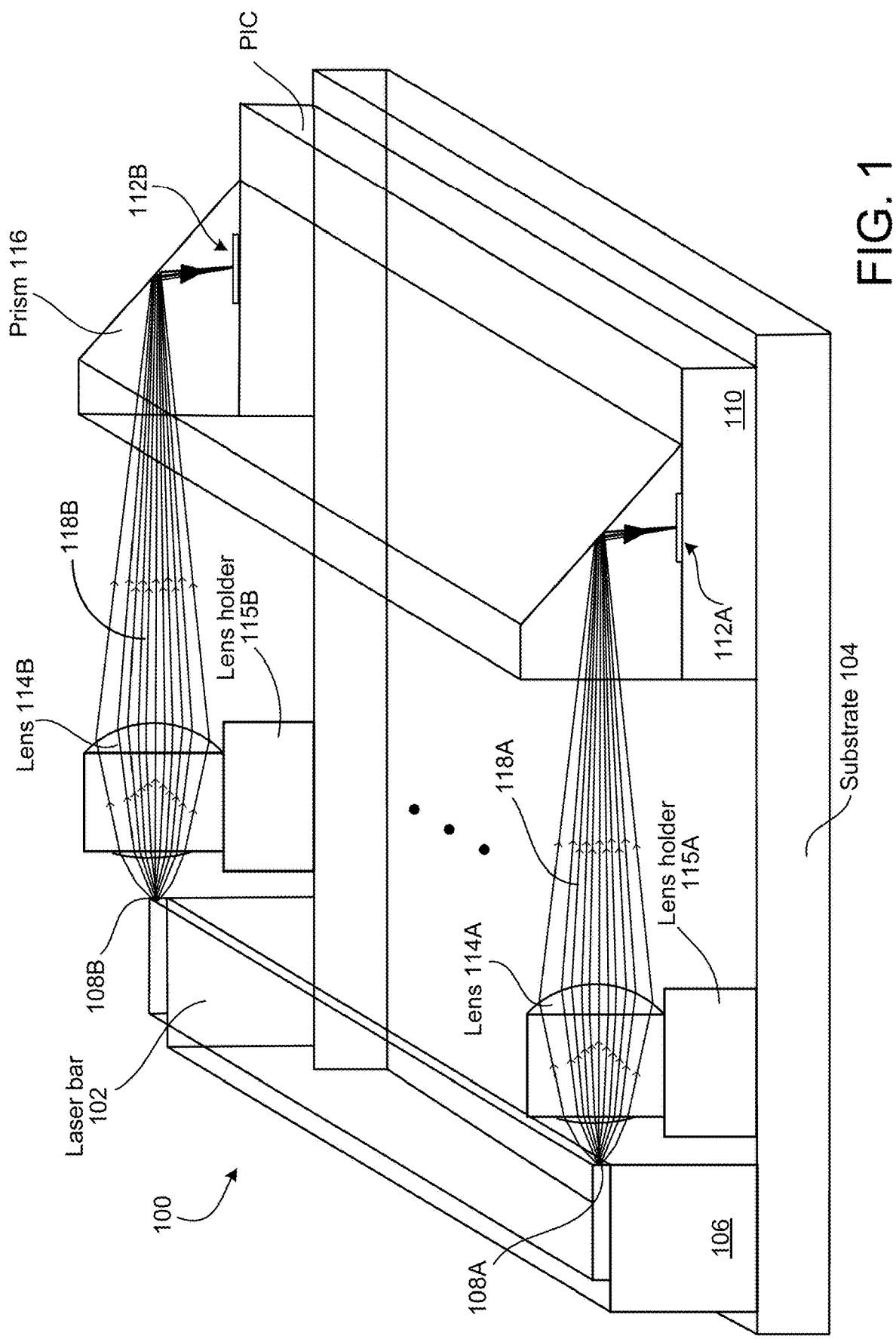
FIG. 1 is a schematic diagram of an example of a photonic computing system.

FIG. 1 shows an example of a photonic computing system 100. The system 100 includes a photonic source 102 (e.g., a laser bar) attached to a submount 106, which is attached to a support structure 104 (e.g., a silicon-based substrate). The photonic source 102 comprises: a first laser module 108A providing a first optical beam 118A emitted from a first emitting location, and a second laser module 108B providing a second optical beam 118B emitted from a second emitting location. The optical beams are collectively referenced as 118. The system 100 includes a photonic integrated circuit 110 attached to the support structure 104. The photonic integrated circuit 110 comprises: a first waveguide and a first guided-mode resonance coupler 112A coupled to the first waveguide, and a second waveguide and a second guided-mode resonance coupler 112B coupled to the second waveguide. The guided-mode resonance couplers are collectively referenced as 112.

The system 100 includes multiple beam-shaping optical elements attached to the support structure 104. In this example, the beam-shaping optical elements comprises: a first lens 114A positioned on a lens holder 115A and configured such that the first optical beam 118A is coupled to the first guided-mode resonance coupler 112A, and a second lens 114B positioned on a lens holder 115B and configured such that the second optical beam 118B is coupled to the second guided-mode resonance coupler 112B. The beam-shaping optical elements are collectively referenced as 114. A beam-redirecting optical element 116 (e.g., a prism) is attached to the photonic integrated circuit 110 and configured to redirect the first optical beam 118A into the first guided-mode resonance coupler 112A and to redirect the second optical beam 118B into the second guided-mode resonance coupler 112B by reflection of the first optical beam 118A and the second optical beam 118B from a common surface. As will be apparent with reference to a variety of examples described herein, different implementations can have different arrangements for some of these elements and still provide the beam alignment capabilities described herein. For example, the lenses 114A and 114B can be attached to the photonic integrated circuit 110. For example, the beam-redirecting optical element 116 can be replaced by two beam-redirecting optical elements that each redirects a respective optical beam.

In some implementations, the photonic source 102 includes a third laser module that provides a third optical beam emitted from a third emitting location. The first, second, and third laser modules can be positioned such that the first, second, and third emitting locations are substantially aligned along a line. For example, the distance between each emitting location and the line can be less than a specified distance. In some implementations, the photonic source 102 includes a fourth laser module that provides a fourth optical beam emitted from a fourth emitting location. The first to fourth laser modules can be positioned such that the first to fourth emitting locations are substantially aligned along a plane. For example, the distance between each emitting location and the plane can be less than a specified distance. The photonic source 102 can also include five or more laser modules that are positioned such that the emitting locations are substantially aligned along a plane, and the distance between each emitting location and the plane is less than a specified distance. The alignment of the laser modules along a line or plane makes it easier to position the beam-shaping optical elements 114 to cause the optical beams to be coupled to the respective guided-mode resonance couplers. The specified distance can depend on the tolerance acceptable for the alignment of the laser modules, and can vary depending on system design.

Figure 2A:
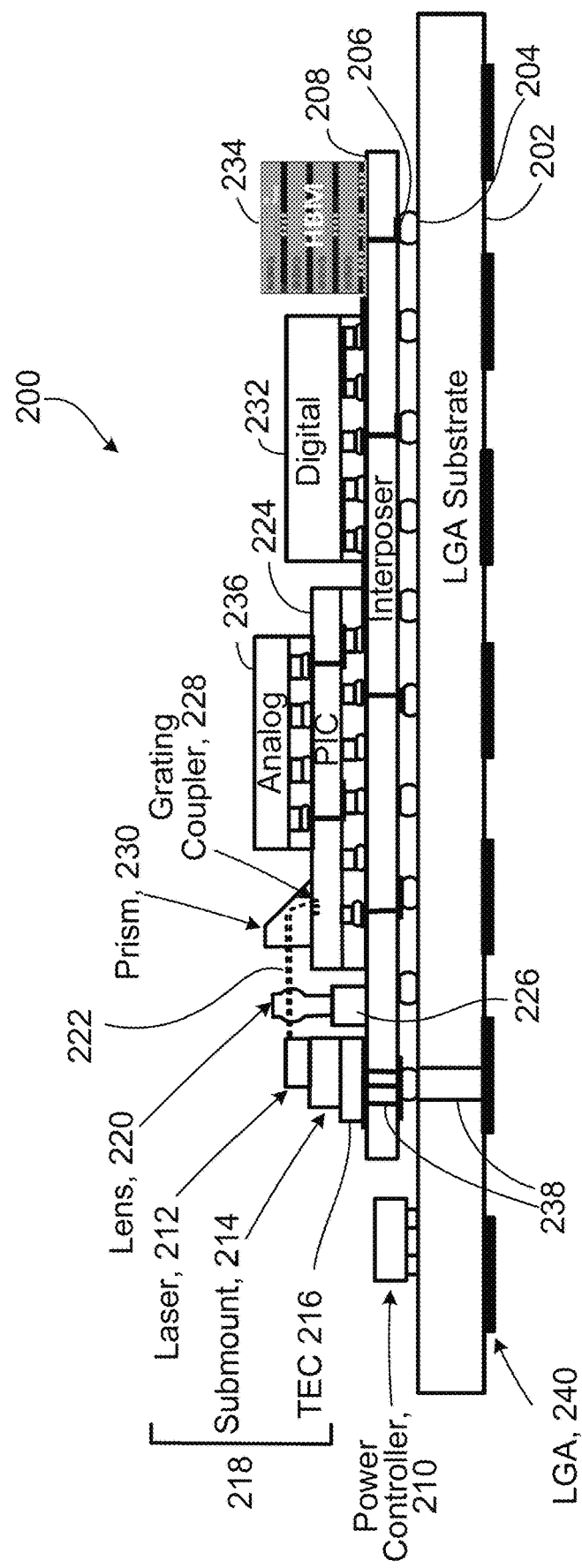
FIGS. 2A-2G are schematic diagrams of views of an example of a packaged photonic computing system.

Referring to FIG. 2A, another example of a photonic computing system 200 includes a land grid array (LGA) substrate 202 that provides an array of contacts 204 on the top (e.g., in the form of pins or contacts for solder-based mounting) for providing electrical connectivity for an array of input/output signals provided by an array of contacts 206 that form an LGA footprint on the bottom of an interposer 208. Alternatively, any other surface-mount packaging structure, for example, can be used to provide electrical input/output connectivity. The interposer 208 on the top of the LGA substrate 202 provides electrical signal paths for communication among different devices that are mounted on top of the interposer 208. The interposer 208 can be formed from silicon, a silicon-on-insulator substrate, an organic substrate, or a silicon on an organic substrate, for example. In some examples, the interposer can include an optoelectronic interposer that provides optical signal paths for optical signals from the photonic integrated circuit. Additional components can be attached to the LGA substrate 202, such as a power controller 210 shown in this example for controlling power signals provided through the LGA substrate 202 to operate various other components and devices in the system 200. In this example, the interposer 208 also serves as a support structure on which different components can be supported for the alignment techniques described herein. The LGA substrate 202 has electrical contacts 240 (or lands) within an LGA footprint.

A feature of the photonic computing system 200 is that the photonic integrated circuit 224 and the laser modules 212 are all mounted on the LGA substrate 202 and form an integrated package that can be electrically coupled to a circuit board, e.g., with or without a socket. The photonic computing system 200 is more compact and easier to install in an overall data processing system, as compared to another photonic computing system that has external laser modules mounted external to the LGA substrate and uses optical fibers to couple light from the external laser modules to the photonic integrated circuit.

Figure 2B:
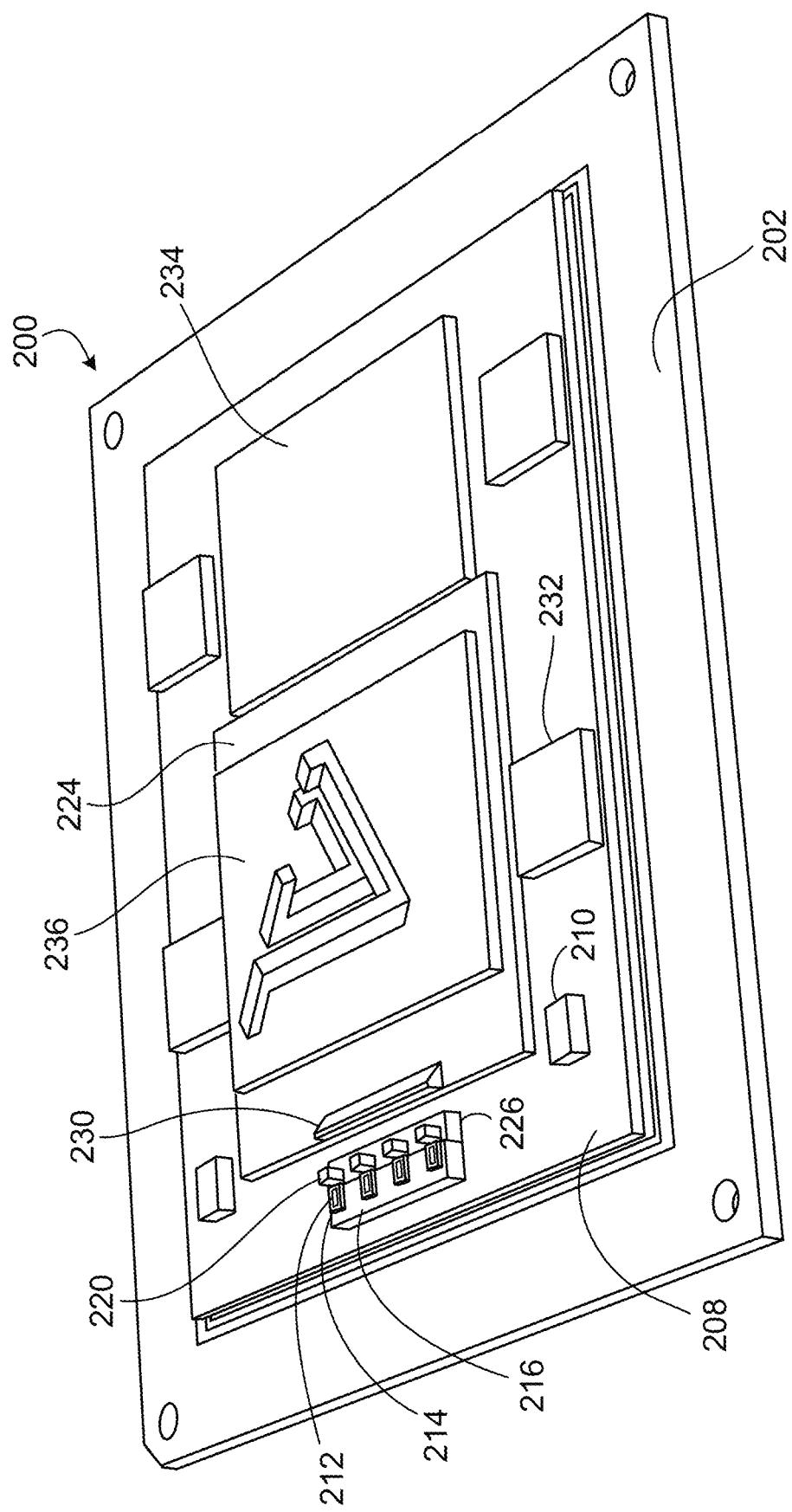
Figure 2C:
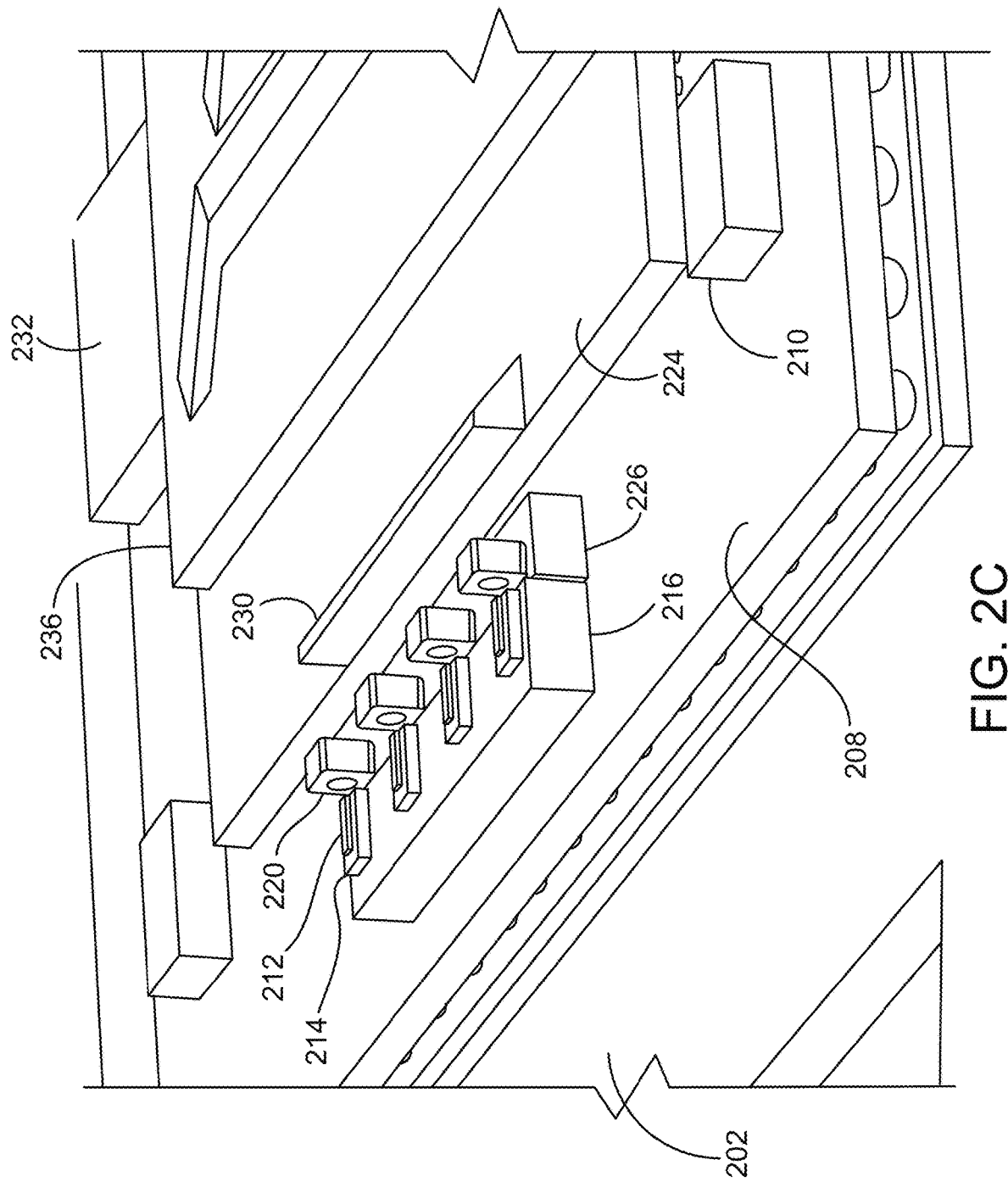

In some implementations, a photonic source is provided as an array of laser modules 212 on respective support structures, which are submount structures 214 that are attached to a thermoelectric cooler (TEC) 216 to provide temperature control. In some implementations, the array of laser modules 212 can be disposed on a common submount structure that is attached to the thermoelectric cooler 216. The laser modules 212 provide laser beams 222 that are directed and coupled to a photonic integrated circuit 224. FIG. 2A shows a side view of the system 200. FIG. 2B shows a perspective view of the system 200, in which multiple laser modules are shown. FIG. 2C provides a closer view of a portion of the system 200 in which the lasers 212 are supported on individual support structures (submount structures) 214 that are attached to the thermoelectric cooler 216 to form an integrated laser chip-on-submount bar 218.

Referring back to FIG. 2A, the thermoelectric cooler 216 is controlled by control signals transmitted by connections provided by the interposer 208 underneath. For example, heat is transferred from the top side to the bottom side of the thermoelectric cooler 216, heat conduction paths are provided through the interposer 208 and the LGA substrate 202 that allow the heat from the underside of the thermoelectric cooler 216 to be transferred to the bottom side of the LGA substrate 202. For example, the heat can be dissipated from the bottom side of the LGA substrate 202 to the ambient environment, or through a heat sink (not shown in the figure) or another thermoelectric cooler (e.g., 272 of FIG. 2G) attached to the underside of the LGA substrate 202.

There is also an array of lenses 220 that serve as beam-shaping elements for the beam 222 of each laser module 212, with each lens 220 being housed within a separate housing that is mounted on a common support structure 226 (or "lens holder") for the lenses 220. The position and orientation of each housed lens 220 can be independently adjusted on the lens holder 226. For example, the lens holder 226 can be mounted directly on the interposer 208 such that each lens 220 is at the correct height for aligning to the beam 222 of a respective laser module 212, as shown in FIGS. 2A, 2B, and 2C. The lenses 220 can be shaped to provide a desired beam-shaping function (e.g., spherical or aspherical lenses), and the lenses 220 can be formed from any of a variety of materials (e.g., glass, silicon, or plastic).

The photonic integrated circuit (PIC) 224 is mounted and electrically connected to contacts of the interposer 208. For example, the photonic integrated circuit 224 can be mounted by die attachment, wirebonding, or a controlled collapse chip connection (also called a "flip-chip" connection). The photonic integrated circuit 224 provides photonic computing elements (e.g., a 2D array of interferometric modulators) that receive light from the array of laser modules 212 as inputs for performing photonic computations. In some implementations, the light is coupled into the photonic integrated circuit 224 via a guided-mode resonance coupler 228, such as a grating coupler. For example, in the system 200, an array of waveguides in the photonic integrated circuit 224 are arranged to receive light from beams 222 that are coupled to the photonic integrated circuit 224 via an array of grating couplers 228 at the surface of the photonic integrated circuit 224. The view of FIG. 2A shows one of those grating couplers 228, and a prism 230 that serves as a beam-redirecting optical element to redirect a beam 222 that has been focused by one of the lenses 220. The prism 230 can be configured to have an apex angle that is selected to redirect the beam propagation axis from horizontal to close to vertical to facilitate coupling the light into the photonic integrated circuit 224 at the appropriate angle for the guided-mode resonance coupler 228 (e.g., between around 30° to around 60°). For purpose of illustration, in this example it is assumed that the top surface of the LGA substrate 202, the top surface of the interposer 208, and the top surface of the photonic integrated circuit 224 are oriented substantially horizontally. It is understood that the system 200 can be operated in any orientation.

Alternatively, in other implementations, the light is coupled into the photonic integrated circuit 224 using a different type of coupler, such as an edge coupler where a portion of a waveguide (e.g., a tapered portion) is formed up to an edge of the photonic integrated circuit 224, in which case the prism is not necessary. An optical wirebond between the laser module and the photonic integrated circuit can be used in some implementations, e.g., by use of optical fibers, in which case the lenses and the prism are not necessary. Different implementations have different trade-offs in terms of ease of fabrication, cost, and other factors.

For implementations that use lenses (or other beam-shaping elements 220) and guided-mode resonance couplers 228, independent alignment of the lenses 220 between the laser modules 212 and respective guided-mode resonance couplers 228 facilitates accurate matching of the spatial modes of the optical beams 222 on either side of each lens 220 (called "mode matching"). Accurate mode matching provides uniform and low-loss coupling for the corresponding optical channels they support. The beam-shaping properties of each lens 220 match the size and divergence of the optical beam 222 arriving at the lens 220 from the laser module 212 to the size and divergence of the optical beam 222 delivered to the grating coupler 228. Additionally, the independent adjustability of the lenses 220 enables the fine alignment that is also needed to achieve accurate mode matching. The laser modules 212, lenses 220, prism 230, and photonic integrated circuit 224 are initially aligned in a coarse alignment procedure. Minor variations in the positions and orientations of the components can reduce the amount of light that is coupled into the photonic integrated circuit 224. A fine alignment procedure is used to compensate for such variations. For example, one degree of freedom that is able to improve the mode matching significantly is translation of each lens 220 in the plane transverse to the beam propagation axis. A pickup tool (e.g., one or more grippers) can be used, for example, to align each lens 220 until an alignment metric is optimized, and epoxy can be cured to secure the lens 220 in that position and orientation. In some implementations, the alignment metric is optimized using active alignment in which light from the laser 212 being aligned is coupled using the lens 220 as it is being aligned. For example, the alignment metric can be a coupling efficiency of the light from the laser 212 into the waveguide through the guided-mode resonance coupler 228. The amount of light that is coupled into the waveguide can be measured using a photodetector in the photonic integrated circuit 224, and the lens 220 is adjusted to maximize the amount of light that is coupled into the waveguide.

Electrical integrated circuit (EIC) chips can be included in the system 200 for performing various electronic control functions. In this example, the system 200 includes: an analog chip 236 mounted on the photonic integrated circuit 224 for providing electrical control signals to the modulators or other photonic or optoelectronic computing elements of the photonic integrated circuit 224, and a digital chip 232 mounted on the interposer 208 for controlling movement of data to and from a digital storage module 234 (e.g., a stack of multiple dynamic random access memory (DRAM) chips, as in a high bandwidth memory (HBM) chip), or other digital electronic modules. Alternatively, in some implementations, instead of including a digital storage module 234 in the system 200, a memory interface can be included for sending digital data to, and receiving data from, an external memory system. Any of the same mounting techniques used for the photonic integrated circuit 224, or other techniques, can be used for these electrical integrated circuits.

Figure 2D:
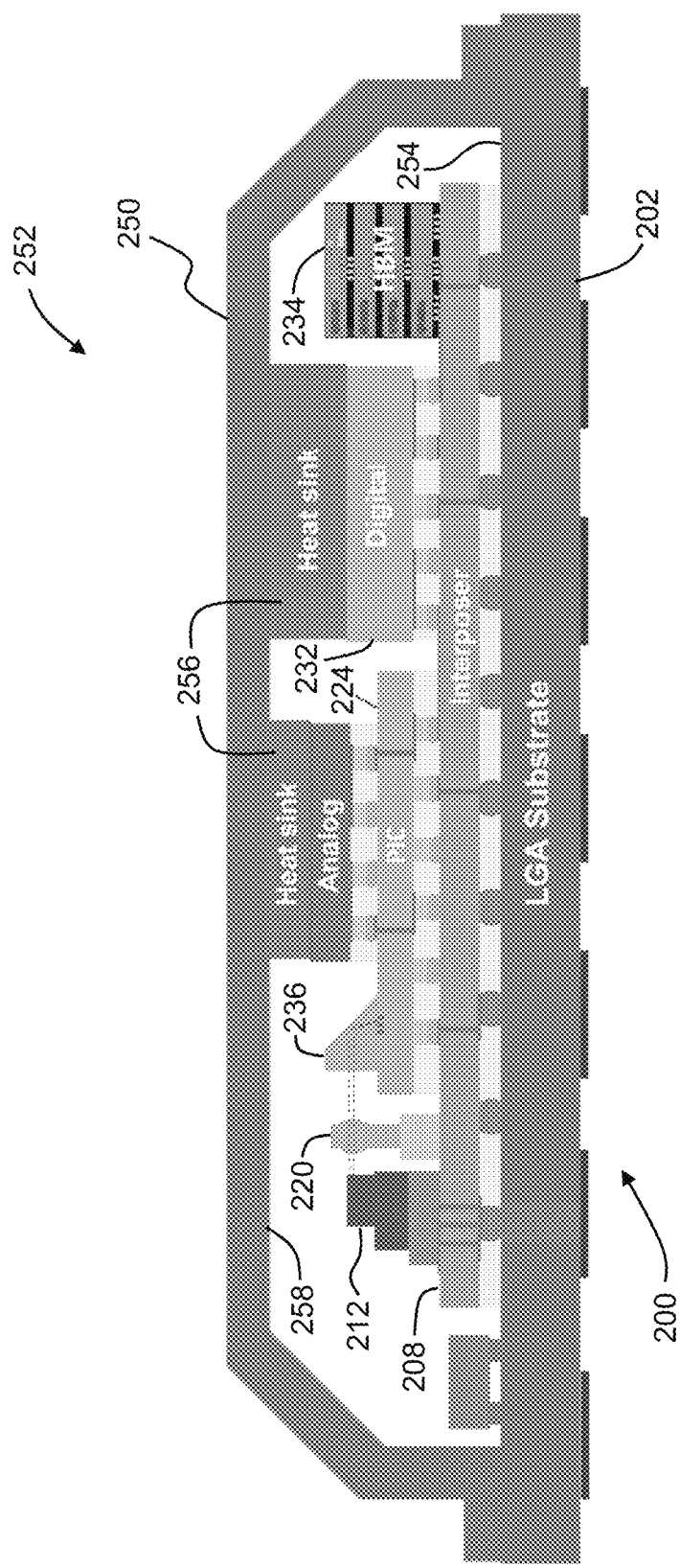
Figure 2E:
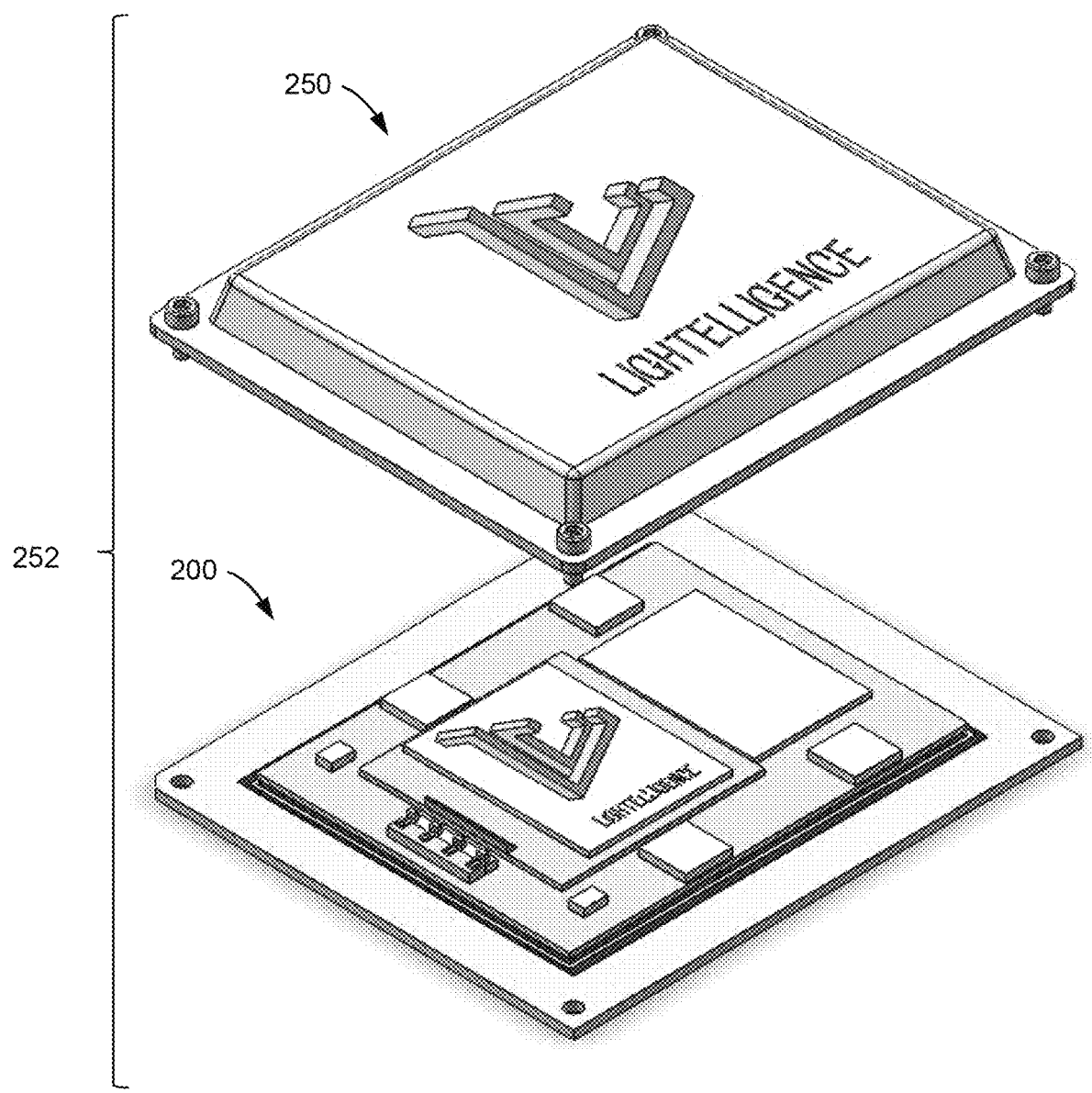

FIGS. 2D and 2E show side and perspective views, respectively, of a packaged photonic computing system 252 that includes a cover 250 that is attached to the top surface 254 of the LGA substrate 202. The cover 250 serves as physical protection for the system 200 and provides heat dissipation. In this example, heat sinks 256 are attached to the analog chip 236 and digital chip 232 such that they contact the inside surface 258 of the cover 250. The heat sinks 256 can be composed of any of a variety of thermally conductive materials. In some implementations, hermetic sealing can be used, which can increase performance for some systems.

Figure 2F:
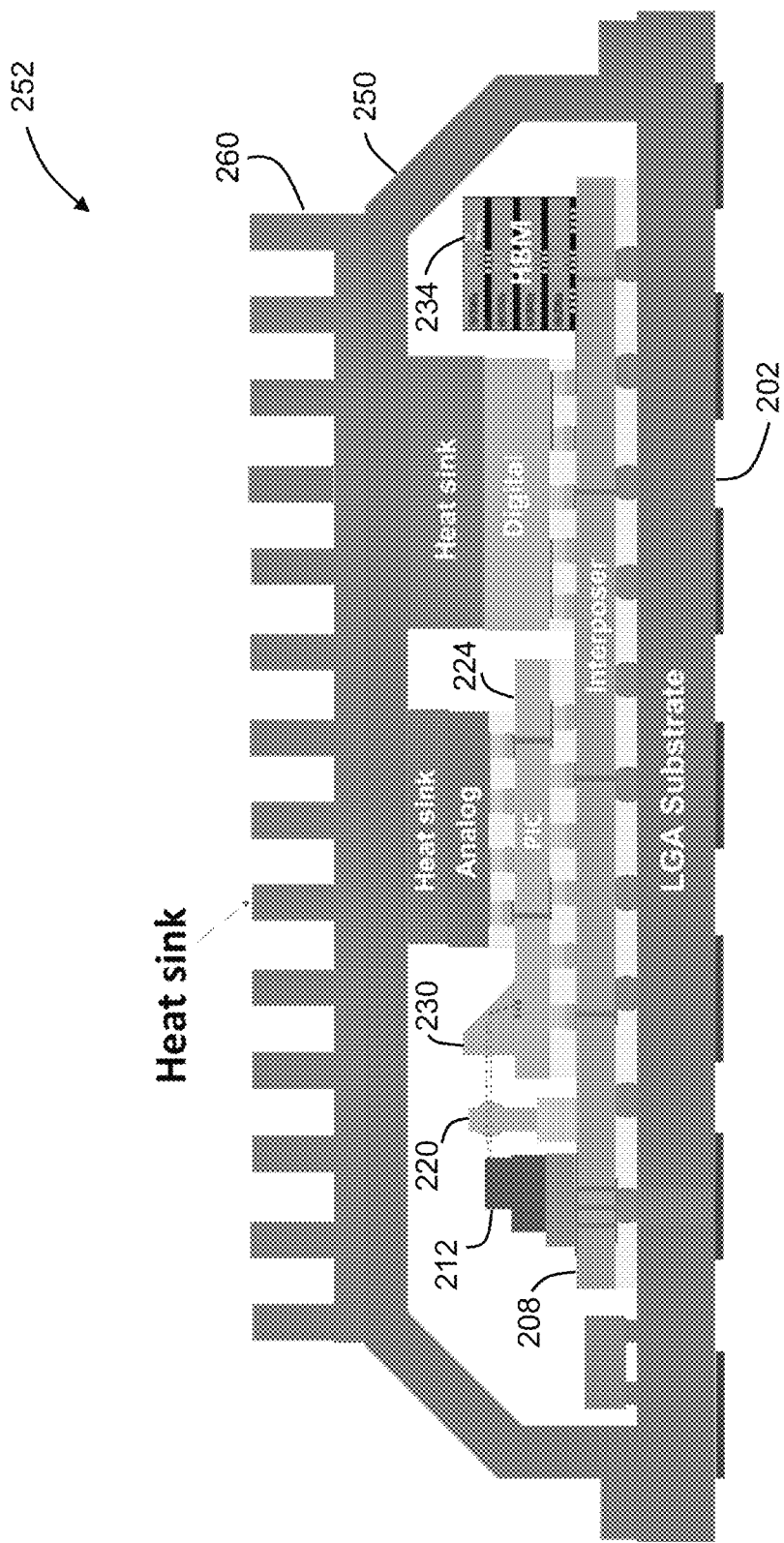
Figure 2G:
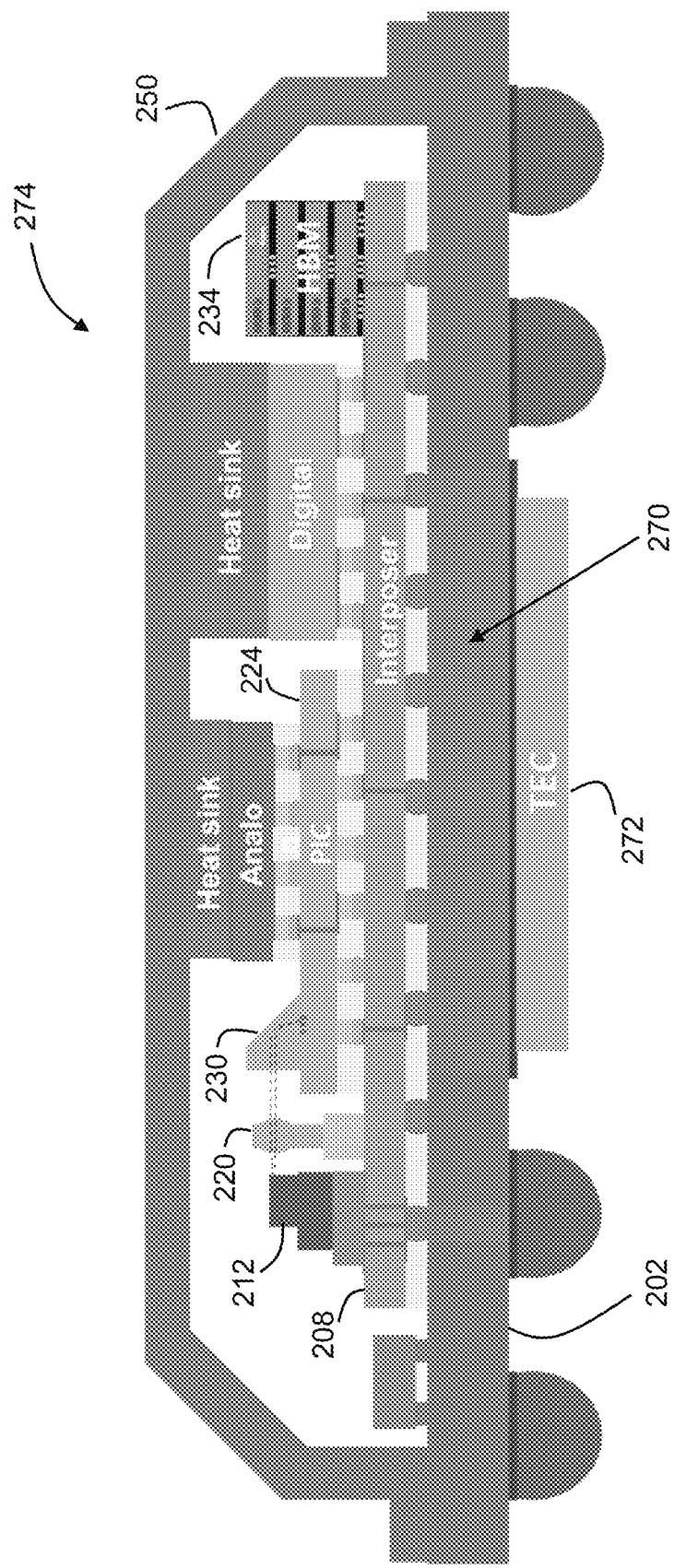

FIG. 2F shows an example of an additional external heat sink 260 placed on the cover 250 for additional heat dissipation. FIG. 2G shows an example of an alternative configuration of a system 274 in which there is a thermally conductive element 270 (e.g., a copper slug) embedded within the LGA substrate 202 and a thermoelectric cooler 272 connected to the bottom surface of the thermally conductive element 270.

Figure 3:
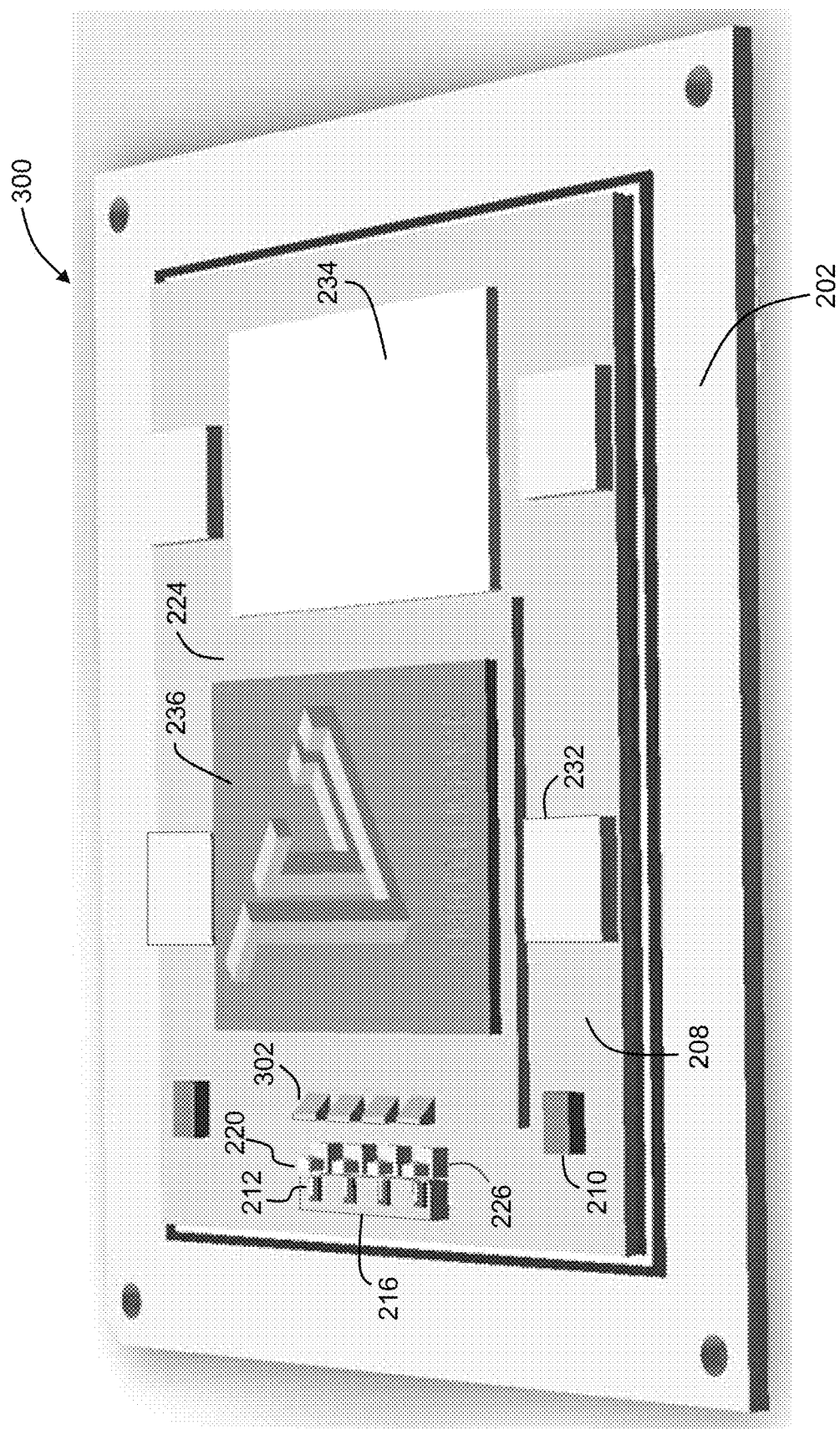
FIG. 3 is a schematic diagram of a perspective view of an example of a photonic computing system.

In some implementations, additional optical elements can be included to provide additional degrees of freedom for aligning a beam (e.g., 222) from each laser module (e.g., 212) to a respective waveguide in the photonic integrated circuit 224. FIG. 3 shows an alternative configuration of a system 300 in which, instead of a single prism for redirecting the laser beams to the respective gratings, there are separate prisms 302 that can each be adjusted as part of the fine alignment procedure for mode matching the laser beams (e.g., 222).

Figure 4:
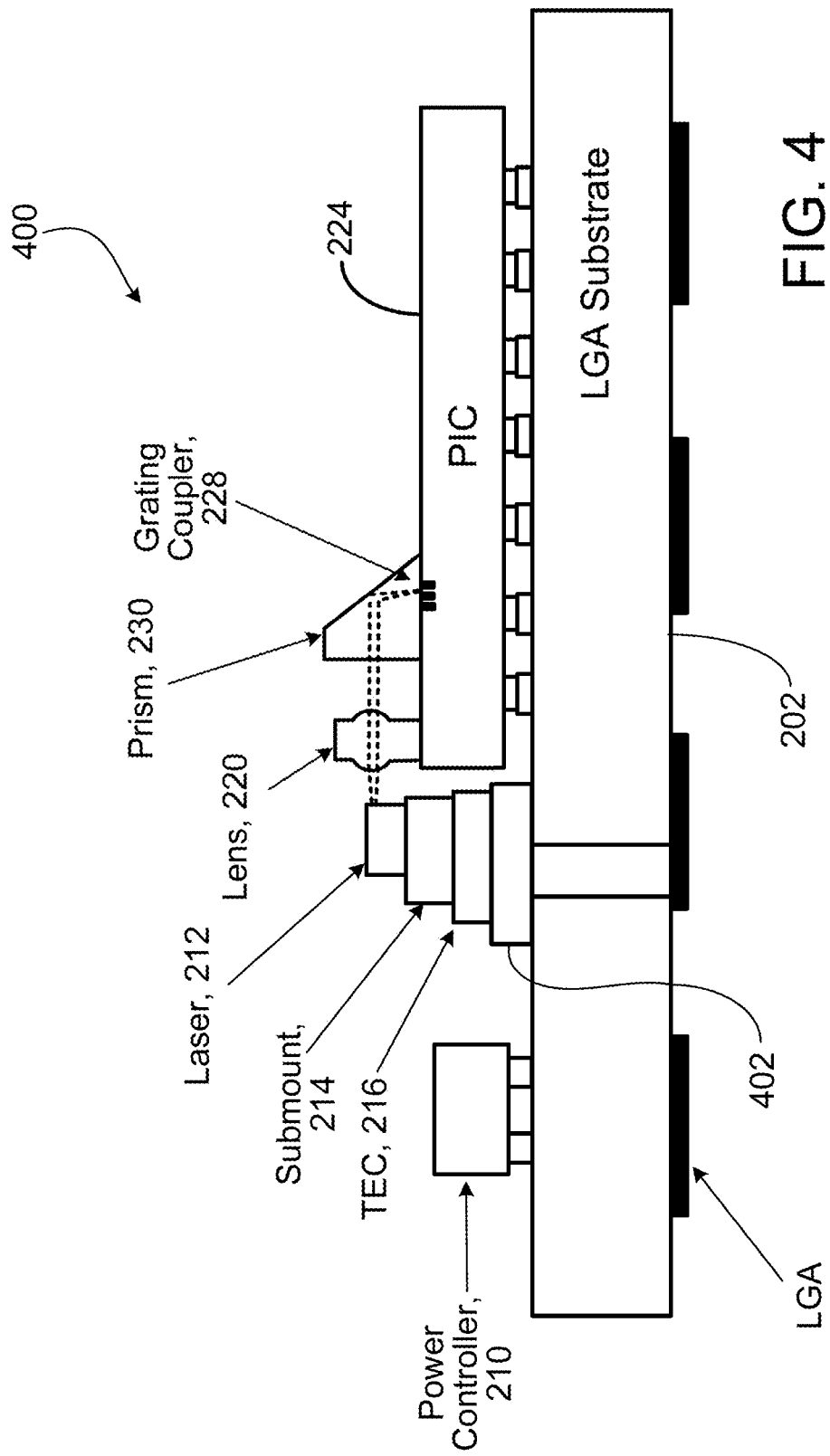
FIGS. 4 and 5A-5E are schematic diagrams of alternative examples of photonic computing system beam coupling arrangements.

There are also different ways to attach the lenses 220 to various structures for performing the fine alignment. FIG. 4 shows an example of an alternative arrangement of a photonic computing system 400 in which the lenses 220 and lens holder underneath are positioned on the photonic integrated circuit 224. In this example, an additional structure 402 under the thermoelectric cooler 216 ensures the laser modules 212 are at the correct height in a coarse alignment procedure.

Figure 5A:
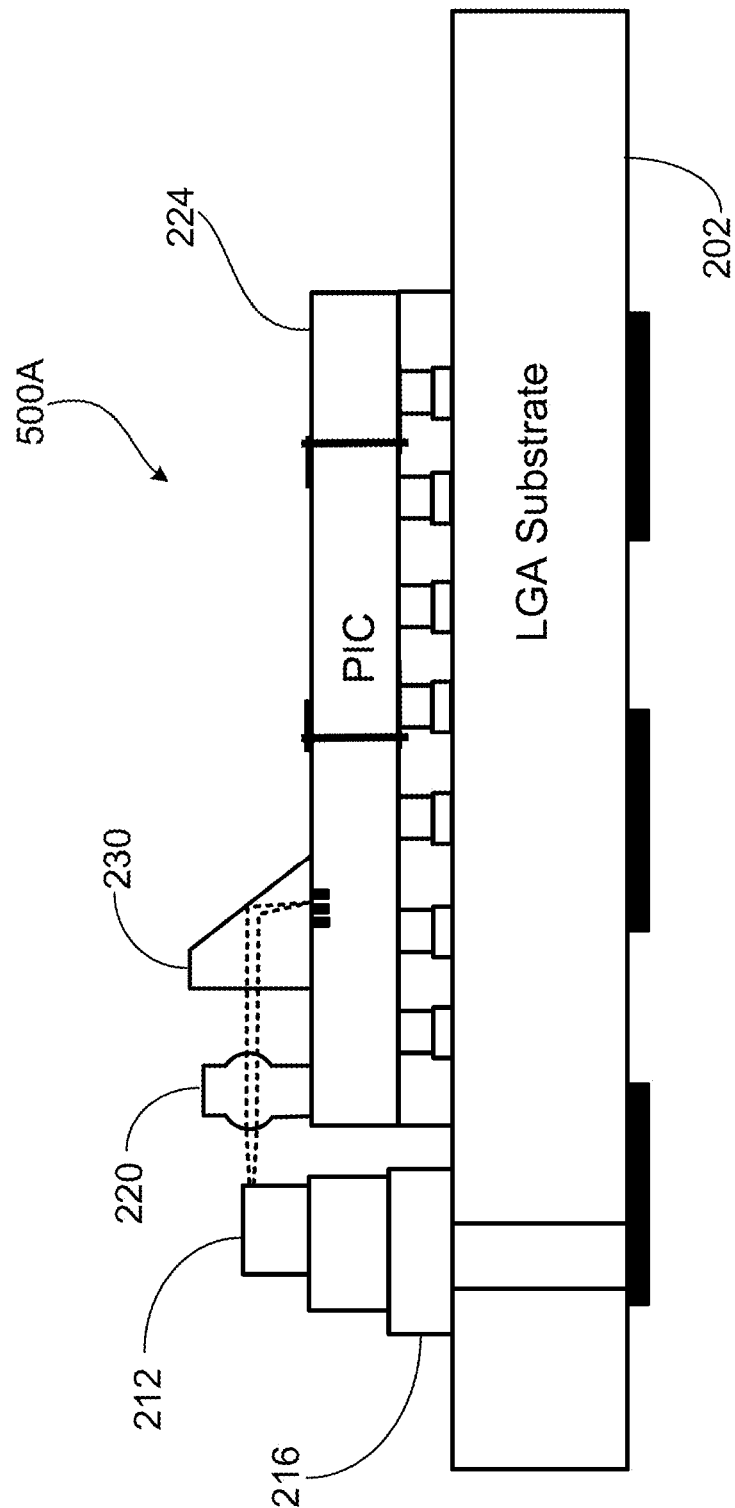
Figure 5B:
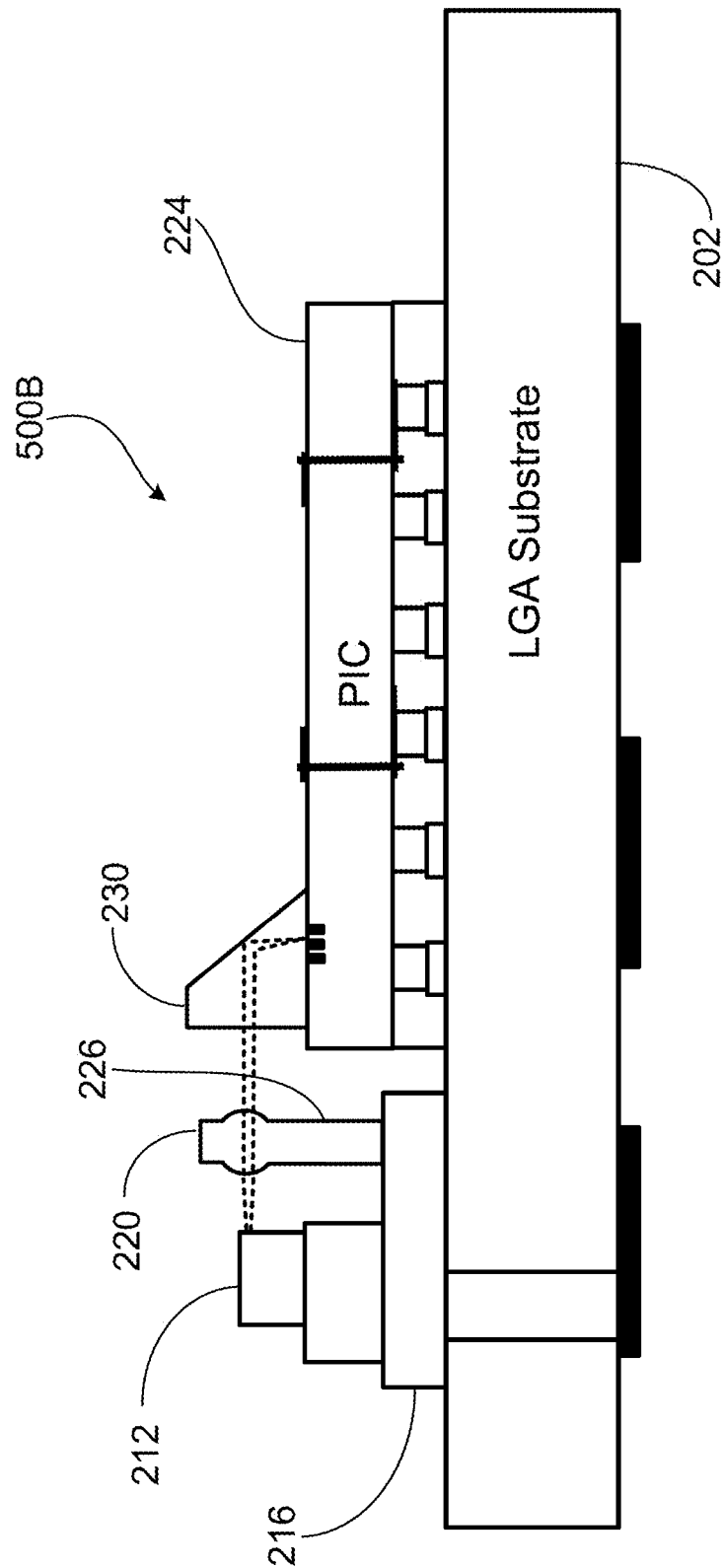
Figure 5C:
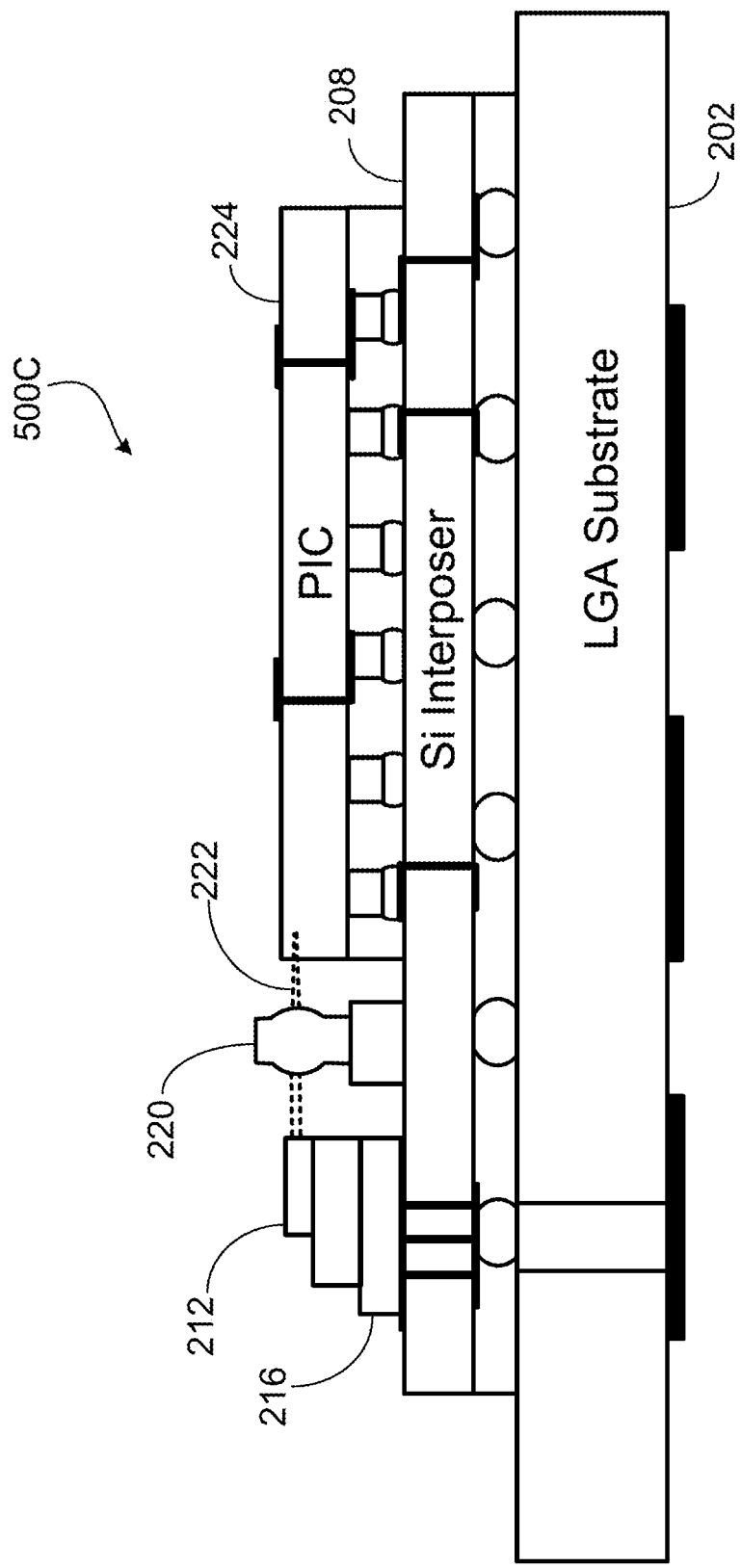
Figure 5D:
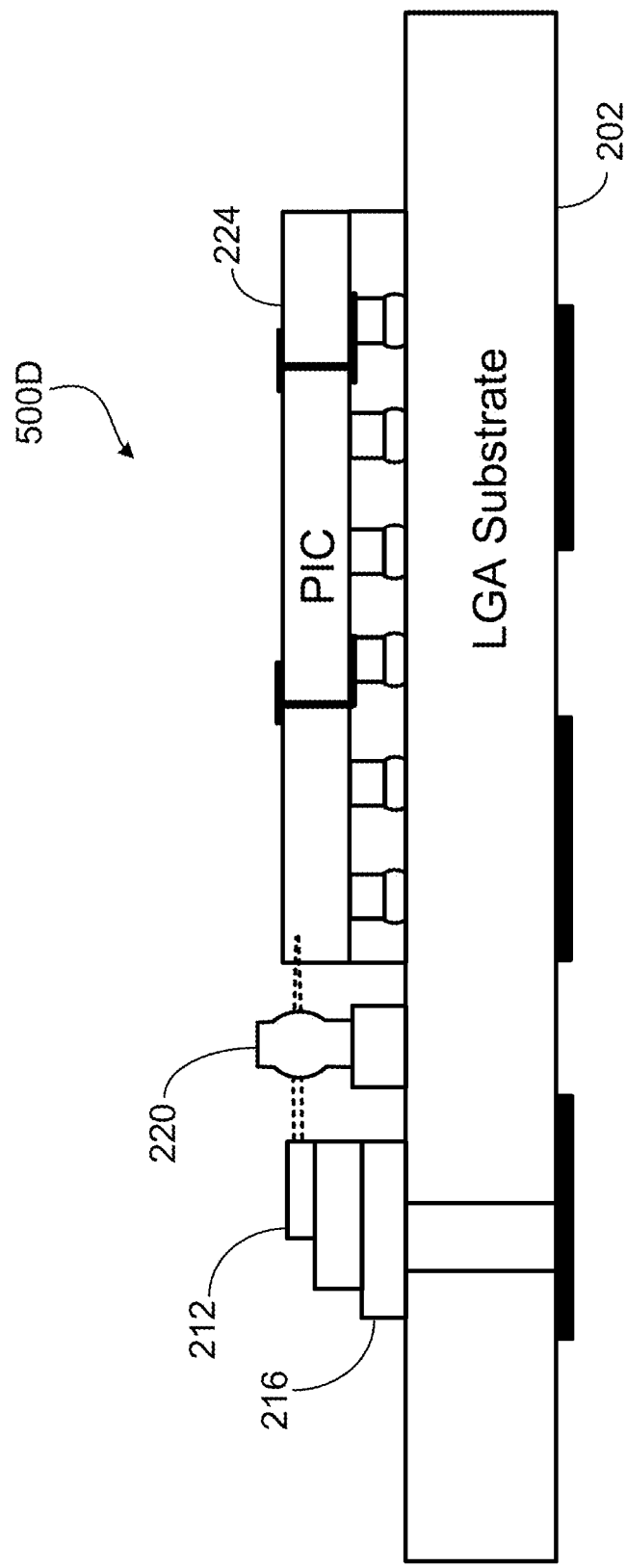
Figure 5E:
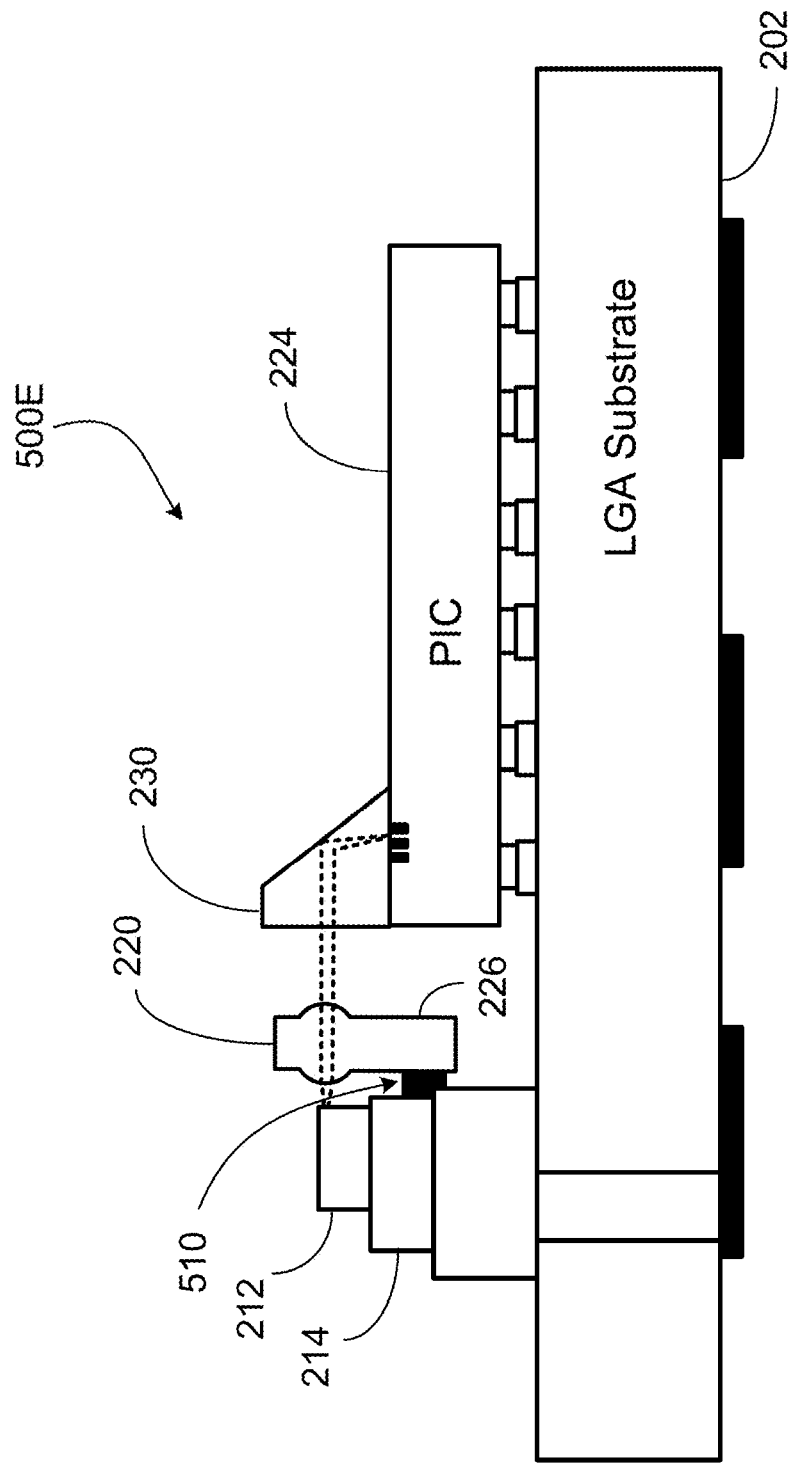

FIG. 5A shows an example of an alternative arrangement of a photonic computing system 500A in which the thermoelectric cooler 216 can be configured to have the appropriate height for coarse alignment without the need for an additional structure under the thermoelectric cooler 216. FIG. 5B shows an example of an alternative arrangement of a photonic computing system 500B in which the lenses 220 and lens holder 226 are on the thermoelectric cooler 216. FIG. 5C shows an example of an alternative arrangement of a photonic computing system 500C in which laser beams 222 from the lenses 220 are coupled into respective edge couplers (e.g., tapered waveguides) to match the modes of waveguides within the photonic integrated circuit 224. In this example, the laser modules 212, lenses 220, and photonic integrated circuit 224 are mounted on an interposer 208. FIG. 5D shows an example of an alternative arrangement of a photonic computing system 500D in which there is edge coupling without a separate interposer between the photonic integrated circuit 224 and the LGA substrate 202. No beam re-direction is needed in the edge coupling arrangements of FIGS. 5C and 5D. FIG. 5E shows an example of an alternative arrangement of a photonic computing system 500E in which the lens holder 226 is attached to the submount structure 214, which positions the lenses 220 even closer to the laser modules 212 in this mode matching arrangement. For example, a drop of a UV-cured epoxy 510 can be used to attach the lens holder 226 to the submount structure 214. In any of these implementations shown in FIGS. 5A to 5E, instead of a common lens holder 226, the housing for each lens 220 can be attached to a separate lens holder, which can then be aligned during fine alignment.

In some implementations, a photonic computing system can include multiple sets of laser modules that are mounted using various methods. For example, a photonic computing system can include two or more of the following: a first set of laser modules that are mounted on the LGA substrate (e.g., FIG. 5A) and a second set of laser modules that are mounted on the interposer 208 (e.g., FIG. 5C).

A photonic computing system that includes multiple sets of laser modules can also include multiple sets of lenses that are mounted using various methods. For example, a photonic computing system can include two or more of the following: a first set of lenses that are mounted on the LGA substrate (e.g., FIG. 5D), a second set of lenses that are mounted on the interposer 208 (e.g., FIG. 5C), a third set of lenses that are mounted on the photonic integrated circuit (e.g., FIG. 5A), a fourth set of lenses that are mounted on the thermoelectric cooler (e.g., FIG. 5B), and a fifth set of lenses that are attached to the submount structure (e.g., FIG. 5E).

A variety of procedures can be used to assemble the photonic computing system 200 (FIGS. 2A to 2C), 252 (FIG. 2D to 2F), 274 (FIG. 2G), 300 (FIG. 3), 400 (FIG. 4), 500A (FIG. 5A), 500B (FIG. 5B), 500C (FIG. 5C), 500D (FIG. 5D), and 500E (FIG. 5E). In some procedures, various structures are attached during coarse alignment phase using passive alignment techniques that align components to alignment marks on other structures. The photonic source (e.g., 218) is attached to the substrate (e.g., 202) by application of silver glue or soldering, for example, using passive alignment to an alignment mark on the substrate to align the photonic source to the photonic integrated circuit (e.g., 224). The lens holder (e.g., 226) is attached to the substrate or the photonic integrated circuit (e.g., by a UV-cured epoxy) using passive alignment. The prism is attached to the photonic integrated circuit (e.g., by a UV-cured epoxy) using passive alignment. Then during a fine alignment phase, active alignment is used to ensure the mode matching for the optical channels is accurate. In the active alignment, the laser module 212 is turned on to emit a laser beam 222 that is directed toward the photonic integrated circuit 224 and coupled to an input waveguide in the photonic integrated circuit 224 through a guided-mode resonance coupler. The lens 220 is aligned to the lens holder 226 (e.g., by a UV-cured epoxy) while monitoring feedback associated with optical coupling. For example, the feedback can be provided by a photodetector (e.g., a photodiode) that is coupled to a tap waveguide in the photonic integrated circuit 224 that provides a portion of the optical power being coupled into the input waveguide via the guided-mode resonance coupler. For example, the feedback can be monitored by a feedback monitoring circuit (not shown in the figure).

Figure 6:
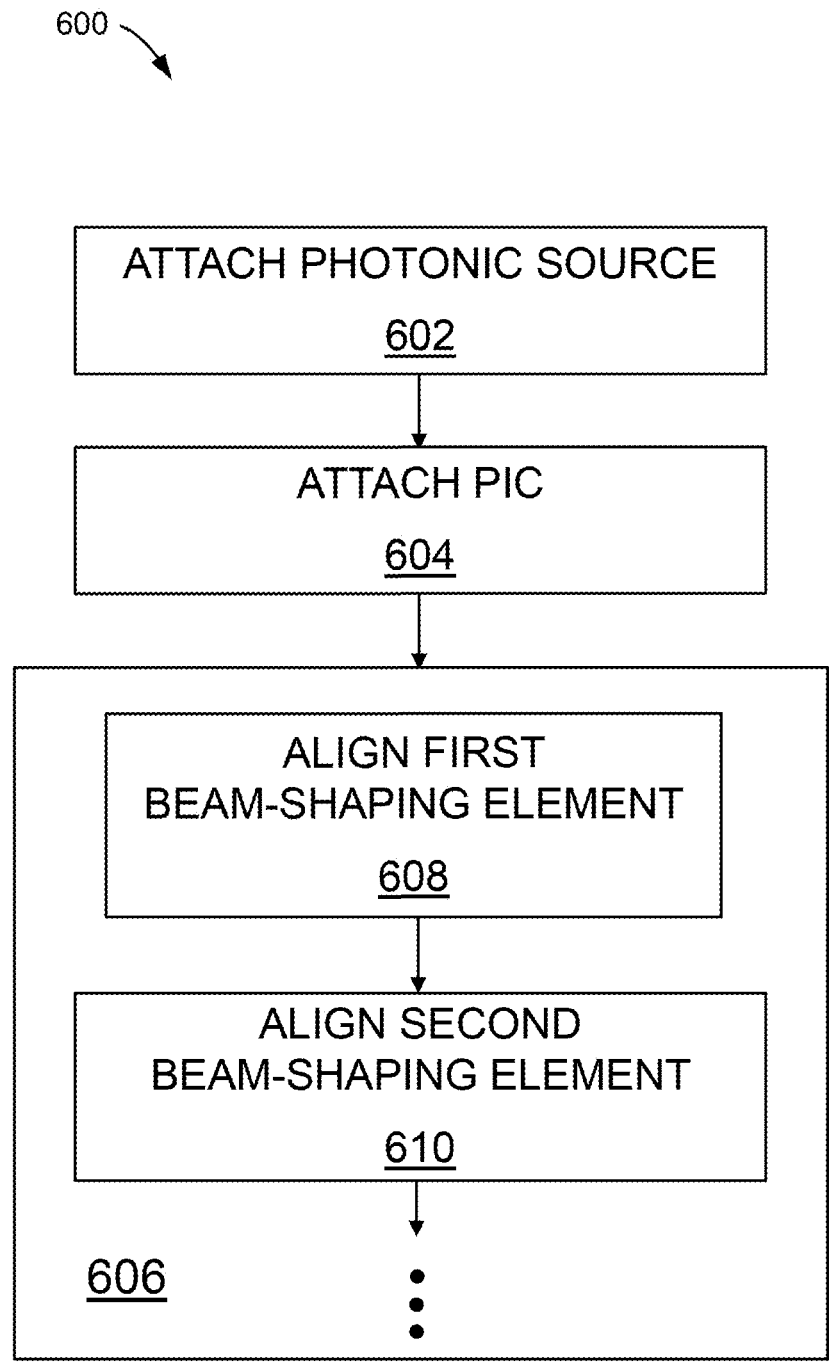
FIG. 6 is a flowchart of an example procedure for assembling a photonic computing system.

FIG. 6 is a flowchart of an example procedure 600 for assembling a photonic computing system (e.g., 200 of FIGS. 2A to 2C, 252 of FIG. 2D to 2F, 274 of FIG. 2G, 300 of FIG. 3, 400 of FIG. 4, 500A of FIG. 5A, 500B of FIG. 5B, 500C of FIG. 5C, 500D of FIG. 5D, or 500E of FIG. 5E). The procedure 600 includes attaching (602) a photonic source to a support structure. The photonic source comprises: a first laser module (e.g., 212) providing a first optical beam (e.g., 222) emitted from a first emitting location, and a second laser module (e.g., 212) providing a second optical beam (e.g., 222) emitted from a second emitting location. The procedure 600 includes attaching a photonic integrated circuit (e.g., 224) to the support structure (e.g., interposer 208 in the examples of FIGS. 2A-2G, 3, and 5C, or LGA substrate 202 in the examples of FIGS. 4, 5A, 5B, 5D, and 5E). The photonic integrated circuit (e.g., 224) comprises: a first waveguide and a first guided-mode resonance coupler coupled to the first waveguide, and a second waveguide and a second guided-mode resonance coupler coupled to the second waveguide. The procedure 600 includes attaching (606) multiple beam-shaping optical elements (e.g., 220) to the support structure (e.g., 208) or the photonic integrated circuit (e.g., 224). The attaching (606) includes: aligning (608) a first beam-shaping optical element (e.g., 220) during attachment so that the first optical beam (e.g., 222) is coupled to the first guided-mode resonance coupler, and aligning (610) a second beam-shaping optical element (e.g., 220) during attachment so that the second optical beam (e.g., 222) is coupled to the second guided-mode resonance coupler. Any number of additional beam-shaping optical elements can be sequentially aligned in this manner.

Figure 7:
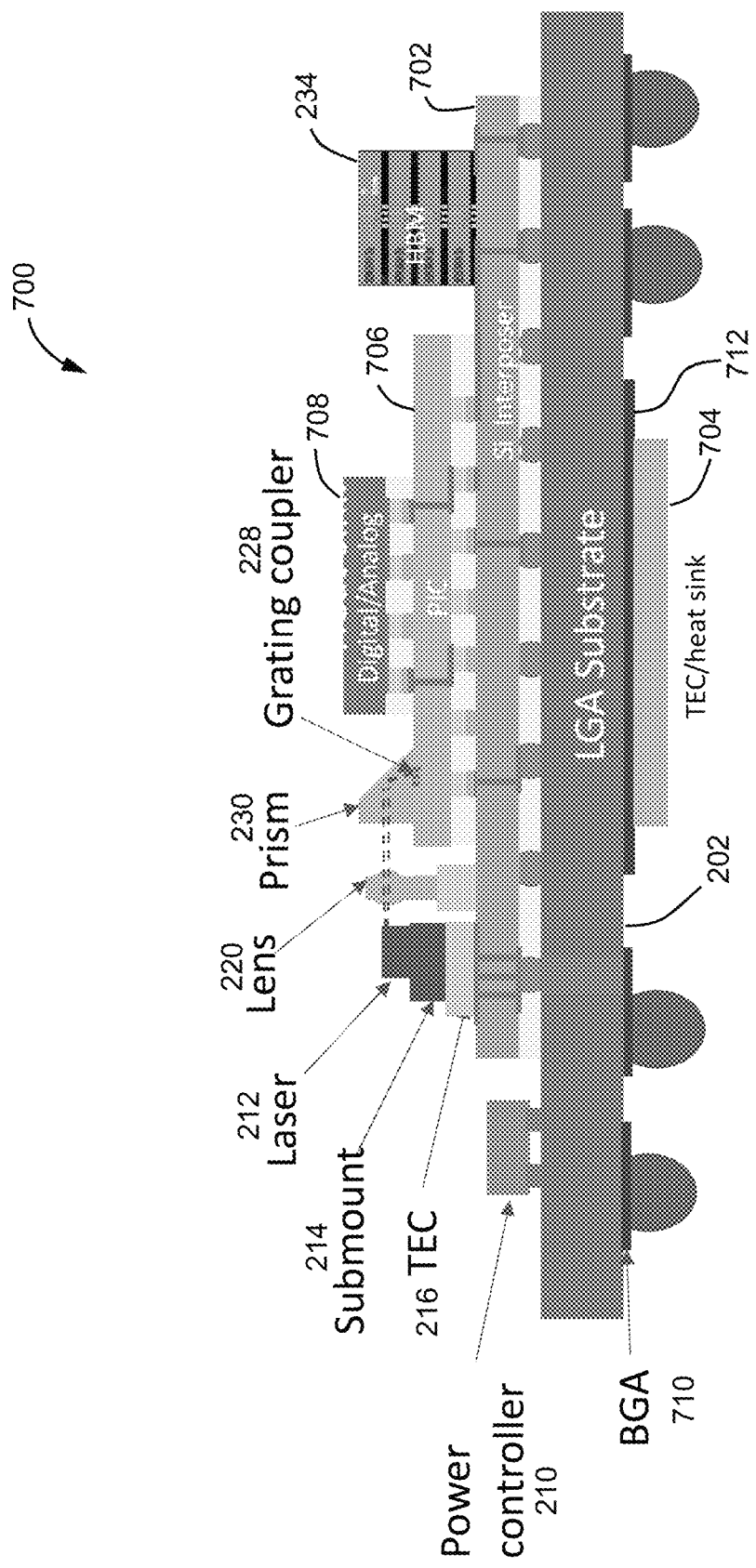
FIG. 7 is a schematic diagram of an example of a photonic computing system.

In some implementations, the photonic computing system is configured to use the photonic integrated circuit (e.g., 224) to provide both an array of photonic computing elements that operate on optical signals carried by optical waveguides, and an interposer for transmitting electrical signals by conductor pathways to other portions of the system. This use of the photonic integrated circuit (e.g., 224) as an interposer can achieve a more compact system. FIG. 7 shows an example photonic computing system 700 that includes a silicon interposer 702 that provides electrical connections to a thermoelectric cooler 704, a photonic integrated circuit 706, and a digital storage module 234 (e.g., a stacked HBM chip). The photonic integrated circuit 706 in this example also serves as another interposer to provide conductor pathways for digitally encoded electrical signals that transfer data between the digital storage module 234 connected to contacts at the bottom of the photonic integrated circuit 706 (via the silicon interposer 702) and a hybrid digital/analog chip 708 connected to contacts at the top of the photonic integrated circuit 706. The hybrid digital/analog chip 708 provides analog control signals for controlling the photonic computing elements in the photonic integrated circuit 706 and sends/receives digital data to/from the digital storage module 234. In this example, the bottom of the LGA substrate 202 includes a ball grid array (BGA) 710 for connection to an input/output interface (e.g., provided on a printed circuit board (PCB)). The bottom of the LGA substrate 202 also includes a large thermally conductive structure 712 that is connected to one or more temperature control elements 704, such as a thermoelectric cooler and/or heat sink.

Figure 8A:
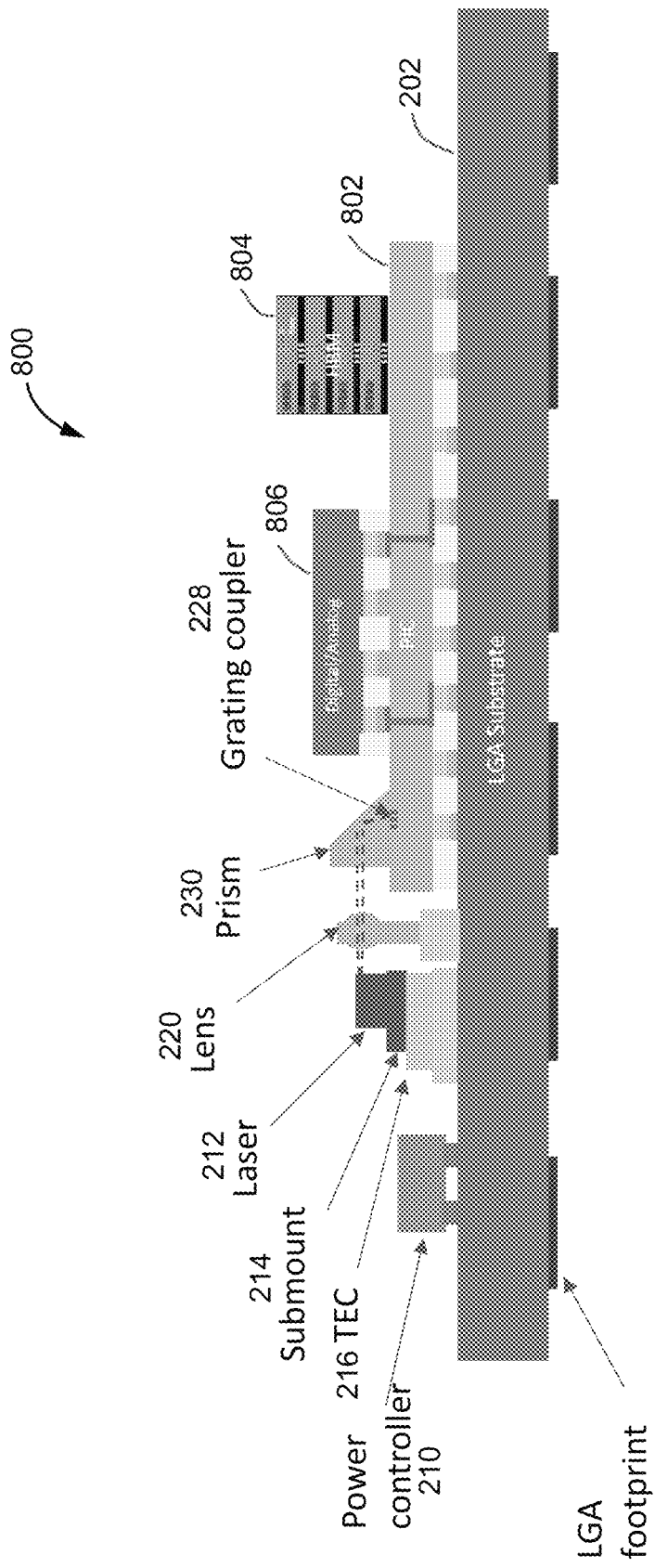
FIGS. 8A and 8B are schematic diagrams of views of an example of a photonic computing system.
Figure 8B:
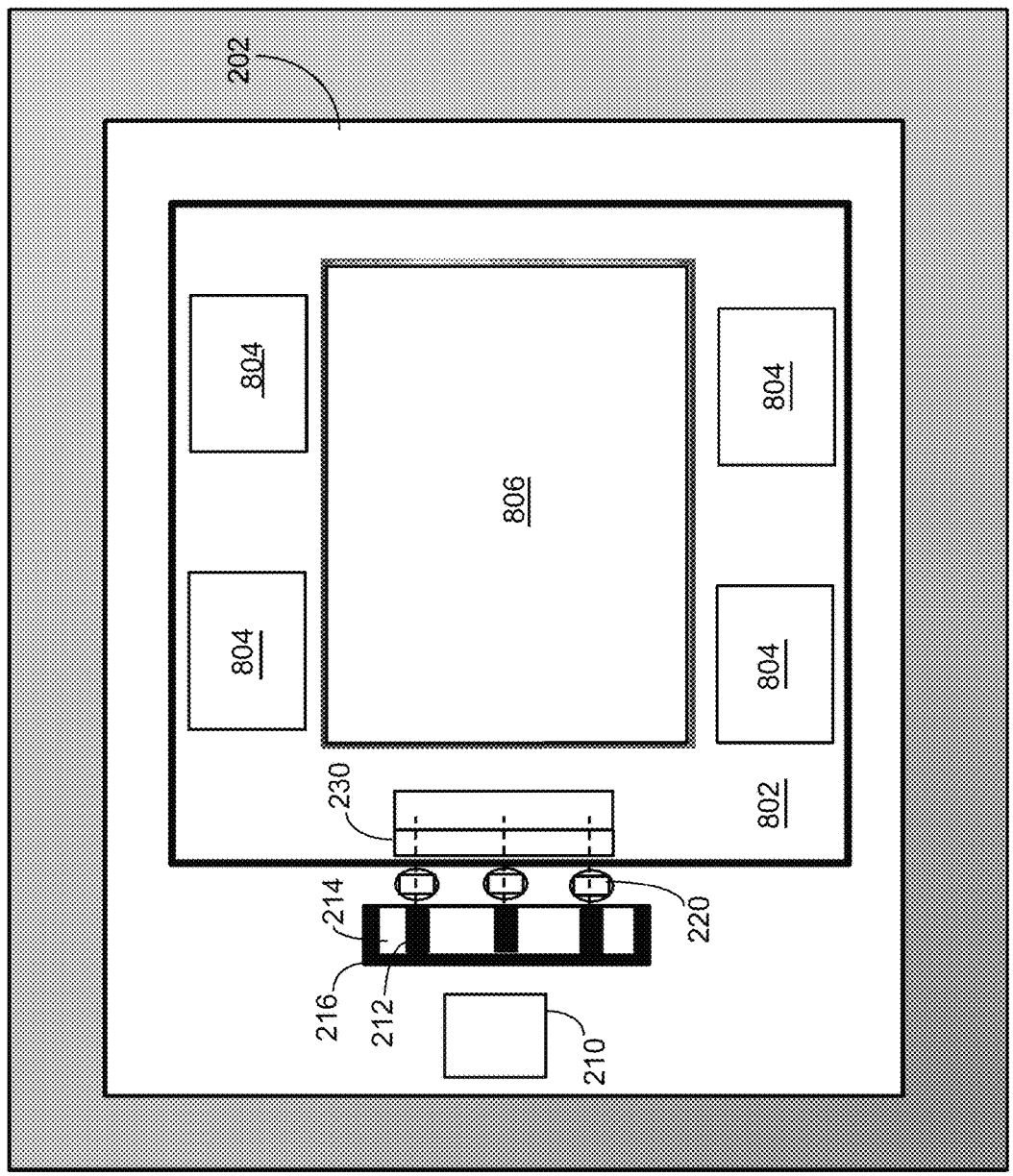

FIGS. 8A and 8B show side and top views, respectively, of another example photonic computing system 800 that includes a photonic integrated circuit 802 that also serves as an interposer. In this example, there is no silicon interposer on the LGA substrate 202, and the photonic integrated circuit 802 is directly connected to the LGA substrate 202. The photonic integrated circuit 802 in this example serves as an interposer to provide conductor pathways for digitally encoded electrical signals that transfer data between digital storage modules 804 connected to contacts on top of the photonic integrated circuit 802 and a hybrid digital/analog chip 806 connected to contacts at the top of the photonic integrated circuit 802. The hybrid digital/analog chip 806 provides analog control signals for controlling the photonic computing elements in the photonic integrated circuit 802 and sends/receives digital data to/from the digital storage modules 804. FIG. 8B shows an arrangement of multiple digital storage modules 804 on top of the photonic integrated circuit 802 and surrounding the hybrid digital/analog chip 806.

Figure 9A:
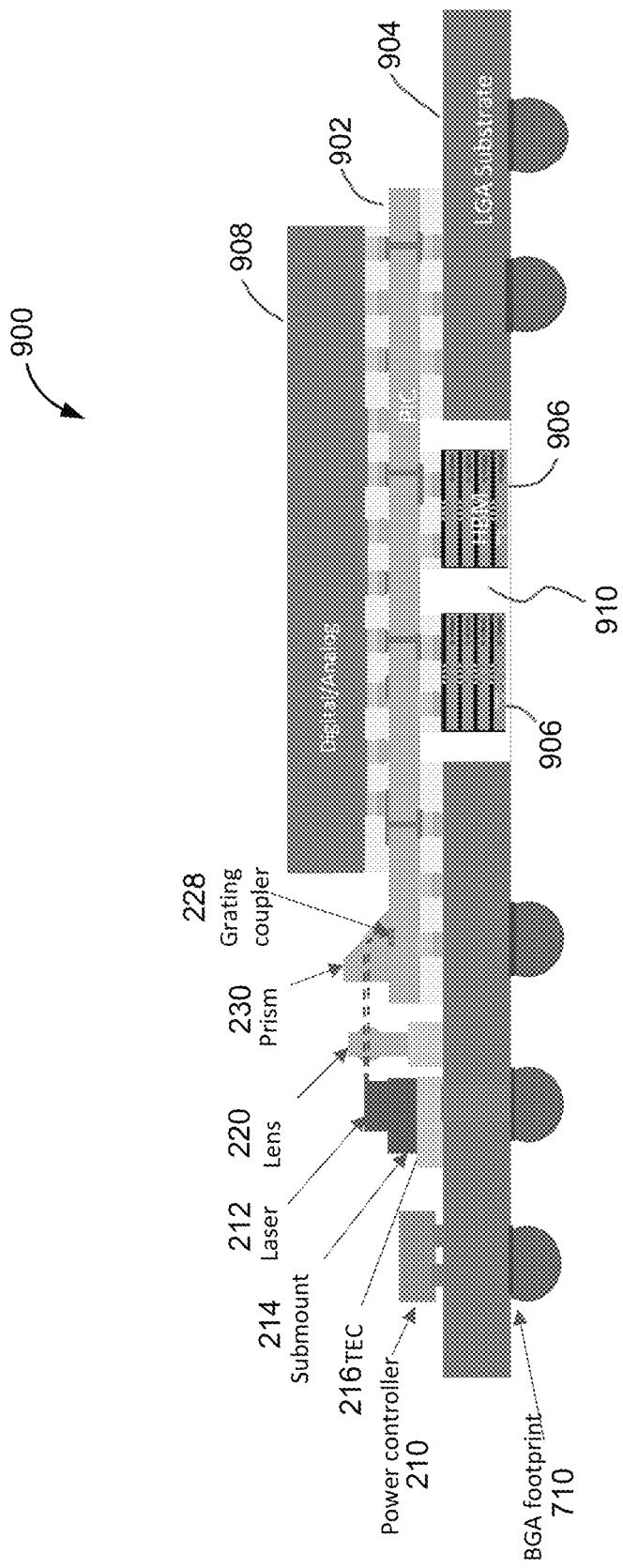
FIGS. 9A, 9B, and 9C are schematic diagrams of views of an example of a photonic computing system.
Figure 9B:
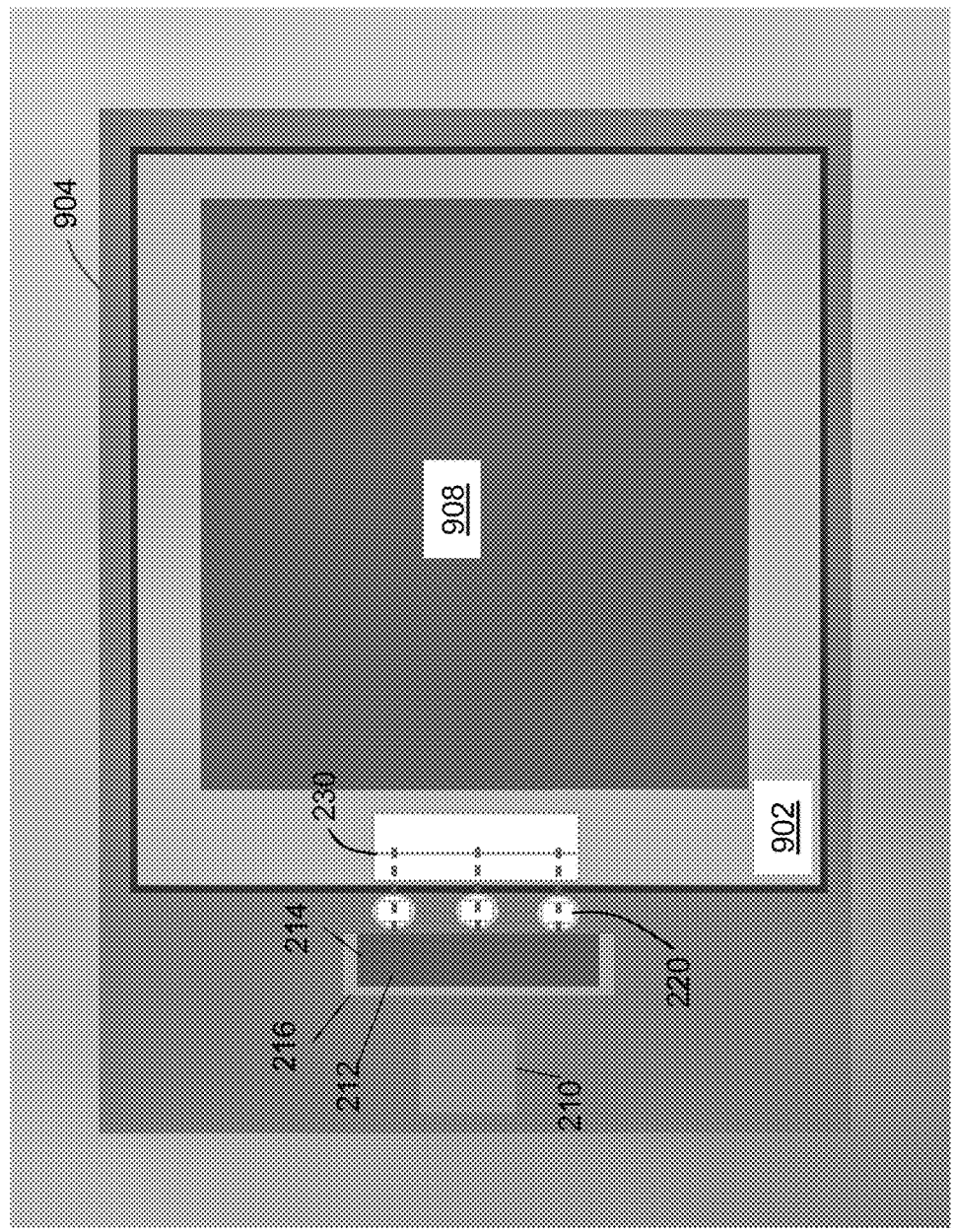
Figure 9C:
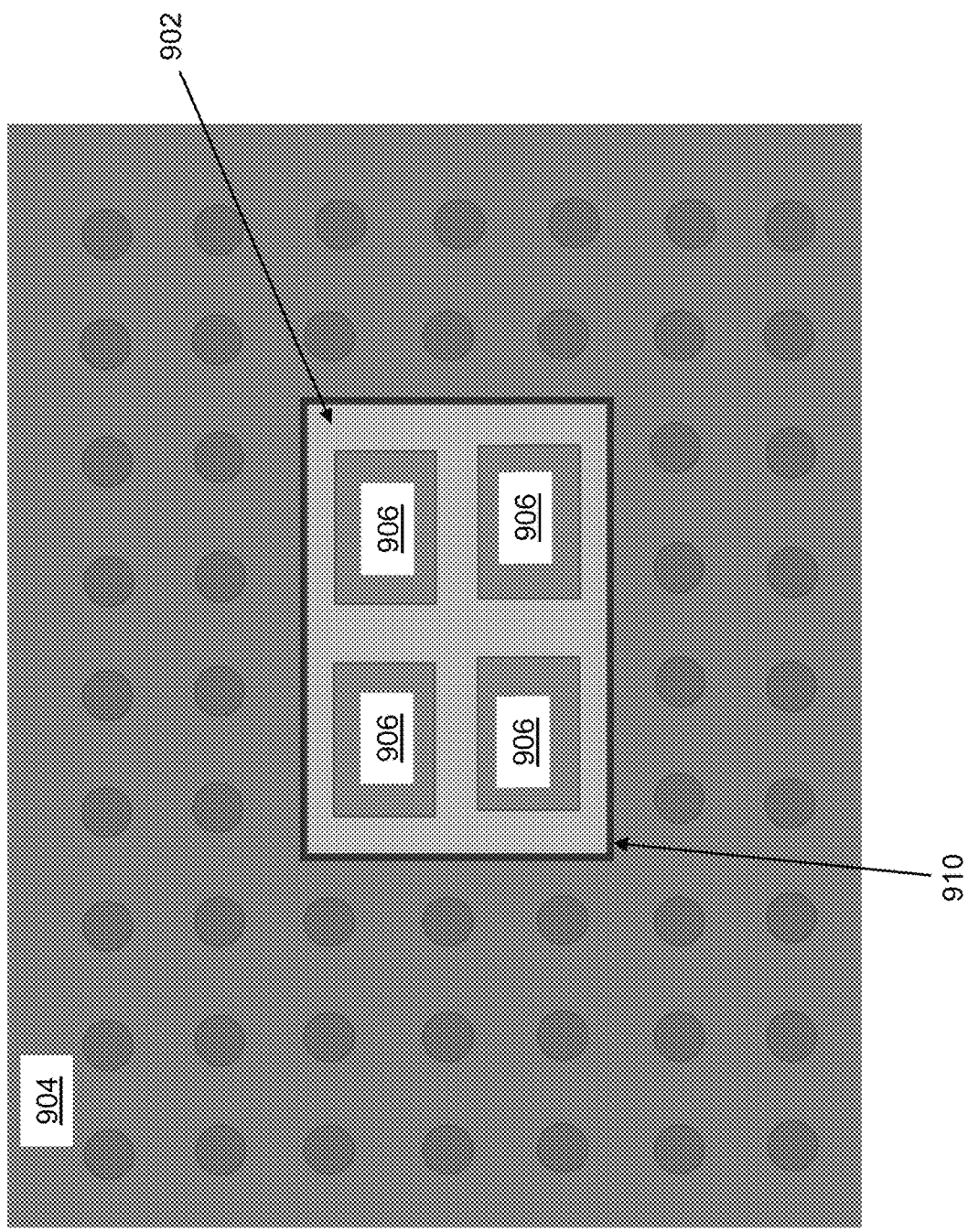

FIGS. 9A, 9B, and 9C show side, top, and bottom views, respectively, of another example photonic computing system 900 that includes a photonic integrated circuit 902 that also serves as an interposer. In this example, the photonic integrated circuit 902 is directly connected to an LGA substrate 904 without using a silicon interposer between the photonic integrated circuit 902 and the LGA substrate 904. The photonic integrated circuit 902 in this example serves as an interposer to provide conductor pathways for digitally encoded electrical signals that transfer data between digital storage modules 906 connected to contacts on the bottom of the photonic integrated circuit 902 and a hybrid digital/analog chip 908 connected to contacts at the top of the photonic integrated circuit 902. The hybrid digital/analog chip 908 provides analog control signals for controlling the photonic computing elements in the photonic integrated circuit 902 and sends/receives digital data to/from the digital storage modules 906. FIG. 9B shows that in this example there is a larger area available on top of the photonic integrated circuit 902 for a larger hybrid digital/analog chip 908. FIG. 9C shows an arrangement of multiple digital storage modules 906 on the bottom of the photonic integrated circuit 902 through an opening 910 in the LGA substrate 904.

Some approaches to fabricating a photonic computing system that use a photonic integrated circuit as an interposer make use of techniques that provide advantages during operation, such as reduced power consumption. FIGS. 16A-16E show an example of fabrication and assembly steps used to form a photonic computing system 1660 that includes an electronic integrated circuit (EIC) 1600 electrically coupled to a photonic integrated circuit (PIC) 1602 through electrical connection structures that provide electrical signal pathways. Due to the resistance R associated with a conductor providing an electrical signal path, there is an associated voltage drop (i.e., an IR drop) caused by the current I flowing through the path that leads to additional power consumption. A technique for directly bonding electrical connection structures formed from layers of conducting structures called redistribution layers (RDLs), or other conducting structures, of the EIC 1600 and the PIC 1602 enables shorter signal paths and therefore lower power consumption. For example, the redistribution layers can be metal interconnects that electrically connect one part of the EIC 1600 or the PIC 1602 to another part and make the input/output pads of the integrated circuit available to other locations on the integrated circuit.

Figure 16A:
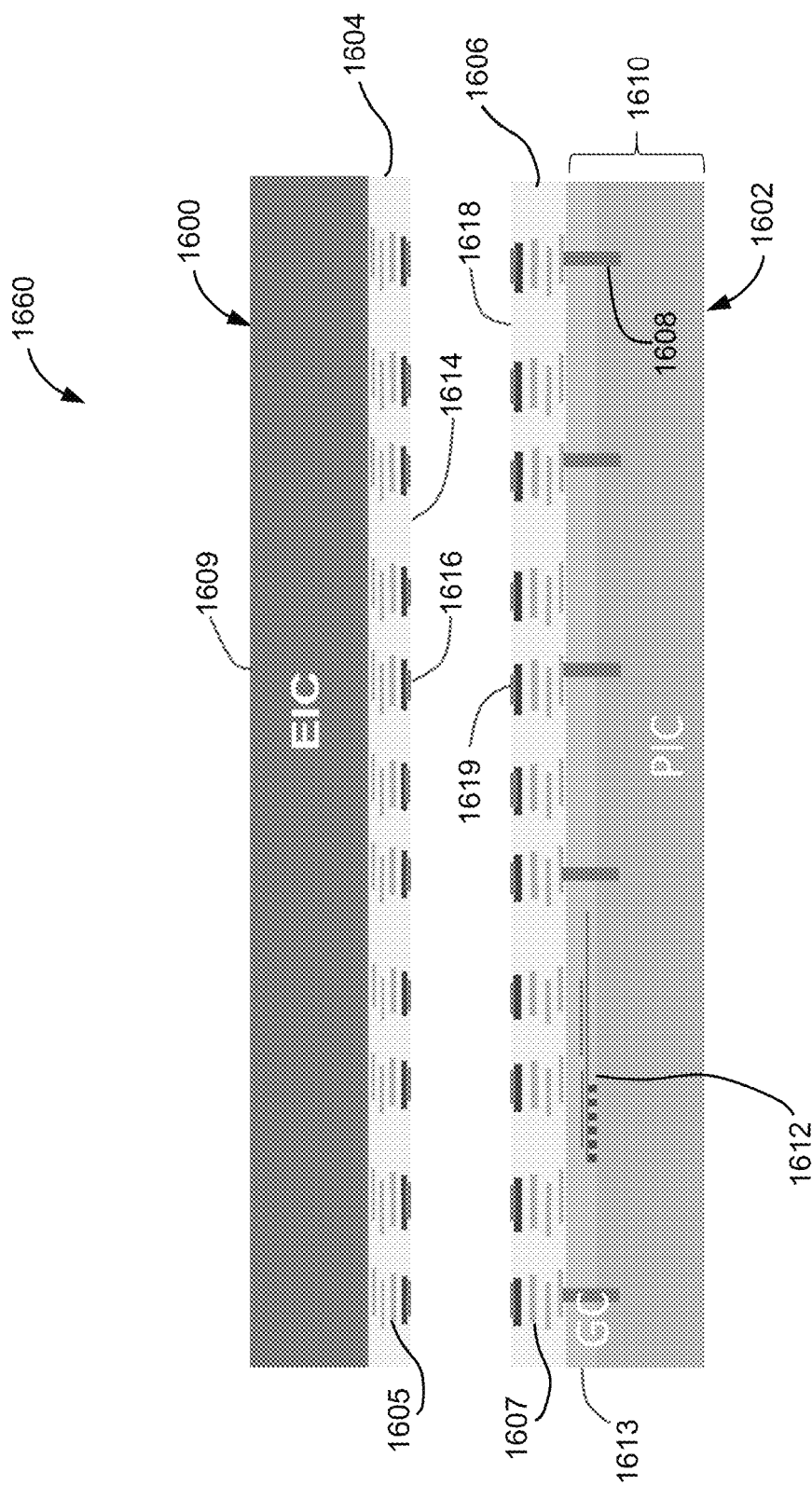
FIGS. 16A-16E are schematic diagrams of fabrication steps for an example of a photonic computing system.

Referring to FIG. 16A, the EIC 1600 is prepared by forming an arrangement 1604 of conducting structures 1605 extending from a layer of the EIC 1600 at which electrical signals are provided. The conducting structures 1605 can include RDLs or other electrically conductive (e.g., metal) structures that are embedded within a dielectric material. The PIC 1602 is also prepared by forming an arrangement 1606 of conducting structures 1607 extending from exposed ends of conductive vias 1608 formed through a substrate 1610 (e.g., silicon dioxide) in which optical and/or optoelectronic elements 1612, including waveguides and optoelectronic computing elements, are also formed. The optical and/or optoelectronic elements 1612 are formed on a layer 1613 (referred to as the "active layer") of the substrate 1610, in which the portion of the substrate 1610 below the active layer 1613 does not have useful optical or optoelectronic elements 1612. The exposed ends of conductive vias 1608 are formed on a surface of the active layer 1613 of the PIC 1602, such that the conductive vias 1608 extend from the surface of the active layer 1613 of the PIC 1602 through the active layer 1613 of the PIC 1602 to a location in the portion of the substrate 1610 below the active layer 1613. The conducting structures 1607 can include RDLs or other electrically conductive (e.g., metal) structures that are embedded within a dielectric material.

In some implementations, the EIC 1600 has a "front" surface 1609 and a "rear" surface 1614. Many of the electronic components (e.g., transistors, amplifiers, drivers, logic gates) of the EIC 1600 are disposed in one or more layers that are closer to the front surface 1609 than the rear surface 1614. The RDLs are closer to the rear surface 1614 than the front surface 1609 and are referred to as "backside redistribution layers." Conductive features, e.g., conductive vias, that pass through the substrate of the EIC 1600 electrically couple the electronic components near the front surface 1609 to the conducting structures 1605 near the rear surface 1614.

In some implementations, the EIC 1600 RDLs are formed above the electronic components of the EIC 1600, and the electronic components are electrically coupled to the RDLs through conductive features that do not pass through the substrate of the IEC 1600. In this example, the EIC 1600 can be flip-chip bonded to the PIC 1602.

The RDLs of the EIC 1600 can include conductive traces, e.g., conductive vias, that connect the conductive traces embedded in the dielectric material to a surface 1614 of the EIC 1600 and be capped with conductive material such as copper (Cu) or solder (e.g., including tin (Sn)) to form conductive caps or capped conducting structures 1616 on the surface 1614 of the EIC 1600. Similarly, the RDLs of the PIC 1602 can include conductive traces, e.g., conductive vias, that connect the conductive traces embedded in the dielectric material to a surface 1618 of the PIC 1602 and be capped with conductive material such as copper (Cu) or solder (e.g., including tin (Sn)) to form conductive caps or capped conducting structures 1619 on the surface 1618 of the PIC 1602. The capped conducting structures 1616 on the surface 1614 of the EIC 1600 and the capped conductive structures 1619 on the surface 1618 of the PIC 1602 can be arranged in the same pattern (e.g., a two-dimensional pattern) so that the capped conducting structures 1616 and 1619 are aligned with each other.

In some implementations, at the surfaces 1614 and 1618 of the EIC 1600 and PIC 1602, there is a one-to-one correspondence between the conducting structures in the EIC 1600 and the conducting structures in the PIC 1602. There can be any number of conducting structures in each chip (e.g., 12 in each, or 64 in each). In some implementations, there are more conducting structures in one chip than the other. For example, there can be X conducting structures in one and Y conducting structures in the other, with X conducting structures connected to the other chip and Y-X conducting structures not connected, which can be left available for other electrical connections (e.g., X=64 and Y=68).

Figure 16B:
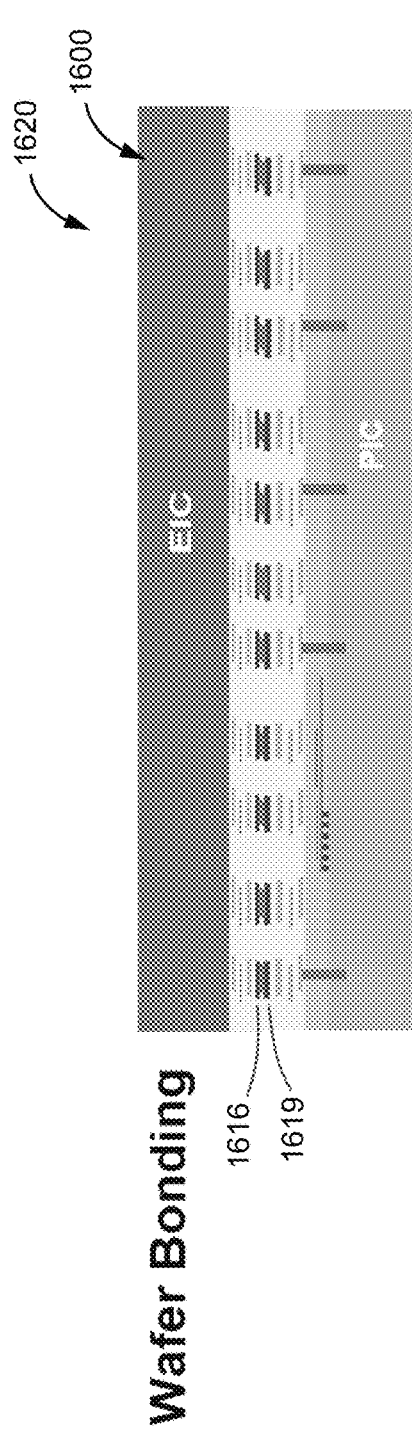

FIG. 16B shows a structure 1620 formed by bonding together the respective wafers on which the EIC 1600 and PIC 1602 are formed with the capped conducting structures 1616, 1619 bonded to each other.

Figure 16C:
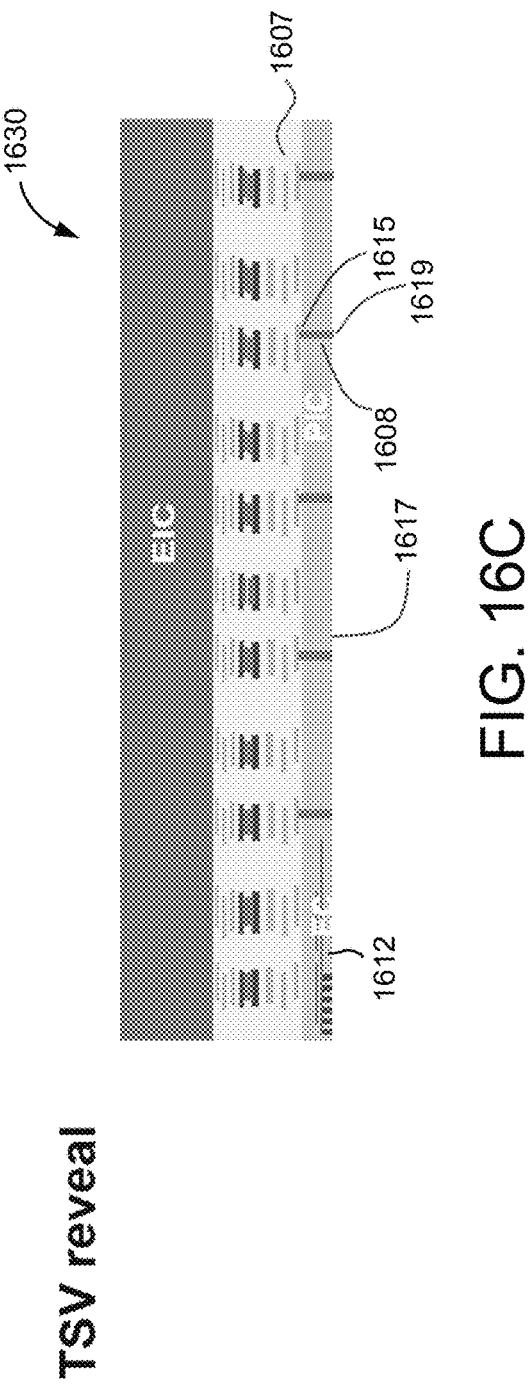

Referring to FIG. 16C, a structure 1630 is formed by performing a "TSV (through silicon via) reveal" step to remove excess material (e.g., semiconductor material, such as the silicon handle in a silicon-on-insulator wafer), which reveals ends 1619 opposite to the ends 1615 of the conductive vias 1608 coupled to the conducting structures 1607 at a newly formed surface 1617 in proximity to the optical elements 1612. Thus, the conductive vias 1608 extend from the conducting structures 1607 through the active layer 1613 to a surface 1617 of the PIC 1602.

Figure 16D:
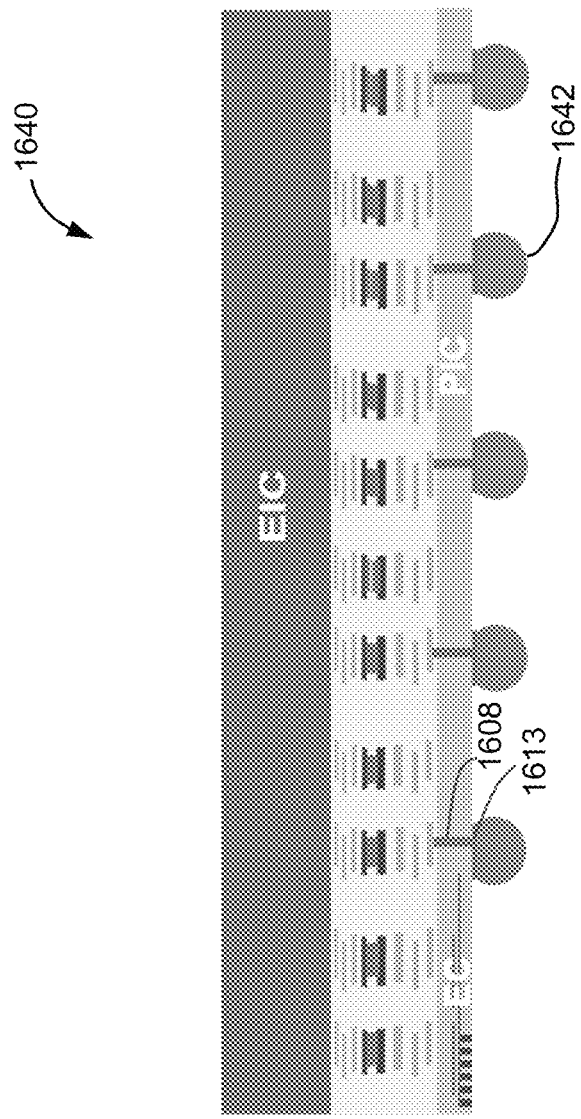

As shown in FIG. 16D, a structure 1640 is formed by bonding the revealed ends 1619 of the conductive vias 1608 to conducting structures 1642 (e.g., solder balls).

Figure 16E:
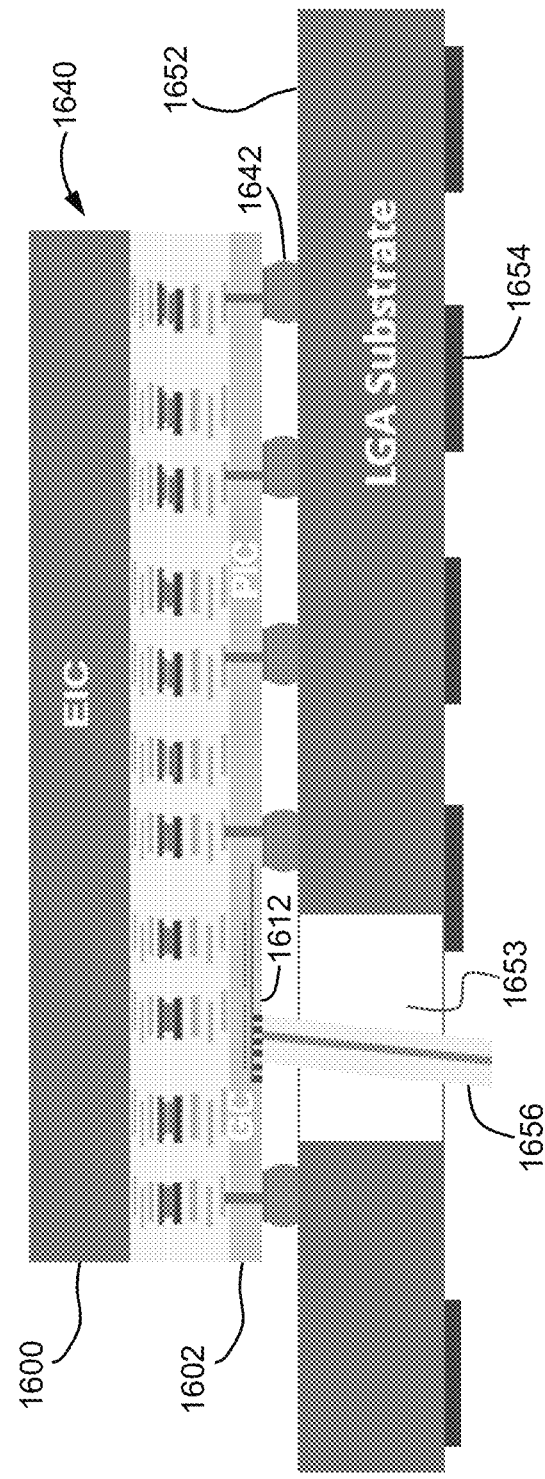

FIG. 16E shows a structure 1650 that includes the bonded structure 1640 attached to a land grid array (LGA) substrate 1652 providing metal contacts 1654 at the bottom of the LGA substrate 1652 for electrical coupling to a socket with pins or a printed circuit board (PCB), for example. In other examples, the bonded structure 1640 can be attached to a different kind of substrate with electrical connections formed to the conducting structures 1642.

In some implementations, the LGA substrate 1652 has an opening 1653 for accommodating an optical port 1656. For example, the optical port 1656 can include an optical connector such as a waveguide structure (e.g., an optical fiber having one or more fiber cores, or an optical fiber array) that is optically coupled to a coupler in the PIC 1602 (e.g., a grating coupler) that is in optical communication with the optical elements 1612. In this example, the thinned down PIC 1602 between the EIC 1600 and the LGA substrate 1652 enables a short electrical connection pathway from the EIC 1600 to the LGA substrate 1652 vertically through the PIC 1602 without requiring long metal traces that would dissipate a significant amount of power. Alternatively, some implementations do not require an opening in the LGA substrate 1652 for optical coupling. For example, optical edge coupling can be used.

Figure 17:
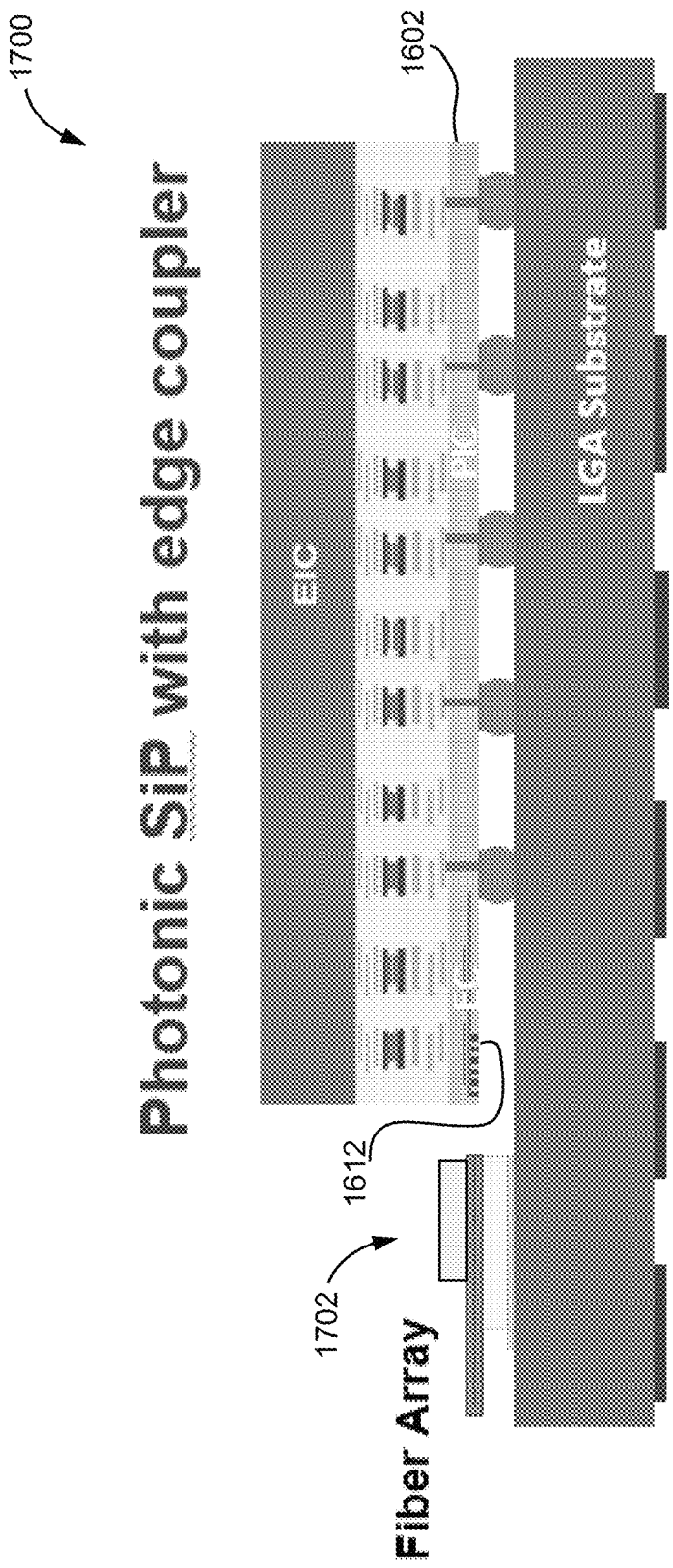
FIG. 17 is a schematic diagram of an example photonic computing system.

FIG. 17 shows an alternative structure 1700 that includes an optical fiber array 1702 that is optically coupled to the optical elements 1612 at an edge of the PIC 1602.

Figure 10A:
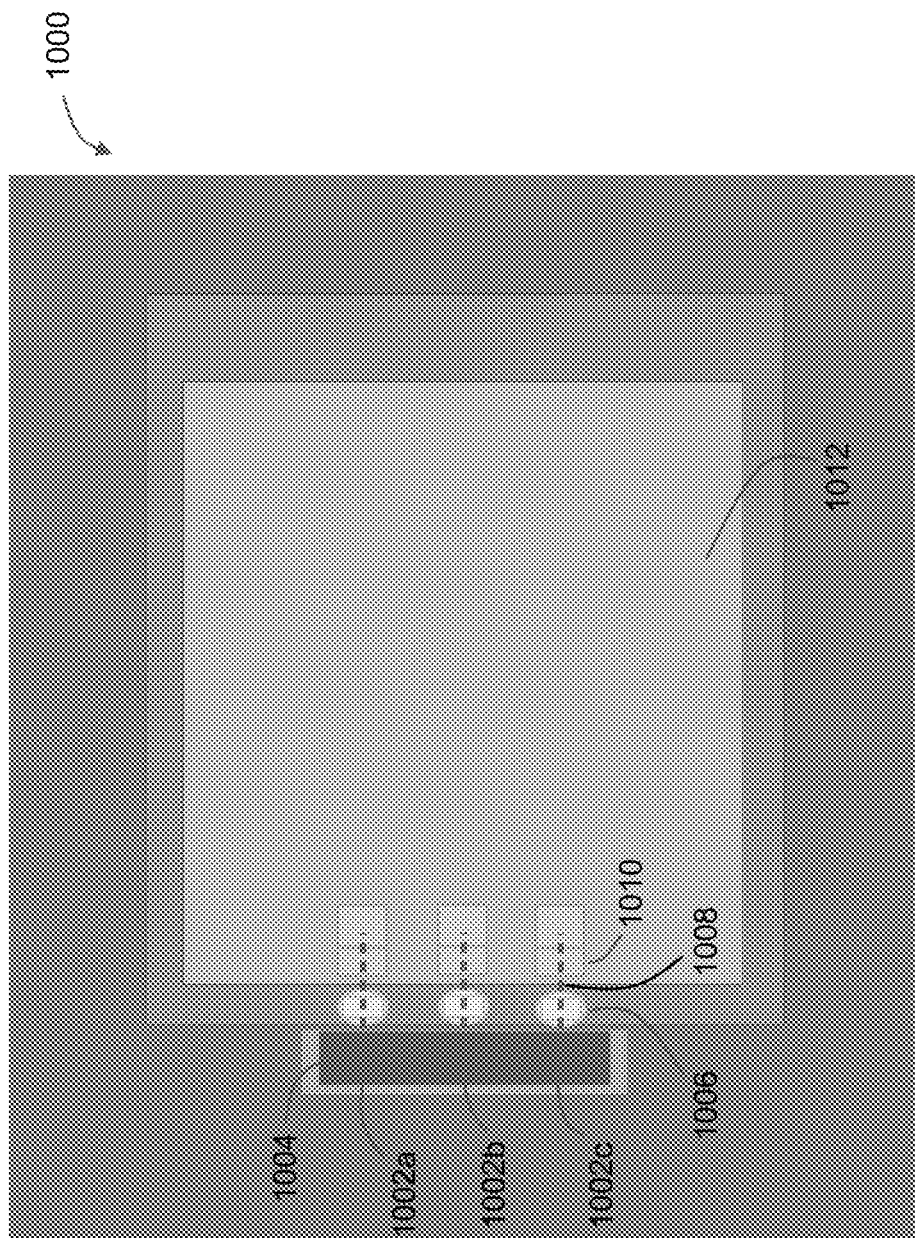
FIGS. 10A-10C are schematic diagrams of examples of photonic computing systems.
Figure 10B:
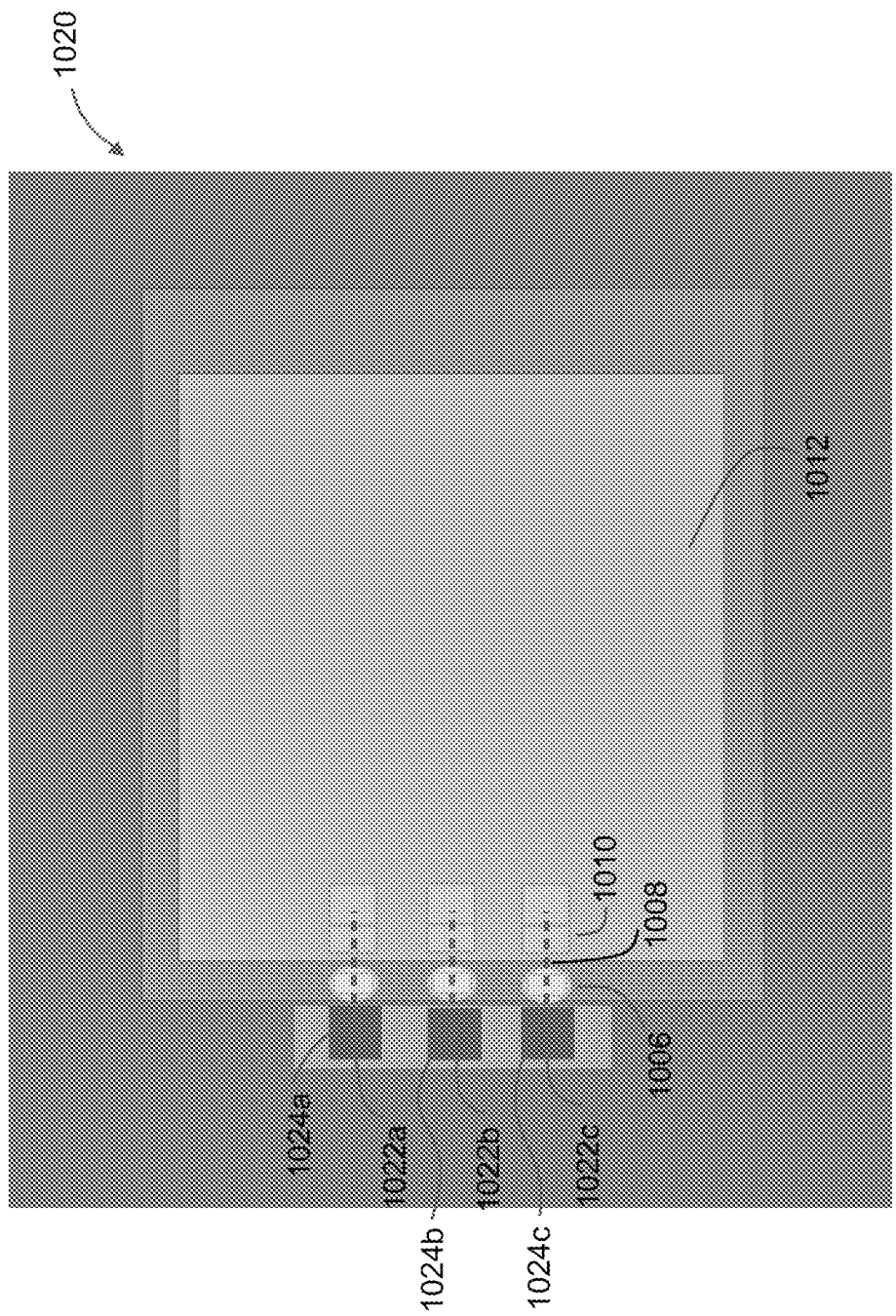
Figure 10C:
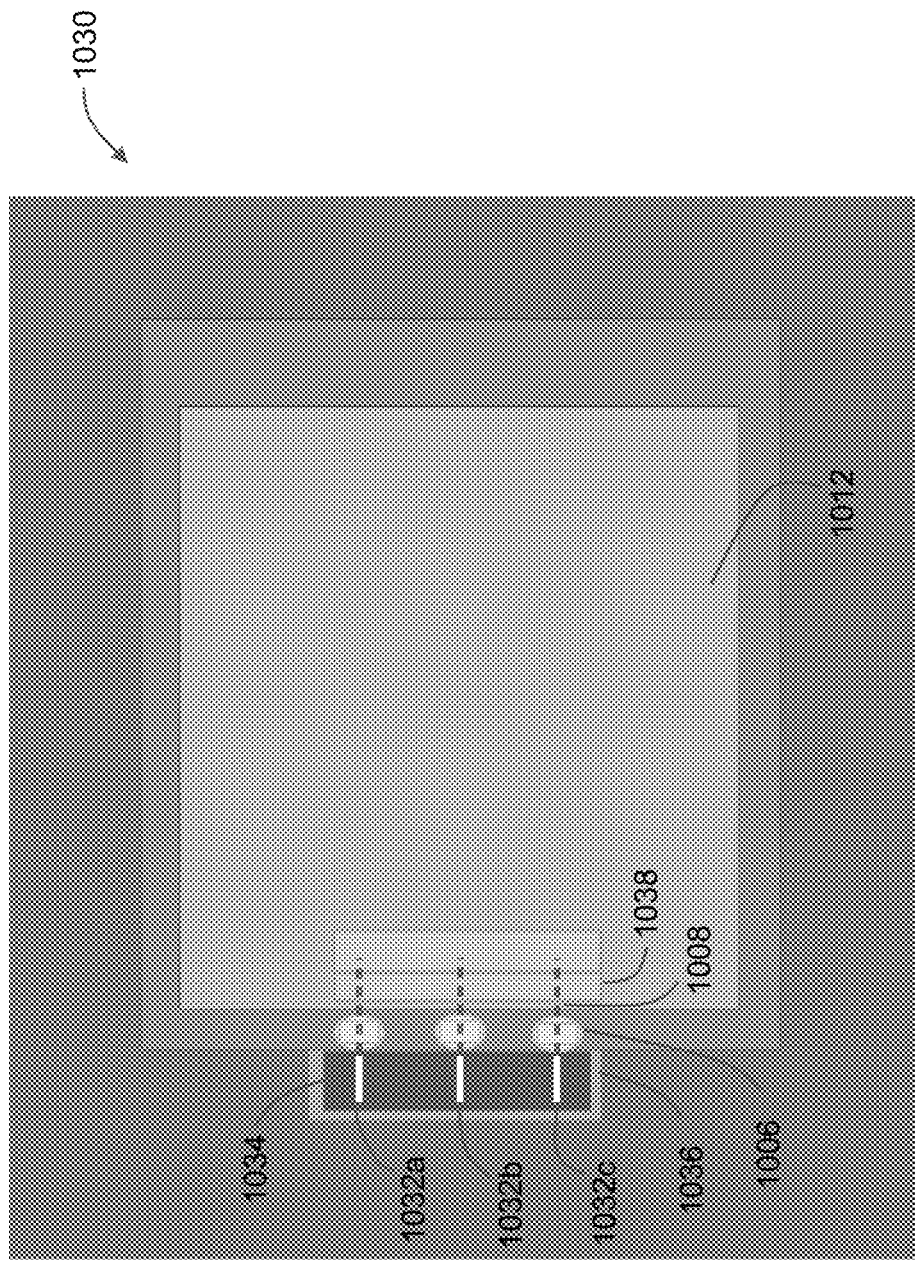

FIGS. 10A, 10B, and 10C show different alternative approaches for integrating the laser modules within the photonic computing system. FIG. 10A shows an example of a photonic computing system 1000 in which there are separate laser dies 1002a, 1002b, 1002c (collectively referenced as 1002) on a common submount substrate 1004, and different respective lenses 1006 couple beams 1008 from the laser dies 1002 into different corresponding prisms 1010 redirecting the beams into grating couplers on a photonic integrated circuit 1012. FIG. 10B shows an example of a photonic computing system 1020 in which there are separate laser dies 1022a, 1022b, 1022c (collectively referenced as 1022) on separate individual submount substrates 1024a, 1024b, 1024c (collectively referenced as 1024), and different respective lenses 1006 couple beams 1008 from the laser dies 1022 into different corresponding prisms 1010 redirecting the beams 1008 into grating couplers on the photonic integrated circuit 1012. FIG. 10C shows an example of a photonic computing system 1030 in which there are separate lasers 1032a, 1032b, 1032c (collectively referenced as 1032) within a common die 1034 (e.g., a "laser bar") on a submount substrate 1036, and different respective lenses 1006 couple beams 1008 from the lasers 1032 into a common prism 1038 redirecting the beams 1008 into grating couplers on the photonic integrated circuit 1012.

Figure 11A:
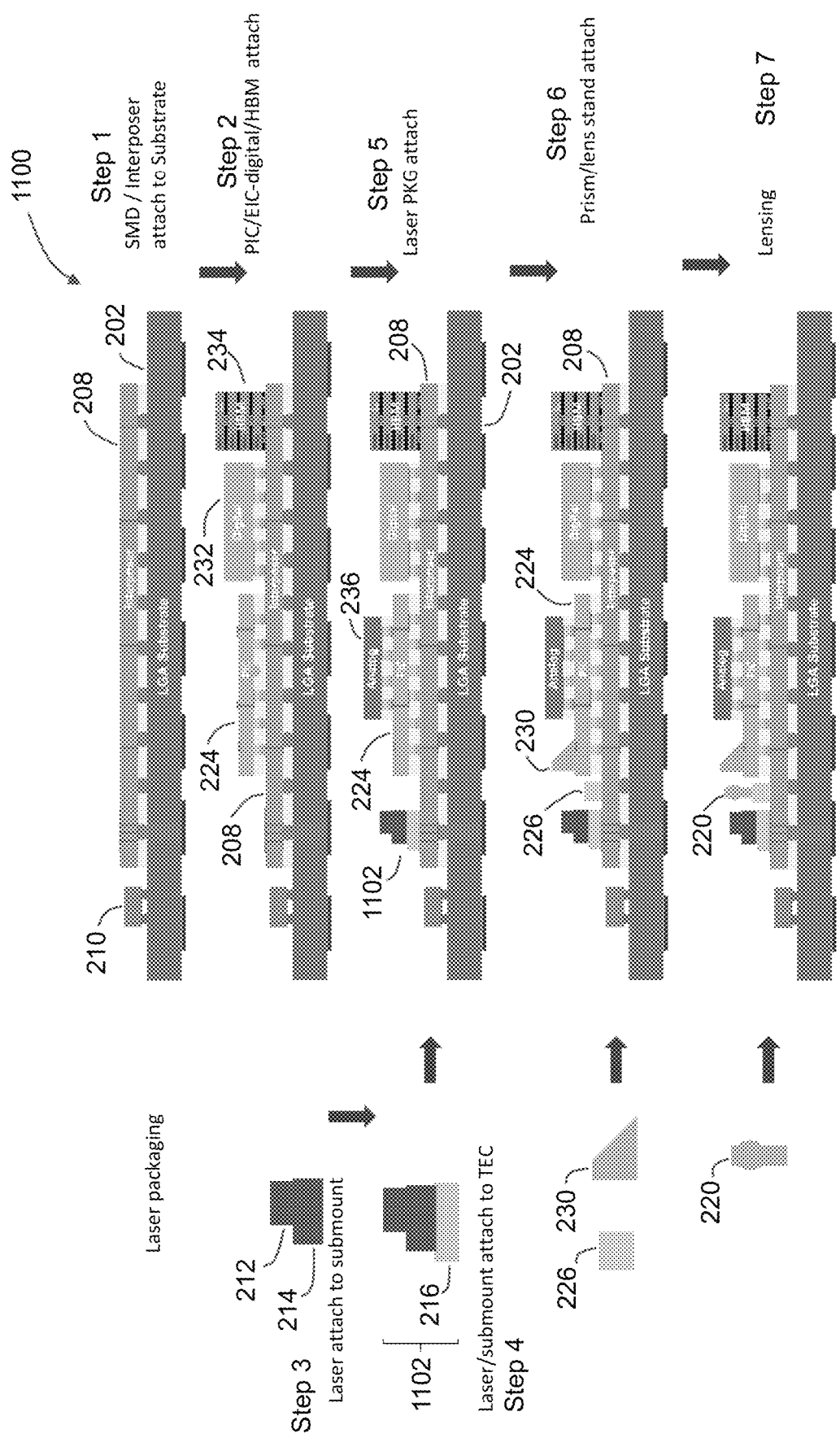
FIGS. 11A and 11B are schematic diagrams illustrating example fabrication process flows.
Figure 11B:
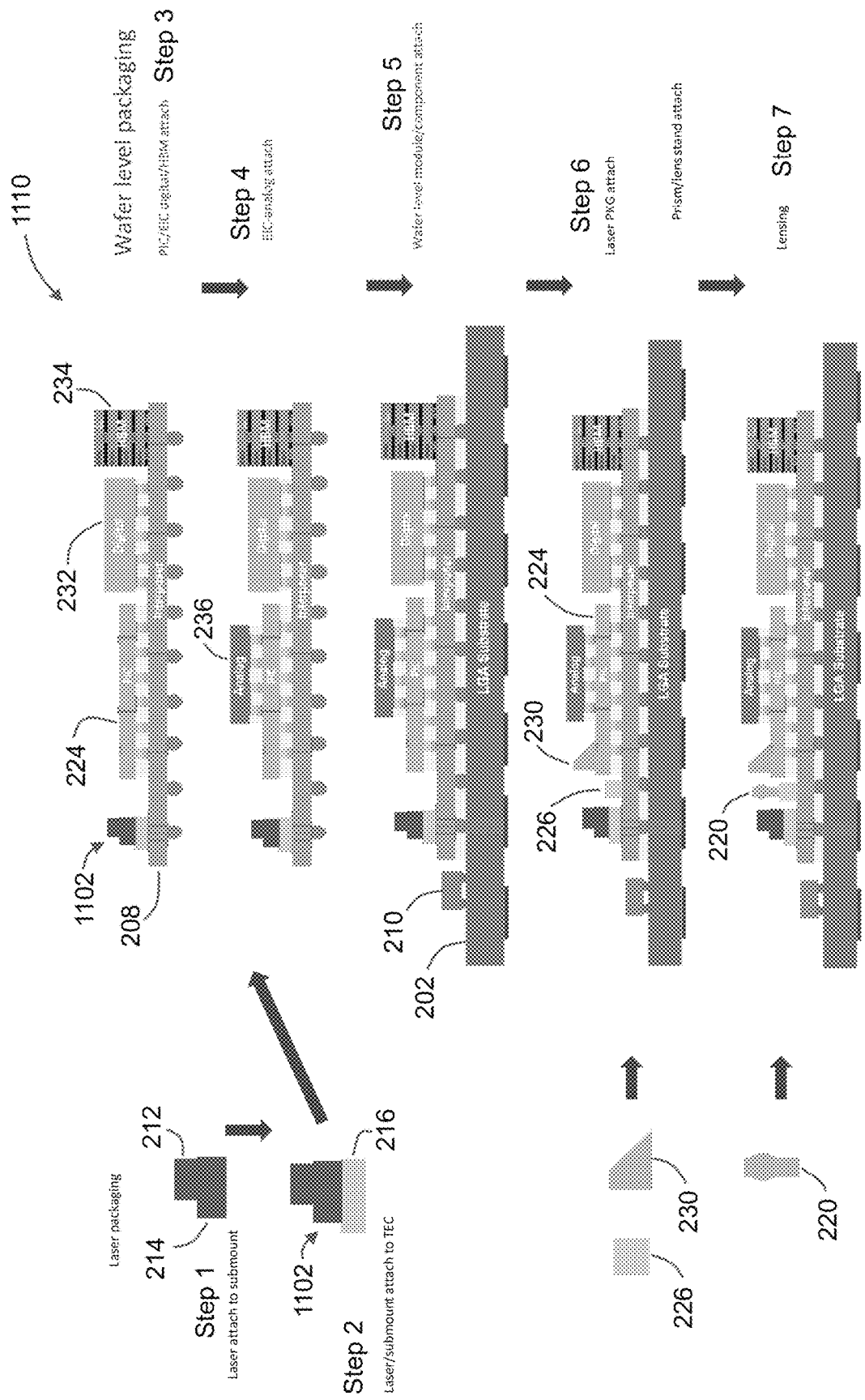

FIGS. 11A and 11B show examples of fabrication process flows for assembling and aligning different components of the photonic computing system. In these examples, the final system arrangement is the same, but some of the components are attached in a different order. FIG. 11A shows a process flow 1100 in which a laser/submount assembly 1102 is attached to an interposer 208 after the interposer 208 has already been attached to an LGA substrate 202. In a first step of the process flow 1100, the interposer 208 and surface mount devices, such as a power controller 210, are attached to the LGA substrate 202. In a second step, a photonic integrated circuit 224, a digital electronic integrated circuit (or digital chip) 232, and a digital storage module 234 (e.g., a high bandwidth memory chip) are attached to the interposer 208. In a third step, a laser module 212 is attached to a submount structure 214. In a fourth step, the submount structure 214 is attached to a thermoelectric cooler 216 to form the laser/submount assembly 1102. In a fifth step, the laser/submount assembly 1102 is attached to the interposer 208. An analog integrated circuit 236 is attached to the photonic integrated circuit 224. In a sixth step, a lens holder (or lens stand) 226 is attached to the interposer 208, and a prism 230 is attached to the photonic integrated circuit 224.

In a seventh step, a beam-shaping element 220, e.g., a lens, is attached to the lens holder 226. The lens 220 is aligned such that the laser beam produced by the laser module 212 is properly coupled to the waveguide in the photonic integrated circuit 224.

The photonic computing system can have two or more laser/submount assemblies 1102 and two or more beam-shaping elements 220. In the third step of the process flow 1100, each of multiple laser modules 212 is attached to a corresponding submount structure 214. In the fourth step, each of multiple laser/submount assemblies 1102 is attached to the corresponding thermoelectric cooler 216. In the fifth step, each of the multiple laser/submount assemblies 1102 is attached to the interposer 208. In the sixth step, each of multiple lens holders 226 is attached to the interposer 208. In the example in which multiple prisms 230 are used, each of the multiple prisms 230 is attached to the photonic integrated circuit 224. In the seventh step, each of the multiple beam-shaping elements 220 is attached to the corresponding lens holder 226. Each of the multiple beam-shaping elements 220 is aligned such that the laser beam produced by the corresponding laser module 212 is properly coupled to the corresponding waveguide in the photonic integrated circuit 224.

FIG. 11B shows a process flow 1110 in which the laser/submount assembly 1102 is attached to the interposer 208 before the interposer 208 is attached to the LGA substrate 202. In a first step of the process flow 1110, a laser module 212 is attached to a submount structure 214. In a second step, the submount structure 214 is attached to a thermoelectric cooler 216 to form a laser/submount assembly 1102. In a third step, the laser/submount assembly 1102 is attached to the interposer 208. A photonic integrated circuit 224, a digital electronic integrated circuit 232, and a digital storage module 234 (e.g., a high bandwidth memory chip) are attached to the interposer 208. In a fourth step, an analog integrated circuit 236 is attached to the photonic integrated circuit 224. In a fifth step, the interposer 208 (along with the components already attached to the interposer 208) and surface mount devices, such as a power controller 210, are attached to the LGA substrate 202. In a sixth step, a lens holder (or lens stand) 226 is attached to the interposer 208, and a prism 230 is attached to the photonic integrated circuit 224. In a seventh step, a beam-shaping element 220, e.g., a lens, is attached to the lens holder 226. The lens 220 is aligned such that the laser beam produced by the laser module 212 is properly coupled to the waveguide in the photonic integrated circuit 224.

The photonic computing system can have two or more laser/submount assemblies 1102 and two or more beam-shaping elements 220. In the first step of the process flow 1110, each of multiple laser modules 212 is attached to a corresponding submount structure 214. In the second step, each of submount structure 214 is attached to the corresponding thermoelectric cooler 216 to form the laser/submount assembly 1102. In the third step, each of the multiple laser/submount assemblies 1102 is attached to the interposer 208. In the sixth step, each of multiple lens holders 226 is attached to the interposer 208. In the example in which multiple prisms 230 are used, each of the multiple prisms 230 is attached to the photonic integrated circuit 224. In the seventh step, each of the multiple beam-shaping elements 220 is attached to the corresponding lens holder 226. Each of the multiple beam-shaping elements 220 is aligned such that the laser beam produced by the corresponding laser module 212 is properly coupled to the corresponding waveguide in the photonic integrated circuit 224.

In both process flows 1100 and 1110, the lenses 220 are attached after the laser/submount assemblies 1102 have been attached to the interposer 208 and the prism 230 is in place to coarsely align the beams into the photonic integrated circuit 224. The fine alignment phase is then used to align the lenses 220 to achieve high-precision mode matching.

Figure 12:
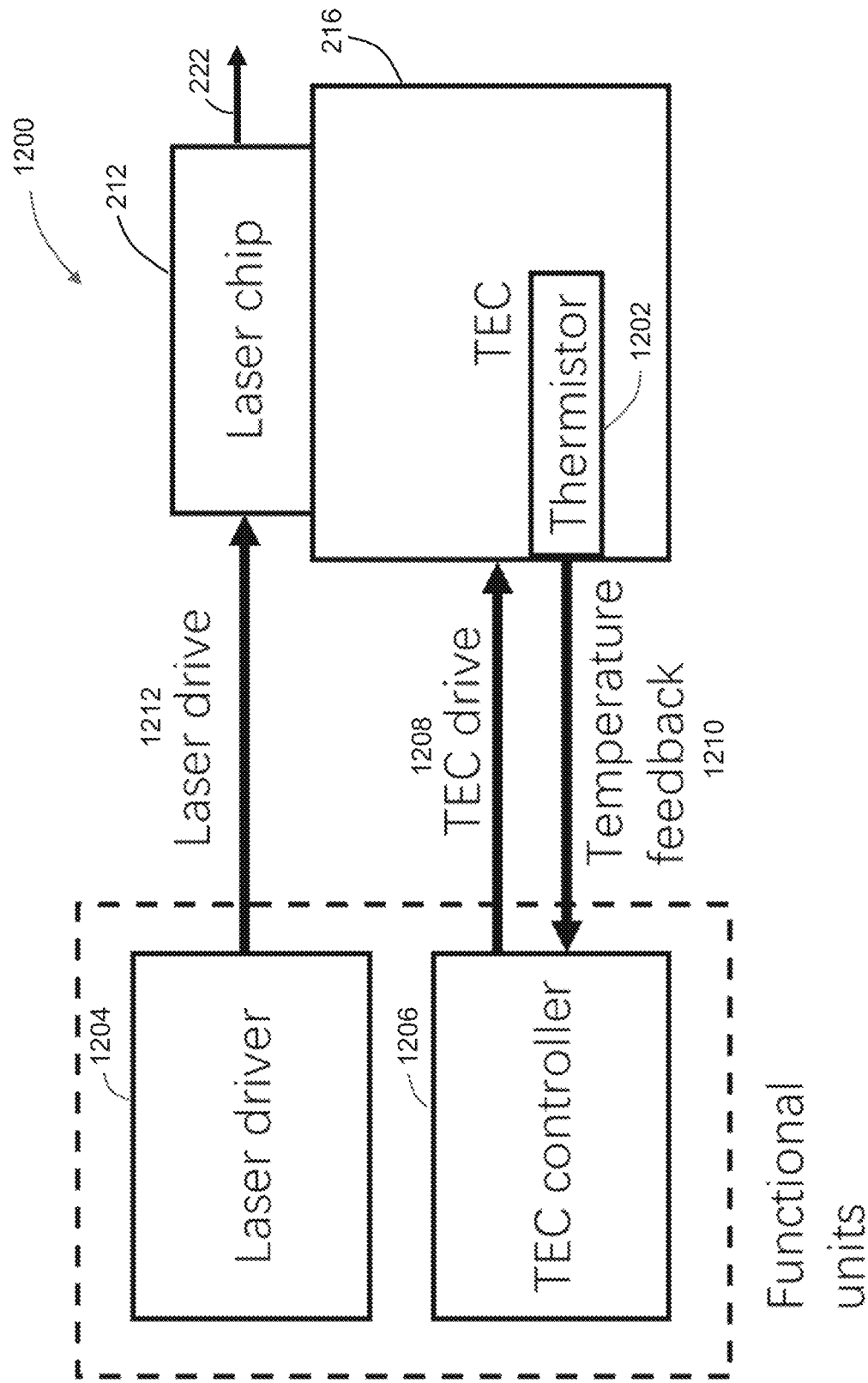
FIG. 12 is a block diagram of an example of a photonic source.

In some examples, the spectral characteristics of the laser module 212 can be dependent on temperature, such that the amplitude and/or phase of the laser beam 222 can vary in response to variations of the temperature of the laser module 212. Referring to FIG. 12, in some implementations, a photonic computing system 1200 includes control circuitry to maintain the laser module 212 at a relatively constant temperature in order to maintain the stability of the laser beam 222 produced by the laser module 212. For example, the photonic computer system 1200 includes a laser chip 212 that is attached to a thermoelectric cooler 216 that can cool the laser chip 212. The system 1200 includes functional units, such as a laser driver 1204 for generating a laser drive signal 1212 for driving the laser chip 212, and a thermoelectric cooler controller 1206 for generating a thermoelectric cooler drive signal 1208 for driving the thermoelectric cooler 216. The thermoelectric cooler 216 includes a thermistor 1202 for sensing the temperature at the thermoelectric cooler 216 and generating a temperature feedback signal 1210. The thermoelectric cooler controller 1206 controls the thermoelectric cooler drive signal 1208 based on the temperature feedback signal 1210. The same operating principle applies to examples in which the laser chip 212 is attached to a submount 214, which in turn is attached to the thermoelectric cooler 216. In such examples, the thermoelectric cooler 216 draws heat away from the submount 214, which in turn draws heat away from the laser chip 212.

For example, the laser chip 212 can be specified to have an optimal operating temperature, and the thermoelectric cooler controller 1206 can be configured to control the thermoelectric cooler 216 to cause the laser chip 212 to operate at a temperature substantially equal to the optimal operating temperature. For example, during a calibration process, the user can control the thermoelectric cooler controller 1206 to control the thermoelectric cooler 216 to be at a certain temperature to cause the laser chip 212 to generate a laser beam 222 having desired optical characteristics (e.g., amplitude). The settings of the thermoelectric cooler controller 1206 can be stored in a data storage (not shown in the figure). When the system 1200 is powered up the next time, the stored settings of the thermoelectric cooler controller 1206 can be retrieved from the data storage.

Due to manufacturing tolerances, different laser modules can have slightly different output characteristics (e.g., amplitude) even when driven by the same current and operating at the same temperature. Some photonic integrated circuits can have optical processors that require the various input laser beams to have substantially the same amplitude, e.g., the maximum difference in amplitude among the input laser beams being less than a threshold.

Figure 13:
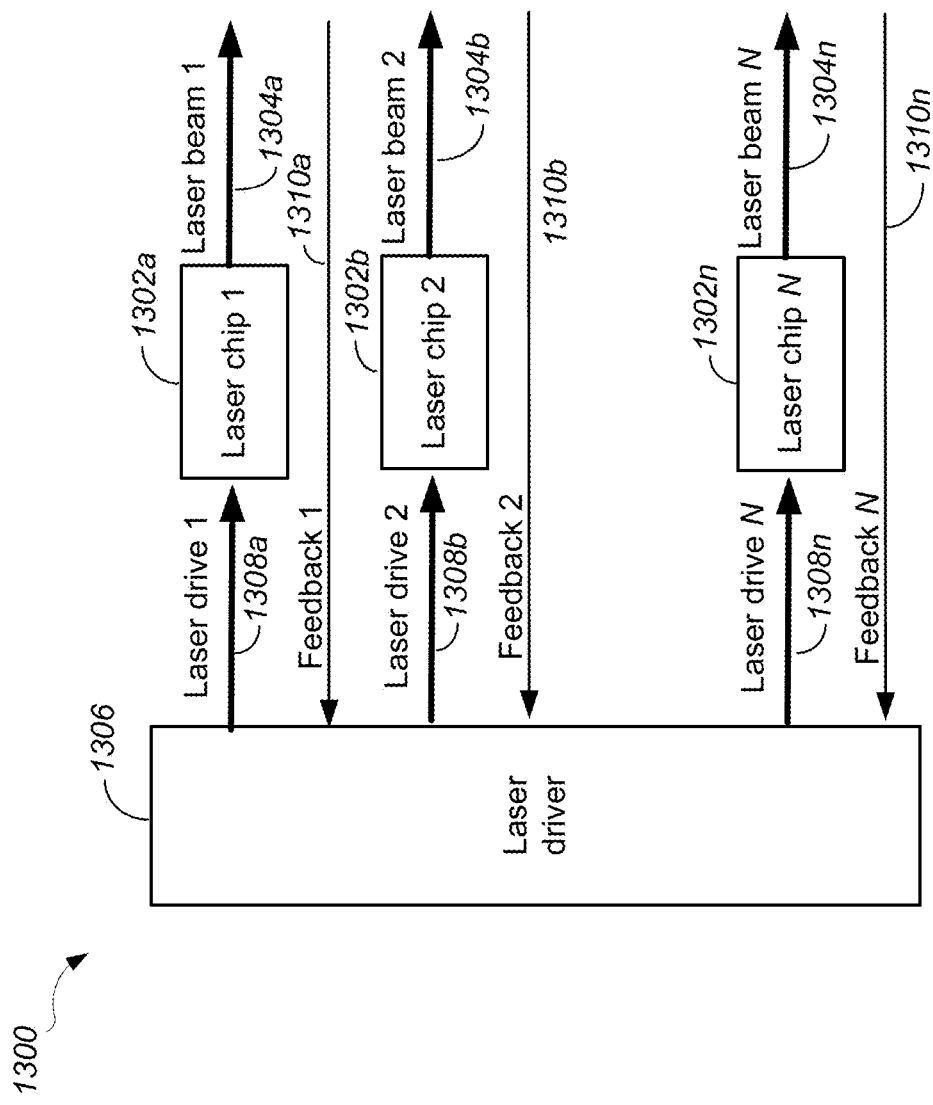
FIG. 13 is a block diagram of a portion of an example photonic computing system.

Referring to FIG. 13, in some implementations, a photonic computing system 1300 can have control circuitry for maintaining consistency of the amplitudes of the laser beams generated by multiple laser modules. The system 1300 includes n laser chips 1302a, 1302b, . . . , 1302n that generate laser beams 1304a, 1304b, . . . , 1304n, respectively. A laser driver 1306 generates n laser drive signals 1308a, 1308b, . . . , 1308n that drive the laser chips 1302a, 1302b, . . . , 1302n, respectively. Feedback signals 1310a, 1310b, . . . , 1310n (collectively referenced as 1310) represent the amplitudes of the laser beams 1304a, $1304b, \ldots, 1304n$, respectively. For example, each of the feedback signals 1310 can be provided by a photodetector (e.g., a photodiode) that is coupled to a tap waveguide in the photonic integrated circuit 224 that provides a portion of the optical power being coupled into the input waveguide via the guided-mode resonance coupler. The laser driver 1306 controls the laser drive signals 1308 based on the feedback signals 1310 to ensure that the laser beams 1304 have substantially the same amplitude, e.g., the maximum difference in amplitude among the laser beams 1304 being less than the threshold required by the optical processor.

In some implementations, the photonic computing systems described in this specification can provide an optoelectronic platform for systems (e.g., artificial neural networks) described in U.S. application Ser. No. 16/431,167, filed on Jun. 4, 2019, published as US2019/0370652, U.S. patent application Ser. No. 16/703,278, filed on Dec. 4, 2019, published as US2020/0110992, PCT patent application PCT/US2020/023674, filed on Mar. 19, 2020, published as WO 2020/191217, U.S. patent application Ser. No. 17/112,369, filed on Dec. 4, 2020, published as US2021/0173238, U.S. patent application Ser. No. 17/242,777, filed on Apr. 28, 2021, published as US2021/0341765, U.S. patent application Ser. No. 17/367,963, filed on Jul. 6, 2021, and U.S. patent application Ser. No. 17/204,320, filed on Mar. 17, 2021. The entire contents of the above applications are incorporated by reference.

Figure 14:
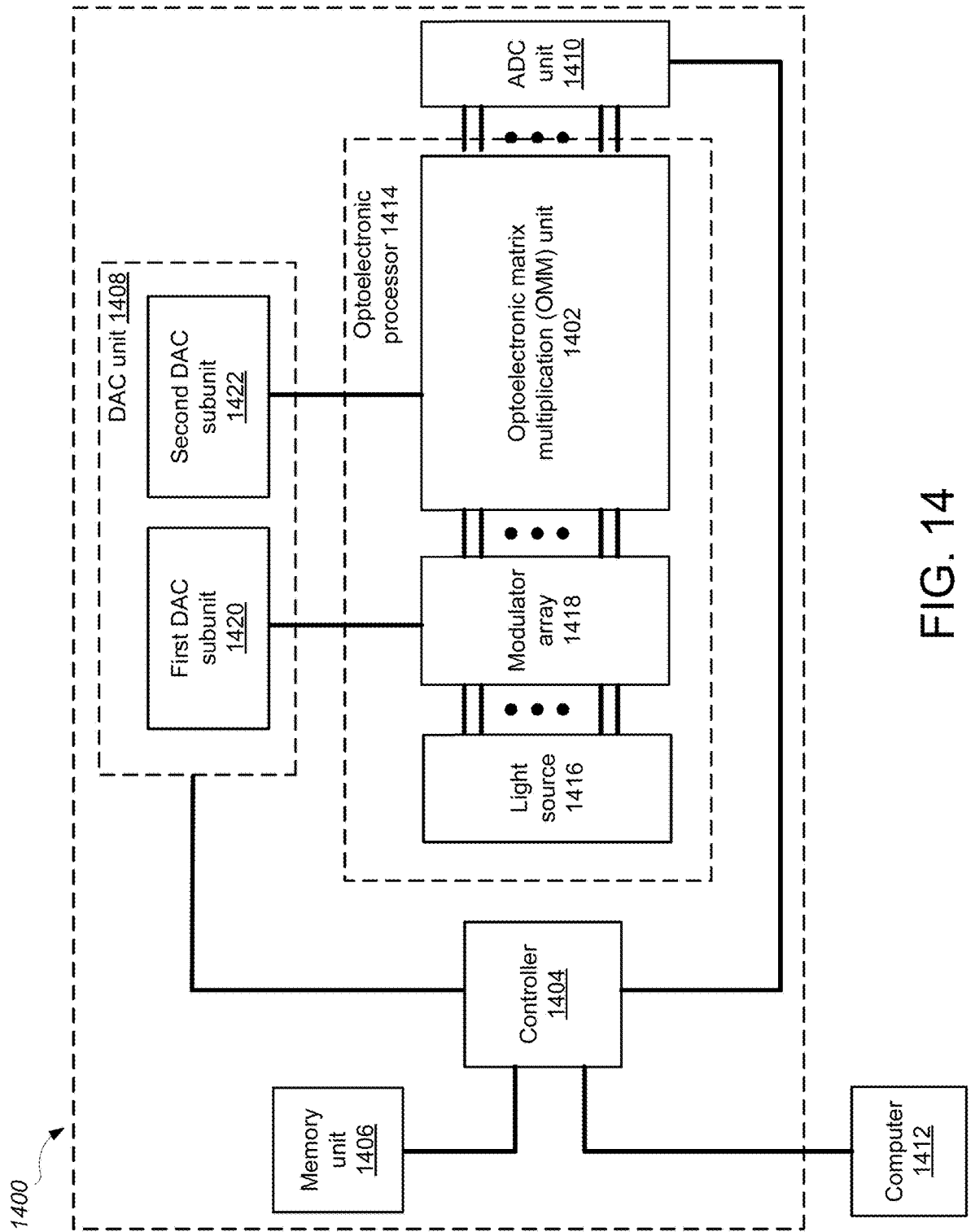
FIG. 14 is a schematic diagram of an example of an artificial neural network (ANN) computation system.
Figure 15:
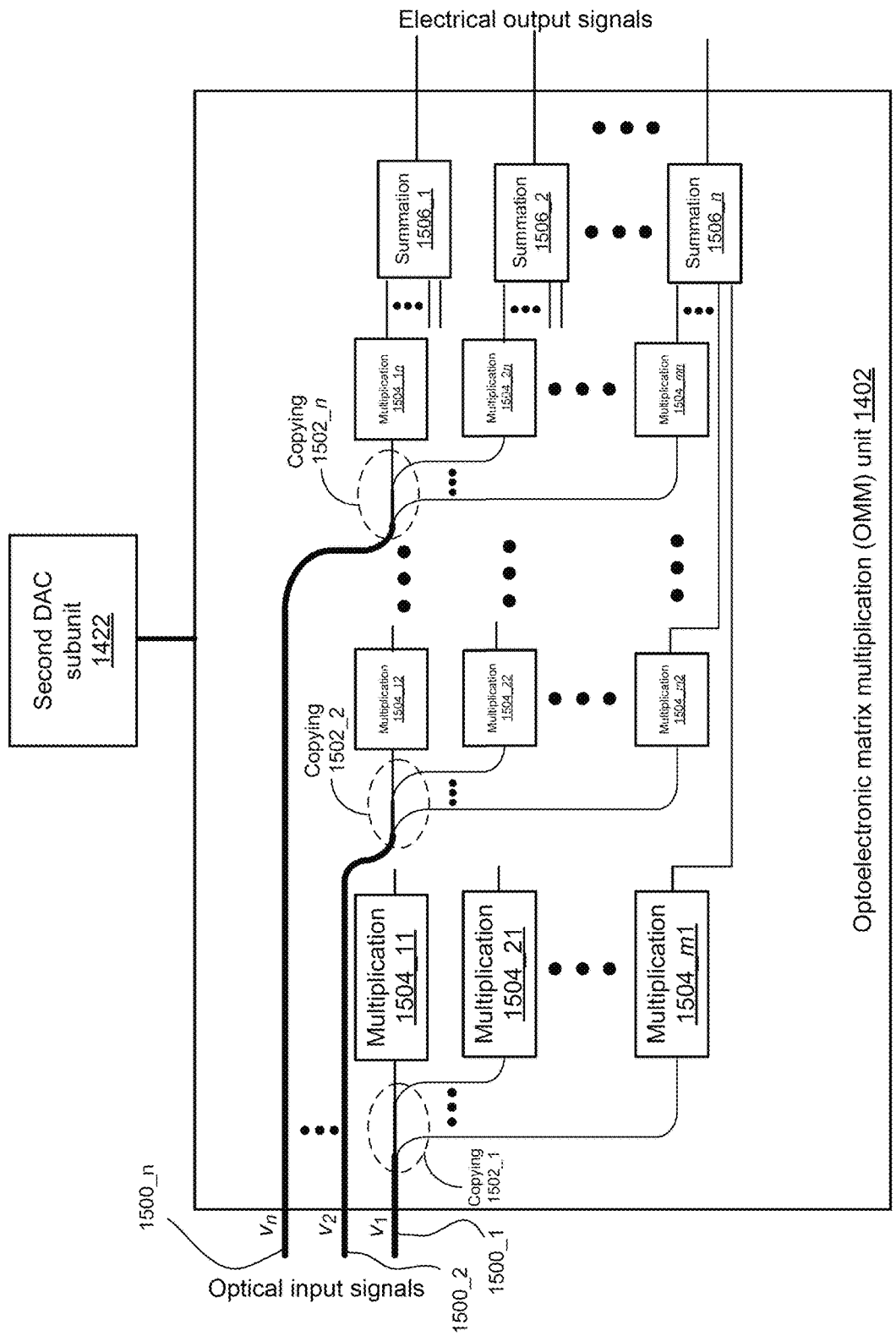
FIG. 15 is a schematic diagram of an example of an optoelectronic matrix multiplication unit.
Figure 32A:
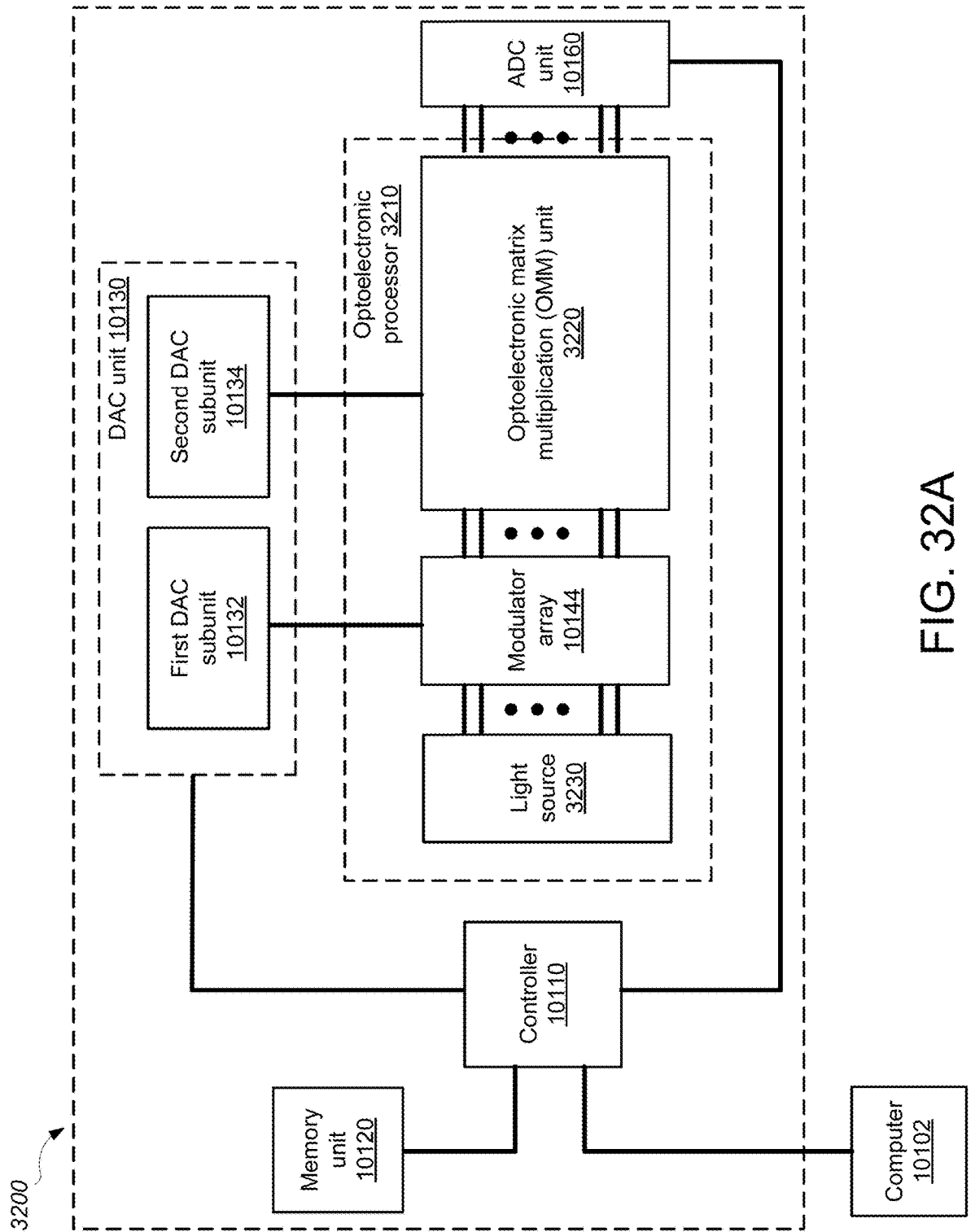
FIG. 32A is a schematic diagram of an example of an artificial neural network (ANN) computation system.
Figure 32B:
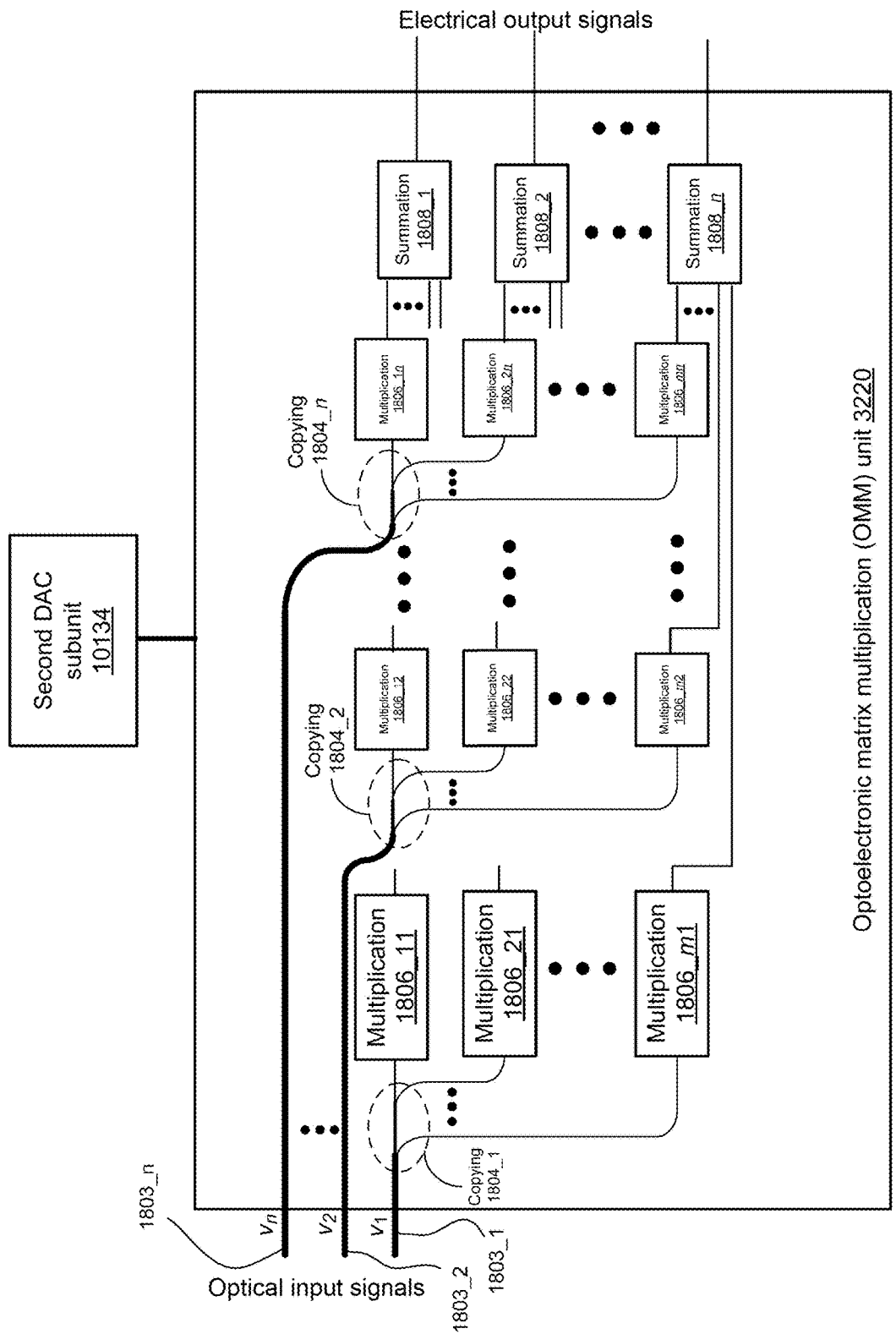
FIG. 32B is a schematic diagram of an example of an optoelectronic matrix multiplication unit.

FIGS. 14 and 15 are similar to FIGS. 32A and 32B of U.S. patent application publication US2020/0110992. Referring to FIG. 14, in some implementations, an artificial neural network (ANN) computation system 1400 includes an optoelectronic matrix multiplication unit 1402 that has, e.g., copying modules, multiplication modules, and summation modules shown in FIGS. 18 to 24D of U.S. patent application publication US2020/0110992, to enable processing non-coherent or low-coherent optical signals in performing matrix computations. The artificial neural network computation system 1400 includes a controller 1404, a memory unit 1406, a DAC unit 1408, and an ADC unit 1410. The controller 1404 receives requests from a computer 1412 and sends the computation outputs to the computer 1412.

An optoelectronic processor 1414 includes a light source 1416, which can include the photonic source 102 of FIG. 1, the array of laser modules 212 of FIGS. 2A-2G, 3, 4, 5A-5E, 7, 8A, 8B, 9A, 9B, 10A-10C, 11A, 111B, or the laser chips 212 of FIGS. 12 and 13. The optoelectronic processor 1414 includes a modulator array 1418 that receives modulator control signals that are generated based on an input vector by a first DAC subunit 1420 of the DAC unit 1408. The outputs of the modulator array 1418 are comparable to the outputs of the optical ports/sources 1802 in FIG. 18 of U.S. patent application publication US2020/0110992 (the figure is also reproduced in this application). The optoelectronic matrix multiplication unit 1402 processes the light signals from the modulator array 1418 in a manner similar to the way that the copy modules 1804, the multiplication modules 1806, and the summation modules 1808 process the optical signals from the optical ports/sources 1802 in FIG. 18 (which corresponds to FIG. 18 of U.S. patent application publication US2020/0110992).

Referring to FIG. 15, in some implementations the optoelectronic matrix multiplication unit 1402 receives an input vector $$\bar{v} = \begin{bmatrix} v_1 \\ \vdots \\ v_n \end{bmatrix},$$

and multiplies the input vector with a matrix $$\bar{M} = \begin{bmatrix} M_{11} & \cdots & M_{1n} \\ \vdots & \ddots & \vdots \\ M_{m1} & \cdots & M_{mn} \end{bmatrix}$$

to produce an output vector $$\bar{y} = \begin{bmatrix} M_{11}v_1 + M_{12}v_2 + \cdots + M_{1n}v_n \\ M_{21}v_1 + M_{22}v_2 + \cdots + M_{2n}v_n \\ \cdots \\ M_{m1}v_1 + M_{m2}v_2 + \cdots + M_{mn}v_n \end{bmatrix}.$$

The optoelectronic matrix multiplication unit 1402 includes m optical paths 1500_1, 1500_2, ..., 1500_m (collectively referenced as 1500) that carry optical signals representing the input vector. A copying module 1502_1 provides copies of the input optical signal $v_1$ to multiplication modules 1504_11, 1504_21, ..., 1504_m1. A copying module 15022 provides copies of the input optical signal $v_2$ to multiplication modules 1504_12, 1504_22, ..., 1504_m2. A copying module 1502_n provides copies of the input optical signal vn to multiplication modules 1504_1n, 1504_2n, ..., 1504_mn.

The amplitudes of the copies of the optical signal $v_1$ provided by the copying module 1502_1 are the same (or substantially the same) relative to one another, but different from that of the optical signal $v_1$ provided by the modulator array 1418. For example, if the copying module 1502_1 splits the signal power of $v_1$ provided by the modulator array 1418 evenly among m signals, then each of the m signals will have a power that is equal to or less than 1/m of the power of $v_1$ provided by the modulator array 1418.

A multiplication module 1504_11 multiplies the input signal $v_1$ with a matrix element $M_{11}$ to produce $M_{11} \cdot v_1$. A multiplication module 1504_21 multiplies the input signal $v_1$ with a matrix element $M_{21}$ to produce $M_{21} \cdot v_1$. A multiplication module 1504_m1 multiplies the input signal $v_1$ with a matrix element $M_{m1}$ to produce $M_{m1} \cdot v_1$. A multiplication module 1504_12 multiplies the input signal $v_2$ with a matrix element $M_{12}$ to produce $M_{12} \cdot v_2$. A multiplication module 1504_22 multiplies the input signal $v_2$ with a matrix element $M_{22}$ to produce $M_{22} \cdot v_2$. A multiplication module 1504_m2 multiplies the input signal $v_2$ with a matrix element $M_{m2}$ to produce $M_{m2} \cdot v_2$. A multiplication module 1504_1n multiplies the input signal $v_n$ with a matrix element $M_{1n}$ to produce $M_{1n} \cdot v_n$. A multiplication module 1504_2n multiplies the input signal $v_n$ with a matrix element $M_{2n}$ to produce $M_{2n} \cdot v_n$. A multiplication module 1504_mn multiplies the input signal $v_n$ with a matrix element $M_{mn}$ to produce $M_{mn} \cdot v_n$, and so forth.

A second DAC subunit 1422 of the DAC unit 1408 generates control signals based on the values of the matrix elements, and sends the control signals to the multiplication modules 1504 to enable the multiplication modules 1504 to multiply the values of the input vector elements with the values of the matrix elements, e.g., by using optical amplitude modulation. For example, the multiplication module 1504_11 can include an optical amplitude modulator, and multiplying the input vector element $v_1$ by the matrix element $M_{11}$ can be achieved by encoding the value of the matrix element $M_{11}$ as an amplitude modulation level applied to the input optical signal representing the input vector element $v_1$.

A summation module 1506_1 receives the outputs of the multiplication modules 1504_11, 1504_12, . . . , 1504_1n, and generates a sum $y_1$ equal to $M_{11}v_1+M_{12}v_2+\ldots+M_{1n}v_n$. A summation module 1506_2 receives the outputs of the multiplication modules 1504_21, 1504_22, . . . , 1504_2n, and generates a sum $y_2$ equal to $M_{21}v_1+M_{22}v_2+\ldots+M_{2n}vn$. A summation module 1506_n receives the outputs of the multiplication modules 1504_m1, 1504_m2, . . . , 1504_mn, and generates a sum $y_n$ equal to $M_{m1}v_1+M_{m2}v_2+\ldots+M_{mn}v_n$.

In the system 1400, the output of the optoelectronic matrix multiplication unit 1402 is provided to the ADC unit 1410. The multiplication modules 1504 or the summation modules 1506 convert the optical signals into electrical signals.

For example, the photonic integrated circuit 110 of FIG. 1, 224 of FIGS. 2A-2G, 3, 4, 5A-5E, 706 of FIG. 7, 802 of FIGS. 8A, 8B, 902 of FIGS. 9A, 9B, 1012 of FIGS. 10A-10C, and 224 of FIGS. 11A, 11B can include the modulator array 1418 and the optoelectronic matrix multiplication unit 1402 of the optoelectronic processor 1414 of FIG. 14. For example, the digital storage module 234 of FIGS. 2A, 2B, 2D-2G, 3, 7, 804 of FIGS. 8A, 8B, 906 of GI. 9A, 9C, and 234 of FIGS. 11A, 11B can include the memory unit 1406 of FIG. 14. For example, the analog integrated circuit 236 and the digital electronic integrated circuit 232 of FIGS. 2A-2G, 3, the hybrid digital/analog chip 708 of FIG. 7, the hybrid digital/analog chip 806 of FIGS. 8A, 8B, the hybrid digital/analog chip 908 of FIGS. 9A, 9B, and the digital electronic integrated circuit 232 of FIGS. 11A, 11B can include the controller 1404, the DAC unit 1408, and the ADC unit 1410 of FIG. 14.

The photonic integrated circuit can be configured to process input optical signals in various ways and is not limited to the examples described above. For example, the photonic integrated circuit can include input waveguides configured to carry input optical signals, and couplers coupled to corresponding input waveguides. The photonic integrated circuit can include operation photodetectors, in which each operation photodetector is configured to detect an optical signal derived from an operation (e.g., matrix operation, such as matrix multiplication operation) based on at least one input optical signal. The photonic integrated circuit also includes feedback photodetectors, in which each feedback photodetector is associated with an input waveguide. The photonic integrated circuit includes tap waveguides, in which each tap waveguide is associated with an input waveguide and is configured to provide a portion of the optical power coupled into the input waveguide to the feedback photodetector. Beam-shaping optical elements (e.g., lenses) are provided, in which each beam-shaping optical element is associated with one of the laser dies and one of the couplers.

A feature of the process for assembling the photonic computing system is that the laser dies are driven during the assembly process in order to align the beam-shaping optical elements. The laser dies are driven to generate laser beams sequentially or in parallel. Each feedback photodetector generates a feedback signal to indicate a coupling efficiency of the laser beam into the corresponding waveguide through the corresponding coupler. Each beam-shaping optical element is aligned to cause the laser beam generated by the corresponding laser die to be coupled through the corresponding coupler to the corresponding input waveguide in the photonic integrated circuit. The process of aligning of the beam-shaping optical element is based on the feedback signal generated by the corresponding feedback photodetector. For example, each beam-shaping optical element can be aligned to maximize the coupling of the corresponding laser beam into the corresponding waveguide.

Figure 35A:
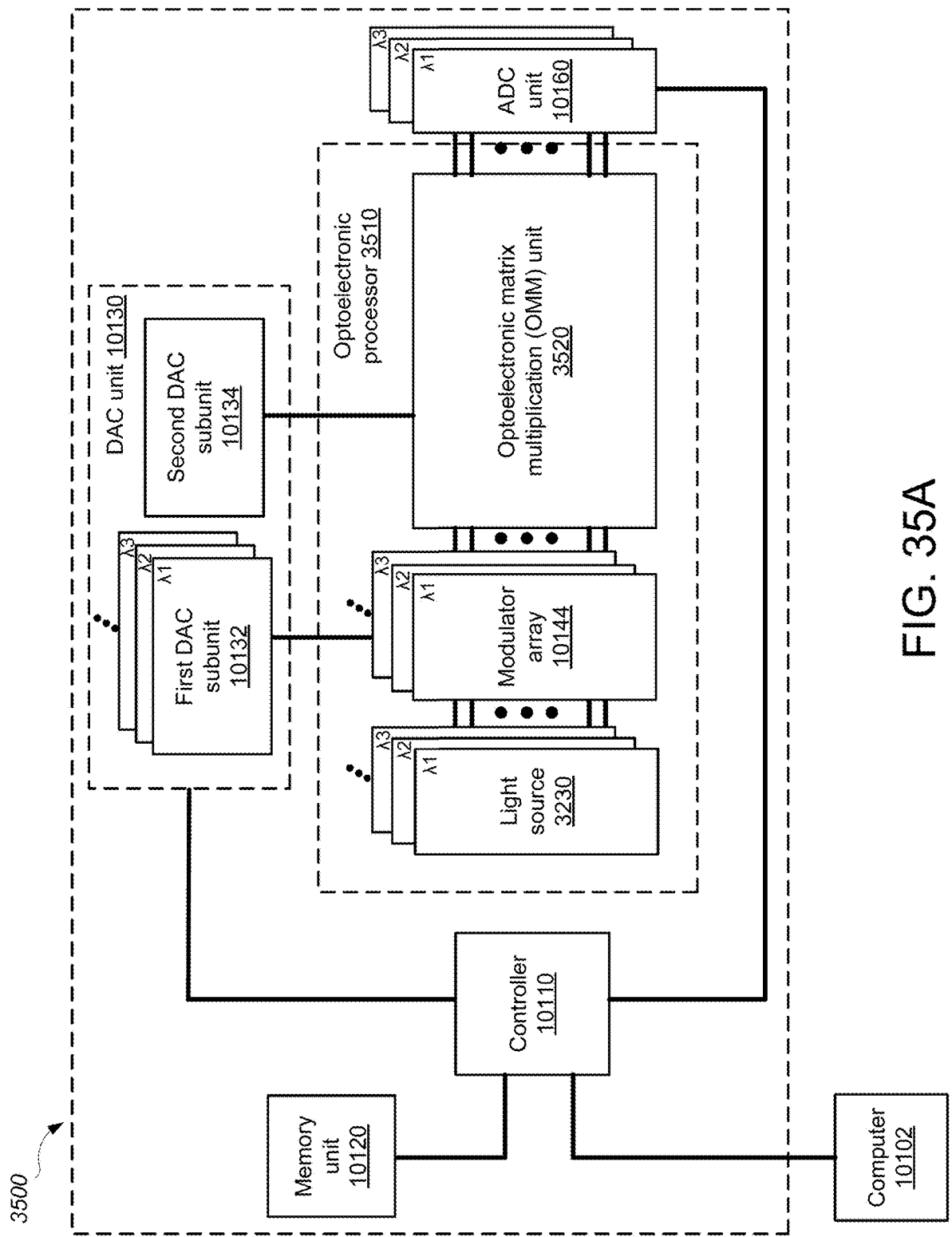
FIG. 35A is a schematic diagram of an example of a wavelength division multiplexed ANN computation system that uses an optoelectronic processor.
Figure 35B:
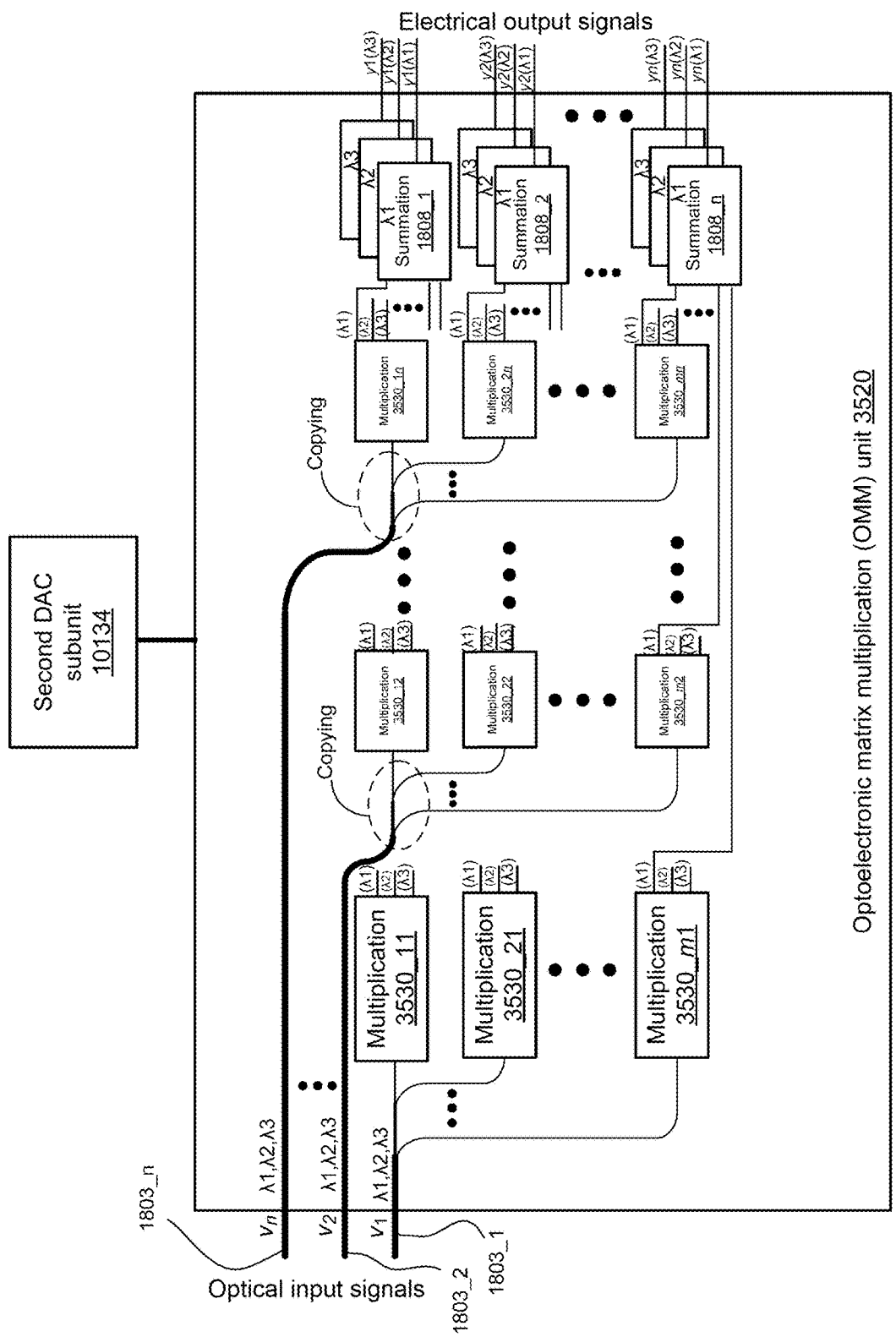
FIGS. 35B and 35C are schematic diagrams of examples of wavelength division multiplexed optoelectronic matrix multiplication units.
Figure 35C:
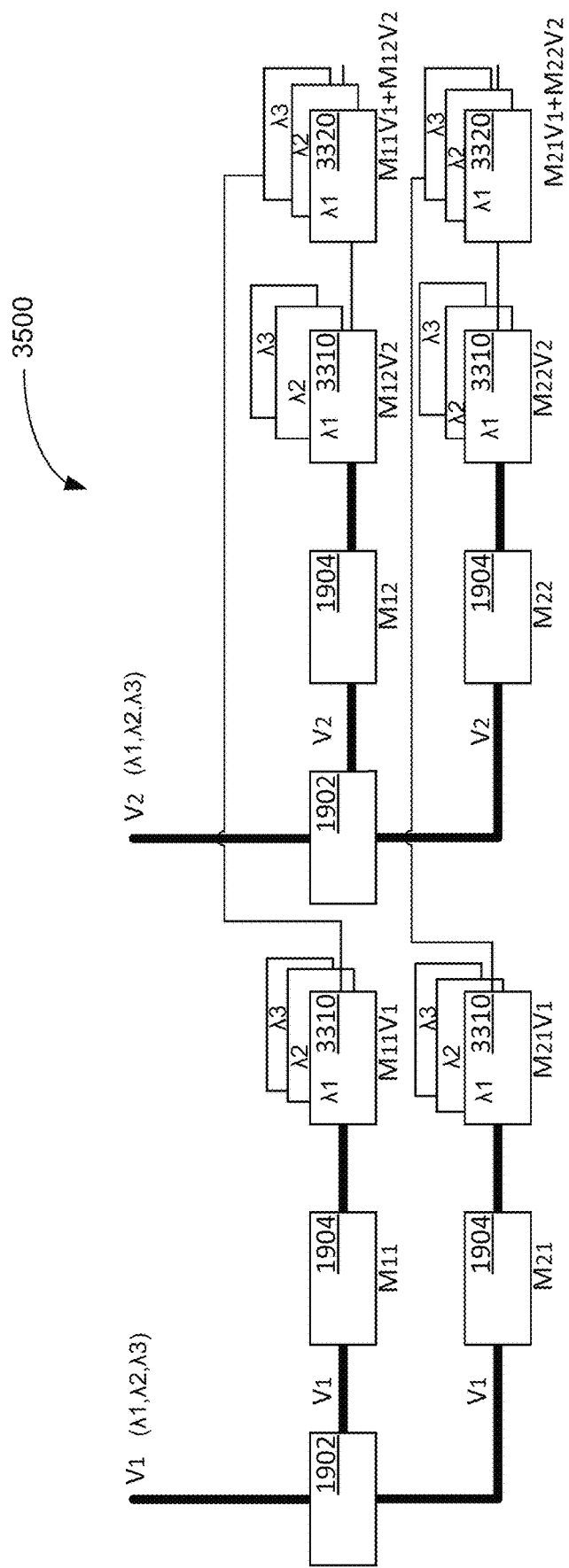

In some implementations, the photonic computing system can include laser modules that generate laser beams having multiple wavelengths that can be used in a photonic integrated circuit that includes a wavelength division multiplexed computation system, e.g., a wavelength division multiplexed artificial neural network computation system disclosed in FIGS. 35A-35C of U.S. patent application publication US2020/0110992.

In some implementations, the photonic computing system includes two or more photonic integrated circuits mounted on an interposer. The interposer can include optical waveguides and optical couplers that provide optical signal paths to enable optical signals to be communicated between or among the two or more photonic integrated circuits. In some implementations, the photonic integrated circuit includes an optical processor that performs operations on input signals, such as matrix multiplications on input signals, in which each bit of the input signal is represented by a modulated optical signal derived from a laser beam provided by one of the laser modules. For example, the input signals can have 8 or more bits, and the photonic computing system can have eight or more laser modules that provide eight or more laser beams that are modulated to represent the 8 or more bits of the input signals.

In some examples, a heat sink can be attached to the thermoelectric cooler 216. In some examples, the thermoelectric cooler 216 can be replaced by a heat sink.

For example, the photonic computing system (e.g., 200 of FIGS. 2A to 2C, 252 of FIG. 2D to 2F, 274 of FIG. 2G, 300 of FIG. 3, 400 of FIG. 4, 500A of FIG. 5A, 500B of FIG. 5B, 500C of FIG. 5C, 500D of FIG. 5D, or 500E of FIG. 5E) described above can be made to have a small size and have a low power consumption, and can be used in, e.g., a robot, an autonomous vehicle, an autonomous drone, a medical diagnosis system, a fraud detection system, a weather prediction system, a financial forecast system, a facial recognition system, a speech recognition system, a metaverse generator, or a product defect detection system. For example, the photonic computing system can be used to generate digital representations of objects in a metaverse and enable users to interact with the objects in the metaverse or with other users in the metaverse. The photonic computing system can also be used in, e.g., a mobile phone or other portable computing devices.

Because the photonic computing systems described in this document can have a low power consumption, a supercomputer or a data center that uses tens, hundreds, thousands, tens of thousands, hundreds of thousands, or more of the photonic computing systems can significantly lower the cost of operation.

The following are additional examples of photonic computing systems that can incorporate the various techniques described in this specification, such as using the photonic integrated circuit as an interposer for other components, or the fabrication processes for assembling and aligning different components of the photonic computing system.

The following describes optoelectronic computing systems that process non-coherent or low-coherent optical signals in performing matrix computations. The optoelectronic computing systems do not require the optical signals to be coherent throughout the entire matrix multiplication process, in which some portions of the computations are performed in the optical domain, and some portions of the computations are performed in the electrical domain.

The optoelectronic computing system produces a computational result using different types of operations that are each performed on signals (e.g., electrical signals or optical signals) for which the underlying physics of the operation is most suitable (e.g., in terms of energy consumption and/or speed). For example, copying can be performed using optical power splitting, summation can be performed using electrical current-based summation, and multiplication can be performed using optical amplitude modulation. An example of a computation that can be performed using these three types of operations is multiplying a vector by a matrix (e.g., as employed by artificial neural network computations). A variety of other computations can be performed using these operations, which represent a set of general linear operations from which a variety of computations can be performed, including but not limited to: vector-vector dot products, vector-vector element-wise multiplication, vector-scalar element wise multiplication, or matrix-matrix element-wise multiplication.

Figure 18:
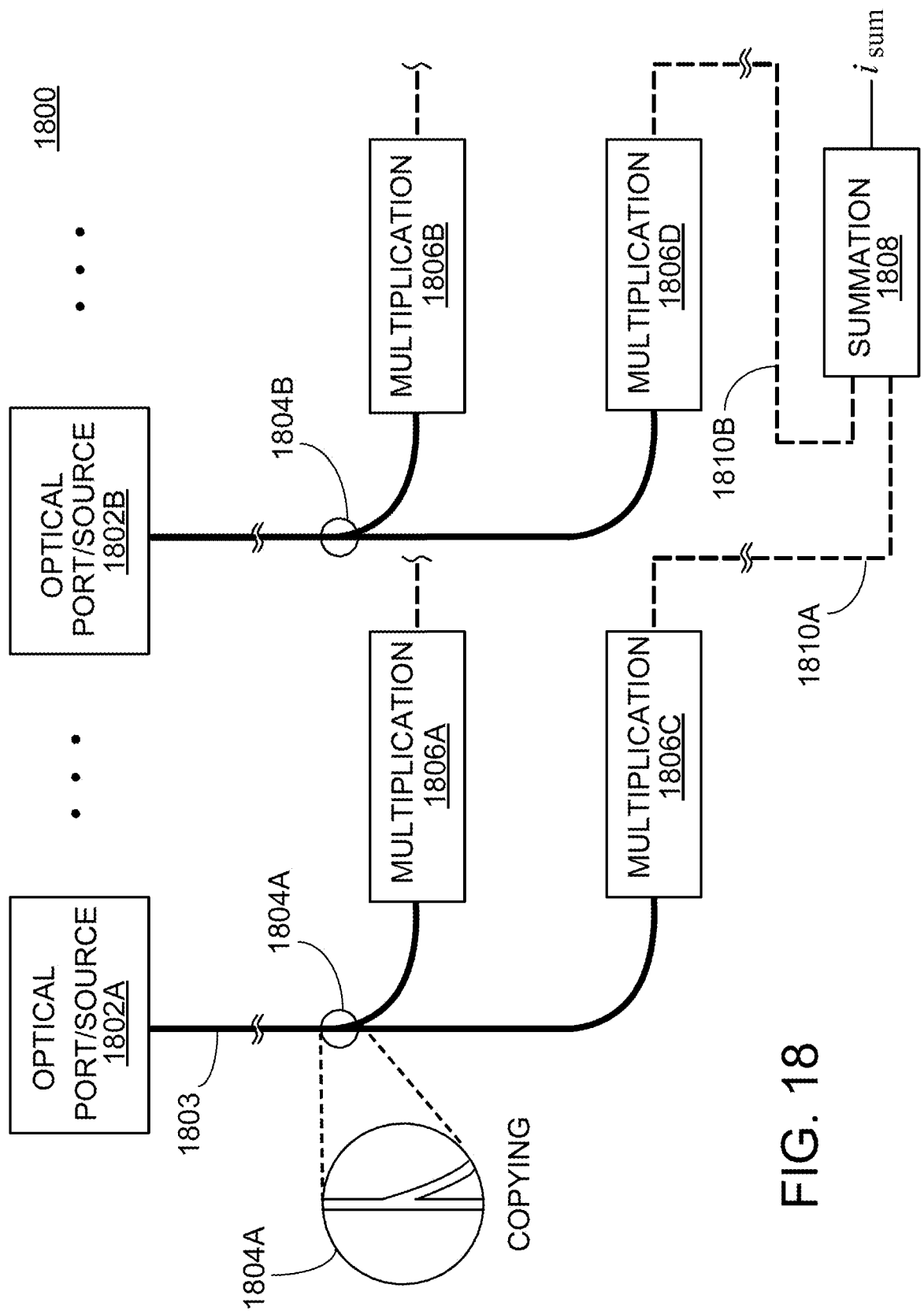
FIG. 18 is a schematic diagram of an example optoelectronic computing system.

Referring to FIG. 18, an example of an optoelectronic computing system 1800 includes a set of optical ports or sources 1802A, 1802B, etc. that provide optical signals. For example, in some implementations, the optical port/source 1802A can include an optical input coupler that provides an optical signal that is coupled to an optical path 1803. In other implementations, the optical port/source 1802A can include a modulated optical source, such as a laser (e.g., for coherence-sensitive implementations) or a light emitting diode (LED) (e.g., for coherence-insensitive implementations), which generates an optical signal that is coupled to the optical path 1803. Some implementations can include a combination of ports that couple optical signals into the system 1800 and sources that generate optical signals within the system 1800. The optical signals can include any optical wave (e.g., an electromagnetic wave having a spectrum that includes wavelengths in the range between about 100 nm and about 1 mm) that has been, or is in the process of being, modulated with information using any of a variety of forms of modulation. The optical path 1803 can be defined, for example, based on a guided mode of an optical waveguide (e.g., a waveguide embedded in a photonic integrated circuit (PIC), or an optical fiber), or based on a predetermined free-space path between the optical port/source 1802A and another module of the system 1800.

In some implementations, the optoelectronic computing system 1800 is configured to perform a computation on an array of input values that are encoded on respective optical signals provided by the optical ports or sources 1802A, 1802B, etc. For example, for various machine learning applications based on neural networks, the computation can implement vector-matrix multiplication (or vector-by-matrix multiplication) where an input vector is multiplied by a matrix to yield an output vector as a result. The optical signals can represent elements of a vector, including possibly only a subset of selected elements of the vector. For example, for some neural network models, the size of a matrix used in the computation can be larger than the size of a matrix that can be loaded into a hardware system (e.g., an engine or co-processor of a larger system) that performs a vector-matrix multiplication portion of the computation. So, part of performing the computation can involve dividing the matrix and the vector into smaller segments that can be provided to the hardware system separately.

The modules shown in FIG. 18 can be part of a larger system that performs vector-matrix multiplication for a relatively large matrix (or submatrix), such as a 64×64-element matrix. But, for purposes of illustration, the modules will be described in the context of an example computation that performs vector-matrix multiplication using a 2×2-element matrix. The modules referenced in this example, will include two copy modules 1804A and 1804B, four multiplication modules 1806A, 1806B, 1806C, and 1806D, and two summation modules, only one of which, summation module 1808, is shown in FIG. 18. These modules will enable multiplication of an input vector $$\overline{x} = \begin{bmatrix} x_A \\ x_B \end{bmatrix}$$

by a matrix $$\overline{M} = \begin{bmatrix} M_A & M_B \\ M_C & M_D \end{bmatrix}$$

to produce an output vector $$\overline{y} = \begin{bmatrix} y_A \\ y_B \end{bmatrix}.$$

For this vector-matrix multiplication $\overline{y}=\overline{M}\overline{x}$, each of the two elements of the output vector $\overline{y}$ can be represented by a different equation, as follows.

$$y_A = M_A x_A + M_B x_B$$

$$y_B = M_C x_A + M_D x_B$$

These equations can be broken down into separate steps that can be performed in the system 1800 using a set of basic operations: a copying operation, a multiplication operation, and a summation operation. In these equations, each element of the input vector appears twice, so there are two copying operations. There are also four multiplication operations, and there are two summation operations. The number of operations performed would be larger for systems that implement vector-matrix multiplication using a larger matrix, and the relative number of instances of each operation would be different using a matrix that is not square matrix in shape (i.e., with the number of rows being different from the number of columns).

In this example, the copying operations are performed by copying modules 1804A and 1804B. The elements of the input vector $x_A$ and $x_B$ are represented by values encoded on optical signals from the optical port/source 1802A and 1802B, respectively. Each of these values is used in both equations, so each value is copied to provide the resulting two copies to different respective multiplication modules. A value can be encoded in a particular time slot, for example, using optical wave that has been modulated to have a power from a set of multiple power levels, or having a duty cycle from a set of multiple duty cycles, as described in more detail below. A value is copied by copying the optical signal on which that value is encoded. The optical signal encoded with the value representing element $x_A$ is copied by copying module 1804A, and the optical signal encoded with the value representing element $x_B$ is copied by copying module 1804B. Each copying module can be implemented, for example, using an optical power splitter, such as a waveguide optical splitter that couples a guided mode in an input waveguide to each of two output waveguides over a Y-shaped splitter that gradually (e.g., adiabatically) splits the power, or a free-space beam splitter that uses a dielectric interface or thin film with one or more layers to transmit and reflect, respectively, two output beams from an input beam.

In this document, when we say that the optical signal encoded with the value representing element $x_A$ is copied by the copying module 1804A, we mean that multiple copies of signals that represent element $x_A$ are produced based on the input signal, not necessarily that the output signals of the copying module 1804A have the same amplitude as that of the input signal. For example, if the copying module 1804A splits the input signal power evenly between two output signals, then each of the two output signals will have a power that is equal to or less than 50% of the power of the input signal. The two output signals are copies of each other, while the amplitude of each output signal of the copying module 1804A is different from the amplitude of the input signal. Also, in some embodiments that have a group of multiple copying modules used for copying a given optical signal, or subset of optical signals, each individual copying module does not necessarily split power evenly among its generated copies, but the group of copying modules can be collectively configured to provide copies that have substantially equal power to the inputs of downstream modules (e.g., downstream multiplication modules).

In this example, the multiplication operations are performed by four multiplication modules 1806A, 1806B, 1806C, and 1806D. For each copy of one of the optical signals, one of the multiplication modules multiplies that copy of the optical signal by a matrix element value, which can be performed using optical amplitude modulation. For example, the multiplication module 1806A multiplies the input vector element $x_A$ by the matrix element $M_A$. The value of the vector element $x_A$ can be encoded on optical signal, and the value of the matrix element $M_A$ can be encoded as an amplitude modulation level of an optical amplitude modulator.

The optical signal encoded with the vector element $x_A$ can be encoded using different forms of amplitude modulation. The amplitude of the optical signal can correspond to a particular instantaneous power level $P_A$ of a physical optical wave within a particular time slot, or can correspond to a particular energy $E_A$ of a physical optical wave over a particular time slot (where the power integrated over time yields total energy). For example, the power of a laser source can be modulated to have a particular power level from a predetermined set of multiple power levels. In some implementations, it may be useful to operate electronic circuitry near an optimized operation point, so instead of varying the power over many possible power levels, an optimized "on" power level is used with the signal being modulated to be "on" and "off" (at zero power) for particular fractions of a time slot. The fraction of time that the power is at the "on" level corresponds to a particular energy level. Either of these particular values of power or energy can be mapped to a particular value of the element $x_A$ (using a linear or nonlinear mapping relationship). The actual integration over time, to yield a particular total energy level, can occur downstream in the system 1800 after signals are in the electrical domain, as described in more detail below.

Additionally, the term "amplitude" may refer to the magnitude of the signal represented by the instantaneous or integrated power in the optical wave, or may also equivalently refer to the "electromagnetic field amplitude" of the optical wave. This is because the electromagnetic field amplitude has a well-defined relationship to the signal amplitude (e.g., by integrating an electromagnetic field intensity, which is proportional to the square of the electromagnetic field amplitude, over a transverse size of a guided mode or free-space beam to yield the instantaneous power). This leads to a relationship between modulation values, since a modulator that modulates the electromagnetic field amplitude by a particular value $\sqrt{M}$ can also be considered as modulating the power-based signal amplitude by a corresponding value M (since the optical power is proportional to the square of the electromagnetic field amplitude).

The optical amplitude modulator used by the multiplication module to encode the matrix element $M_A$ can operate by changing the amplitude of the optical signal (i.e., the power in the optical signal) using any of a variety of physical interactions. For example, the modulator can include a ring resonator, an electro-absorption modulator, a thermal electro-optical modulator, or a Mach-Zehnder Interferometer (MZI) modulator. In some techniques a fraction of the power is absorbed as part of the physical interaction, and in other techniques the power is diverted using a physical interaction that modifies another property of the optical wave other than its power, such as its polarization or phase, or modifies coupling of optical power between different optical structures (e.g., using tunable resonators). For optical amplitude modulators that operate using interference (e.g., destructive and/or constructive interference) among optical waves that have traveled over different paths, coherent light sources such as lasers can be used. For optical amplitude modulators that operate using absorption, either coherent or non-coherent or low-coherence light sources such as LEDs can be used.

In one example of a waveguide 1×2 optical amplitude modulator, a phase modulator is used to modulate the power in an optical wave by placing that phase modulator in one of multiple waveguides of the modulator. For example, the waveguide 1×2 optical amplitude modulator can split an optical wave guided by an input optical waveguide into first and second arms. The first arm includes a phase shifter that imparts a relative phase shift with respect to a phase delay of the second arm. The modulator then combines the optical waves from the first and second arms. In some embodiments, different values of the phase delay provide multiplication of the power in the optical wave guided by the input optical waveguide by a value between 0 to 1 through constructive or destructive interference. In some embodiments, the first and second arms are combined into each of two output waveguides, and a difference between photocurrents generated by respective photodetectors receiving light waves from the two output waveguides provides a signed multiplication result (e.g., multiplication by a value between −1 to 1), as described in more detail below. By suitable choice of amplitude scaling of the encoded optical signals, the range of the matrix element value can be mapped to an arbitrary range of positive values (0 to M), or signed values (−M to M).

In this example, the summation operations are performed by two summation modules, with the summation module 1808, shown in FIG. 18, used for performing the summation in the equation for computing the output vector element $y_B$.

A corresponding summation module (not shown) is used for performing the summation in the equation for computing the output vector element $y_A$. The summation module 1808 produces an electrical signal that represents a sum of the results of the two multiplication modules 1806C and 1806D. In this example, the electrical signal is in the form of a current $i_{sum}$ that is proportional to the sum of the powers in the output optical signals generated by multiplication modules 1806C and 1806D, respectively. The summation operation that yields this current $i_{sum}$ is performed in the optoelectronic domain in some embodiments, and is performed in the electrical domain in other embodiments. Or, some embodiments can use optoelectronic domain summation for some summation modules and electrical domain summation for other summation modules.

In embodiments in which the summation is performed in the electrical domain, the summation module 1808 can be implemented using: (1) two or more input conductors that each carries an input current whose amplitude represents a result of one of the multiplication modules, and (2) at least one output conductor that carries a current that is the sum of the input currents. For example, this occurs if the conductors are wires that meet at a junction. Such a relationship can be understood, for example (without being bound by theory), based on Kirchhoff's current law, which states that current flowing into a junction is equal to current flowing out of the junction. For these embodiments, the signals 1810A and 1810B provided to the summation module 1808 are input currents, which can be produced by photodetectors that are part of the multiplication modules that generate a respective photocurrent whose amplitude is proportional to the power in a received optical signal. The summation module 1808 then provides the output current $i_{sum}$. The instantaneous value of that output current, or the integrated value of that output current, can then be used to represent the quantitative value of the sum.

In embodiments in which the summation is performed in the optoelectronic domain, the summation module 1808 can be implemented using a photodetector (e.g., a photodiode) that receives the optical signals generated by different respective multiplication modules. For these embodiments, the signals 1810A and 1810B provided to the summation module 1808 are input optical signals that each comprise an optical wave whose power represents a result of one of the multiplication modules. The output current $i_{sum}$ in this embodiment is the photocurrent generated by the photodetector. Since the wavelengths of the optical waves are different (e.g., different enough such that no significant constructive or destructive interference occurs between them), the photocurrent will be proportional to the sum of the powers of the received optical signals. The photocurrent is also substantially equal to the sum of the individual currents that would result for the individual detected optical powers detected by separate equivalent photodetectors. The wavelengths of the optical waves are different, but close enough to have substantially the same response by the photodetector (e.g., wavelengths within a substantially flat detection bandwidth of the photodetector). As mentioned above, summation in the electrical domain, using current summation, can enable a simpler system architecture by avoiding the need for multiple wavelengths.

FIG. 19A shows an example of a system configuration 1900 for an implementation of the system for performing vector-matrix multiplication using a 2×2-element matrix, with the summation operation performed in the electrical domain. In this example, the input vector is $$\overline{v} = \begin{bmatrix} v_1 \\ v_2 \end{bmatrix},$$

and the matrix is $$\overline{M} = \begin{bmatrix} M_{11} & M_{12} \\ M_{21} & M_{22} \end{bmatrix}.$$

Each of the elements of the input vector is encoded on a different optical signal. Two different copying modules 1902 perform an optical copying operation to split the computation over different paths (e.g., an "upper" path and a "lower" path). There are four multiplication modules 1904 that each multiply by a different matrix element using optical amplitude modulation. At the output of each multiplication module 1904, there is an optical detection module 1906 that converts an optical signal to an electrical signal in the form of an electrical current. Both upper paths of the different input vector elements are combined using a summation module 1908, and both lower paths of the different input vector elements are combined using a summation module 1908, which performs summation in the electrical domain. So, each of the elements of output vector is encoded on a different electrical signal. As shown in FIG. 19A, as the computation progresses, each component of an output vector is incrementally generated to yield the following results for the upper and lower paths, respectively.

$M_{11}v_1 + M_{12}v_2$ $M_{21}v_1 + M_{22}v_2$

The system configuration 1900 can be implemented using any of a variety of optoelectronic technologies. In some implementations, there is a common substrate (e.g., a semiconductor such as silicon), which can support both integrated optics components and electronic components. The optical paths can be implemented in waveguide structures that have a material with a higher optical index surrounded by a material with a lower optical index defining a waveguide for propagating an optical wave that carries an optical signal. The electrical paths can be implemented by a conducting material for propagating an electrical current that carries an electrical signal. (In FIGS. 19A to 20A, 21A to 24E, unless otherwise indicated, the thicknesses of the lines representing paths are used to differentiate between optical paths, represented by thicker lines, and electrical paths, represented by thinner lines or dashed lines.) Optical devices such as splitters and optical amplitude modulators, and electrical devices such as photodetectors and operational amplifiers (op-amps) can be fabricated on the common substrate. Alternatively, different devices having different substrates can be used to implement different portions of the system, and those devices can be in communication over communication channels. For example, optical fibers can be used to provide communication channels to send optical signals among multiple devices used to implement the overall system. Those optical signals can represent different subsets of an input vector that is provided when performing vector-matrix multiplication, and/or different subsets of intermediate results that are computed when performing vector-matrix multiplication, as described in more detail below.

In this document, a figure may show an optical waveguide crossing an electrical signal line, it is understood that the optical waveguide does not intersect the electrical signal line. The electrical signal line and the optical waveguide may be disposed at different layers of the device.

FIG. 19B shows an example of a system configuration 1920 for an implementation of the system for performing vector-matrix multiplication using a 2×2-element matrix, with the summation operation performed in the optoelectronic domain. In this example, the different input vector elements are encoded on optical signals using two different respective wavelengths $\lambda_1$ and $\lambda_2$. Also, the optical output signals of the multiplication modules 1904 are combined in optical combiner modules 1910, such that optical waveguides guide both optical signals on both wavelengths to each of the optoelectronic summation modules 1912, which can be implemented using photodetectors, as used for the optical detection modules 1906 in the example of FIG. 19A. But, in this example the summation is represented by the photocurrent representing the power in both wavelengths instead of by the current leaving a junction between different conductors.

In this document, when a figure shows two optical waveguides crossing each other, whether the two optical waveguides are actually optically coupled to each other will be clear from the description. For example, two waveguides that appear to cross each other from a top view of the device can be implemented in different layers and thus not intersect with each other. For example, the optical path that provides the optical signal $\lambda_2$ as input to the copying module 1902 and the optical path that provides the optical signal $M_{11}V_1$ from the multiplication module 1904 to the optical combiner module 1910 are not optically coupled to each other, even though in the figure they may appear to cross each other. Similarly, the optical path that provides the optical signal $\lambda_2$ from the copying module 1902 to the multiplication module 1904 and the optical path that provides the optical signal $M_{21}V_1$ from the multiplication module 1904 to the optical combiner module 1910 are not optically coupled to each other, even though in the figure they may appear to cross each other.

The system configurations shown in FIGS. 19A and 19B can be extended to implement a system configuration for performing vector-matrix multiplication using an m×n-element matrix. In this example, the input vector is $$\overline{v} = \begin{bmatrix} v_1 \\ \vdots \\ v_n \end{bmatrix},$$

and the matrix is $$\overline{M} = \begin{bmatrix} M_{11} & \cdots & M_{1n} \\ \vdots & \ddots & \vdots \\ M_{m1} & \cdots & M_{mn} \end{bmatrix}.$$

For example, the input vector elements $v_1$ to $v_n$ are provided by n waveguides, and each input vector element is processed by one or more copying modules to provide m copies of the input vector element to m respective paths. There are m×n multiplication modules that each multiply by a different matrix element using optical amplitude modulation to produce an electrical or optical signal representing $M_{ij} \cdot v_j$ (i=1 ... m, j=1 ... n). The signals representing $M_{ij} \cdot v_j$ (j=1 ... n) are combined using an i-th summation module (i=1 ... m) to produce the following results for the m paths, respectively.

$$M_{11}v_1 + M_{12}v_2 + \cdots + M_{1n}v_n$$
$$M_{21}v_1 + M_{22}v_2 + \cdots + M_{2n}v_n$$
$$\cdots$$
$$M_{m1}v_1 + M_{m2}v_2 + \cdots + M_{mn}v_n$$

Since optical amplitude modulation is able to reduce the power in an optical signal from its full value to a lower value, down to zero (or near zero) power, multiplication by any value between 0 and 1 can be implemented. However, some computations may call for multiplication by values greater than 1 and/or multiplication by signed (positive or negative) values. First, for extending the range to 0 to $M_{max}$ (where $M_{max}>1$), the original modulation of the optical signals can include an explicit or implicit scaling of an original vector element amplitude by $M_{max}$ (or equivalently, scaling the value mapped to a particular vector element amplitude in a linear mapping by $1/M_{max}$) such that the range 0 to 1 for matrix element amplitudes corresponds quantitatively in the computation to the range 0 to $M_{max}$. Second, for extending the positive range 0 to $M_{max}$ for matrix element values to a signed range $-M_{max}$ to $M_{max}$, a symmetric differential configuration can be used, as described in more detail below. Similarly, a symmetric differential configuration can also be used to extend a positive range for the values encoded on the various signals to a signed range of values.

Figure 20A:
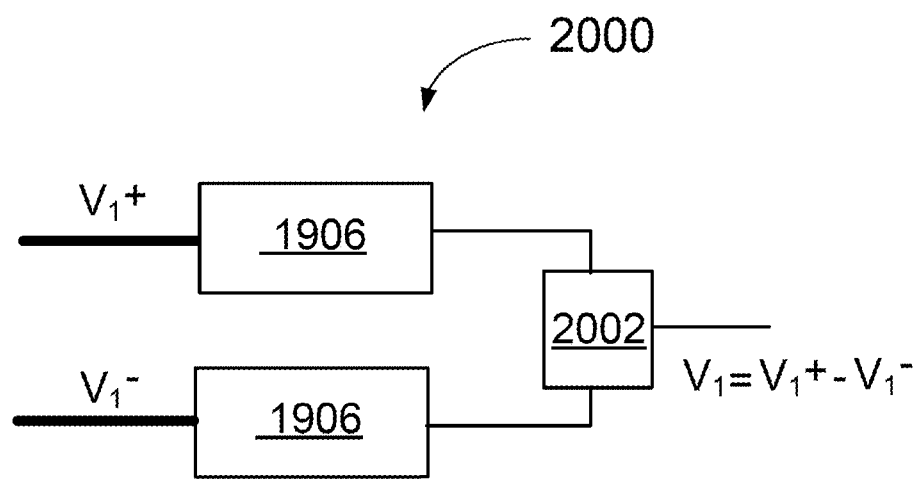
FIG. 20A is a schematic diagram of an example of a symmetric differential configuration.

FIG. 20A shows an example of a symmetric differential configuration 2000 for providing a signed range of values for values that are encoded on optical signals. In this example, there are two related optical signals encoding unsigned values designated as $V_1^+$ and $V_1^-$, where each value is assumed to vary between 0 (e.g., corresponding to an optical power near zero) and $V_{max}$ (e.g., corresponding to an optical power at a maximum power level). The relationship between the two optical signals is such that when one optical signal is encoded with a "main" value $V_1^+$ the other optical signal is encoded with a corresponding "anti-symmetric" value $V_1^-$ such that as the main value $V_1^+$ encoded on one optical signal monotonically increases from 0 to $V_{max}$, the anti-symmetric $V_1^-$ value encoded on the paired optical signal monotonically decreases from $V_{max}$ to 0. Or, conversely, as the main value $V_1$ encoded on one optical signal monotonically decreases from $V_{max}$ to 0, the anti-symmetric value $V_1^-$ encoded on the paired optical signal monotonically increases from 0 to $V_{max}$. After the optical signals in the upper and lower paths are converted to electrical current signals by respective optical detection modules 1906, a difference between the current signals can be produced by a current subtraction module 2002. The difference between the current signals encoding $V_1^+$ and $V_1^-$ results in a current that is encoded with a signed value $V_1$ given as:

$$V_1 = V_1^+ - V_1^-$$

where the signed value $V_1$ monotonically increases between $-V_{max}$ and $V_{max}$ as the unsigned main value $V_1^+$ monotonically increases from 0 to $V_{max}$ and its paired anti-symmetric value $V_1^-$ monotonically decreases from $V_{max}$ to 0. There are various techniques that can be used for implementing the symmetric differential configuration of FIG. 20A, as shown in FIGS. 20B and 20C.

Figure 20B:
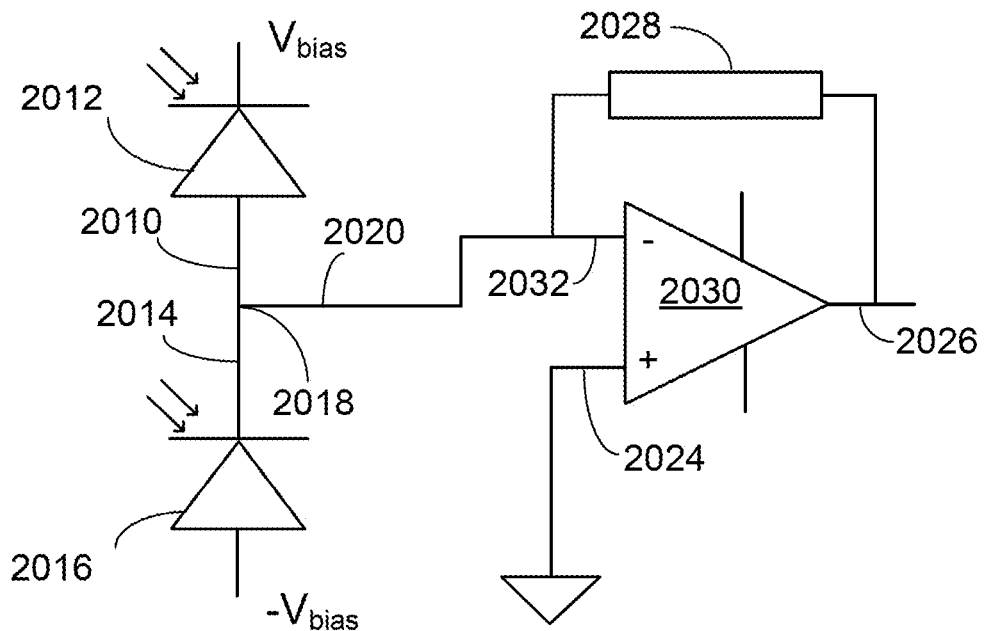
FIGS. 20B and 20C are circuit diagrams of examples of system modules.

In FIG. 20B, the optical signals are detected in a common-terminal configuration where two photodiode detectors are connected to a common terminal 2032 (e.g., the inverting terminal) of an op-amp 2030. In this configuration, a current 2010 generated from a first photodiode detector 2012 and a current 2014 generated from a second photodiode detector 2016 combine at a junction 2018 among three conductors to produce a difference current 2020 between current 2010 and the current 2014. The currents 2010 and 2014 are provided from opposite sides of the respective photodiodes, which are connected at the other ends to voltage sources (not shown) providing bias voltages at the same magnitude $V_{bias}$ but of opposite signs, as shown in FIG. 20B. In this configuration the difference is generated due to the behavior of currents that meet at the common junction 2018. The difference current 2020 represents the signed value encoded on an electrical signal corresponding to the difference between the unsigned values encoded on detected optical signals. The op-amp 2030 can be configured in a transimpedance amplifier (TIA) configuration in which the other terminal 2024 is grounded and an output terminal 2026 is fed back to the common terminal 2032 using a resistive element 2028 that provides a voltage proportional to the difference current 2020. Such a TIA configuration would provide the resulting value as an electrical signal in the form of a voltage signal.

Figure 20C:
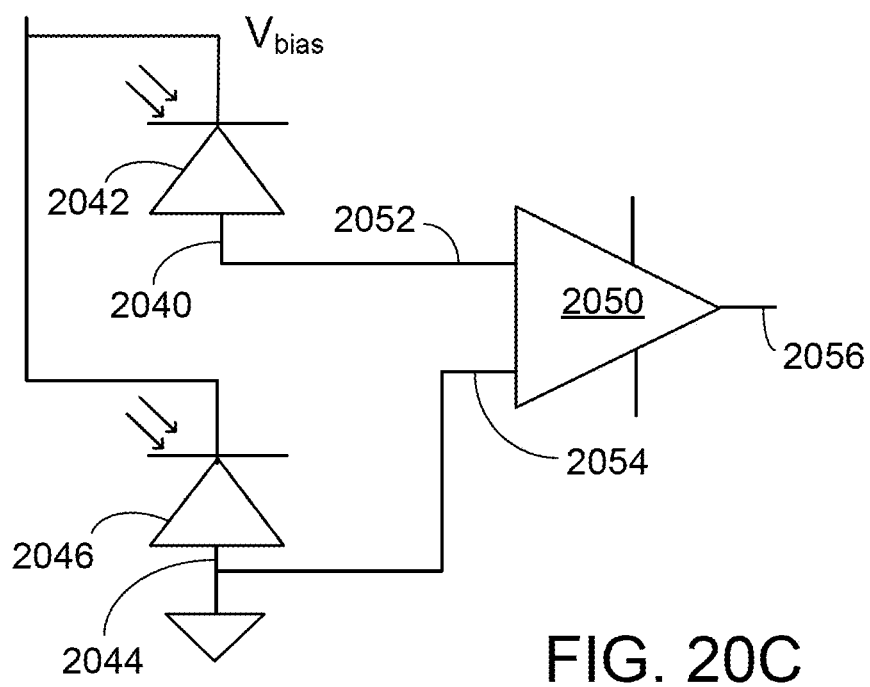

In FIG. 20C, the optical signals are detected in a differential-terminal configuration where two photodiode detectors are connected to different terminals of an op-amp 2050. In this configuration, a current 2040 generated from a first photodiode detector 2042 is connected to an inverting terminal 2052, and a current 2044 generated from a second photodiode detector 2046 is connected to a non-inverting terminal 2054. The currents 2040 and 2044 are provided from the same ends of the respective photodiodes, which are connected at the other ends to a voltage source (not shown) providing a bias voltage at the same magnitude $v_{bias}$ and same sign, as shown in FIG. 20C. The output terminal 2056 of the op-amp 2050 in this configuration provides a current proportional to the difference between the current 2040 and the current 2044. In this configuration, the difference is generated due to the behavior of the circuitry of the op-amp 2050. The difference current flowing from the output terminal 2056 represents the signed value encoded on an electrical signal corresponding to the difference between the unsigned values encoded on the detected optical signals.

Figure 21A:
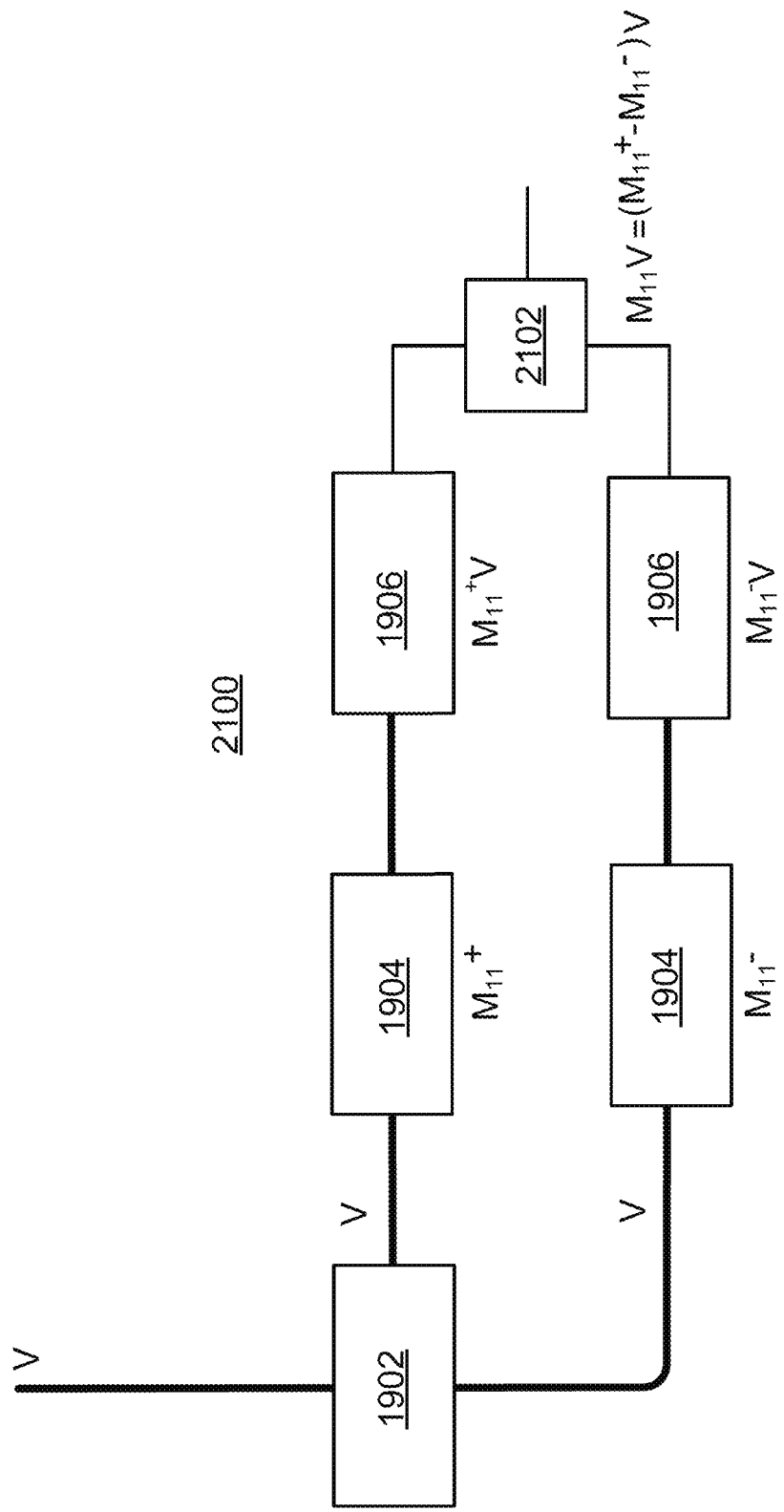
FIG. 21A is a schematic diagram of an example of a symmetric differential configuration.

FIG. 21A shows an example of a symmetric differential configuration 2100 for providing a signed range of values for values that are encoded as modulation levels of optical amplitude modulators implementing the multiplication modules 1904. In this example, there are two related modulators configured to modulate by unsigned values designated as $M_{11}^+$ and $M_{11}^-$, where each value is assumed to vary between 0 (e.g., corresponding to an optical power modulated to be reduced to near zero) and $M_{max}$ (e.g., corresponding to an optical power preserved near a maximum power level). The relationship between the two modulation levels is such that when one modulation level is configured at a "main" value $M_{11}^+$ the other modulation level is configured at a corresponding "anti-symmetric" value $M_{11}^-$ such that as the main value $M_{11}^+$ of one modulator monotonically increases from 0 to $M_{max}$, the anti-symmetric value $M_{11}^-$ of the other modulator monotonically decreases from $M_{max}$ to 0. Or, conversely, as the main value $M_{11}^+$ of one modulator monotonically decreases from $M_{max}$ to 0, the anti-symmetric $M_{11}^-$ value of the other modulator monotonically increases from 0 to $M_{max}$. After an input optical signal encoding a value V has been copied by a copying module 1902, each of the modulators provides a modulated output optical signal to a corresponding optical detection module 1906. The multiplication module 1904 in the upper path includes a modulator that multiplies by $M_{11}^+$ and provides an optical signal encoded with the value $M_{11}^+V$. The multiplication module 1904 in the lower path includes a modulator that multiplies by $M_{11}^-$ and provides an optical signal encoded with the value $M_{11}^-V$. After the optical signals are converted to electrical current signals by the respective optical detection modules 1906, a difference between them can be produced by a current subtraction module 2102. The difference between the current signals encoding $M_{11}^+V$ and $M_{11}^-V$ results in a current that is encoded with V multiplied by a signed value $M_{11}$ given as:

$$M_{11}V = M_{11}^+V - M_{11}^-V$$

where the signed value $M_{11}$ monotonically increases between $-M_{max}$ and $M_{max}$ as the unsigned main value $M_{11}^+$ monotonically increases from 0 to $M_{max}$ and its paired anti-symmetric value $M_{11}^-$ monotonically decreases from $M_{max}$ to 0.

Figure 21B:
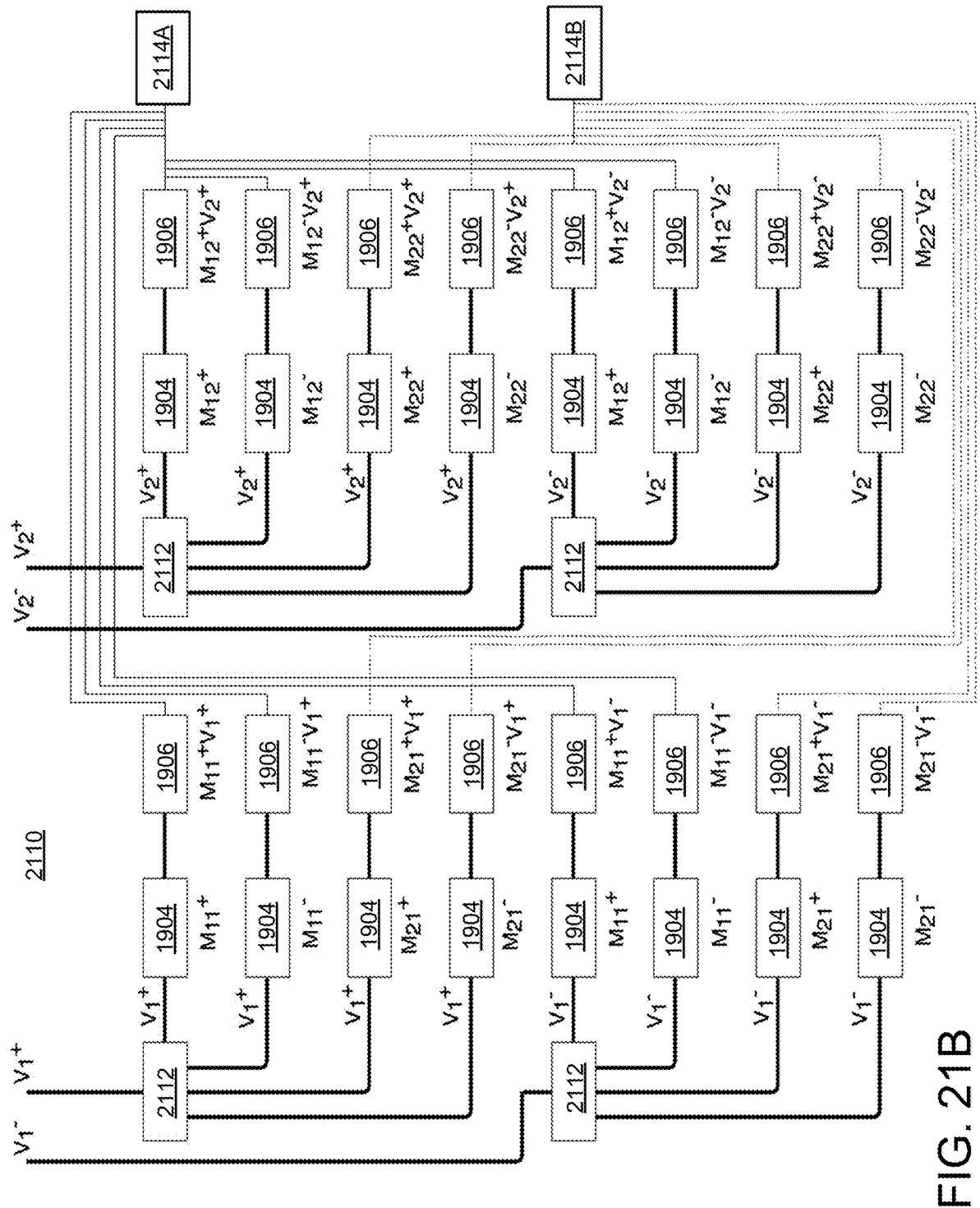
FIG. 21B is a schematic diagram of an example of a system configuration.

FIG. 21B shows an example of a system configuration 2110 for an implementation of the system 1800 for performing vector-matrix multiplication using a 2×2-element matrix, with the summation operation performed in the electrical domain, and with signed elements of an input vector and signed elements of the matrix. In this example, for each signed element of the input vector, there are two related optical signals encoding unsigned values. There are two unsigned values designated as $V_1^+$ and $V_1^-$ for the first signed input vector element value $V_1$, and there are two unsigned values designated as $V_2^+$ and $V_2^-$ for the second signed input vector element value $V_2$. Each unsigned value encoded on an optical signal is received by a copying module 2112 performing one or more optical copying operations that yields four copies of the optical signal over four respective optical paths. In some implementations of the copying module 2112, there are three different Y-shaped waveguide splitters that are each configured to split using a different power ratio (which can be achieved, for example, using any of a variety of photonic devices). For example, a first splitter could split using a 1:4 power ratio to divert 25% (¼) of the power to a first path, a second splitter could split using a 1:3 power ratio to divert 25% (¼=⅓×¾) of the power to a second path, and a third splitter could split using a 1:2 power ratio to divert 25% (¼=½×⅔×¾) of the power to a third path and the remaining 25% of the power to a fourth path. The individual splitters that are part of the copying module 2112 could be arranged in different parts of a substrate, for example, to appropriately distribute the different copies to different pathways within the system. In other implementations of the copying module 2112 there could be a different number of paths being split with different splitting ratios, as appropriate. For example, a first splitter could split using a 1:2 power ratio to provide two intermediate optical signals having substantially equal power (e.g., 50% of the power in the input optical wave to each of two output ports). Then, one of those intermediate optical signals could be split using a second splitter having a 1:2 power ratio to divert 25% of the power of the input optical wave to each of a first path and a second path, and the other of those intermediate optical signals could be split using a third splitter having a 1:2 power ratio to divert 25% of the power of the input optical wave to each of a third path and a fourth path.

An optical copying distribution network having this type of binary tree topology provides certain advantages. For example, since the binary tree optical copying distribution network is able to use symmetric designs (e.g., a Y-shaped adiabatic waveguide taper) for an even 1:2 power splitter for all wavelengths, the network would be wavelength independent, facilitating its use with multiple wavelengths. Additionally, uneven power splitters can have coupling sections whose length need to be precisely controlled to divert varying fractions of the power (e.g., 1/n, 1/(n–1), . . . etc. for n branches of the network). But, such precision may be difficult in the presence of fabrication variations. This binary tree optical copying distribution network also facilitates the shortening of the electrical paths for some compact die layouts, as described in more detail below with reference to FIGS. 45A-45G.

The system configuration 2110 also includes other modules arranged as shown in FIG. 21B to provide two different output electrical signals that represent an output vector that is the result of the vector-matrix multiplication performed by system 100. There are 16 different multiplication modules 1904 modulating different copies of the optical signals representing the input vector, and there are 16 different optical detection modules 1906 to provide electrical signals representing intermediate results of the computation. There are also two different summation modules 2114A and 2114B that compute the overall summation for each of the output electrical signals. In the figure, the signal lines electrically coupling the optical detection modules 1906 to the summation module 2114B are shown in dashed lines. Because each overall summation can include some anti-symmetric terms that are being subtracted from paired main terms from any symmetric differential configurations for vector elements and/or matrix elements, the summation modules 2114A and 2114B can include a mechanism for some terms of the summation to be added after being inverted (equivalently, being subtracted from the non-inverted terms). For example, in some implementations the summation modules 2114A and 2114B include both inverting and non-inverting input ports such that the terms that are to be added within in the overall summation can be connected to the non-inverting input port, and terms that are to be subtracted within the overall summation can be connected to the inverting input port. One example implementation of such a summation module is an op-amp where a non-inverting terminal is connected to wires conducting currents representing signals to be added, and an inverting terminal is connected to wires conducting currents representing signals to be subtracted. Alternatively, inverting input ports may not be necessary on the summation modules if the inversion of the anti-symmetric terms is performed by other means. The summation modules 2114A and 2114B yield the following summation results, respectively, to complete the vector-matrix multiplication.

$$M_{11}V_1 + M_{12}V_2 = (M_{11}^+ - M_{11}^-)(V_1^+ - V_1^-) + (M_{12}^+ - M_{12}^-)(V_2^+ - V_2^-)$$

$$M_{21}V_1 + M_{22}V_2 = (M_{21}^+ - M_{21}^-)(V_1^+ - V_1^-) + (M_{22}^+ - M_{22}^-)(V_2^+ - V_2^-)$$

In this document, when a figure shows two electrical signal lines crossing each other, whether the two electrical signal lines are electrically coupled to each other will be clear from the description. For example, the signal line carrying the $M_{21}^+V1^+$ signal is not electrically coupled to the signal line carrying the $M_{11}^+V_1^-$ signal or the signal line carrying the $M_{11}^-V_1^-$ signal.

The system configuration shown in FIG. 21B can be extended to implement a system configuration for performing vector-matrix multiplication using an m×n-element matrix, in which the input vector and the matrix include signed elements.

Figure 22A:
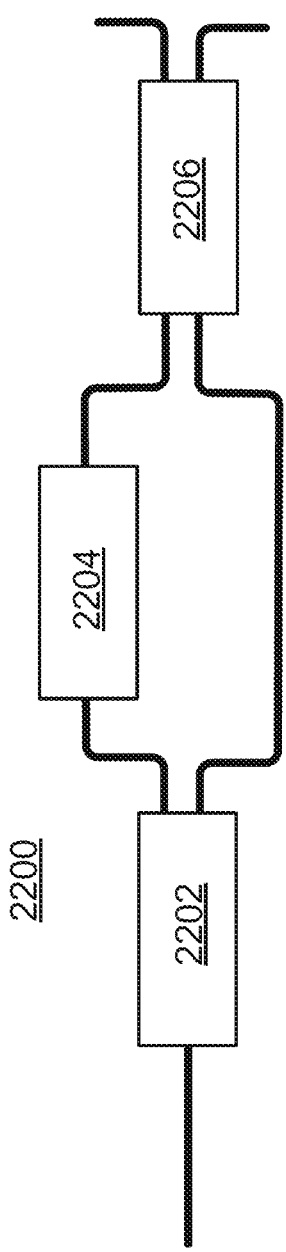
FIG. 22A is a schematic diagram of an example optical amplitude modulator.

There are various techniques that can be used for implementing the symmetric differential configuration of FIG. 21B. Some of those techniques make use of 1×2 optical amplitude modulators for implementing the multiplication modules 1904, and/or for providing pairs of optical signals that are related as main and anti-symmetric pairs. FIG. 22A shows an example of a 1×2 optical amplitude modulator 2200. In this example, the 1×2 optical amplitude modulator 2200 includes an input optical splitter 2202 that splits an incoming optical signal to provide 50% of the power to a first path that includes a phase modulator 2204 (also called a phase shifter), and 50% of the power to a second path that does not include a phase modulator. The paths can be defined in different ways, depending on whether the optical amplitude modulator is implemented as a free-space interferometer or as a waveguide interferometer. For example, in a free-space interferometer, one path is defined by transmission of a wave through a beam splitter and the other path is defined by reflection of a wave from the beam splitter. In a waveguide interferometer, each path is defined by a different optical waveguide that has been coupled to an incoming waveguide (e.g., in a Y-shaped splitter). The phase modulator 2204 can be configured to impart a phase shift such that the total phase delay of the first path differs from the total phase delay of the second path by a configurable phase shift value (e.g., a value that can be set to phase shift somewhere between 0 degrees to 180 degrees).

The 1×2 optical amplitude modulator 2200 includes a 2×2 coupler 2206 that combines the optical waves from first and second input paths using optical interference or optical coupling in a particular manner to divert power into first and second output paths in different ratios, depending on the phase shift. For example, in a free-space interferometer, a phase shift of 0 degrees causes substantially all of the input power that was split between the two paths to constructively interfere to exit from one output path of a beam splitter implementing the coupler 2206, and a phase shift of 180 degrees causes substantially all of the input power that was split between the two paths constructively interfere to exit from the other output path of the beam splitter implementing the coupler 2206. In a waveguide interferometer, a phase shift of 0 degrees causes substantially all of the input power that was split between the two paths to couple to one output waveguide of the coupler 2206, and a phase shift of 180 degrees causes substantially all of the input power that was split between the two paths to couple to the other output waveguide of the coupler 2206. Phase shifts between 0 degrees and 180 degrees can then provide multiplication of the power in an optical wave (and the value encoded on the optical wave) by a value between 0 and 1 through partial constructive or destructive interference, or partial waveguide coupling. Multiplication by any value between 0 to 1 can then be mapped to multiplication by any value between 0 to $M_{max}$ as described above.

Figure 22B:
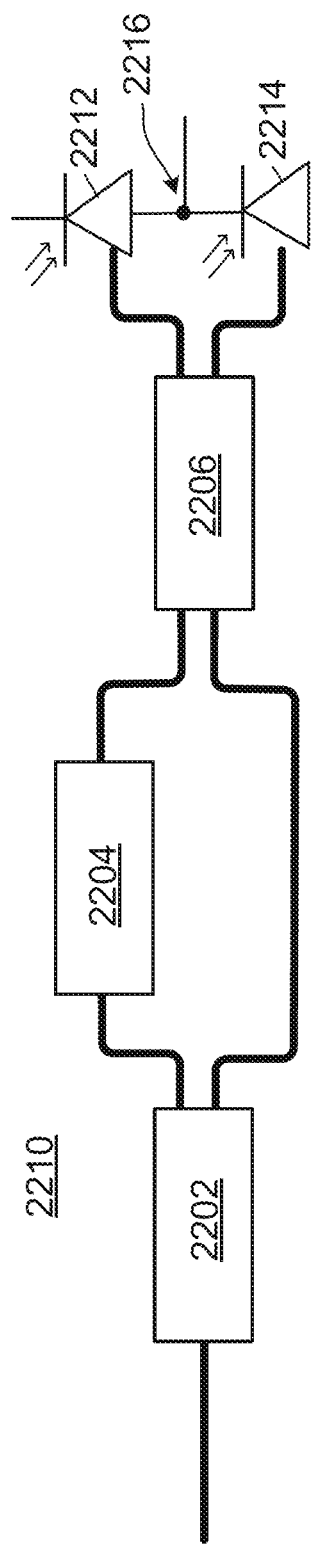
FIG. 22B-22D are schematic diagrams of examples of optical amplitude modulators with optical detection in a symmetric differential configuration.

Additionally, the relationship between the power in the two optical waves emitted from the modulator 2200 follows that of the main and anti-symmetric pairs described above. When the amplitude of the optical power of one signal increases, the amplitude of the optical power of the other signal decreases, so a difference between detected photocurrents can yield a signed vector element, or multiplication by a signed matrix element, as described herein. For example, the pair of related optical signals can be provided from the two output ports of the modulator 2200 such that a difference between amplitudes of the related optical signals corresponds to a result of multiplying an input value by a signed matrix element value. FIG. 22B shows a symmetric differential configuration 2210 of the 1×2 optical amplitude modulator 2200 arranged with the optical signals at the output to be detected in the common-terminal version of the symmetric differential configuration of FIG. 20B. The current signals corresponding to the photocurrent generated by a pair of photodetectors 2212 and 2214 are combined at a junction 2216 to provide an output current signal whose amplitude corresponds to the difference between the amplitudes of the related optical signals. In other examples, such as in the symmetric differential configuration of FIG. 20C, the photocurrents detected from the two optical signals at the output can be combined using different electrical circuitry.

Figure 22C:
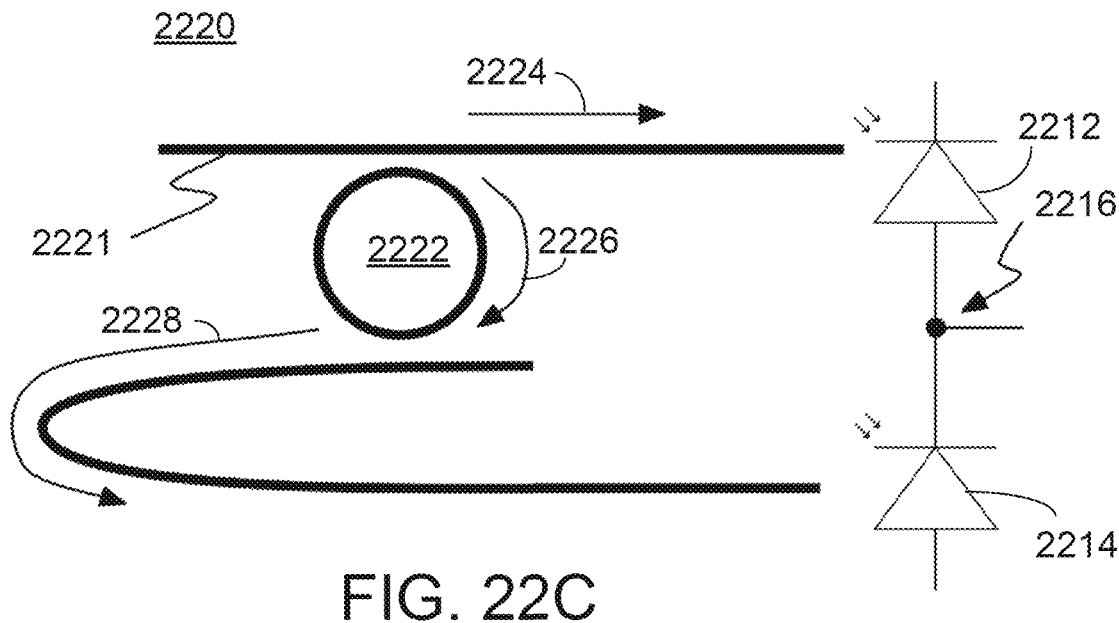

Other techniques can be used to construct 1×2 optical amplitude modulators for implementing the multiplication modules 1904, and/or for providing pairs of optical signals that are related as main and anti-symmetric pairs. FIG. 22C shows another example of a symmetric differential configuration 2220 of another type of 1×2 optical amplitude modulator. In this example, the 1×2 optical amplitude modulator includes a ring resonator 2222 that is configured to split the optical power of an optical signal at an input port 2221 to two output ports. The ring resonator 2222 (also called a "microring") can be fabricated, for example, by forming a circular waveguide on a substrate, where the circular waveguide is coupled to a straight waveguide corresponding to the input port 2221. When the wavelength of the optical signal is near a resonant wavelength associated with the ring resonator 2222, the optical wave that is coupled into the ring circulates around the ring on a clockwise path 2226 and destructively interferes at the coupling location such that a reduced-power optical wave exits over a path 2224 to a first output port. The circulating optical wave is also coupled out of the ring such that another optical wave exits over a path 2228 through a curved waveguide that guides an optical wave out of a second output port.

Since the time scale over which the optical power circulates around the ring resonator 2222 is small compared to the time scale of the amplitude modulation of the optical signals, an anti-symmetric power relationship is quickly established between the two output ports, such that the optical wave detected by the photodetector 2212 and the optical wave detected by the photodetector 2214 form main and antisymmetric pairs. The resonance wavelength of the ring resonator 2222 can be tuned to monotonically decrease/increase the main/anti-symmetric signals to achieve a signed result, as described above. When the ring is completely off-resonance all of the power exits over the path 2224 out of the first output port, and when it is completely on-resonance, with certain other parameters (e.g., quality factor, and coupling coefficient) appropriately tuned, all of the power exits over the path 2228 out of the second output port. In particular, to achieve complete power transfer, the coupling coefficient characterizing the coupling efficiency between the waveguide and the ring resonator should be matched. In some embodiments, it is useful to have a relatively shallow tuning curve, which can be achieved by reducing the quality factor of the ring resonator 2222 (e.g., by increasing the loss) and correspondingly increasing the coupling coefficients into and out of the ring. A shallow tuning curve provides less sensitivity of the amplitude to the resonance wavelength. Techniques such as temperature control can also be used for tuning and/or stability of the resonance wavelength.

Figure 22D:
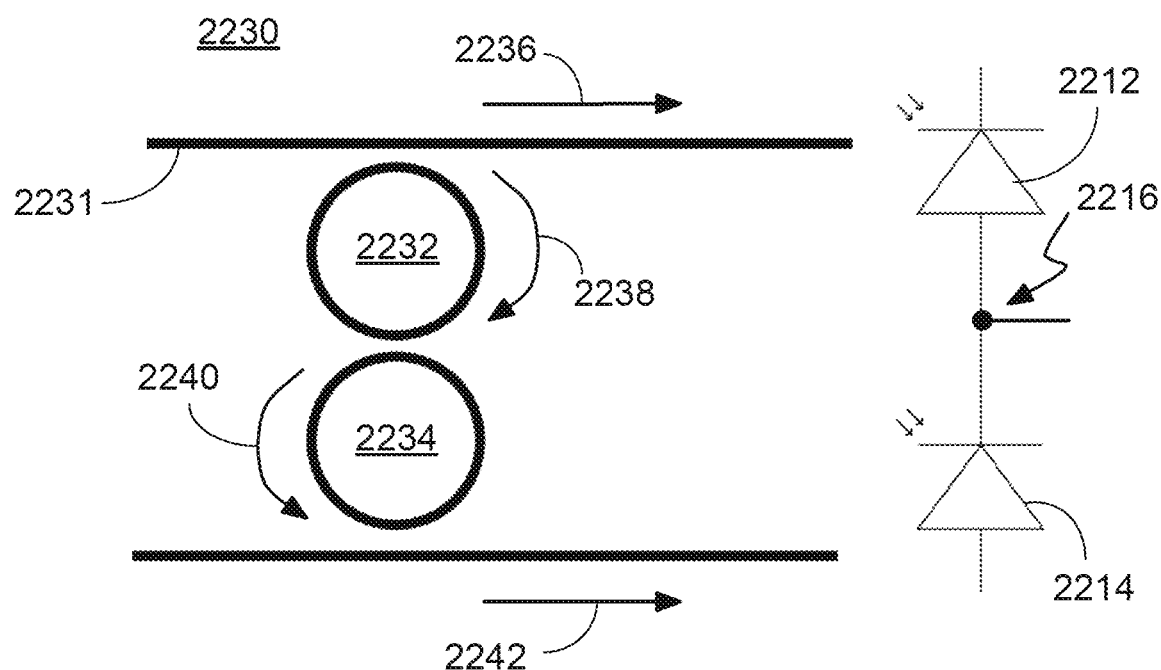

FIG. 22D shows another example of a symmetric differential configuration 2230 of another type of 1×2 optical amplitude modulator. In this example, the 1×2 optical amplitude modulator includes two ring resonators 2232 and 2234. The optical power of an optical signal at an input port 2231 is split to two ports. When the wavelength of the optical signal is near a resonant wavelength associated with both ring resonators 2232 and 2234, a reduced-power optical wave exits over a path 2236 to a first output port. A portion of the optical wave is also coupled into the ring resonator 2232 circulating around the ring on a clockwise path 2238, and is also coupled into the ring resonator 2234 circulating around the ring on a counter-clockwise path 2240. The circulating optical wave is then coupled out of the ring such that another optical wave exits over a path 2242 out of a second output port. The optical wave detected by the photodetector 2212 and the optical wave detected by the photodetector 2214 also form main and anti-symmetric pairs in this example.

Figure 23A:
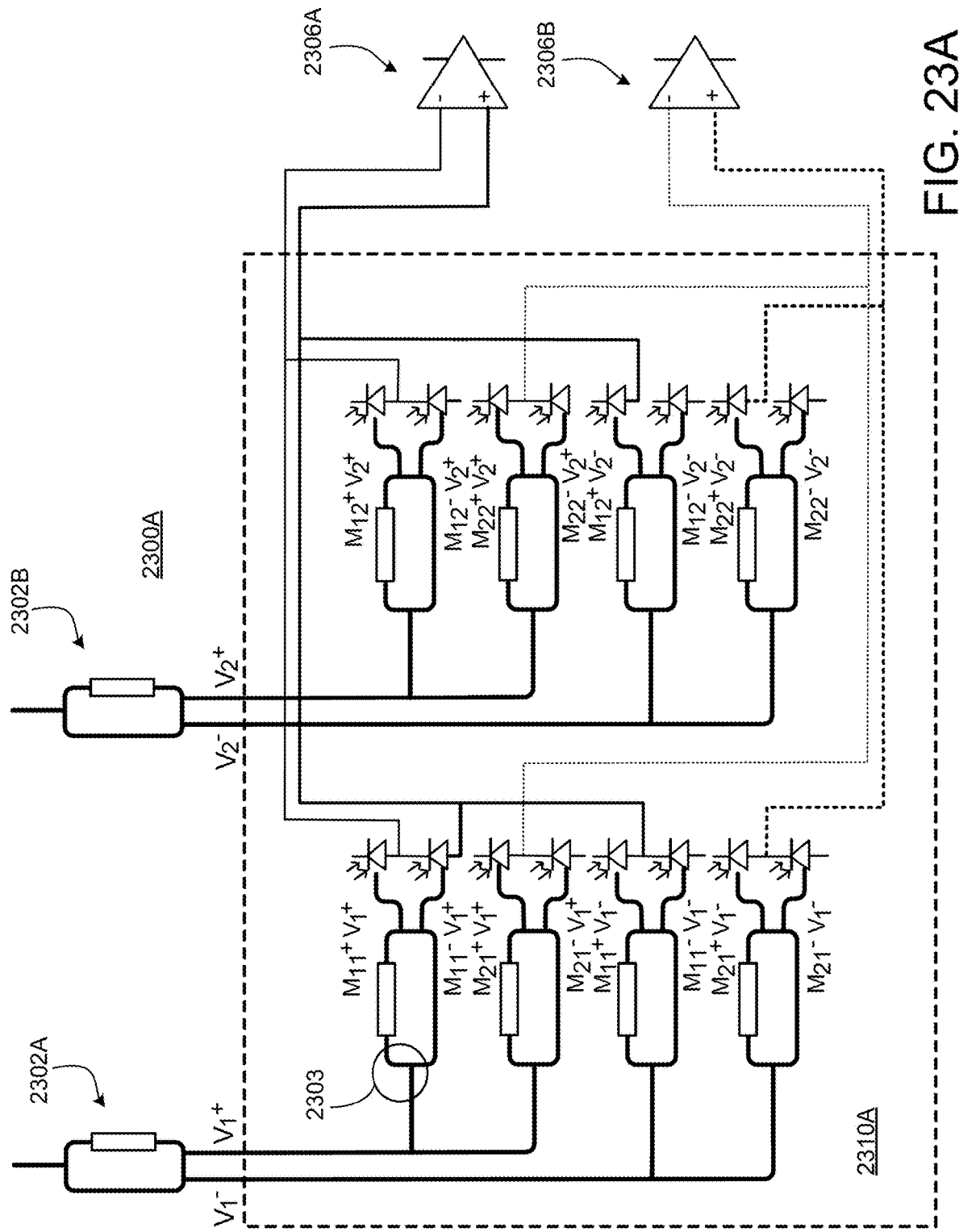
FIGS. 23A-23C are optoelectronic circuit diagrams of example system configurations.
Figure 23B:
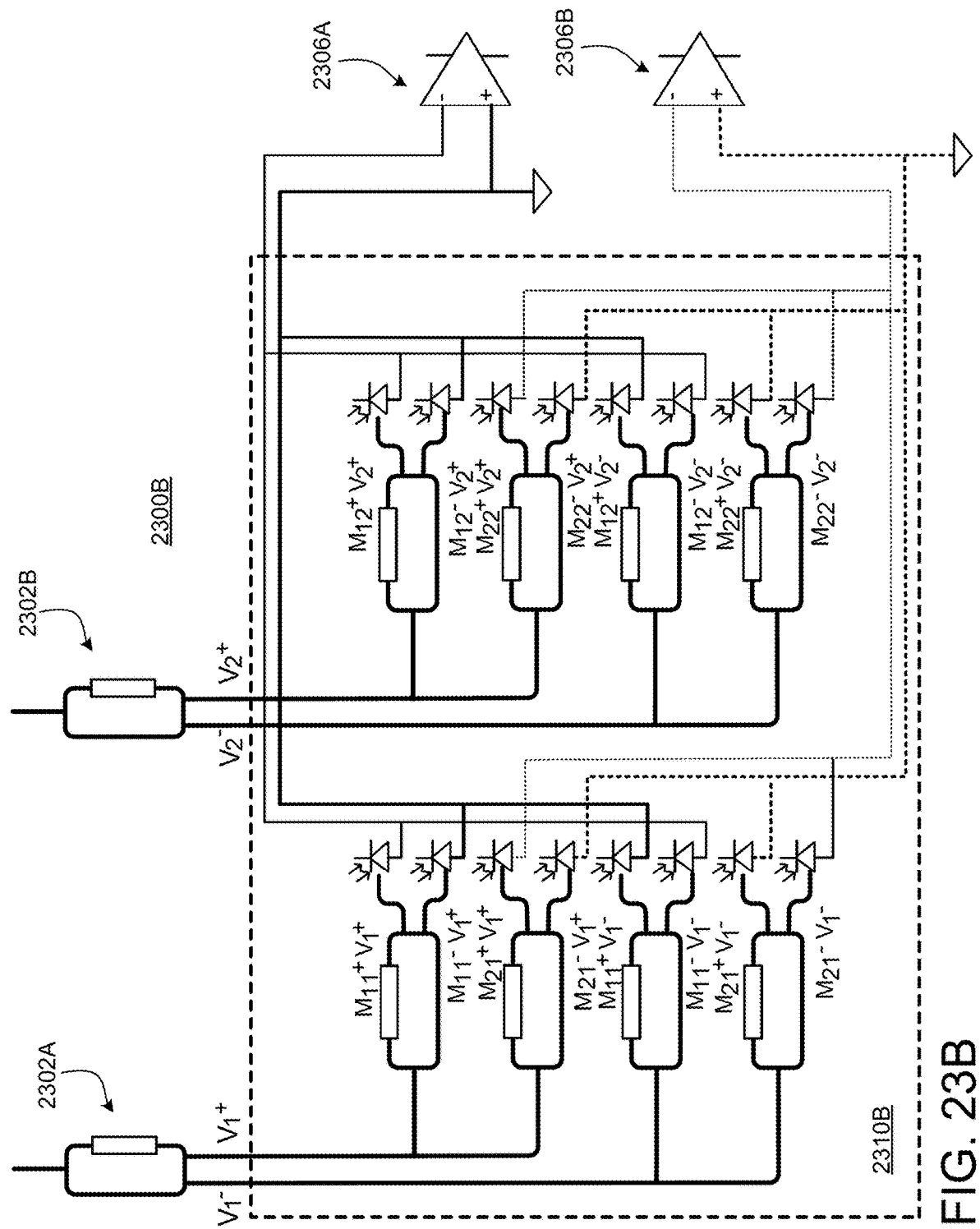

FIGS. 23A and 23B show different examples of the use of optical amplitude modulators such as the 1×2 optical amplitude modulator 2200 for an implementation of the system 1800 for performing vector-matrix multiplication for a 2×2-element matrix. FIG. 23A shows an example of an optoelectronic system configuration 2300A that includes optical amplitude modulators 2302A and 2302B providing values representing the signed vector elements of the input vector. The modulator 2302A provides a pair of optical signals that encode a pair of values $V_1^+$ and $V_1^-$ for a first signed vector element, and the modulator 2302B provides a pair of optical signals that encode a pair of values $V_2^+$ and $V_2^-$ for a second signed vector element. A vector-matrix multiplier (VMM) subsystem 2310A receives the input optical signals, performs the splitting operations, multiplication operations, and some of the summation operations as described above, and provides output current signals to be processed by additional circuitry. In some examples, the output current signals represent partial sums that are further processed to produce the ultimate sums that result in the signed vector elements of the output vector. In this example, some of the final summation operations are performed as a subtraction between different partial sums represented by the current signals at inverting and non-inverting terminals of op-amps 2306A and 2306B. The subtractions are used to provide the signed values, as described above (e.g., with reference to FIG. 21B). This example also illustrates how some elements can be part of multiple modules. In particular, the optical copying performed by a waveguide splitter 2303 can be considered to be part of a copying module (e.g., one of the copying modules 2112 in FIG. 21B) and part of a multiplication module (e.g., one of the multiplication modules 1904 in FIG. 21B). The optical amplitude modulators that are used within the VMM subsystem 2310A are configured for detection in the common-terminal configuration shown in FIG. 20B.

FIG. 23B shows an example of an optoelectronic system configuration 2300B similar to that of the optoelectronic system configuration 2300A shown in FIG. 23A. But, the VMM subsystem 2310B includes optical modulators that are configured for detection in the differential-terminal configuration shown in FIG. 20C. In this example, the output current signals of the VMM subsystem 2310B also represent partial sums that are further processed to produce the ultimate sums that result in the signed vector elements of the output vector. The final summation operations that are performed as a subtraction between different partial sums represented by the current signals at inverting and non-inverting terminals of op-amps 2306A and 2306B are different than in the example of FIG. 23A. But, the final subtractions still result in providing the signed values, as described above (e.g., with reference to FIG. 21B).

Figure 23C:
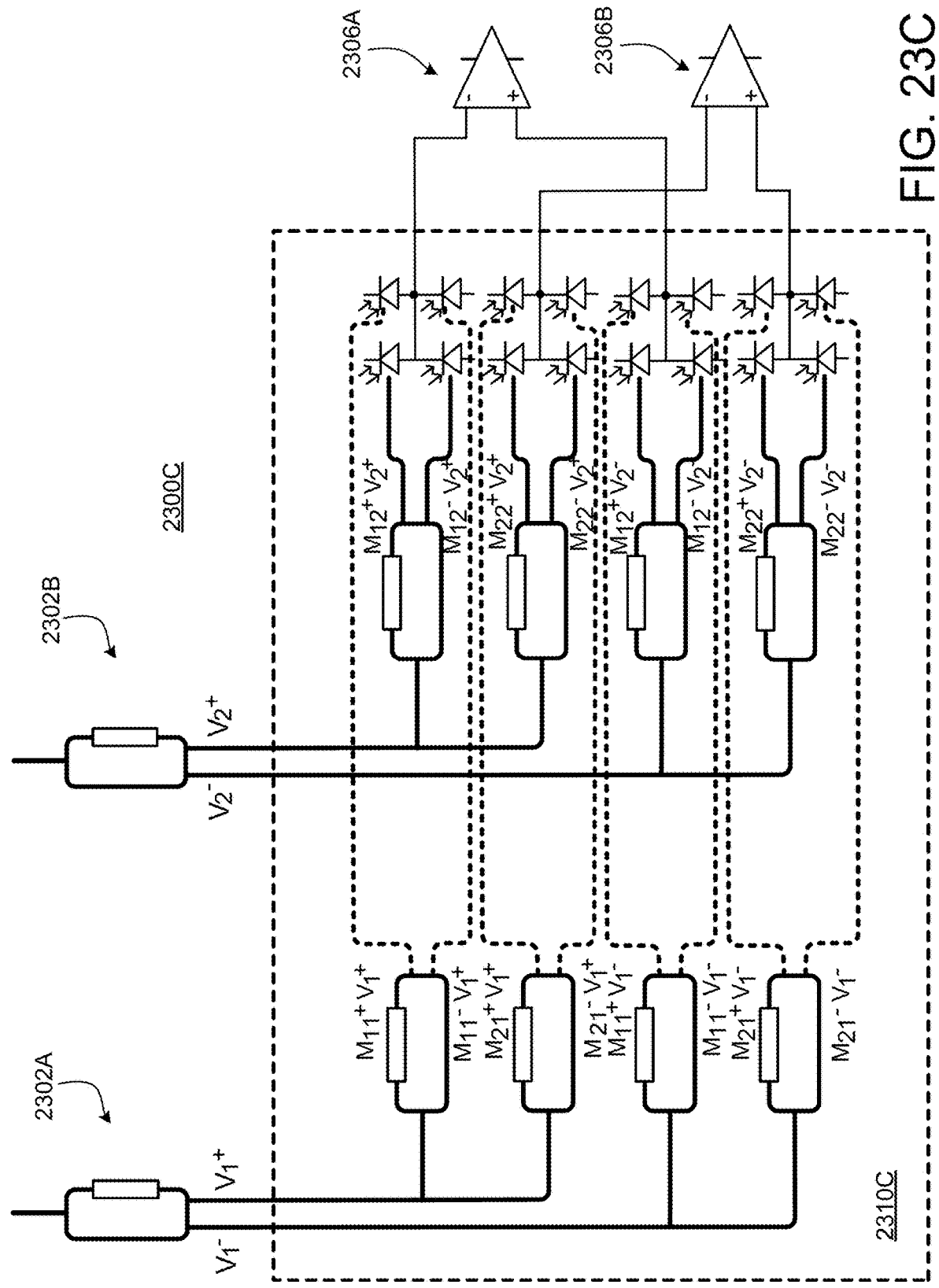

FIG. 23C shows an example of an optoelectronic system configuration 2300C that uses an alternative arrangement of a VVM subsystem 2310C with detection in the common-terminal configuration, as in the VVM subsystem 2310A shown in FIG. 23A, but with optical signals carrying results of multiplication modules routed through the subsystem within waveguides (e.g., in a semiconductor substrate) to a portion of the substrate that includes detectors arranged to convert the optical signals to electrical signals. In some embodiments, this grouping of the detectors allows the electrical paths to be shortened, potentially reducing electrical cross-talk or other impairments due to the long electrical paths that would otherwise be used. The optical waveguides can be routed within one layer of the substrate, or to avoid the waveguide crossings (and associated losses) that would be encountered in a single layer, waveguides can be routed within multiple layers of the substrate to allow more flexibility in routing paths that cross in two dimensions of the substrate but don't cross in a third dimension (of depth in the substrate). A variety of other changes can be made in the system configuration, including changes in what components are included in a VMM subsystem. For example, the optical amplitude modulators 2302A and 2302B can be included as part of the VMM subsystem. Alternatively, the VMM subsystem can include optical input ports for receiving paired main and anti-symmetric optical signals generated by modules other than optical amplitude modulators, or for interfacing with other kinds of subsystems. In some implementations, instead of grouping detectors and using multiple layers in the substrate for the waveguides, an alternative way to avoid the waveguide crossing losses and still limit the length of electrical paths involves rearranging the layout of the waveguides and elements on a photonic integrated circuit (PIC) die. For example, some fabrication procedures may bring additional cost and/or complexity in order to provide multiple waveguide layers in a substrate. Instead, the optical routing can include an optical copying distribution network that facilitates the shortening of the electrical paths for some compact die layouts, as explained below with reference to FIGS. 45A-45G.

A long wire between a given photodetector and a downstream port has an associated parasitic capacitance, which leads to increased power consumed to drive a signal down the wire. To limit the power consumption in the system, the layout of components on a die containing the photonics integrated circuit (PIC) implementing the optical processor can be optimized to allow for a compact electrical routing. For example, the portion of the PIC implementing distributed optoelectronic processing, such as the vector-matrix multiplier subsystem 2310A or the vector-matrix multiplier subsystem 2310B, can be arranged such that there is a relatively narrow "optical ribbon" that includes optical waveguides carrying optical signals of an optical input (e.g., from optical modulators providing elements of an input vector), optoelectronic nodes (e.g., including an MZI modulator and detectors), and wires carrying electrical signals of an electrical output (e.g., feeding transimpedance amplifiers that provide elements of an output vector). In some implementations the transimpedance amplifiers (e.g., TIA 2306A and 2306B) are part of the electronic integrated circuit (EIC) that will be flip-chip connected to the PIC. The optical ribbon includes multiple "strands" that include portions of the optical copying distribution network and optoelectronic "nodes" corresponding to a particular column of a matrix multiplication, which intersect with "tiles" including components corresponding to a particular row of the matrix multiplication. These tiles in the PIC also overlap with corresponding tiles in the EIC, as described in more detail below.

Figure 45A:
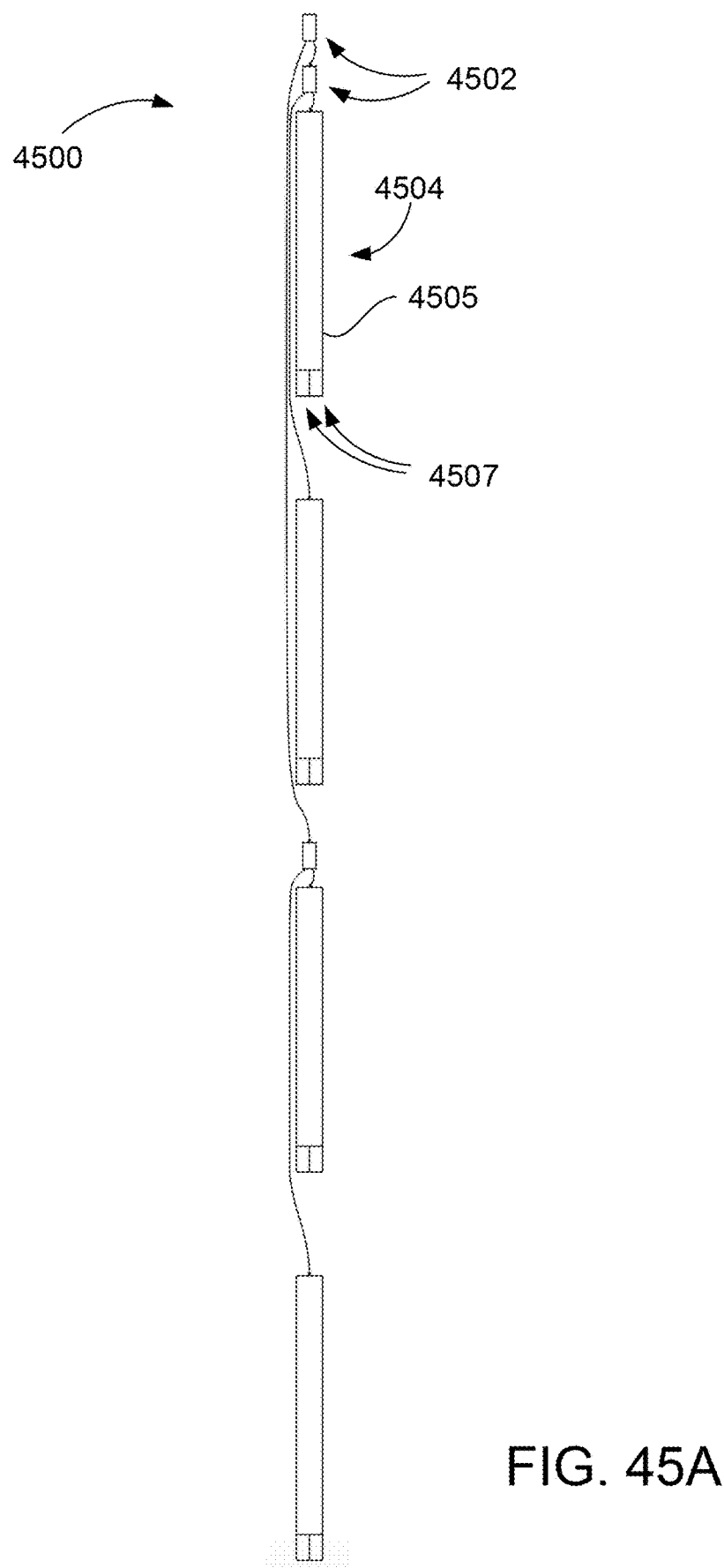
FIGS. 45A-45G are diagrams of example layouts for portions of photonic and electronic integrated circuits on dies configured to be connected in a controlled collapsed chip connection.

FIG. 45A shows an example of a strand 4500 within such an optical ribbon. The strand 4500 includes: a binary tree waveguide network optically distributing a corresponding component of an input vector using 1:2 splitters 4502 as intermediate nodes within a binary tree arrangement, and optoelectronic nodes 4504 for performing an optoelectronic operation as leaf nodes within the binary tree arrangement. Alternatively, a strand can include two binary trees distributing respective main and anti-symmetric values for that component, but one binary tree is sufficient for some system configurations in which a matrix is limited to contain only positive weights for particular software algorithms, for example. Additionally, the PIC will include wires (not shown) extending from the nodes 4504 that meet with wires of other strands at junctions. The root of each subnetwork of the optical copying distribution network can be fed by a root modulator (not shown) (e.g., an MZI modulator such as 2302A or 2302B) that modulates an optical wave according to an element of an input vector. In some implementations, the optoelectronic node 4504 at each leaf of the optical copying distribution network includes an MZI modulator 4505 for performing multiplication by a matrix element, and a pair of photodetectors 4507 at the outputs of the MZI modulators for performing optical-to-electrical conversion. The length of wires used for electrically routing those electrical signals depends in part on the width of the entire optical ribbon. For an N×N array of elements (e.g., for an N×N matrix multiplication), there is a set of N strands within the ribbon, each with its own optical copying distribution network. Each subnetwork of the optical copying distribution network (i.e., each binary tree) should occupy a narrow width since the length of the longest wire may need to traverse a distance over as many as N of the strands. For simplicity and clarity of illustration, an example of a 4×4 array of elements is illustrated, but in some implementations the value of N would be significantly larger (e.g., 32, 64, 128, or larger).

A subnetwork of the optical copying distribution network that distributes a given value to the nodes of a strand can be fabricated with tolerance to errors and wavelength independence using a binary tree topology, as explained above. As part of considering the motivation for the asymmetric arrangement of the binary tree in the strand 4500, consider the size that a symmetric binary tree would have for an N×N matrix multiplication. Since the tree for a column of N elements is larger in breadth (N) than in depth (log 2(N)), the tree could be arranged so that the narrowest dimension is over its depth. But, the last level of the binary tree, at the leaves, would need to fit a symmetric distribution of nodes over the breadth of the tree, so the waveguides in the tree would need to have 90-degree turns to expand to a large enough breadth. There would be limits on how narrow this depth dimension could be based on the need to support a minimum radius of curvature of the waveguides (to limit bend losses) leading to a minimum width (e.g., around 40 microns) at each level of the tree. Thus, in this example, the total width is proportional to log 2(N) times 40 microns. Instead, consider the asymmetric arrangement of the binary tree as used in the strand 4500. In this asymmetric arrangement optical propagation lengths between a root of the binary tree arrangement and different optoelectronic nodes are all different from each other. In other asymmetric arrangements some, but not necessarily all, of the lengths are different from each other. In some asymmetric arrangements having a binary tree topology, the root may not be at an end of a strand but may somewhere in between two ends that correspond to leaf nodes. The asymmetry helps to enable a narrow strand. The width of a 1:2 Y-splitter that does not need to change orientation can be limited to around 1 micron per arm (i.e., around 2 microns total), instead of a bend needed to produce a 90-degree rotation taking around 10 microns. The widest part of the strand is at the top node where there is the width of a rectangular shaped node+log 2(N) neighboring waveguides. The width of each node is large enough to accommodate the width of 2 arms of an MZI modulator (e.g., 20 microns or less). The width between neighboring waveguides is about 2.5 microns (for waveguide itself and spacing to its neighbor). Thus, the total width of the strand is proportional to 20 microns plus log 2(N) times 2.5 microns, which is potentially much narrower than for a symmetric binary tree.

Figure 45B:
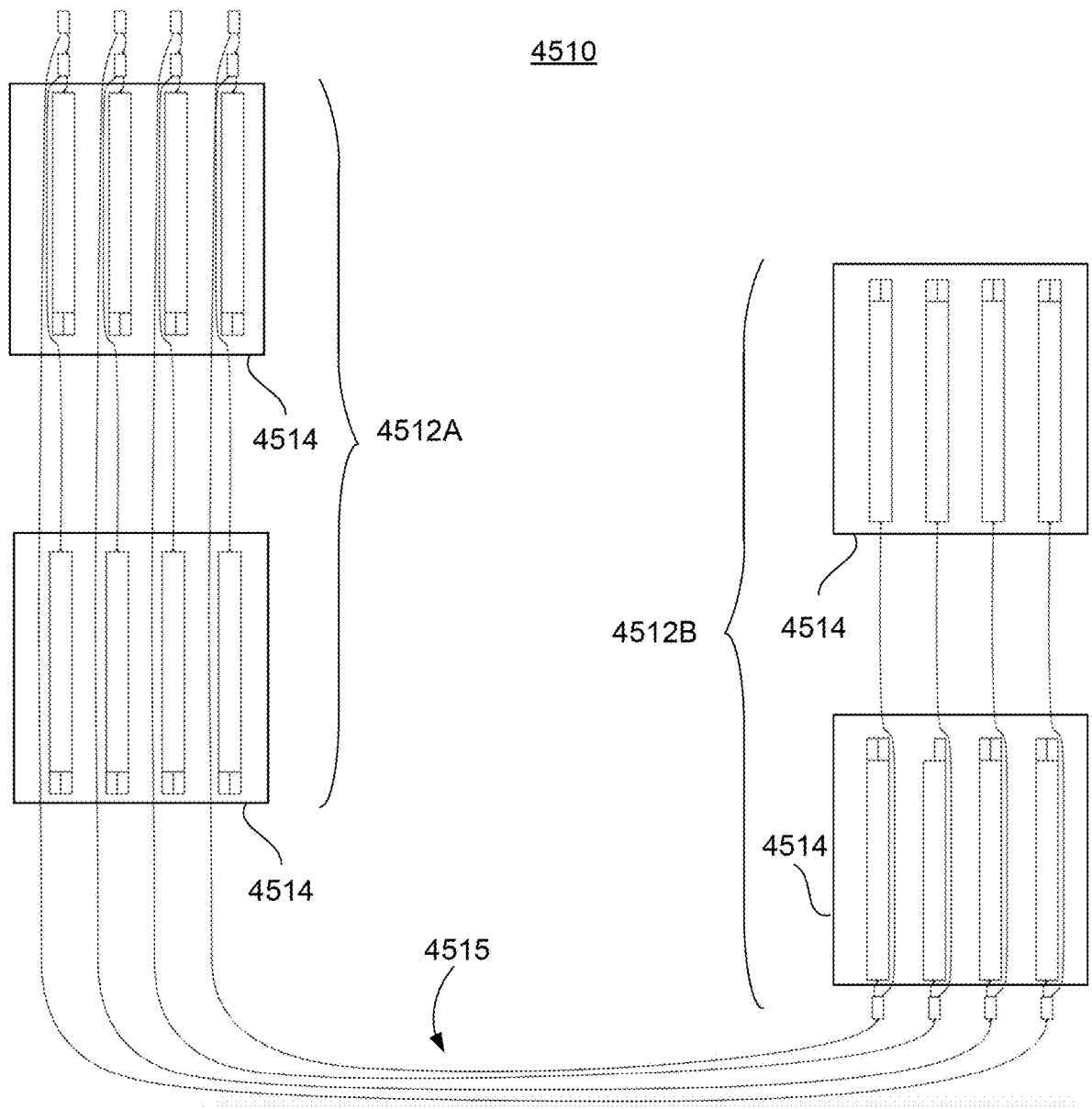

FIG. 45B shows how a ribbon 4510 could be arranged over a PIC die. The ribbon 4510 includes a first line 4512A of tiles 4514 arranged on one side of the die, and a second line 4512B of tiles 4514 arranged on the other side of the die. A connection portion 4515 is provided by extending one or more of the waveguides within each of the strands. The distribution of tiles into two or more substantially straight lines spread over different portions of the die area (in this case different ends of the die area), connected by waveguides of the optical copying distribution networks within the strands, enables a more compact arrangement. Extending the waveguides in such a manner does incrementally increase the total optical insertion loss (e.g., by around 1 dB/cm of additional waveguide length), but such additional losses can generally be sustained. The number of lines of tiles connected by extended waveguides (e.g., 2 lines, 3 lines, 4 lines, or more) can be selected to jointly optimize the fit to the die area and the total power losses in the entire system. For a large number of tiles, the substantially straight lines of tiles can be arranged in evenly spaced columns. Also, the amount of waveguide extension may be limited by computing constraints, such as the propagation time over the length of a strand being significantly less than the time of a clock cycle, leading to a limit on the total length of a strand (e.g., less than 10 cm).

Figure 45C:
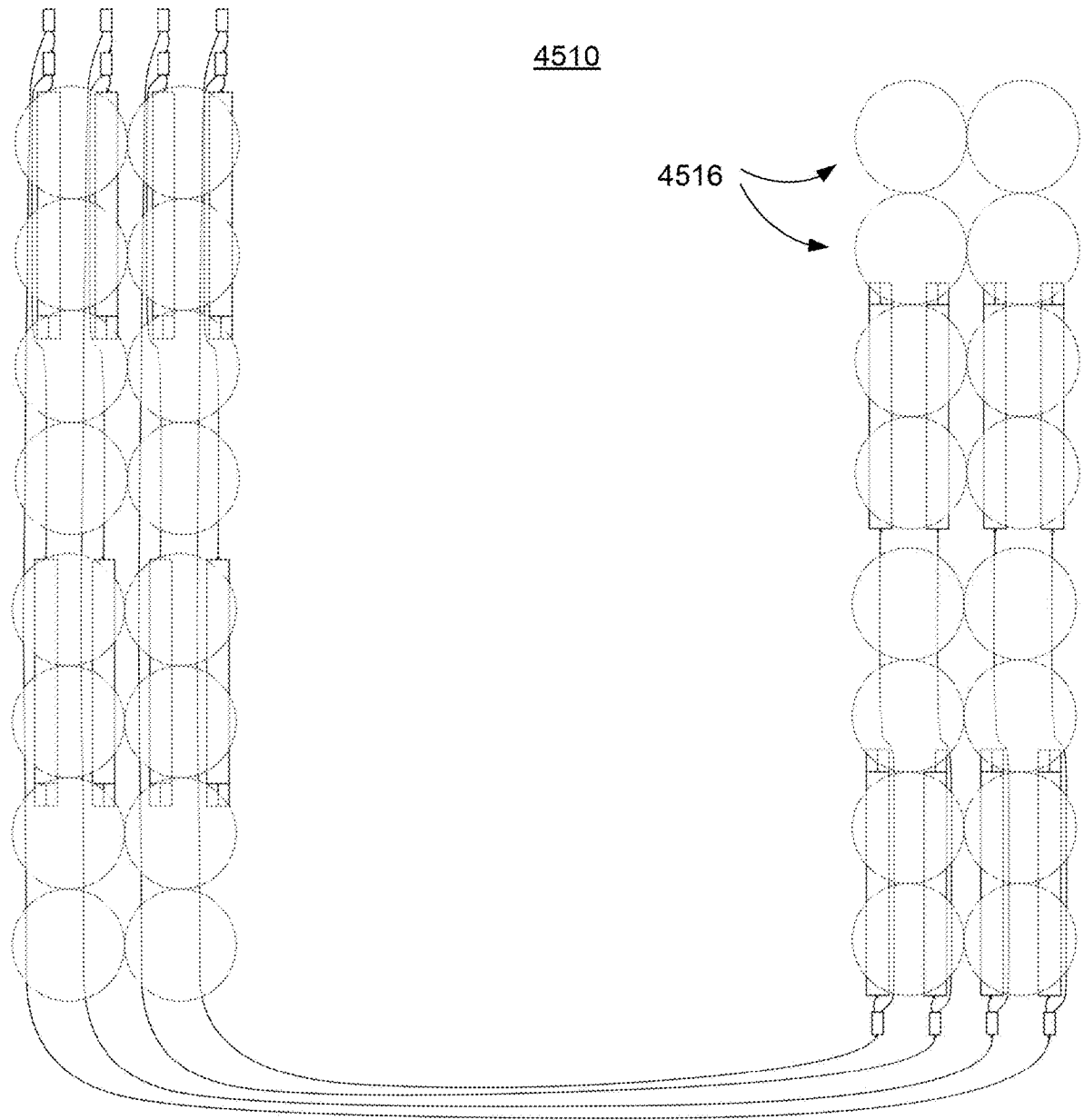

FIG. 45C shows the arrangement of the ribbon 4510, without showing the tile boundaries, superimposed on an arrangement of bumps 4516 for electrically connecting pads (e.g., formed from conducting material, such as a metal or metal alloy) on the PIC providing electrical input and output ports with pads on the EIC providing output and input ports, respectively. For example, signals are provided over output ports of the EIC for controlling the MZI modulators (i.e., 2 bumps per MZI in a given optoelectronic node). In some implementations, there are one or more additional bumps per optoelectronic node (e.g., a bump for a temperature control for a given MZI modulator), and additional bumps for a variety of other electrical signals exchanged between the PIC and EIC. The pads in the PIC will be aligned with corresponding pads in the EIC at the bump locations for transfer of electrical signals from the EIC to the PIC for control, and for receiving electrical signals from the PIC to the EIC. One example of bumps that connect output ports of the PIC to input ports of the EIC are bumps (not shown) that connect a pad in the tile that provides summed current(s) from the wires of multiple optoelectronic nodes within that tile to a pad of TIA input in the EIC. A typical bump diameter can be around 100 microns, though the bumps could be smaller (e.g., 50 microns). Thus, in some implementations, the bump pitch spacing (e.g., 100 microns) will be larger than the space needed for the tiles in the strands, in which case the tiles can be spread out to provide a substantially uniform spacing between tiles.

Figure 45D:
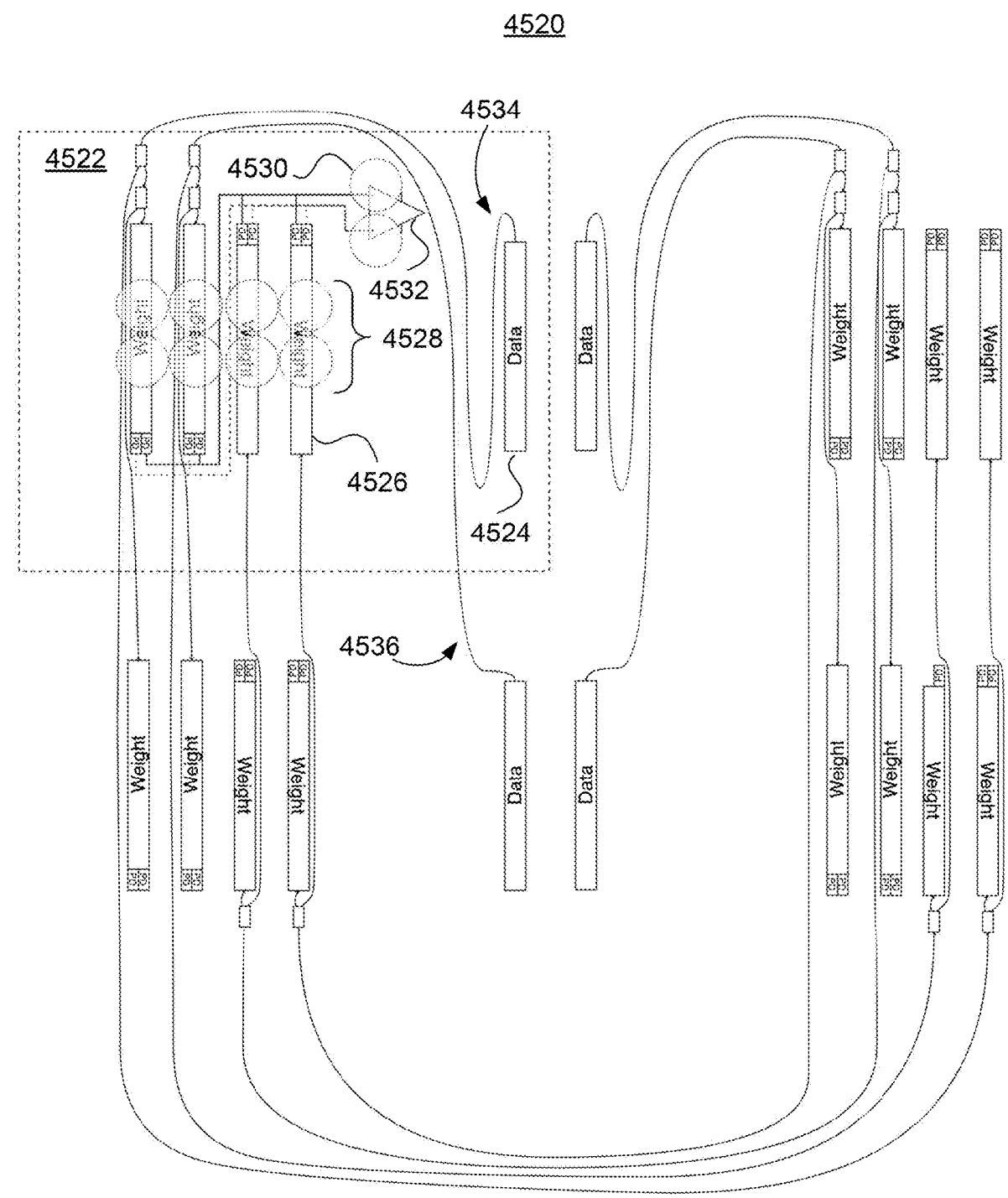

FIG. 45D shows another example of a ribbon 4520 that illustrates an example of a tile 4522 that includes a root modulator 4524 for modulating a data value onto an optical wave feeding the subnetwork of the optical copying distribution network for one of the strands. There is also an array of optoelectronic nodes 4526 (4 nodes in this example) from each of the strands (including the strand fed by the root modulator 4524). There is a set 4528 of bumps for sending from the EIC to the PIC phase modulation values for the arms of the MZI modulators in the nodes 4526 (e.g., for modulating weights for the matrix multiplication). The tile 4522 also includes wires that end at pads that connect via bumps 4530 to pads of inputs of a TIA 4532 in the EIC. It is the length of these wires in the dimension that goes across multiple strands that should be optimized to remain relatively short since that dimension scales by N, which can be relatively large in some implementations. In FIG. 45D, the bumps 4528, 4530 and TIA 4532 are shown superimposed on the tile 4522, but they are not part of the tile 4522. Since the root modulator 4524 for tile 4522 is positioned at a different position on the die with respect to the nodes of the optical copying distribution network, the waveguide portion connecting the modulator 4524 includes an optical delay portion of the waveguide (or other form of optical delay) so that the total effective optical distance, and corresponding time delay, is matched with respect to root modulators of other tiles. Thus, in this example, the waveguide portion 4534 is longer than the waveguide portion 4536.

Figure 45E:
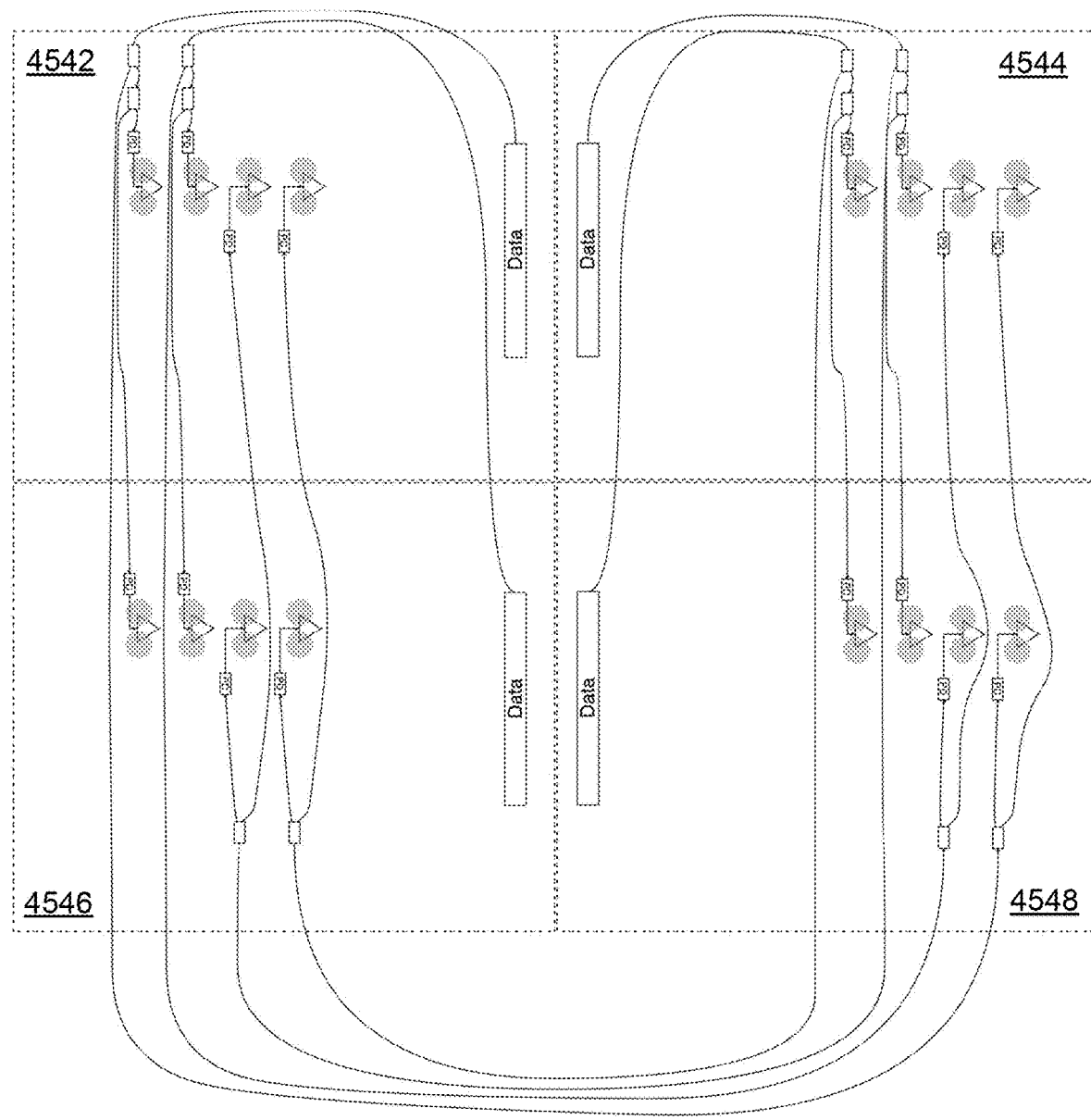

FIG. 45E shows an alternative optical ribbon 4540 for a different optoelectronic computing system that does more of the computing with the EIC instead of the PIC. In this example, there is still a similar arrangement of four tiles 4542, 4544, 4546, and 4548 in a PIC for a 4×4 matrix multiplication, but the optical waves carrying the modulated data values are detected and coupled to the EIC via bumps that connect to TIAs in the EIC. Then the multiplication and the summation that are part of the VMM operation are performed electronically using digital values by digital circuitry in the EIC. For this computation, the timing differences that would be caused by different waveguide lengths can be compensated for in the context of synchronous communication that occurs in the digital domain, so no optical delay is necessary. Alternatively, another optoelectronic computing system can include the MZI modulators for performing multiplication by the weights, and the results of the optoelectronic multiplication can be detected and coupled to the EIC for summation to be performed electronically using digital values.

Figure 45F:
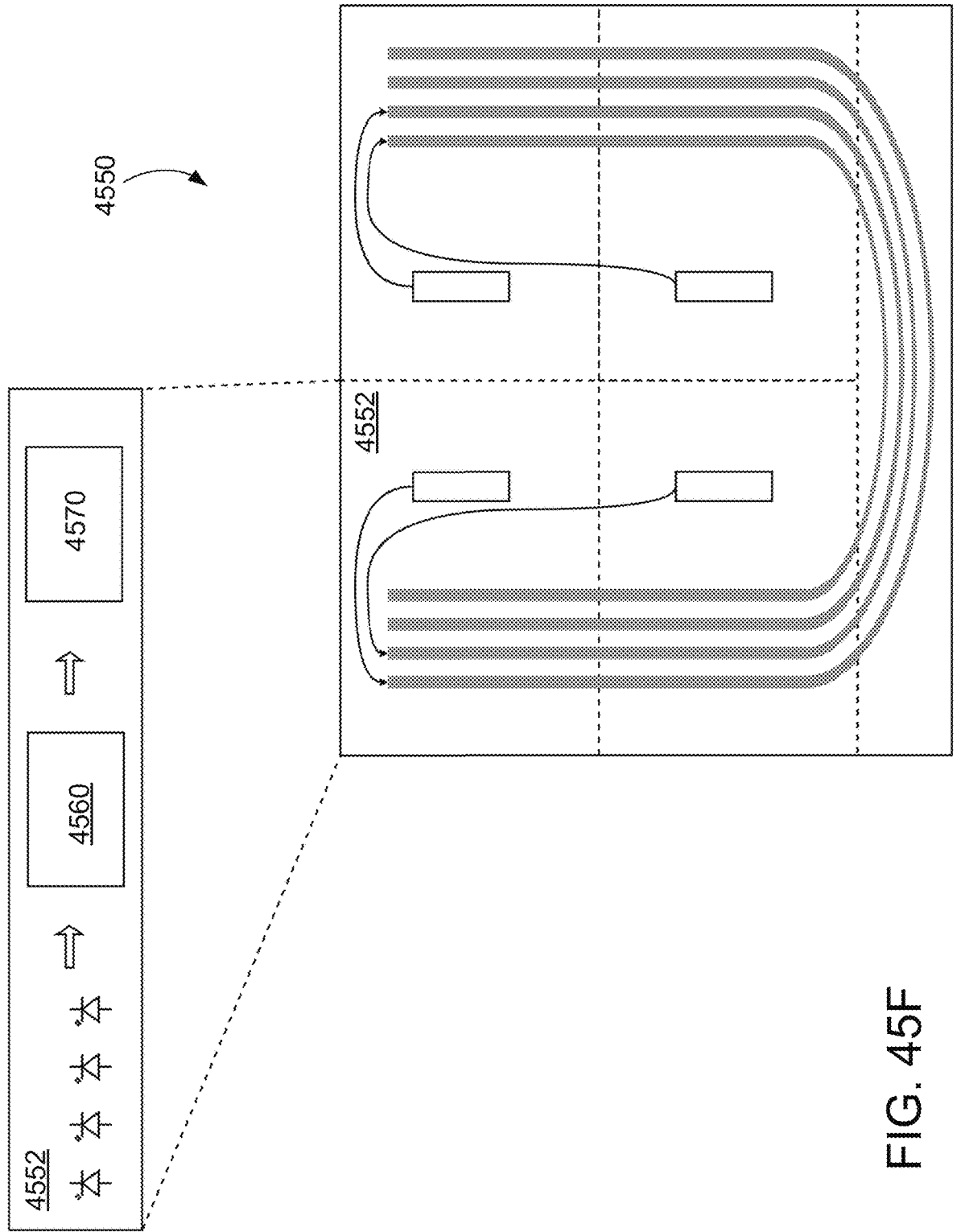

FIG. 45F shows another example of an optical ribbon 4550 and the type of optoelectronic processing that can occur within a tile 4552 that performs any of a variety of types of data processing within the PIC. Generally, photodiodes are used to convert optical signals encoded on optical waves that have been distributed over different strands of the ribbon into electrical signals. These electrical signals are fed into data processing circuitry 4560 within the PIC. The PIC also includes data uploading circuitry 4570 for any operations used for uploading results to a flip-chip connected EIC, or any other form of integrated electronic circuitry.

Figure 45G:
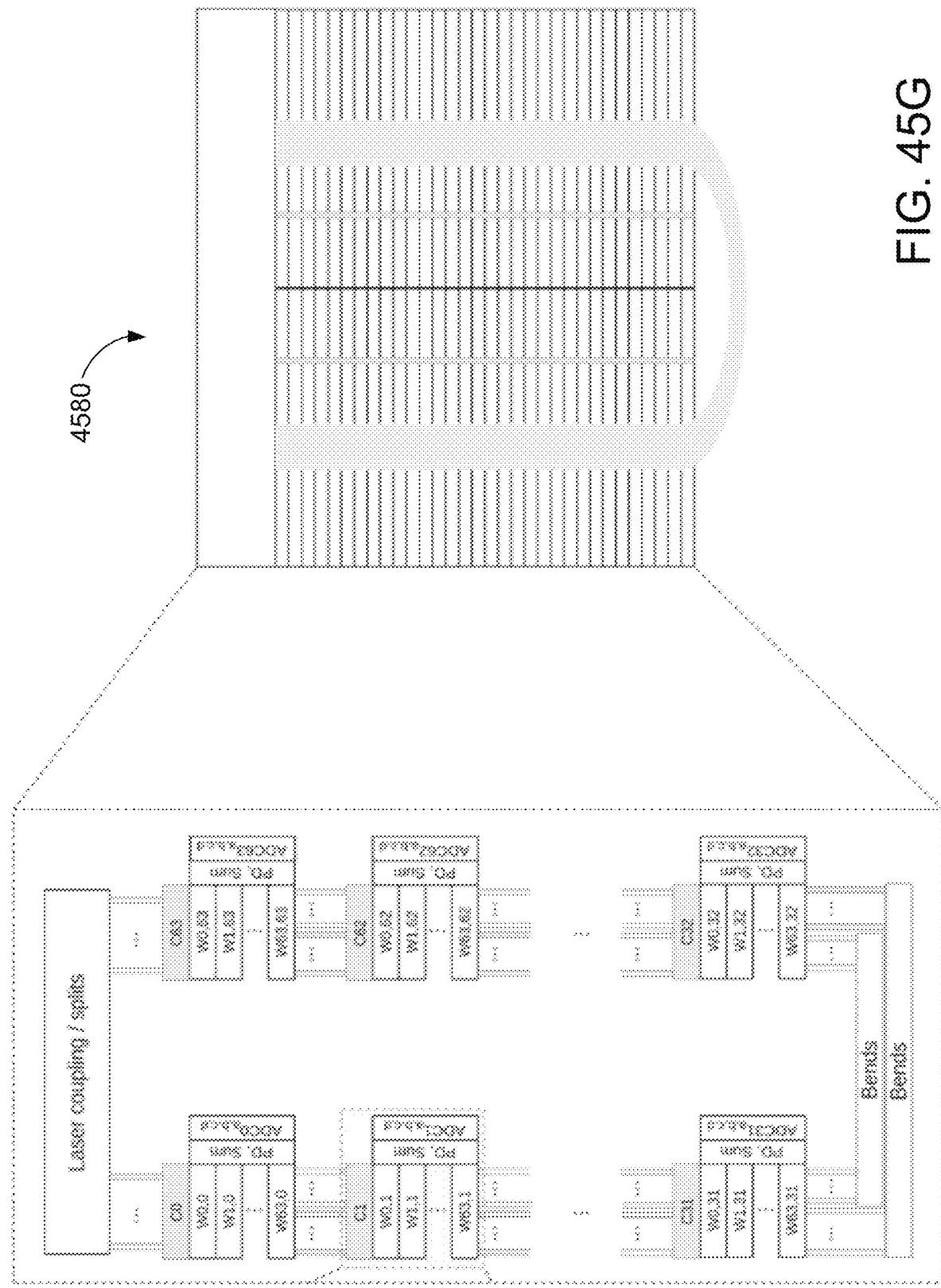

FIG. 45G shows a view of an optoelectronic computing system 4580 illustrating an example arrangement of various functionality within the system including weight values (W #,#) used for multiplication of matrix elements, photodiodes (PD) used for optical or electrical summation, and ADC modules for converting analog electrical signals to digital electrical signals. Different portions of the functionality can be included in a PIC or EIC in the system 4580.

In some arrangements, the matrix multiplication can have different numbers of rows and columns. For example, for an M×N matrix multiplier, there are M electric tiles in the EIC (1 for each row), and M tiles in the PIC, where each tile has N weight modulators corresponding to one of N strands of the optical ribbon. As mentioned above, to fit better on a die, instead of a long line of M tiles, there can be multiple lines: a first line of M/2 tiles and a second line of M/2 tiles, or four lines of M/4, M/4, M/4, M/4 tiles, etc. In some cases, four lines can be enough since there may be diminishing returns for spatial distribution, but in some cases the number of lines can be larger but less than M.

In some implementations, the EIC includes circuitry for components such as weight drivers, data drivers, memory (e.g., to store the matrix weight for the modulator, and an accumulated result), DACs, ADCs, digital logic (e.g., for accumulation), and portions of a digital data bus for communicating with other tiles. For most cases, there is limited communication needed between different tiles (e.g., different rows in a matrix) due to limited dependence between data computed in different tiles. So, the layout can allow the (short) rows being summed (via current) to a given TIA (and corresponding element in the output vector) to be relatively independent from each other in the layout. Most of the time there is no relationship between a given output vector and the input vector of the next iteration, but in some iterations of a computation (e.g., a neural network computation) there is a dependence between elements of an output vector and corresponding elements of an input vector used in the next iteration. Very rarely, there can be further dependence between other elements, such as when all elements are accumulated as part of a normalization computation that divides each element by the accumulated sum. Thus, in the layout, the components that need to communicate with each other more frequency can be arranged more closely to each other.

Figure 24A:
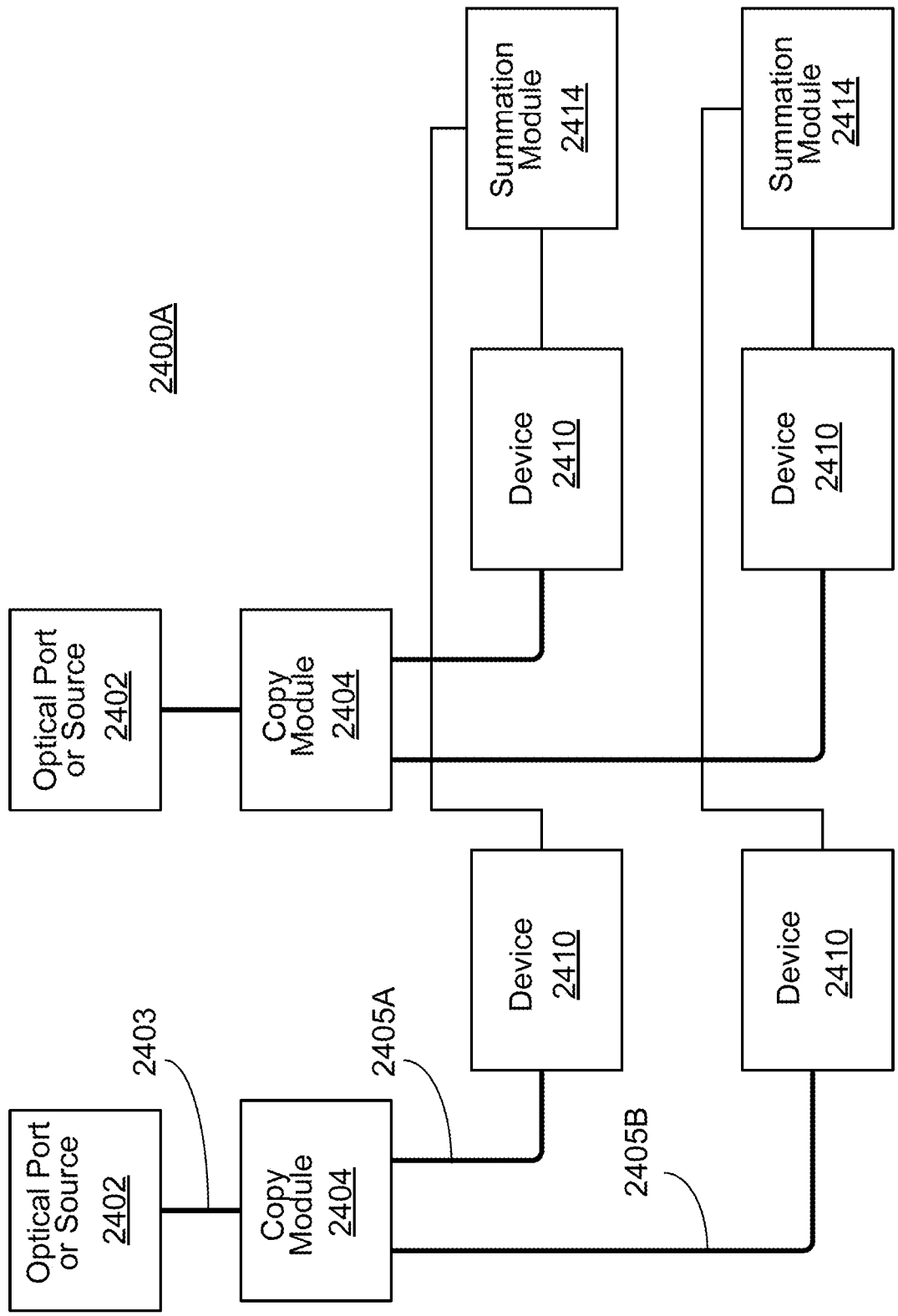
FIGS. 24A-24E are schematic diagrams of example computing systems using multiple optoelectronic subsystems.

FIG. 24A shows an example of a system configuration 2400A for an implementation of the system 1800 in which there are multiple devices 2410 that host different ones of the multiplication modules (e.g., the multiplication modules 1806A, 1806B, 1806C, and 1806D), which are each configured as a VMM subsystem to perform vector-matrix multiplication on a different subset of vector elements by a different submatrix of a larger matrix. For example, each multiplication module can be configured similar to the system configuration 2110 (FIG. 21B), but instead of implementing a VMM subsystem using a 2×2-element matrix, each multiplication module can be configured to implement a VMM subsystem using a matrix that has as large a size as can be efficiently fabricated on a single device having a common substrate for the modules within that device. For example, each multiplication module can implement a VMM subsystem using a 64×64-element matrix.

The different VMM subsystems are arranged so that the results of each submatrix are appropriately combined to yield results for the larger combined matrix (e.g., elements of a 128-element vector resulting from multiplication by a 128×128-element matrix). Each set of optical ports or sources 2402 provides a set of optical signals that represent different subsets of vector elements of a larger input vector. Copy modules 2404 are configured to copy all of the optical signals within a received set of optical signals encoded on optical waves guided in a set 2403 of 64 optical waveguides, and provide that set of optical signals to each of two different sets of optical waveguides, which in this example are a set 2405A of 64 optical waveguides and a set 2405B of 64 optical waveguides. This copying operation can be performed, for example, by using an array of waveguide splitters, each splitter in the array copying one of the elements of the subset of input vector elements (e.g., a subset of 64 elements for each copy module 2404) by splitting an optical wave in the set 2403 of optical waveguides into a first corresponding optical wave in the set 2405A of optical waveguides and a second corresponding optical wave in the set 2405B of optical waveguides. If multiple wavelengths are used in some embodiments (e.g., W wavelengths), the number of separate waveguides (and thus the number of separate ports or sources in 2402) can be reduced, for example, by a factor of 1/W. Each VMM subsystem device 2410 performs vector-matrix multiplication, providing its partial results as a set of electrical signals (for a subset of elements of the output vector), with corresponding partial result pairs from different devices 2410 being added together by the summation modules 2414 as shown in FIG. 24A, using any of the techniques described herein, such as current summation at a junction among conductors. In some implementations, vector-matrix multiplications using a desired matrix can be performed, recursively, by combining results from smaller submatrices, for any number of levels of recursion, ending by using the single element optical amplitude modulator at the root level of the recursion. At different levels of recursion the VMM subsystem device can be more compact (e.g., different data centers connected by long distance optical fiber networks at one level, different multi-chip devices connected by optical fibers within a data center at another level, different chips within a device connected by optical fibers at another level, and different sections of modules on the same chip connected by on-chip waveguides at another level).

Figure 24B:
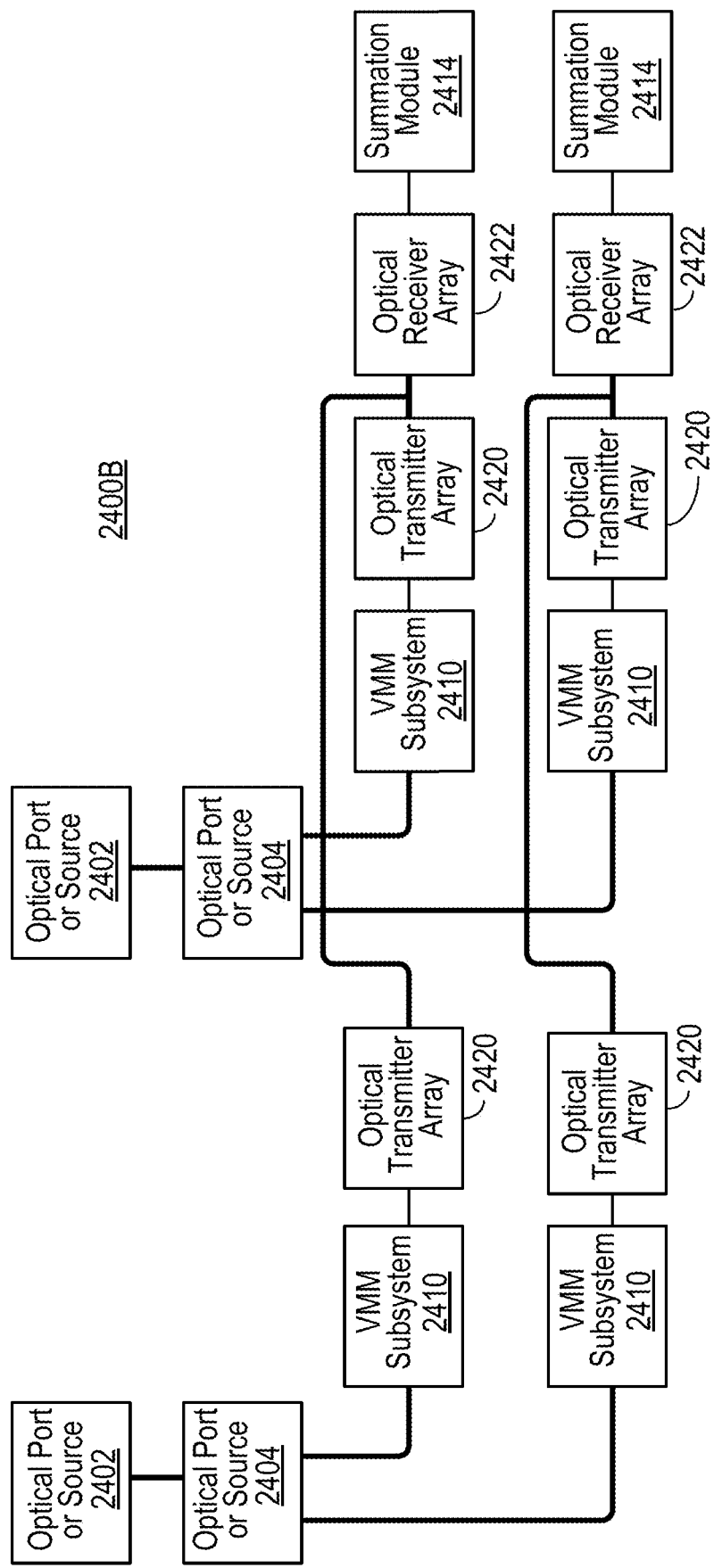

FIG. 24B shows another example of a system configuration 2400B in which additional devices are used for optical transmission and reception for each VMM subsystem 2410. At the output of each VMM subsystem 2410, an optical transmitter array 2420 is used to couple each optical signal to a channel within an optical transmission line (e.g., an optical fiber in a fiber bundle between VMM subsystems 2410 that can be hosted by separate devices and/or distributed in remote locations, or a waveguide in a set of waveguides on an integrated device, such as a SoC, that hosts the VMM subsystems 2410 on a common substrate). An optical receiver array 2422 is used for each subset of output vector elements to convert the optical signals to electrical signals before corresponding pairs of partial results are summed by the summation modules 2414.

Figure 24C:
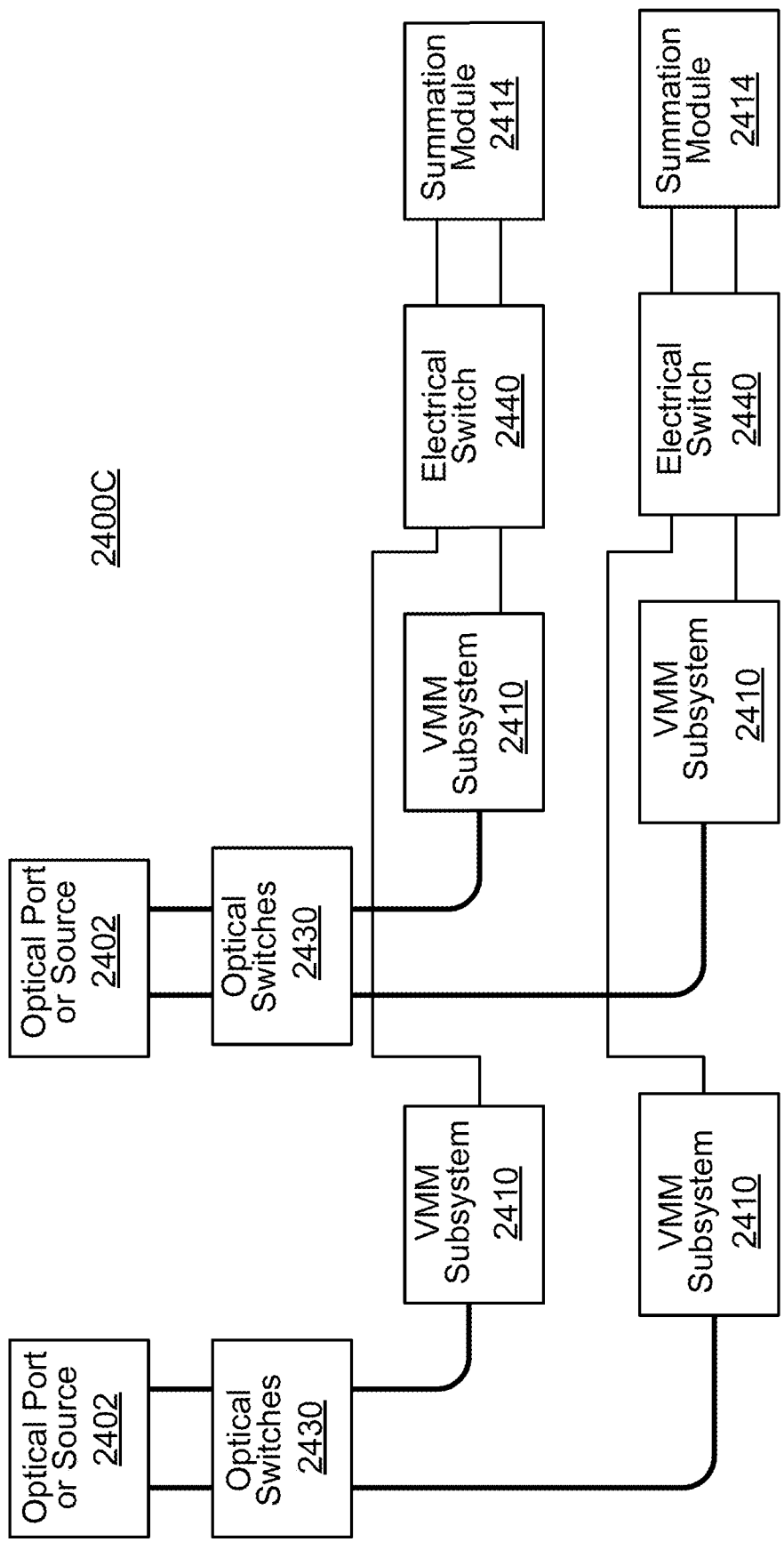

FIG. 24C shows another example of a system configuration 2400C in which the VMM subsystems 2410 can be reconfigured to enable the different vector-matrix multiplications for different submatrices to be rearranged in different ways. For example, the shape of the larger matrix that is formed by combining different submatrices can be configurable. In this example, two different subsets of optical signals are provided from each set of optical ports or sources 2402 to optical switches 2430. There are also electrical switches 2440 that are able to rearrange subsets of electrical signals representing partial results to be summed by the summation modules 2414 to provide an output vector, or separate output vectors, for a desired computation. For example, instead of vector-matrix multiplication using a matrix of size 2m×2n composed of four submatrices of size m×n, the VMM subsystems 2410 can be rearranged to use a matrix of size 2m×n or a matrix of size m×2n.

Figure 24D:
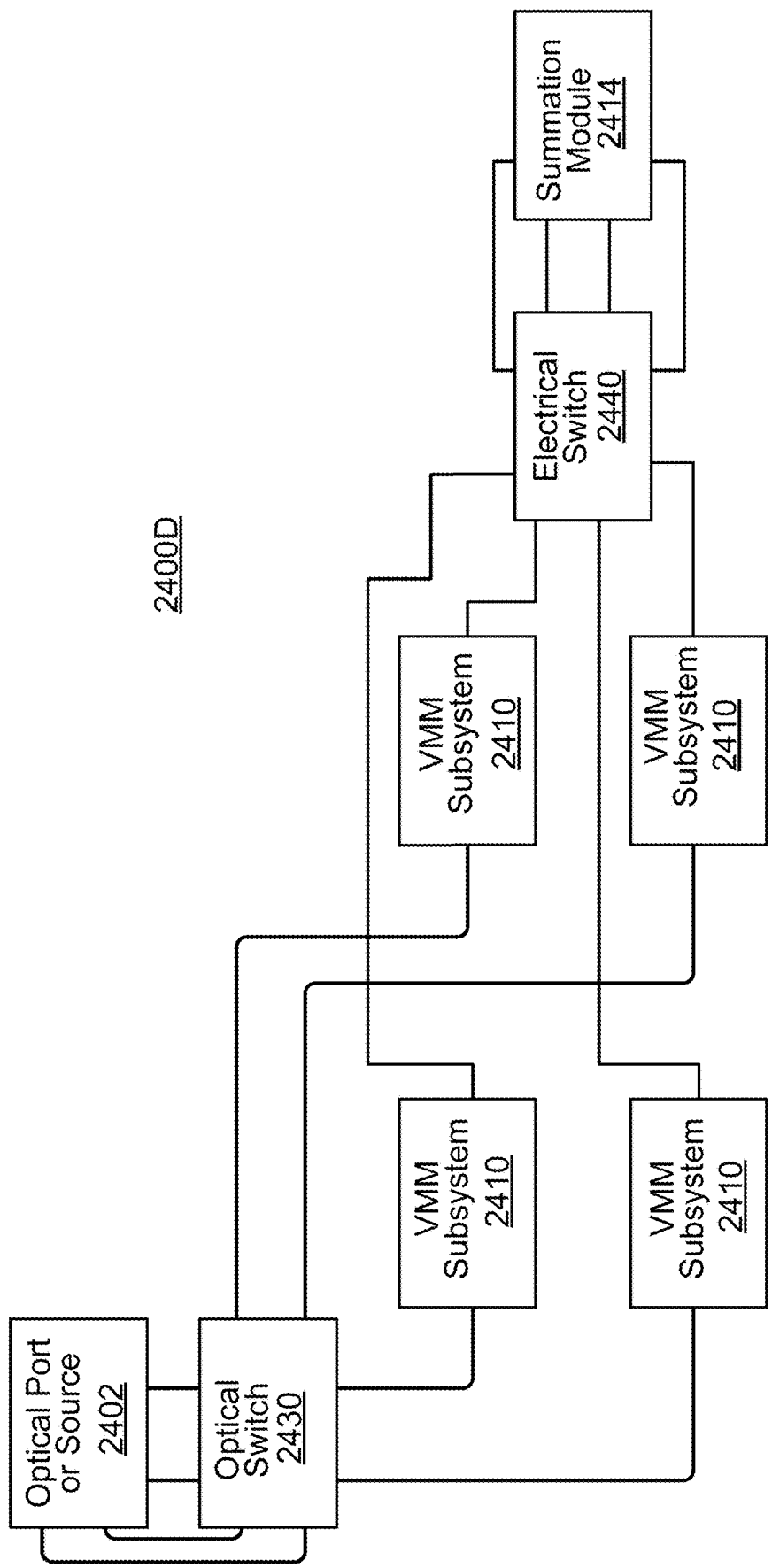

FIG. 24D shows another example of a system configuration 2400D in which the VMM subsystems 2410 can be reconfigured in additional ways. The optical switches 2430 can receive up to four separate sets of optical signals, and can be configured to provide different sets of optical signals to different VMM subsystems 2410, or to copy any of the sets of optical signals to multiple VMM subsystems 2410. Also, the electrical switches 2440 can be configured to provide any combination of the sets of electrical signals received to the summation modules 2414. This greater reconfigurability enables a wider variety of different vector-matrix multiplication computations, including multiplication using a matrix of size: m×3n, 3m×n, m×4n, 4m×n.

Figure 24E:
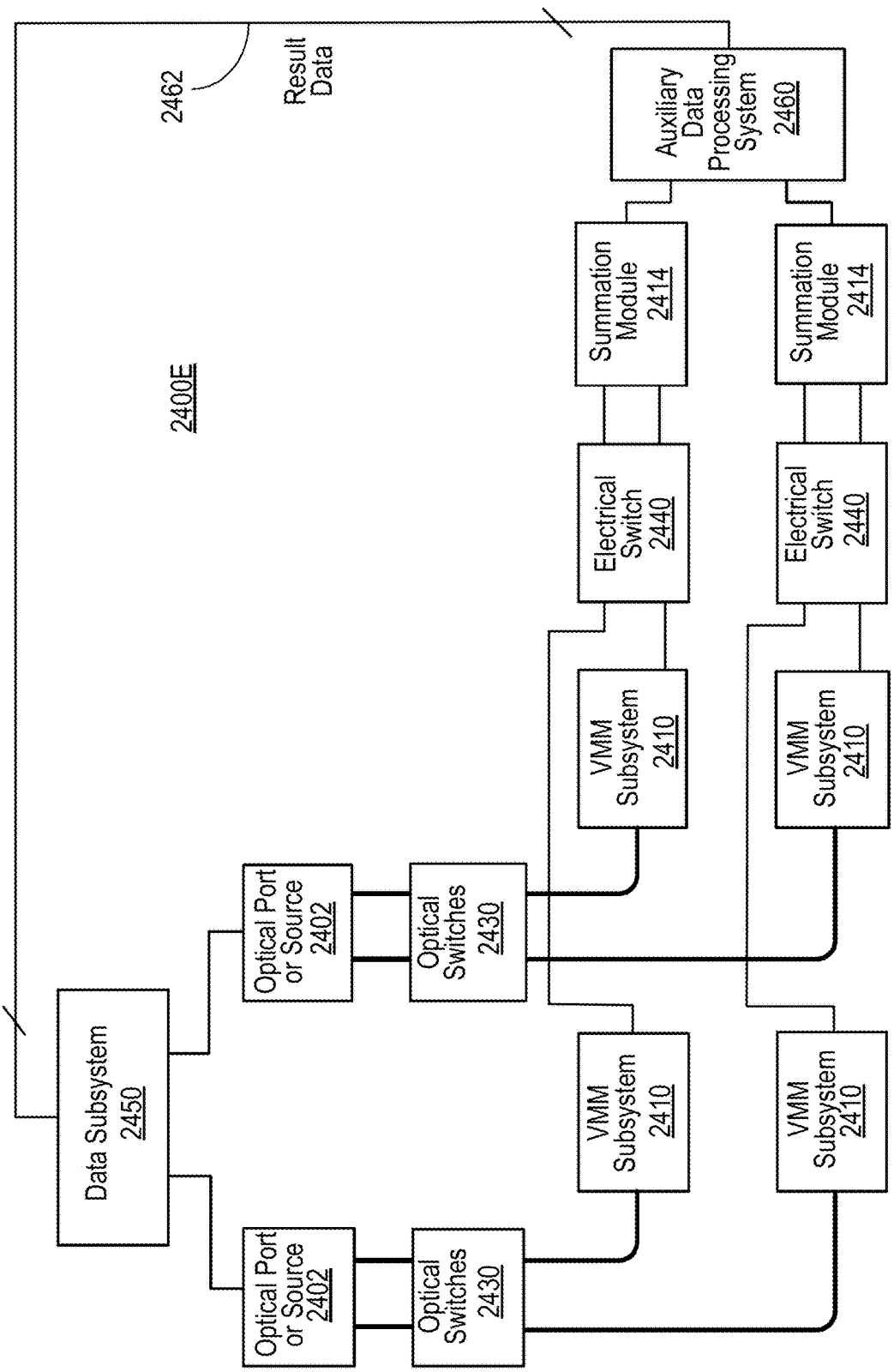

FIG. 24E shows another example of a system configuration 2400E that includes additional circuitry that can perform various operations (e.g., digital logic operations), to enable the system configuration 2400E to be used (e.g., for a complete optoelectronic computing system, or for an optoelectronic subsystem of a larger computing platform) for implementing computational techniques such as artificial neural networks or other forms of machine learning. A data storage subsystem 2450 can include volatile storage media (e.g., SRAM, and/or DRAM) and/or non-volatile storage media (e.g., solid state drives, and/or hard drives). The data storage subsystem 2450 can also include hierarchical cache modules. The data that is stored can include, for example, training data, intermediate result data, or production data used to feed online computational systems. The data storage subsystem 2450 can be configured to provide concurrent access to input data for modulation onto different optical signals provided by the optical ports or sources 2402. The conversion of data stored in digital form to an analog form that can be used for the modulation can be performed by circuitry (e.g., digital-to-analog converters) that is included at the output of the data storage subsystem 2450, or the input of the optical ports or sources 2402, or split between both. An auxiliary processing subsystem 2460 can be configured to perform auxiliary operations (e.g., nonlinear operations, data shuffling, etc.) on data that can be cycled through multiple iterations of vector-matrix multiplication using the VMM subsystems 2410. Result data 2462 from those auxiliary operations can be sent to the data storage subsystem 2450 in digital form. The data retrieved by the data storage subsystem 2450 can be used for modulating optical signals with appropriate input vectors, and for providing control signals (not shown) used to set modulation levels of optical amplitude modulators in the VMM subsystems 2410. The conversion of data encoded on electrical signals in analog form to a digital form can be performed by circuitry (e.g., analog-to-digital converters) within the auxiliary processing subsystem 2460.

In some implementations, a digital controller (not shown in the figure) is provided to control the operations of the data storage subsystem 2450, the hierarchical cache modules, various circuitry such as the digital-to-analog converters and analog-to-digital converters, the VMM subsystems 2410, and the optical sources 2402. For example, the digital controller is configured to execute program code to implement a neural network having several hidden layers. The digital controller iteratively performs matrix processing associated with various layers of the neural network. The digital controller performs a first iteration of matrix processing by retrieving first matrix data from the data storage subsystem 2450 and setting the modulation levels of the optical amplitude modulators in the VMM subsystems 2410 based on the retrieved data, in which the first matrix data represent coefficients of a first layer of the neural network. The digital controller retrieves a set of input data from the data storage subsystem and sets the modulation levels for the optical sources 2402 to produce a set of optical input signals that represent elements of a first input vector.

The VMM subsystems 2410 perform matrix processing based on the first input vector and the first matrix data, representing the processing of signals by the first layer of the neural network. After the auxiliary processing subsystem 2450 has produced a first set of result data 2462, the digital controller performs a second iteration of matrix processing by retrieving second matrix data from the data storage subsystem that represent coefficients of a second layer of the neutral network, and setting the modulation levels of the optical amplitude modulators in the VMM subsystems 2410 based on the second matrix data. The first set of result data 2462 is used as a second input vector to set the modulation levels for the optical sources 2402. The VMM subsystems 2410 perform matrix processing based on the second input vector and the second matrix data, representing the processing of signals by the second layer of the neural network, and so forth. At the last iteration, the output of the processing of signals by the last layer of the neural network is produced.

In some implementations, when performing computations associated with hidden layers of a neural network, the result data 2462 are not sent to the data storage subsystem 2450, but are used by the digital controller to directly control digital-to-analog converters that produce control signals for setting the modulation levels of the optical amplitude modulators in the VMM subsystems 2410. This reduces the time needed for storing data to and accessing data from the data storage subsystem 2450.

Other processing techniques can be incorporated into other examples of system configurations. For example, various techniques used with other kinds of vector-matrix multiplication subsystems (e.g., subsystems using optical interference without the electrical summation or signed multiplication described herein) can be incorporated into some system configurations, such as some of the techniques described in U.S. Patent Publication No. 2017/0351293, incorporated herein by reference.

FIGS. 32A and 32B show an artificial neural network computation systems that is similar to the one shown in FIGS. 14 and 15.

Figure 33:
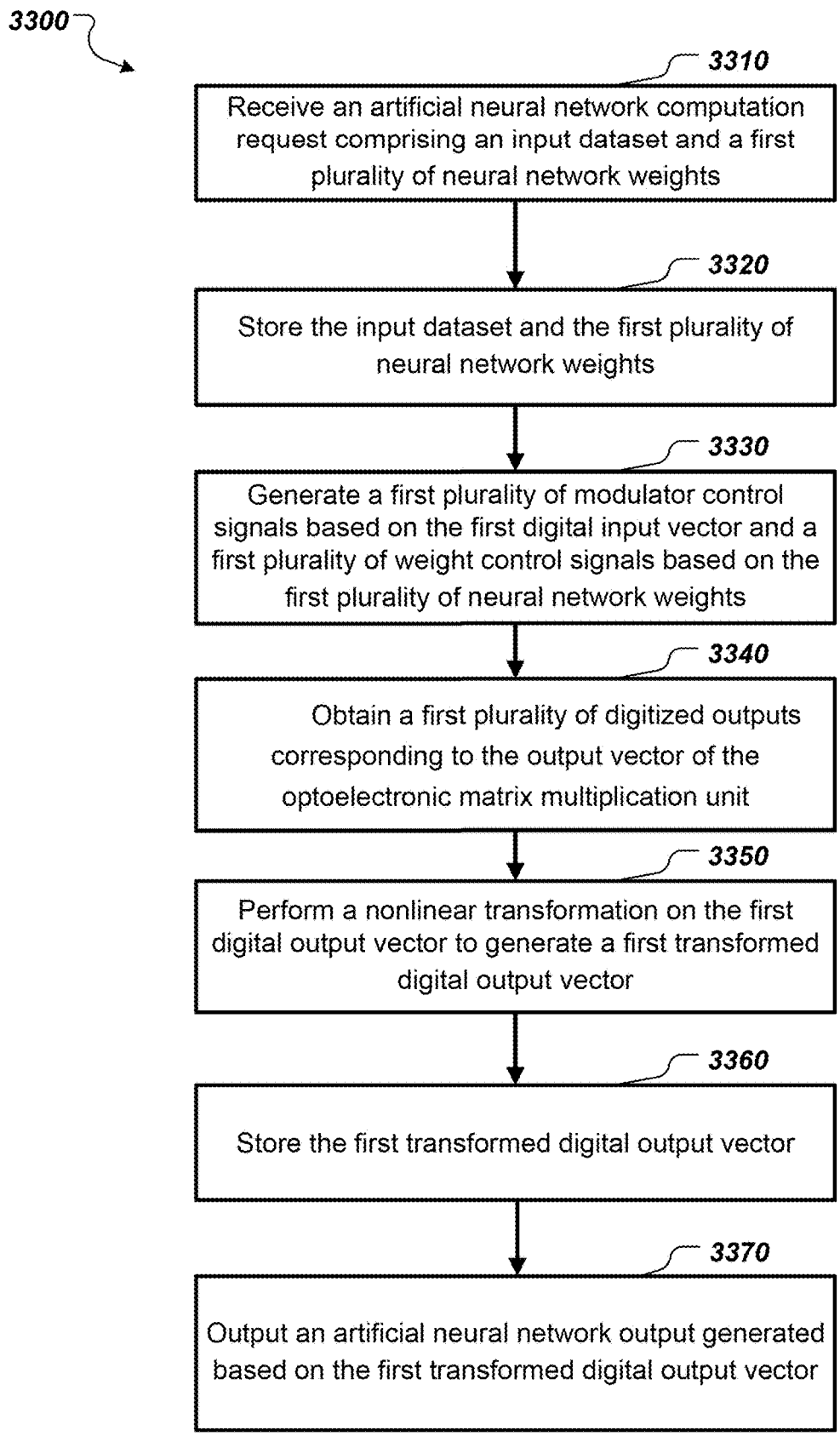
FIG. 33 is a flow diagram showing an example of a method for performing an ANN computation using an optoelectronic processor.

FIG. 33 shows a flowchart of an example of a method 3300 for performing an ANN computation using the ANN computation system 3200 of FIG. 32A. The steps of the process 3300 can be performed by the controller 10110 of the system 3200. In some implementations, various steps of the method 3300 can be run in parallel, in combination, in loops, or in any order.

At 3310, an artificial neural network (ANN) computation request comprising an input dataset and a first plurality of neural network weights is received. The input dataset includes a first digital input vector. The first digital input vector is a subset of the input dataset. For example, it may be a sub-region of an image. The ANN computation request can be generated by various entities, such as the computer 10102 of FIG. 32A. The computer 10102 can include one or more of various types of computing devices, such as a personal computer, a server computer, a vehicle computer, and a flight computer. The ANN computation request generally refers to an electrical signal that notifies or informs the ANN computation system 3300 of an ANN computation to be performed. In some implementations, the ANN computation request can be divided into two or more signals. For example, a first signal can query the ANN computation system 3300 to check whether the system 3300 is ready to receive the input dataset and the first plurality of neural network weights. In response to a positive acknowledgement by the system 3300, the computer 10102 can send a second signal that includes the input dataset and the first plurality of neural network weights.

At 3320, the input dataset and the first plurality of neural network weights are stored. The controller 10110 can store the input dataset and the first plurality of neural network weights in the memory unit 10120. Storing of the input dataset and the first plurality of neural network weights in the memory unit 10120 can allow flexibilities in the operation of the ANN computation system 3300 that, for example, can improve the overall performance of the system. For example, the input dataset can be divided into digital input vectors of a set size and format by retrieving desired portions of the input dataset from the memory unit 10120. Different portions of the input dataset can be processed in various order, or be shuffled, to allow various types of ANN computations to be performed. For example, shuffling can allow matrix multiplication by block matrix multiplication technique in cases where the input and output matrix sizes are different. As another example, storing of the input dataset and the first plurality of neural network weights in the memory unit 10120 can allow queuing of multiple ANN computation requests by the ANN computation system 3300, which can allow the system 3300 to sustain operation at its full speed without periods of inactivity.

In some implementations, the input dataset can be stored in the first memory subunit, and the first plurality of neural network weights can be stored in the second memory subunit.

At 3330, a first plurality of modulator control signals is generated based on the first digital input vector and a first plurality of weight control signals is generated based on the first plurality of neural network weights. The controller 10110 can send a first DAC control signal to the DAC unit 130 for generating the first plurality of modulator control signals. The DAC unit 130 generates the first plurality of modulator control signals based on the first DAC control signal, and the modulator array 144 generates the optical input vector representing the first digital input vector.

The first DAC control signal can include multiple digital values to be converted by the DAC unit 130 into the first plurality of modulator control signals. The multiple digital values are generally in correspondence with the first digital input vector, and can be related through various mathematical relationships or look-up tables. For example, the multiple digital values can be linearly proportional to the values of the elements of the first digital input vector. As another example, the multiple digital values can be related to the elements of the first digital input vector through a look-up table configured to maintain a linear relationship between the digital input vector and the optical input vector generated by the modulator array 144.

The controller 10110 can send a second DAC control signal to the DAC unit 130 for generating the first plurality of weight control signals. The DAC unit 130 generates the first plurality of weight control signals based on the second DAC control signal, and the optoelectronic matrix multiplication unit 3220 is reconfigured according to the first plurality of weight control signals, implementing a matrix corresponding to the first plurality of neural network weights.

The second DAC control signal can include multiple digital values to be converted by the DAC unit 130 into the first plurality of weight control signals. The multiple digital values are generally in correspondence with the first plurality of neural network weights, and can be related through various mathematical relationships or look-up tables. For example, the multiple digital values can be linearly proportional to the first plurality of neural network weights. As another example, the multiple digital values can be calculated by performing various mathematical operations on the first plurality of neural network weights to generate weight control signals that can configure the optoelectronic matrix multiplication unit 3220 to perform a matrix multiplication corresponding to the first plurality of neural network weights.

At 3340, a first plurality of digitized outputs corresponding to the electronic output vector of the optoelectronic matrix multiplication unit 3220 is obtained. The optical input vector generated by the modulator array 144 is processed by the optoelectronic matrix multiplication unit 3220 and transformed into an electrical output vector. The electrical output vector is converted into digitized values by the ADC unit 160. The controller 10110 can, for example, send a conversion request to the ADC unit 160 to begin a conversion of the voltages output by the optoelectronic matrix multiplication unit 3220 into digitized outputs. Once the conversion is complete, the ADC unit 160 can send the conversion result to the controller 10110. Alternatively, the controller 10110 can retrieve the conversion result from the ADC unit 160. The controller 10110 can form, from the digitized outputs, a digital output vector that corresponds to the result of the matrix multiplication of the input digital vector. For example, the digitized outputs can be organized, or concatenated, to have a vector format.

In some implementations, the ADC unit 160 can be set or controlled to perform an ADC conversion based on a DAC control signal issued to the DAC unit 10130 by the controller 10110. For example, the ADC conversion can be set to begin at a preset time following the generation of the modulation control signal by the DAC unit 130. Such control of the ADC conversion can simplify the operation of the controller 10110 and reduce the number of necessary control operations.

At 3350, a nonlinear transformation is performed on the first digital output vector to generate a first transformed digital output vector. A node, or an artificial neuron, of an ANN operates by first performing a weighted sum of the signals received from nodes of a previous layer, then performing a nonlinear transformation ("activation") of the weighted sum to generate an output. Various types of ANN can implement various types of differentiable, nonlinear transformations. Examples of nonlinear transformation functions include a rectified linear unit (RELU) function, a Sigmoid function, a hyperbolic tangent function, an $X^2$ function, and a |X| function. Such nonlinear transformations are performed on the first digital output by the controller 10110 to generate the first transformed digital output vector. In some implementations, the nonlinear transformations can be performed by a specialized digital integrated circuitry within the controller 10110. For example, the controller 10110 can include one or more modules or circuit blocks that are specifically adapted to accelerate the computation of one or more types of nonlinear transformations.

At 3360, the first transformed digital output vector is stored. The controller 10110 can store the first transformed digital output vector in the memory unit 10120. In cases where the input dataset is divided into multiple digital input vectors, the first transformed digital output vector corresponds to a result of the ANN computation of a portion of the input dataset, such as the first digital input vector. As such, storing of the first transformed digital output vector allows the ANN computation system 3200 to perform and store additional computations on other digital input vectors of the input dataset to later be aggregated into a single ANN output.

At 3370, an artificial neural network output generated based on the first transformed digital output vector is output. The controller 10110 generates an ANN output, which is a result of processing the input dataset through the ANN defined by the first plurality of neural network weights. In cases where the input dataset is divided into multiple digital input vectors, the generated ANN output is an aggregated output that includes the first transformed digital output, but can further include additional transformed digital outputs that correspond to other portions of the input dataset. Once the ANN output is generated, the generated output is sent to a computer, such as the computer 10102, that originated the ANN computation request.

Various performance metrics can be defined for the ANN computation system 3200 implementing the method 3300. Defining performance metrics can allow a comparison of performance of the ANN computation system 3200 that implements the optoelectronic processor 3210 with other systems for ANN computation that instead implement electronic matrix multiplication units. In one aspect, the rate at which an ANN computation can be performed can be indicated in part by a first loop period defined as a time elapsed between the step 3320 of storing, in the memory unit, the input dataset and the first plurality of neural network weights, and the step 3360 of storing, in the memory unit, the first transformed digital output vector. This first loop period therefore includes the time taken in converting the electrical signals into optical signals (e.g., step 3330), and performing the matrix multiplication in the optical and electrical domains (e.g., step 3340). Steps 3320 and 3360 both involves storing of data into the memory unit 10120, which are steps shared between the ANN computation system 3200 and conventional ANN computation system systems without the optoelectronic processor 3210. As such, the first loop period measuring the memory-to-memory transaction time can allow a realistic or fair comparison of ANN computation throughput to be made between the ANN computation system 3200 and ANN computation systems without the optoelectronic processor 3210, such as systems implementing electronic matrix multiplication units.

Due to the rate at which the optical input vectors can be generated by the modulator array 144 (e.g., at 25 GHz) and the processing rate of the optoelectronic matrix multiplication unit 3220 (e.g., >25 GHz), the first loop period of the ANN computation system 3200 for performing a single ANN computation of a single digital input vector can approach the reciprocal of the speed of the modulator array 144, e.g., 40 ps. After accounting for latencies associated with the signal generation by the DAC unit 130 and the ADC conversion by the ADC unit 160, the first loop period can, for example, be less than or equal to 100 ps, less than or equal to 200 ps, less than or equal to 500 ps, less than or equal to 1 ns, less than or equal to 2 ns, less than or equal to 5 ns, or less than or equal to 10 ns.

As a comparison, execution time of a multiplication of an M×1 vector and an M×M matrix by an electronic matrix multiplication unit is typically proportional to $M^2-1$ processor clock cycles. For M=32, such multiplication would take approximately 1024 cycles, which at 3 GHz clock speed results in an execution time exceeding 300 ns, which is orders of magnitude slower than the first loop period of the ANN computation system 3200.

In some implementations, the method 3300 further includes a step of generating a second plurality of modulator control signals based on the first transformed digital output vector. In some types of ANN computations, a single digital input vector can be repeatedly propagated through, or processed by, the same ANN. As previously discussed, an ANN that implements multi-pass processing can be referred to as a recurrent neural network (RNN). A RNN is a neural network in which the output of the network during a (k)th pass through the neural network is recirculated back to the input of the neural network and used as the input during the (k+1)th pass. RNNs can have various applications in pattern recognition tasks, such as speech or handwriting recognition. Once the second plurality of modulator control signals are generated, the method 3300 can proceed from step 3340 through step 3360 to complete a second pass of the first digital input vector through the ANN. In general, the recirculation of the transformed digital output to be the digital input vector can be repeated for a preset number of cycles depending of the characteristics of the RNN received in the ANN computation request.

In some implementations, the method 3300 further includes a step of generating a second plurality of weight control signals based on a second plurality of neural network weights. In some cases, the artificial neural network computation request further includes a second plurality of neural network weights. As previously discussed, in general, an ANN has one or more hidden layers in addition to the input and output layers. For ANN with two hidden layers, the second plurality of neural network weights can correspond, for example, to the connectivity between the first layer of the ANN and the second layer of the ANN. To process the first digital input vector through the two hidden layers of the ANN, the first digital input vector can first be processed according to the method 3300 up to step 3360, at which the result of processing the first digital input vector through the first hidden layer of the ANN is stored in the memory unit 10120. The controller 10110 then reconfigures the optoelectronic matrix multiplication unit 3220 to perform the matrix multiplication corresponding to the second plurality of neural network weights associated with the second hidden layer of the ANN. Once the optoelectronic matrix multiplication unit 3220 is reconfigured, the method 3300 can generate the plurality of modulator control signals based on the first transformed digital output vector, which generates an updated optical input vector corresponding to the output of the first hidden layer. The updated optical input vector is then processed by the reconfigured optoelectronic matrix multiplication unit 3220 which corresponds to the second hidden layer of the ANN. In general, the described steps can be repeated until the digital input vector has been processed through all hidden layers of the ANN.

In some implementations of the optoelectronic matrix multiplication unit 3220, the reconfiguration rate of the optoelectronic matrix multiplication unit 3220 may be significantly slower than the modulation rate of the modulator array 144. In such cases, the throughput of the ANN computation system 3200 may be adversely impacted by the amount of time spent in reconfiguring the optoelectronic matrix multiplication unit 3220 during which ANN computations cannot be performed. To mitigate the impact of the relatively slow reconfiguration time of the optoelectronic matrix multiplication unit 3220, batch processing techniques can be utilized in which two or more digital input vectors are propagated through the optoelectronic matrix multiplication unit 3220 without a configuration change to amortize the reconfiguration time over a larger number of digital input vectors.

Figure 34:
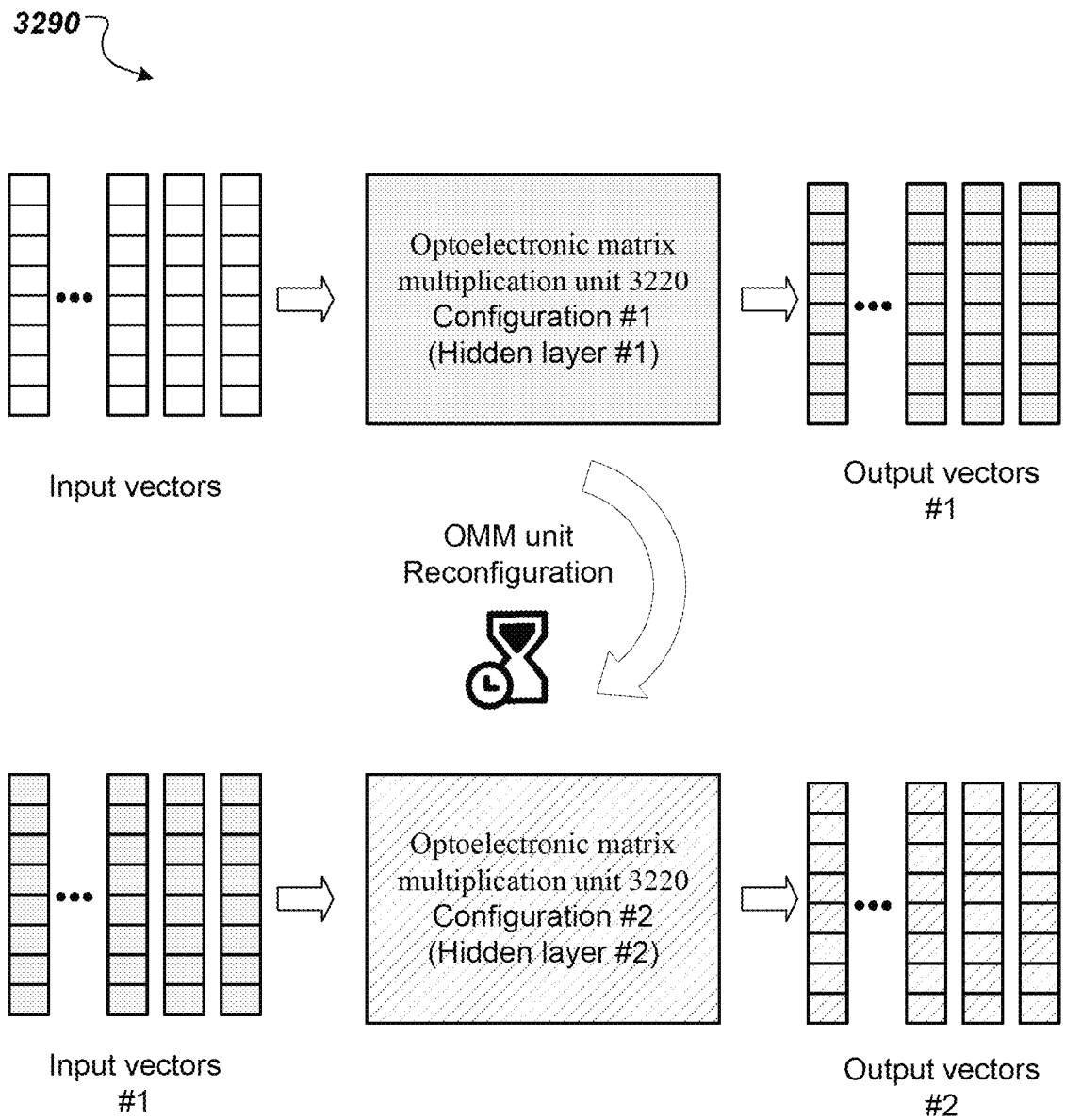
FIG. 34 is a diagram illustrating an aspect of the method of FIG. 33.

FIG. 34 shows a diagram 3290 illustrating an aspect of the method 3300 of FIG. 33. For an ANN with two hidden layers, instead of processing the first digital input vector through the first hidden layer, reconfiguring the optoelectronic matrix multiplication unit 3220 for the second hidden layer, processing the first digital input vector through the reconfigured optoelectronic matrix multiplication unit 3220, and repeating the same for the remaining digital input vectors, all digital input vectors of the input dataset can be first processed through the optoelectronic matrix multiplication unit 3220 configured for the first hidden layer (configuration #1) as shown in the upper portion of the diagram 3290. Once all digital input vectors have been processed by the optoelectronic matrix multiplication unit 3220 having configuration #1, the optoelectronic matrix multiplication unit 3220 is reconfigured into configuration #2, which correspond to the second hidden layer of the ANN. This reconfiguration can be significantly slower than the rate at which the input vectors can be processed by the optoelectronic matrix multiplication unit 3220. Once the optoelectronic matrix multiplication unit 3220 is reconfigured for the second hidden layer, the output vectors from the previous hidden layer can be processed by the optoelectronic matrix multiplication unit 3220 in a batch. For large input datasets having tens or hundreds of thousands of digital input vectors, the impact of the reconfiguration time can be reduced by approximately the same factor, which can substantially reduce the portion of the time spent by the ANN computation system 3200 in reconfiguration.

To implement batch processing, in some implementations, the method 3300 further includes steps of generating, through the DAC unit, a second plurality of modulator control signals based on the second digital input vector; obtaining, from the ADC unit, a second plurality of digitized outputs corresponding to the output vector of the optoelectronic matrix multiplication unit, the second plurality of digitized outputs forming a second digital output vector; performing a nonlinear transformation on the second digital output vector to generate a second transformed digital output vector; and storing, in the memory unit, the second transformed digital output vector. The generating of the second plurality of modulator control signals can follow the step 3360, for example. Further, the ANN output of step 3370 in this case is now based on both the first transformed digital output vector and the second transformed digital output vector. The obtaining, performing, and storing steps are analogous to the steps 3340 through 3360.

The batch processing technique is one of several techniques for improving the throughput of the ANN computation system 3200. Another technique for improving the throughput of the ANN computation system 3200 is through parallel processing of multiple digital input vectors by utilizing wavelength division multiplexing (WDM). As previously discussed, WDM is a technique of simultaneously propagating multiple optical signals of different wavelengths through a common propagation channel, such as a waveguide of the optoelectronic matrix multiplication unit 3220. Unlike electrical signals, optical signals of different wavelengths can propagate through a common channel without affecting other optical signals of different wavelengths on the same channel. Further, optical signals can be added (multiplexed) or dropped (demultiplexed) from a common propagation channel using well-known structures such as optical multiplexers and demultiplexers.

In context of the ANN computation system 3200, multiple optical input vectors of different wavelengths can be independently generated, simultaneously propagated through the optical paths and optical processing components (e.g., optical amplitude modulators) of the optoelectronic matrix multiplication unit 3220, and independently processed by the electronic processing components (e.g., detectors and/or summation modules) to enhance the throughput of the ANN computation system 3200.

Referring to FIG. 35A, in some implementations, a wavelength division multiplexed (WDM) artificial neural network (ANN) computation system 3500 includes an optoelectronic processor 3510 that includes an optoelectronic matrix multiplication unit 3520 that has, e.g., the copying modules, multiplication modules, and summation modules shown in FIGS. 18 to 24D to enable processing non-coherent or low-coherent optical signals in performing matrix computations, in which the optical signals are encoded in multiple wavelengths. The WDM ANN computation system 3500 is similar to the ANN computation system 3200 except that the WDM technique is used in which, for some implementations of the ANN computation system 3500, the light source 3230 is configured to generate multiple wavelengths, such as $\lambda 1$, $\lambda 2$, and $\lambda 3$, similar to the system 10104 of FIG. 46F.

The multiple wavelengths can preferably be separated by a wavelength spacing that is sufficiently large to allow easy multiplexing and demultiplexing onto a common propagation channel. For example, the wavelength spacing greater than 0.5 nm, 1.0 nm, 2.0 nm, 3.0 nm, or 5.0 nm can allow simple multiplexing and demultiplexing. On the other hand, the range between the shortest wavelength and the longest wavelength of the multiple wavelengths ("WDM bandwidth") can preferably be sufficiently small such that the characteristics or performance of the optoelectronic matrix multiplication unit 3520 remain substantially the same across the multiple wavelengths. Optical components are typically dispersive, meaning that their optical characteristics change as a function of wavelength. For example, a power splitting ratio of an MZI can change over wavelength. However, by designing the optoelectronic matrix multiplication unit 3520 to have a sufficiently large operating wavelength window, and by limiting the wavelengths to be within that operating wavelength window, the output electronic vector output by the optoelectronic matrix multiplication unit 3520 corresponding to each wavelength can be a sufficiently accurate result of the matrix multiplication implemented by the optoelectronic matrix multiplication unit 3520. The operating wavelength window can be, for example, 1 nm, 2 nm, 3 nm, 4 nm, 5 nm, 10 nm, or 20 nm.

The modulator array 144 of the WDM ANN computation system 3500 includes banks of optical modulators configured to generate a plurality of optical input vectors, each of the banks corresponding to one of the multiple wavelengths and generating respective optical input vector having respective wavelength. For example, for a system with an optical input vector of length 32 and 3 wavelengths (e.g., $\lambda 1$, $\lambda 2$, and $\lambda 3$), the modulator array 144 can have 3 banks of 32 modulators each. Further, the modulator array 144 also includes an optical multiplexer configured to combine the plurality of optical input vectors into a combined optical input vector including the plurality of wavelengths. For example, the optical multiplexer can combine the outputs of the three banks of modulators at three different wavelengths into a single propagation channel, such as a waveguide, for each element of the optical input vector. As such, returning to the example above, the combined optical input vector would have 32 optical signals, each signal containing 3 wavelengths.

The optoelectronic processing components of the WDM ANN computation system 3500 are further configured to demultiplex the multiple wavelengths and to generate a plurality of demultiplexed output electric signals. Referring to FIG. 35B, the optoelectronic matrix multiplication unit 3520 includes optical paths 1803 configured to receive from the modulator array 144 the combined optical input vector including the plurality of wavelengths. For example, the optical path 1803_1 receives the combined optical input vector element $v_1$ at the wavelengths $\lambda 1$, $\lambda 2$, and $\lambda 3$. Copies of the optical input vector element $v_1$ at the wavelengths $\lambda 1$, $\lambda 2$, and $\lambda 3$ are provided to the multiplication module 3530_11, 3530_21, . . . , and 3530_$m$1. In some implementations in which the multiplication modules 3530 output electrical signals, the multiplication module 3530_11 outputs three electrical signals representing $M_{11} \cdot v_1$ that correspond to the input vector element $v_1$ at the wavelengths $\lambda 1$, $\lambda 2$, and $\lambda 3$. The output electrical signals of the multiplication module 3530_11 that correspond to the input vector element $v_1$ at the wavelengths $\lambda 1$, $\lambda 2$, and $\lambda 3$ are shown as ($\lambda 1$), ($\lambda 2$), and ($\lambda 3$), respectively. Similar notations apply to the outputs of the other multiplication modules. The multiplication module 3530_21 outputs three electrical signals representing $M_{21} \cdot v_1$ that correspond to the input vector element $v_1$ at the wavelengths $\lambda 1$, $\lambda 2$, and $\lambda 3$, respectively. The multiplication module 3530_$m$1 outputs three electrical signals representing $M_{m1} \cdot v_1$ that correspond to the input vector element $v_1$ at the wavelengths $\lambda 1$, $\lambda 2$, and $\lambda 3$.

Copies of the optical input vector element $v_2$ at the wavelengths $\lambda 1$, $\lambda 2$, and $\lambda 3$ are provided to the multiplication module 3530_12, 3530_22, . . . , and 3530_$m$2. The multiplication module 3530_12 outputs three electrical signals representing $M_{12} \cdot v_2$ that correspond to the input vector element $v_2$ at the wavelengths $\lambda 1$, $\lambda 2$, and $\lambda 3$. The multiplication module 3530_22 outputs three electrical signals representing $M_{22} \cdot v_2$ that correspond to the input vector element $v_2$ at the wavelengths $\lambda 1$, $\lambda 2$, and $\lambda 3$. The multiplication module 3530_$m$2 outputs three electrical signals representing $M_{m2} \cdot v_2$ that correspond to the input vector element $v_2$ at the wavelengths $\lambda 1$, $\lambda 2$, and $\lambda 3$.

Copies of the optical input vector element $v_{n2}$ including the wavelengths $\lambda 1$, $\lambda 2$, and $\lambda 3$ are provided to the multiplication module 3530_1$n$, 3530_2$n$, . . . , and 3530_$mn$. The multiplication module 3530_1$n$ outputs three electrical signals representing $M_{1n} \cdot v_n$ that correspond to the input vector element $v_n$ at the wavelengths $\lambda 1$, $\lambda 2$, and $\lambda 3$. The multiplication module 3530_2$n$ outputs three electrical signals representing $M_{2n} \cdot v_n$ that correspond to the input vector element $v_n$ at the wavelengths $\lambda 1$, $\lambda 2$, and $\lambda 3$. The multiplication module 3530_$mn$ outputs three electrical signals representing $M_{mn} \cdot v_n$ that correspond to the input vector element $v_n$ at the wavelengths $\lambda 1$, $\lambda 2$, and $\lambda 3$, and so forth.

For example, each of the multiplication module 3530 can include a demultiplexer configured to demultiplex the three wavelengths contained in each of the 32 signals of the multi-wavelength optical vector, and route the 3 single-wavelength optical output vectors to three banks of photodetectors (e.g., photodetectors 2012, 2016 (FIG. 20B) or 2042, 2046 (FIG. 20C)) coupled to three banks of op-amps or transimpedance amplifiers (e.g., op-amps 2030 (FIG. 20B) or 2050 (FIG. 20C)).

Three banks of summation modules 1808 receive outputs from the multiplication modules 3530 and generate sums y that correspond to the input vector at the various wavelengths, For example, three summation modules 1808_1 receive the outputs of the multiplication modules 3530_11, 3530_12, . . . , 3530_1$n$ and generate sums $y_1(\lambda 1)$, $y_1(\lambda 2)$, $y_1(\lambda 2)$ that correspond to the input vector element $v_1$ at the wavelengths $\lambda 1$, $\lambda 2$, and $\lambda 3$, respectively, in which at each wavelength the sum $y_1$ is equal to $M_{11}v_1 + M_{12}v_2 + \ldots + M_{1n}v_n$. Three summation modules 1808_2 receive the outputs of the multiplication modules 3530_21, 3530_22, . . . , 3530_2$n$, and generates sums $y_2(\lambda 1)$, $y_2(\lambda 2)$, $y_2(\lambda 3)$ that correspond to the input vector element $v_2$ at the wavelengths $\lambda 1$, $\lambda 2$, and $\lambda 3$, respectively, in which at each wavelength the sum $y_2$ is equal to $M_{21}v_1 + M_{22}v_2 + \ldots + M_{2n}v_n$. Three summation modules 1808_$n$ receive the outputs of the multiplication modules 3530_$m$1, 3530_$m$2, . . . , 3530_$mn$, and generates sums $y_n(\lambda 1)$, $y_n(\lambda 2)$, $y_n(\lambda 3)$ that correspond to the input vector element $v_n$ at the wavelengths $\lambda 1$, $\lambda 2$, and $\lambda 3$, respectively, in which at each wavelength the sum $y_n$ is equal to $M_{m1}v_1 + M_{m2}v_2 + \ldots + M_{mn}v_n$.

Referring back to FIG. 35A, the ADC unit 160 of the WDM ANN computation system 3500 includes banks of ADCs configured to convert the plurality of demultiplexed output voltages of the optoelectronic matrix multiplication unit 3520. Each of the banks corresponds to one of the multiple wavelengths, and generates respective digitized demultiplexed outputs. For example, the banks of ADCs 160 can be coupled to the banks of the summation modules 1808.

The controller 10110 can implement a method analogous to the method 3300 (FIG. 33) but expanded to support the multi-wavelength operation. For example, the method can include the steps of obtaining, from the ADC unit 160, a plurality of digitized demultiplexed outputs, the plurality of digitized demultiplexed outputs forming a plurality of first digital output vectors, in which each of the plurality of first digital output vectors corresponds to one of the plurality of wavelengths; performing a nonlinear transformation on each of the plurality of first digital output vectors to generate a plurality of transformed first digital output vectors; and storing, in the memory unit, the plurality of transformed first digital output vectors.

In some cases, the ANN can be specifically designed, and the digital input vectors can be specifically formed such that the multi-wavelength products of the multiplication module 3530 can be added without demultiplexing. In such cases, the multiplication module 3530 can be a wavelength-insensitive multiplication module that does not demultiplex the multiple wavelengths of the multi-wavelength products. As such, each of the photodetectors of the multiplication module 3530 effectively sums the multiple wavelengths of an optical signal into a single photocurrent, and each of the voltages output by the multiplication module 3530 corresponds to a sum of the product of a vector element and a matrix element for the multiple wavelengths. The summation module 1808 (only one bank is needed) outputs an element-by-element sum of the matrix multiplication results of the multiple digital input vectors.

FIG. 35C shows an example of a system configuration 3500 for an implementation of the wave division multiplexed optoelectronic matrix multiplication unit 3520 for performing vector-matrix multiplication using a 2×2-element matrix, with the summation operation performed in the electrical domain. In this example, the input vector is $$\overline{v} = \begin{bmatrix} v_1 \\ v_2 \end{bmatrix},$$

and the matrix is $$\overline{M} = \begin{bmatrix} M_{11} & M_{12} \\ M_{21} & M_{22} \end{bmatrix}.$$

In this example, the input vector has multiple wavelengths λ1, λ2, and λ3, and each of the elements of the input vector is encoded on a different optical signal. Two different copying modules 1902 perform an optical copying operation to split the computation over different paths (e.g., an "upper" path and a "lower" path). There are four multiplication modules 1904 that each multiply by a different matrix element using optical amplitude modulation. The output of each multiplication module 1904 is provided to a demultiplexer and a bank of optical detection modules 3310 that convert a wavelength division multiplexed optical signal to electrical signals in the form of electrical currents associated with the wavelengths λ1, λ2, and λ3. Both upper paths of the different input vector elements are combined using a bank of summation modules 3320 associated with the wavelengths λ1, λ2, and λ3, and both lower paths of the different input vector elements are combined using a bank of summation modules 3320 associated with the wavelengths λ1, λ2, and λ3, in which the summation modules 3320 perform summation in the electrical domain. Thus, each of the elements of the output vector for each wavelength is encoded on a different electrical signal. As shown in FIG. 35C, as the computation progresses, each component of an output vector is incrementally generated to yield the following results for the upper and lower paths, respectively, for each wavelength.

$$M_{11}v_1 + M_{12}v_2$$

$$M_{21}v_1 + M_{22}v_2$$

The system configuration 3500 can be implemented using any of a variety of optoelectronic technologies. In some implementations, there is a common substrate (e.g., a semiconductor such as silicon), which can support both integrated optics components and electronic components. The optical paths can be implemented in waveguide structures that have a material with a higher optical index surrounded by a material with a lower optical index defining a waveguide for propagating an optical wave that carries an optical signal. The electrical paths can be implemented by a conducting material for propagating an electrical current that carries an electrical signal. (In FIG. 35C, the thicknesses of the lines representing paths are used to differentiate between optical paths, represented by thicker lines, and electrical paths, represented by thinner lines or dashed lines.) Optical devices such as splitters and optical amplitude modulators, and electrical devices such as photodetectors and operational amplifiers (op-amps) can be fabricated on the common substrate. Alternatively, different devices having different substrates can be used to implement different portions of the system, and those devices can be in communication over communication channels. For example, optical fibers can be used to provide communication channels to send optical signals among multiple devices used to implement the overall system. Those optical signals can represent different subsets of an input vector that is provided when performing vector-matrix multiplication, and/or different subsets of intermediate results that are computed when performing vector-matrix multiplication, as described in more detail below.

So far, the nonlinear transformations of the weighted sums performed as part of the ANN computation was performed in the digital domain by the controller 10110. In some cases, the nonlinear transformations can be computationally intensive or power hungry, add significantly to the complexity of the controller 10110, or otherwise limit the performance of the ANN computation system 3200 (FIG. 32A) in terms of throughput or power efficiency. As such, in some implementations of the ANN computation system, the nonlinear transformation can be performed in the analog domain through analog electronics.

Figure 36:
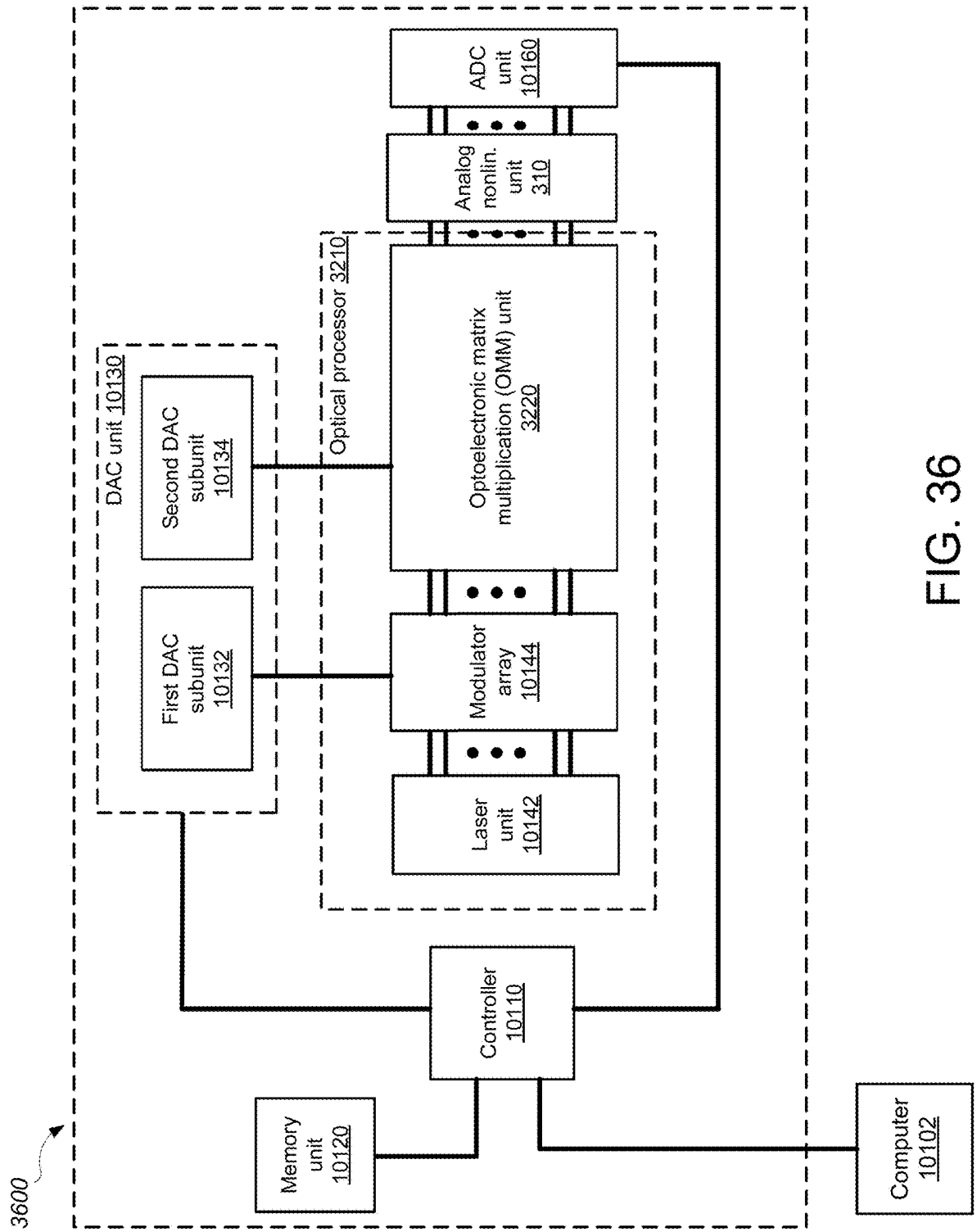
FIGS. 36 and 37 are schematic diagrams of examples of ANN computation systems that use optoelectronic matrix multiplication units.

FIG. 36 shows a schematic diagram of an example of an ANN computation system 3600. The ANN computation system 3600 is similar to the ANN computation system 3200, but differs in that an analog nonlinearity unit 310 has been added. The analog nonlinearity unit 310 is arranged between the optoelectronic matrix multiplication unit 3220 and the ADC unit 160. The analog nonlinearity unit 310 is configured to receive the output voltages from the optoelectronic matrix multiplication unit 3220, apply a nonlinear transfer function, and output transformed output voltages to the ADC unit 160.

As the ADC unit 160 receives voltages that have been nonlinearly transformed by the analog nonlinearity unit 310, the controller 10110 can obtain, from the ADC unit 160, transformed digitized output voltages corresponding to the transformed output voltages. Because the digitized output voltages obtained from the ADC unit 160 have already been nonlinearly transformed ("activated"), the nonlinear transformation step by the controller 10110 can be omitted, reducing the computation burden by the controller 10110. The first transformed voltages obtained directly from the ADC unit 160 can then be stored as the first transformed digital output vector in the memory unit 10120.

The analog nonlinearity unit 310 can be implemented in various ways, as discussed below for the analog nonlinearity unit 310 of FIG. 48A. Use of the analog nonlinearity unit 310 can improve the performance, such as throughput or power efficiency, of the ANN computation system 3600 by reducing a step to be performed in the digital domain. The moving of the nonlinear transformation step out of the digital domain can allow additional flexibility and improvements in the operation of the ANN computation systems. For example, in a recurrent neural network, the output of the optoelectronic matrix multiplication unit 3220 is activated, and recirculated back to the input of the optoelectronic matrix multiplication unit 3220. The activation is performed by the controller 10110 in the ANN computation system 3200, which necessitates digitizing the output voltages of the optoelectronic matrix multiplication unit 3220 at every pass through the optoelectronic matrix multiplication unit 3220. However, because the activation is now performed prior to digitization by the ADC unit 160, it may be possible to reduce the number of ADC conversions needed in performing recurrent neural network computations.

In some implementations, the analog nonlinearity unit 310 can be integrated into the ADC unit 160 as a nonlinear ADC unit. For example, the nonlinear ADC unit can be a linear ADC unit with a nonlinear lookup table that maps the linear digitized outputs of the linear ADC unit into desired nonlinearly transformed digitized outputs.

Figure 37:
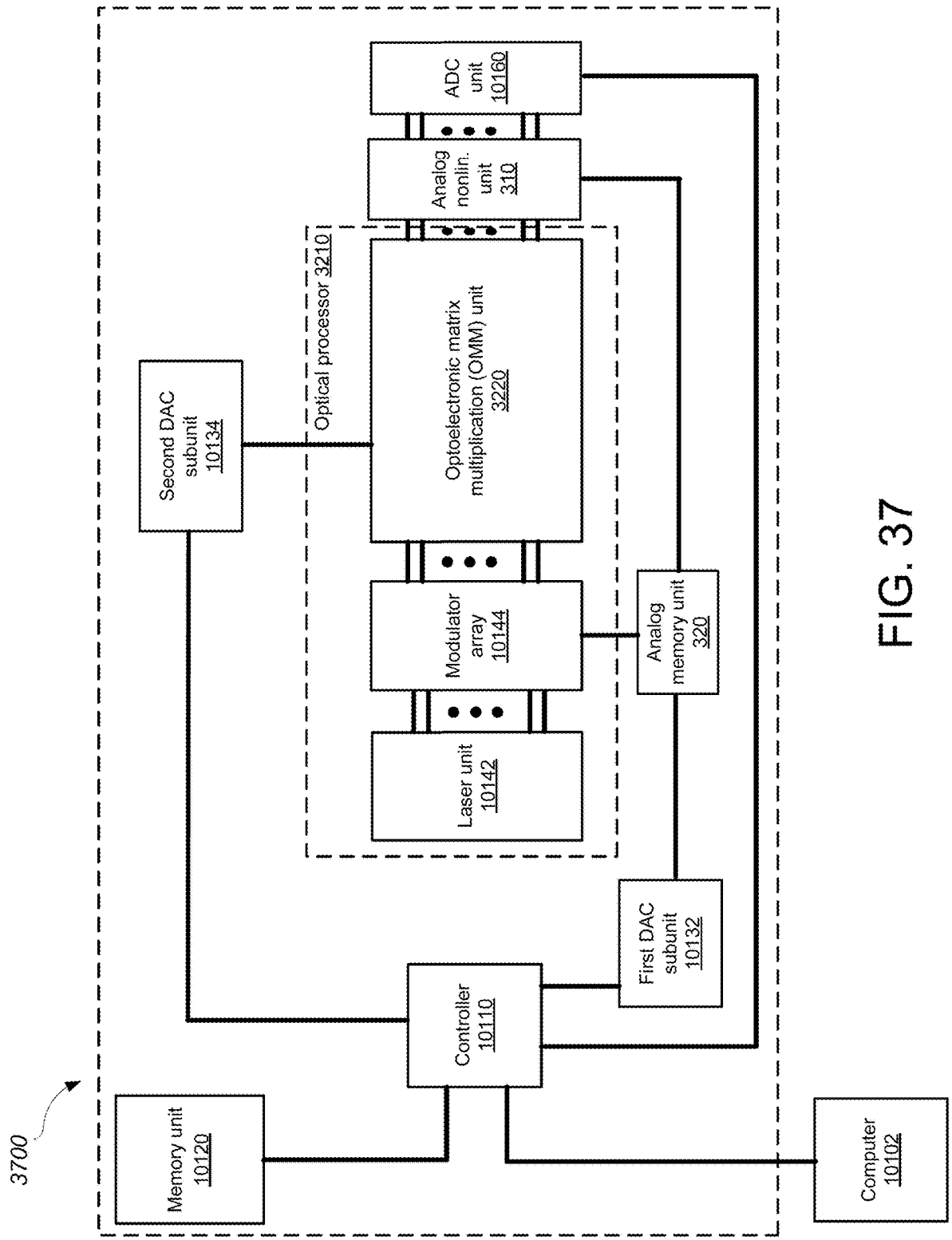

FIG. 37 shows a schematic diagram of an example of an ANN computation system 3700. The ANN computation system 3700 is similar to the system 3600 of FIG. 36, but differs in that it further includes an analog memory unit 320. The analog memory unit 320 is coupled to the DAC unit 130 (e.g., through the first DAC subunit 132), the modulator array 144, and the analog nonlinearity unit 310. The analog memory unit 320 includes a multiplexer that has a first input coupled to the first DAC subunit 132 and a second input coupled to the analog nonlinearity unit 310. This allows the analog memory unit 320 to receive signals from either the first DAC subunit 132 or the analog nonlinearity unit 310. The analog memory unit 320 is configured to store analog voltages and to output the stored analog voltages. The analog memory unit 320 can be implemented in various ways, as discussed above for the analog memory unit 320 of FIG. 3B.

The operation of the ANN computation system 3700 will now be described. The first plurality of modulator control signals output by the DAC unit 130 (e.g., by the first DAC subunit 132) is first input to the modulator array 144 through the analog memory unit 320. At this step, the analog memory unit 320 can simply pass on or buffer the first plurality of modulator control signals. The modulator array 144 generates an optical input vector based on the first plurality of modulator control signals, which propagates through the optoelectronic matrix multiplication unit 3220. The output voltages of the optoelectronic matrix multiplication unit 3220 are nonlinearly transformed by the analog nonlinearity unit 310. At this point, instead of being digitized by the ADC unit 160, the output voltages of the analog nonlinearity unit 310 are stored by the analog memory unit 320, which are then output to the modulator array 144 to be converted into the next optical input vector to be propagated through the optoelectronic matrix multiplication unit 3220. This recurrent processing can be performed for a preset amount of time or a preset number of cycles, under the control of the controller 10110. Once the recurrent processing is complete for a given digital input vector, the transformed output voltages of the analog nonlinearity unit 310 are converted by the ADC unit 160.

Figure 38:
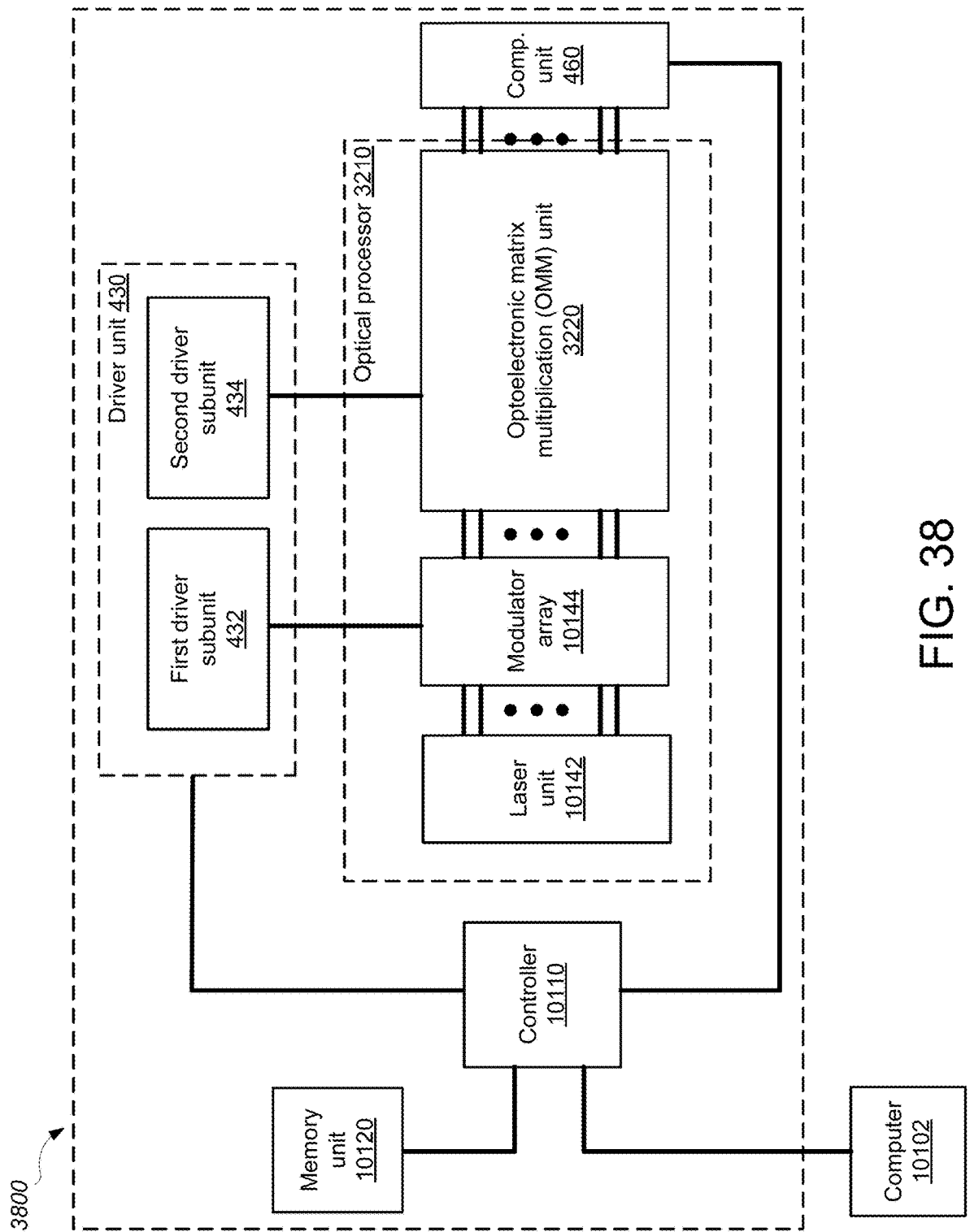
FIG. 38 is a schematic diagram of an example of an artificial neural network computation system with 1-bit internal resolution, in which the system uses an optoelectronic matrix multiplication unit.
Figure 48A:
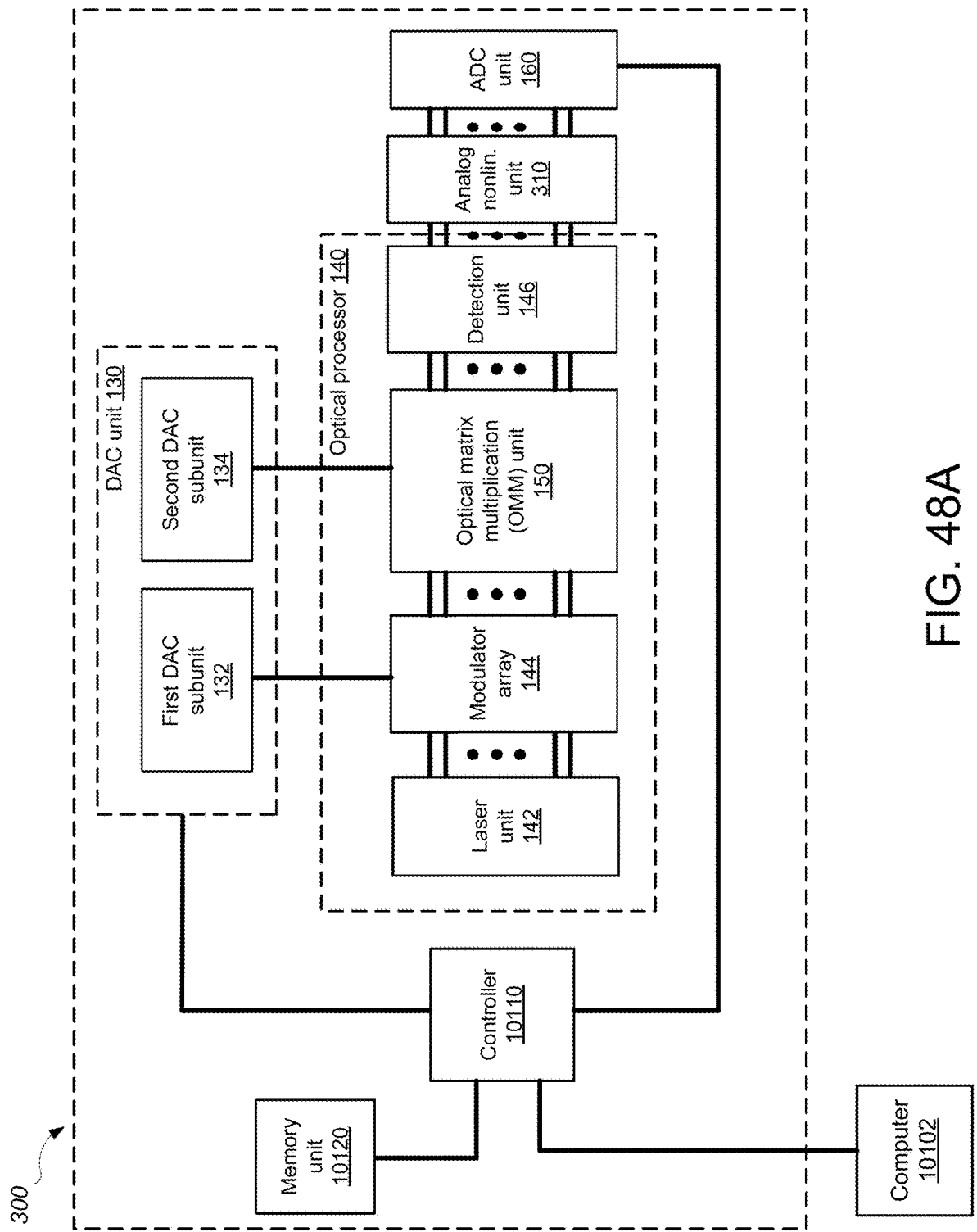
FIGS. 48A and 48B are schematic diagrams of examples of ANN computation systems.
Figure 48B:
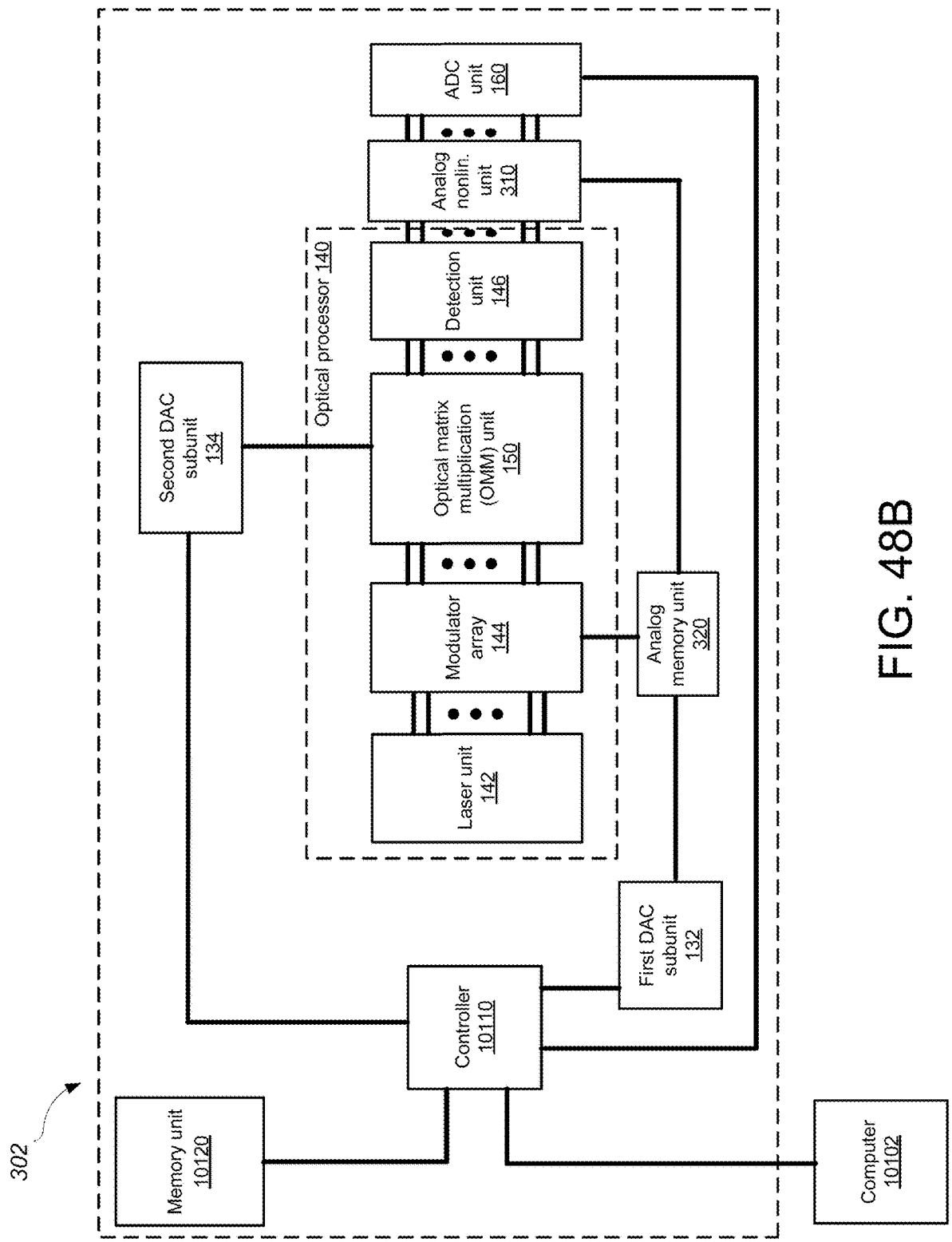

The advantages of using the analog memory unit 320 in the system 3700 are similar to those of using the analog memory unit 320 in the system 302 of FIG. 48B. Similarly, the execution of the recurrent neural network computation using the system 3700 can be similar to that of the system 302 of FIG. 48B. As discussed below for the system 400 of FIG. 49A, there are advantages (e.g., reduced power consumption) by using an ANN computation system that internally operates at a bit resolution lower than the resolution of the input dataset while maintaining the resolution of the ANN computation output. Referring to FIG. 38, a schematic diagram of an example of an artificial neural network (ANN) computation system 3800 with 1-bit internal resolution is shown. The ANN computation system 3800 is similar to the ANN computation system 3200 (FIG. 32A), but differs in that the DAC unit 130 is now replaced by a driver unit 430, and the ADC unit 160 is now replaced by a comparator unit 460.

Figure 49A:
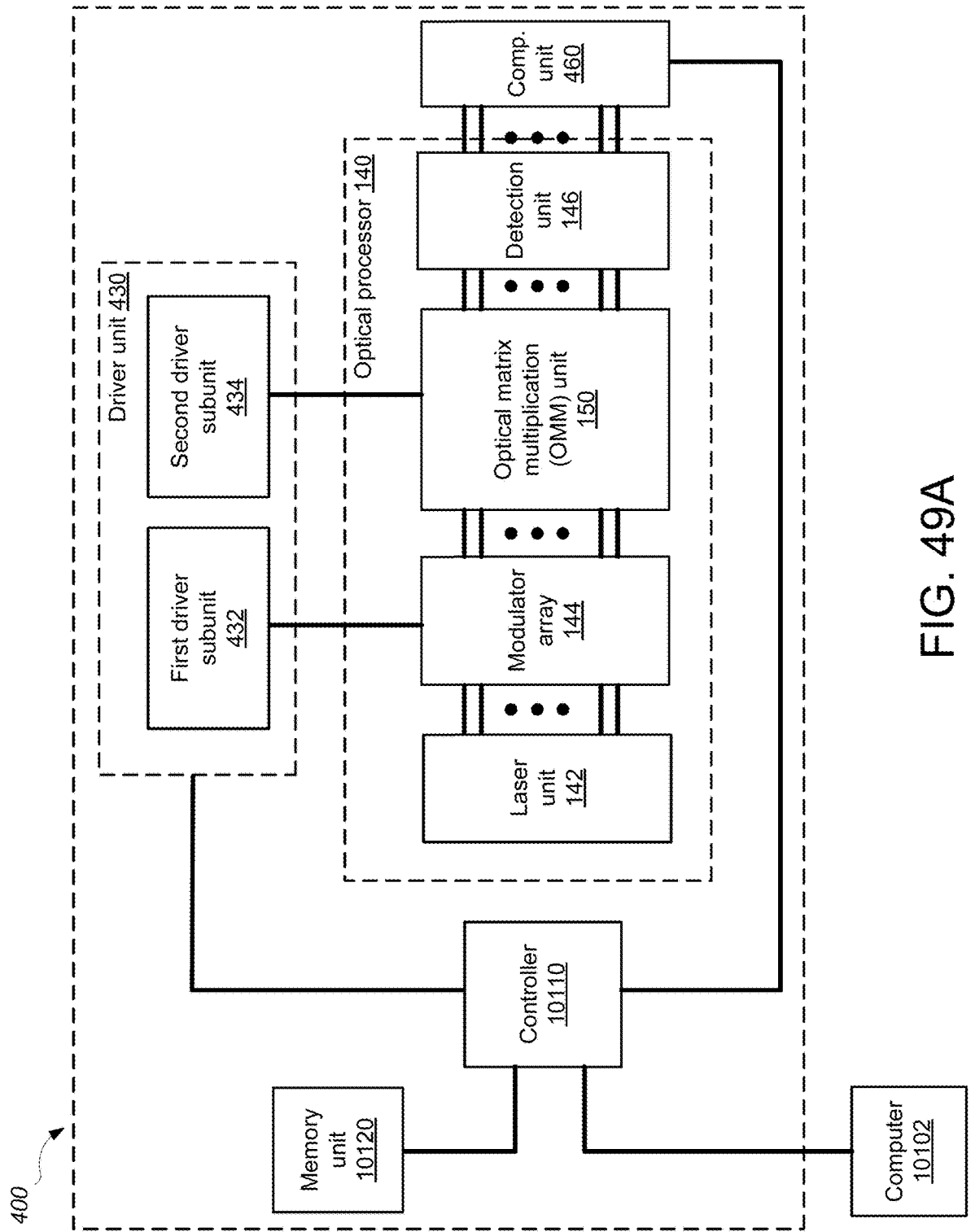
FIG. 49A is a schematic diagram of an example of an ANN computation system with 1-bit internal resolution.

The driver unit 430 and the comparator unit 460 in the system 3800 of FIG. 38 operate in a manner similar to the driver unit 430 and the comparator 460 in the system 400 of FIG. 49A. A mathematical representation of the operation of the ANN computation system 3800 in FIG. 38 is similar to mathematical representation of the operation of the ANN computation system 400 shown in FIG. 49A.

The ANN computation system 3800 performs ANN computations by performing a series of matrix multiplication of 1-bit vectors followed by summation of the individual matrix multiplication result. Using the example shown in FIG. 49A, each of the decomposed input vectors $V_{bit0}$ through $V_{bit3}$ can be multiplied with the matrix U by generating, through the driver unit 430, a sequence of 4 1-bit modulator control signals corresponding to the 4 1-bit input vectors. This in turn generates a sequence of 4 1-bit optical input vectors, which is processed by the optoelectronic matrix multiplication unit 3220 configured through the driver unit 430 to implement matrix multiplication of matrix U. The controller 10110 can then obtain, from the comparator unit 460, a sequence of 4 digitized 1-bit optical outputs corresponding to the sequence of the 4 1-bit modulator control signals.

In this case where a 4-bit vector is decomposed into 4 1-bit vectors, each vector should be processed by the ANN computation system 3800 at four times the speed at which a single 4-bit vector can be processed by other ANN computation systems, such as the system 3200 (FIG. 32A), to maintain the same effective ANN computation throughput. Such increased internal processing speed can be viewed as time-division multiplexing of the 4 1-bit vectors into a single timeslot for processing a 4-bit vector. The needed increase in the processing speed can be achieved at least in part by the increased operating speeds of the driver unit 430 and the comparator unit 460 relative to the DAC unit 130 and the ADC unit 160, as a decrease in the resolution of a signal conversion process typically leads to an increase in the rate of signal conversion that can be achieved.

In this example, although the signal conversion rates are increased by a factor of four in 1-bit operations, the resulting power consumption can be significantly reduced relative to 4-bit operations. As previously described, power consumption of signal conversion processes typically scale exponentially with the bit resolution, while scaling linearly with the conversion rate. As such, a 16 fold reduction in power per conversion can result from the 4 fold reduction in the bit resolution, followed by a 4 fold increase in power from the increased conversion rate. Overall, a 4 fold reduction in operating power can be achieved by the ANN computation system 3800 over, for example, the ANN computation system 3200 while maintaining the same effective ANN computation throughput.

The controller 10110 can then construct a 4-bit digital output vector from the 4 digitized 1-bit optical outputs by multiplying each of the digitized 1-bit optical outputs with respective weights of $2^0$ through $2^3$. Once the 4-bit digital output vector is constructed, the ANN computation can proceed by performing a nonlinear transformation on the constructed 4-bit digital output vector to generate a transformed 4-bit digital output vector; and storing, in the memory unit 10120, the transformed 4-bit digital output vector.

Alternatively, or additionally, in some implementations, each of the 4 digitized 1-bit optical outputs can be nonlinearly transformed. For example, a step-function nonlinear function can be used for the nonlinear transformation. Transformed 4-bit digital output vector can then be constructed from the nonlinearly transformed digitized 1-bit optical outputs.

While a separate ANN computation system 3800 has been illustrated and described, in general, the ANN computation system 3200 of FIG. 32A can be designed to implement functionalities analogous to that of the ANN computation system 3800. For example, the DAC unit 130 can include a 1-bit DAC subunit configured to generate 1-bit modulator control signals, and the ADC unit 160 can be designed to have a resolution of 1-bit. Such a 1-bit ADC can be analogous to, or effectively equivalent to, a comparator.

Further, while operation of an ANN computation system with 1-bit internal resolution has been described, in general, the internal resolution of an ANN computation system can be reduced to an intermediate level lower than the N-bit resolution of the input dataset. For example, the internal resolution can be reduced to $2^Y$ bits, where Y is an integer greater than or equal to 0.

A variety of alternative system configurations or signal processing techniques can be used with various implementations of the different systems, subsystems, and modules described herein.

In some embodiments, it may be useful for some or all of the VMM subsystems to be replaceable with alternative subsystems, including subsystems that use different implementations of the various copying modules, multiplication modules, and/or summation modules. For example, a VMM subsystem can include the optical copying modules described herein and the electrical summation modules described herein, but the multiplication modules can be replaced with a subsystem that performs the multiplication operations in the electrical domain instead of the optoelectronic domain. In such examples, the array of optical amplitude modulators can be replaced by an array of detectors to convert optical signals to electrical signals, followed by an electronic subsystem (e.g., an ASIC, processor, or SoC). Optionally, if optical signal routing is to be used to the summation modules that are configured to detect optical signals, the electronic subsystem can include electrical to optical conversion, for example, using an array of electrically-modulated optical sources.

In some embodiments, it may be useful to be able to use a single wavelength for some or all of the optical signals being used for some or all of the VMM computations. Alternatively, in some embodiments, to help reduce the number of optical input ports that may be required, an input port can receive a multiplexed optical signal that has different values encoded on different optical waves at different wavelengths. Those optical waves can then be separated at an appropriate location in the system, depending on whether any of the copying modules, multiplication modules, and/or summation modules are configured to operate on multiple wavelengths. But, even in the multi-wavelength embodiments, it may be useful to use the same wavelength for different subsets of optical signals, for example, used in the same VMM subsystem.

In some embodiments, an accumulator can be used to enable a time domain encoding of the optical and electrical signals received by the various modules, alleviating the need for the electronic circuitry to operate effectively over a large number of different power levels. For example, a signal that is encoded using binary (on-off) amplitude modulation with a particular duty cycle over N time slots per symbol, can be converted into a signal that has N amplitude levels per symbol after that signal is passed through the accumulator (an analog electronic accumulator that integrates the current or voltage of an electrical signal). So, if the optical devices (e.g., the phase modulators in the optical amplitude modulators) are capable of operating at a symbol bandwidth B, they can be operated instead at a symbol bandwidth B/100, where each symbol value uses N=100 time slots. An integrated amplitude of 50% has a 50% duty cycle (e.g., the first 50 time slots at the non-zero "on" level, followed by 50 time slots at the zero, or near zero, "off" level), whereas an integrated amplitude of 10% has a 10% duty cycle (e.g., the first 10 time slots at the non-zero "on" level, followed by 90 time slots at zero "off" level). In the examples described herein, such an accumulator can be positioned on the path of each electrical signal at any location within the VMM subsystem that is consistent for each electrical signal, such as for example, before the summation modules for all electrical signals in that VMM subsystem or after the summation modules for all electrical signals in that VMM subsystem. The VMM subsystem can also be configured such that there are no significant relative time shifts between different electrical signals preserving alignment of the different symbols.

Figure 40:
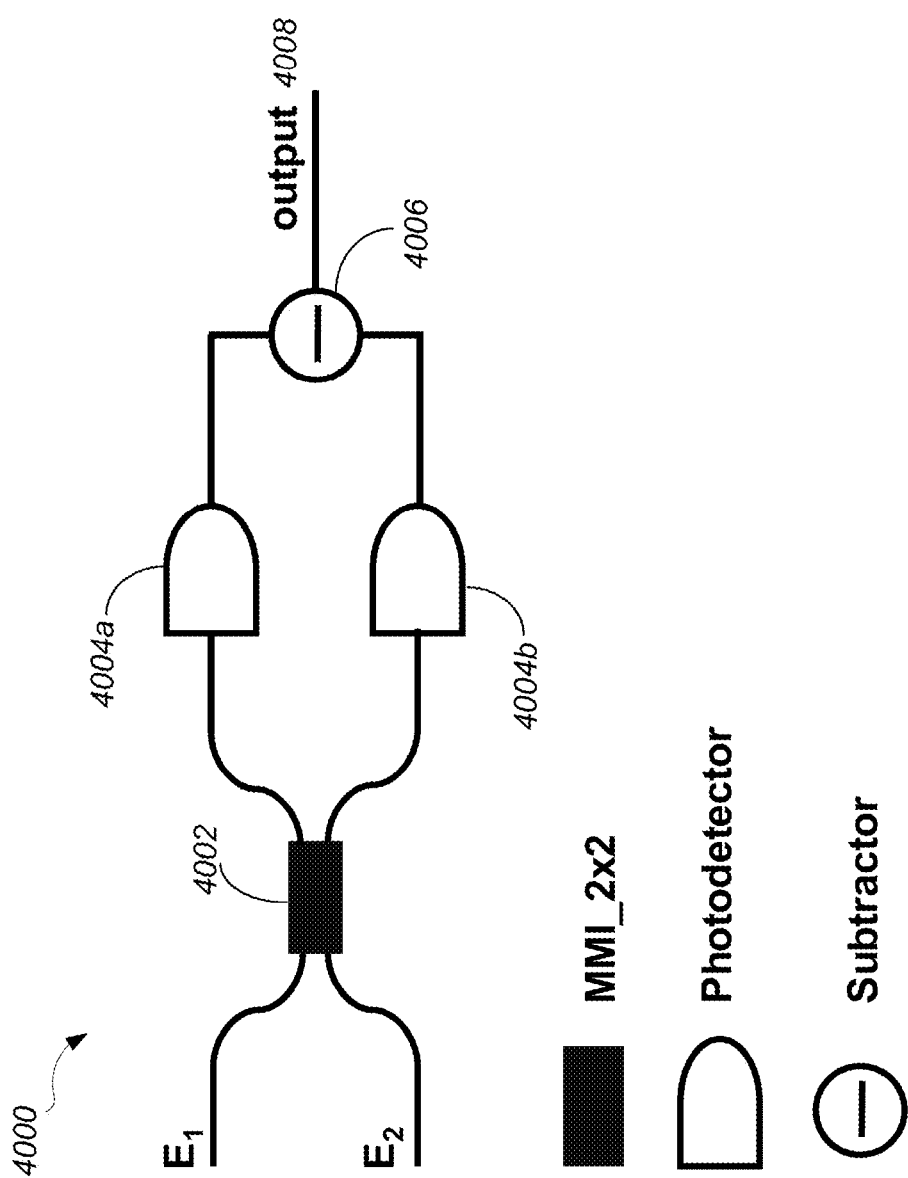
FIG. 40 is a schematic diagram of a homodyne detector.

Referring to FIG. 40, in some implementations, homodyne detection can be used to obtain the phase and the amplitude of the modulated signal. A homodyne detector 4000 includes a beam splitter 4002 that includes a 2×2 multi-mode interference (MMI) coupler, two photodetectors 4004a and 4004b, and a subtractor 4006. The beam splitter 4002 receives input signals $E_1$ and $E_2$, the outputs of the beam splitter 4002 are detected by the photodetectors 4004a and 4004b. For example, the input signal $E_1$ can be the signal to be detected, and the input signal $E_2$ can be generated by a local oscillator that has a constant laser power. The local oscillator signal $E_2$ is mixed with the input signal $E_1$ by the beam splitter 4002 before the signals are detected by the photodetectors 4004a and 4004b. The subtractor 4006 outputs the difference between the outputs of the photodetectors 4004a and 4004b. The output 4008 of the subtractor 4006 is proportional to $|E_1||E_2|\sin(\theta)$, in which $|E_1|$ and $|E_2|$ are the amplitudes of two input optical fields, $\theta$ is their relative phase. Since the output is related to the product of two optical fields, it can detect an extremely weak optical signal, even in single-photon level.

For example, the homodyne detector 4000 can be used in the systems shown in FIGS. 18-24E, 26-32B, 35A-38, 46A, 46F, 48A-49A, 50, 52, and 54. The homodyne detector 4000 provides gain on the signal and hence better signal noise ratio. For coherent systems, the homodyne detector 4000 provides the added benefit of revealing the phase information of the signal via the polarity of the detection result.

In the example of FIG. 19B, the system 1920 includes a 2×2-element matrix, in which two input vector elements are encoded on two optical signals using two different respective wavelengths $\lambda_1$ and $\lambda_2$. The two optical signals can be provided to the system 1920 using, e.g., two optical fibers. For example, a system that performs matrix processing on 4×4 matrices can receive four input optical signals carried on four optical fibers. Although more optical fibers can be used to carry more input optical signals for systems that process larger matrices, because the coupling between an optical fiber and an optoelectronics chip takes up considerable space, it is difficult to couple a large number of optical fibers to an optoelectronics chip.

A way to reduce the number of optical fibers required to carry optical signals to an optoelectronics chip is to use wavelength division multiplexing. Multiple optical signals having different wavelengths can be multiplexed and transmitted using a single optical fiber. For example, referring to FIG. 41, in a computation system 4100, a first light signal 4102 having a wavelength $\lambda_1$ is modulated by a first modulator 4104 to produce a first modulated optical signal 4120 representing a first input vector element V1. A second light signal 4106 having a wavelength $\lambda_2$ is modulated by a second modulator 4108 to produce a second modulated optical signal 4122 representing a second input vector element V2. The first and second modulated optical signals are combined by a multiplexer 4110 to produce a wavelength division multiplexed signal that is transmitted via an optical fiber 4112 to an optoelectronics chip 4114 that includes a plurality of matrix multiplication modules, e.g., 4116a, 4116b, 4116c, and 4116d (collectively referenced as 4116), and 4118a, 4118b, 4118c, and 4118d (collectively referenced as 4118).

Inside the optoelectronics chip 4114, the wavelength division multiplexed signal is demultiplexed by a demultiplexer 4118 to separate the optical signals 4120 and 4122. In this example, the optical signal 4120 is copied by a copying module 4124 to produce copies of optical signals that are sent to the matrix multiplication modules 4116a and 4118a. The optical signal 4122 is copied by a copying module 4126 to produce copies of optical signals that are sent to the matrix multiplication modules 4116b and 4118b. The outputs of the matrix multiplication units 4116a and 4116b are combined using an optical coupler 4120a, and the combined signal is detected by a photodetector 4122a.

A third light signal 4124 having a wavelength $\lambda_1$ is modulated by a third modulator 4128 to produce a third modulated optical signal 4132 representing a third input vector element V3. A fourth light signal 4126 having a wavelength $\lambda_2$ is modulated by a fourth modulator 4130 to produce a fourth modulated optical signal 4134 representing a fourth input vector element V4. The third and fourth modulated optical signals are combined by a multiplexer 4136 to produce a wavelength division multiplexed signal that is transmitted via an optical fiber 4138 to the optoelectronics chip 4114.

Inside the optoelectronics chip 4114, the wavelength division multiplexed signal provided by the optical fiber 4138 is demultiplexed by a demultiplexer 4140 to separate the optical signals 4132 and 4134. In this example, the optical signal 4132 is copied by a copying module 4142 to produce copies of optical signals that are sent to the matrix multiplication modules 4116c and 4118c. The optical signal 4134 is copied by a copying module 4144 to produce copies of optical signals that are sent to the matrix multiplication modules 4116d and 4118d. The outputs of the matrix multiplication units 4116c and 4116d are combined using an optical coupler 4120b, and the combined signal is detected by a photodetector 4122b. The outputs of the matrix multiplication units 4118a and 4118b are combined using an optical coupler, and the combined signal is detected by a photodetector. The outputs of the matrix multiplication units 4118c and 4118d are combined using an optical coupler, and the combined signal is detected by a photodetector.

In some examples, a multiplexer can multiplex optical signals having three or more (e.g., 10, or 100) wavelengths to produce a wavelength division multiplexed signal that is transported by a single optical fiber, and a demultiplexer inside the optoelectronics chip can demultiplex the wavelength division multiplexed signal to separate the signals having different wavelengths. This allows more optical signals be transmitted to the optoelectronics chip in parallel through the optical fibers, increasing the data processing throughput of the optoelectronics chip.

Figure 46A:
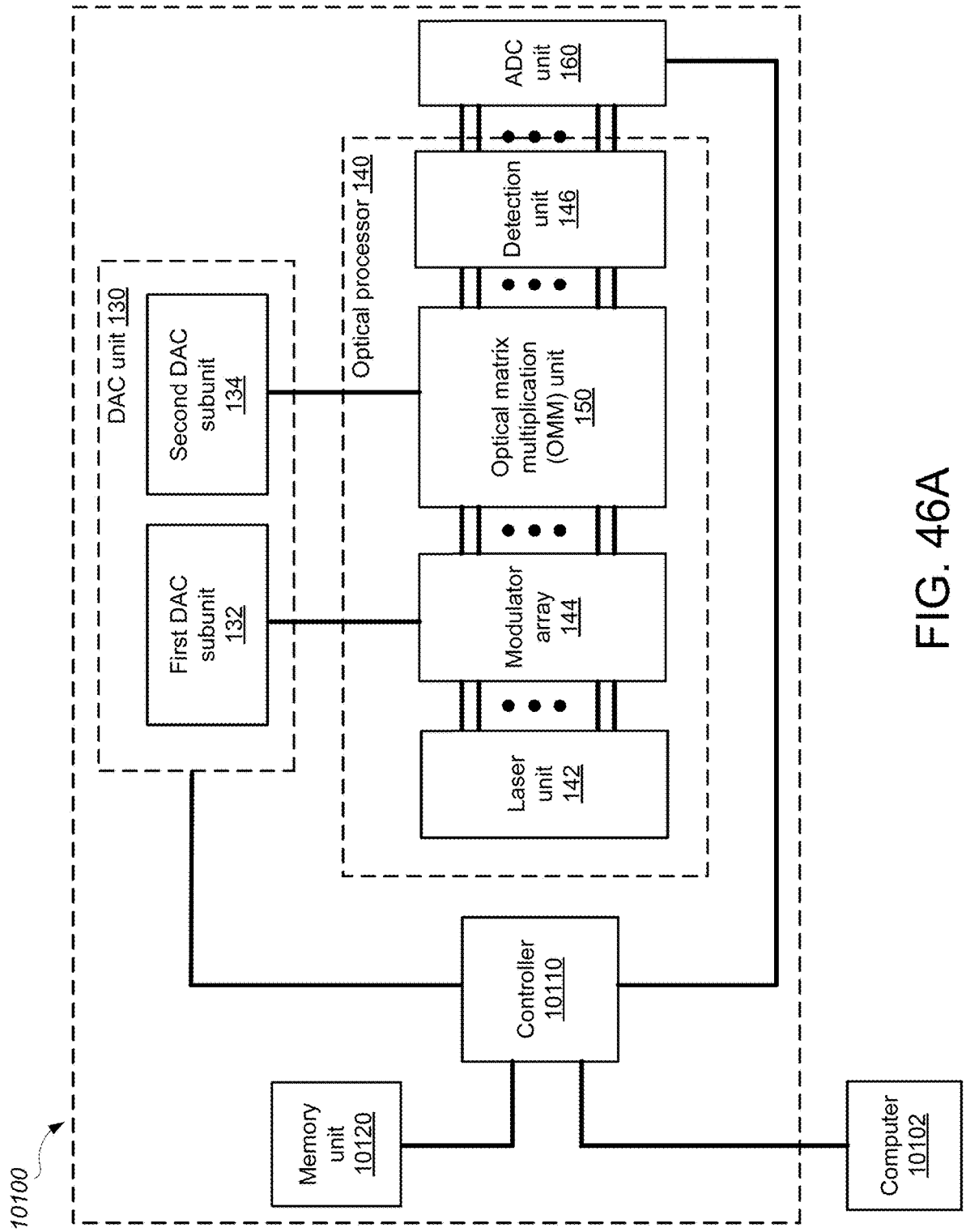
FIG. 46A is a schematic diagram of an example of an artificial neural network (ANN) computation system.

In some examples, the laser unit 142 of FIG. 46A includes a single laser that provides an optical wave that can be modulated with different optical signals. In that case, the optical waves in the various waveguides of the system have common wavelengths that are substantially identical to each other, within the resolution of the line width of the laser. For example, the optical waves can have wavelengths that are within 1 nm of one another. However, the laser unit 142 can also include multiple lasers that enable wavelength division multiplexed operation using different optical signals modulated onto different respective optical waves (e.g., each with a line width of 1 nm or less). The different optical waves can have peak wavelengths that are separated from each other by wavelength distances greater than the line widths of the individual lasers (e.g., by more than 1 nm). In some examples, wavelength division multiplexed systems can use optical signals modulated onto optical waves having wavelengths that are a few nanometers (e.g., 3 nm or more) apart. However, if the demultiplexer has better resolution, the differences between different wavelengths in the WDM system can also be less than 3 nm.

The digital controller (e.g., for controlling the components shown in FIG. 24E) and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

Figure 42:
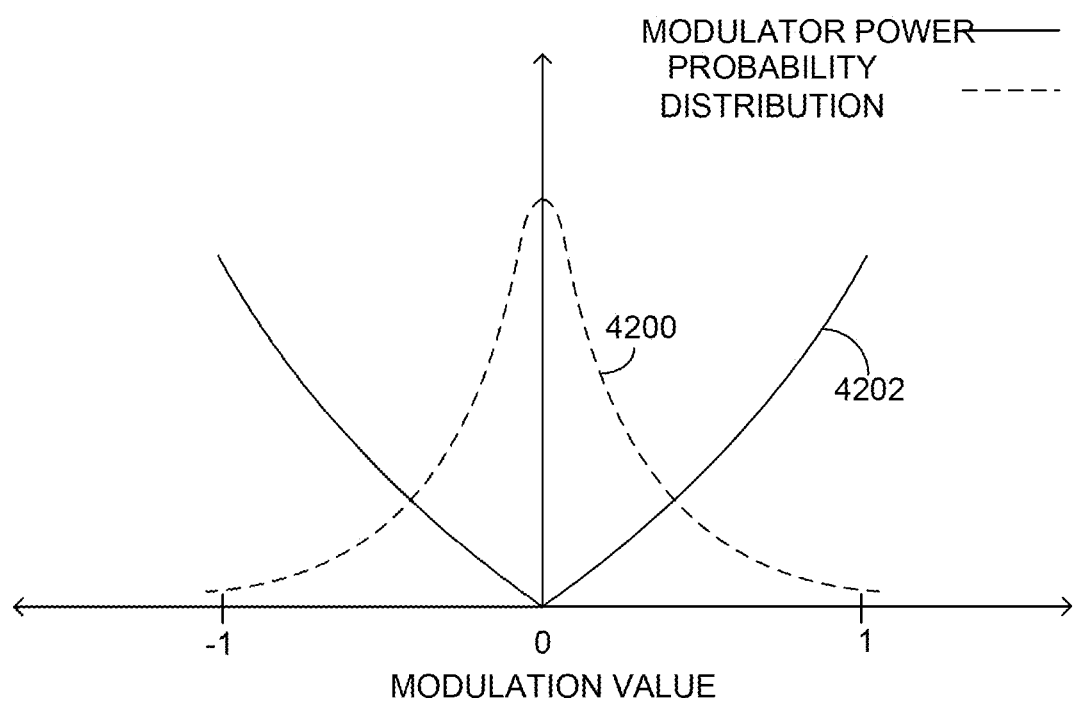
FIG. 42 is a graph of an example modulation value probability distribution and an example relationship between modulator power and modulation value.

For example, FIG. 42 shows the probability distribution function of a data set in which small coefficients appear more frequently. In another example, suppose a data set has characteristics such that a probability distribution function (PDF) of the coefficients yields higher probabilities for (and thus more frequent instances of) large coefficients (i.e., coefficients with relatively large absolute values). For such data sets ("high-coefficient weighted data sets"), reduced power consumption can be achieved by designing the modulators such that the modulators operate in lower power states for computations using larger coefficients (which appear more often in the data sets), and operate in higher power states for computations using smaller coefficients (which appear less often in the data sets).

The following are additional examples of photonic computing systems that can incorporate the various techniques described in this specification, such as using the photonic integrated circuit as an interposer for other components, or the fabrication processes for assembling and aligning different components of the photonic computing system.

FIG. 46A shows a schematic diagram of an example of an artificial neural network (ANN) computation system 10100. The system 10100 includes a controller 10110, a memory unit 10120, a digital-to-analog converter (DAC) unit 130, an optical processor 140, and an analog-to-digital converter (ADC) unit 160. The controller 10110 is coupled to a computer 10102, the memory unit 10120, the DAC unit 130, and the ADC unit 160. The controller 10110 includes integrated circuitry that is configured to control the operation of the ANN computation system 10100 to perform ANN computations.

The integrated circuitry of the controller 10110 may be an application specific integrated circuit specifically configured to perform the steps of an ANN computation process. For example, the integrated circuitry may implement a microcode or a firmware specific to performing the ANN computation process. As such, the controller 10110 may have a reduced set of instructions relative to a general purpose processor used in conventional computers, such as the computer 10102. In some implementations, the integrated circuitry of the controller 10110 may include two or more circuitries configured to perform different steps of the ANN computation process.

In an example operation of the ANN computation system 10100, the computer 10102 may issue an artificial neural network computation request to the ANN computation system 10100. The ANN computation request may include neural network weights that define an ANN, and an input dataset to be processed by the provided ANN. The controller 10110 receives the ANN computation request, and stores the input dataset and the neural network weights in the memory unit 10120.

The input dataset may correspond to various digital information to be processed by the ANN. Examples of the input dataset include image files, audio files, LiDAR point cloud, and GPS coordinates sequences, and the operation of the ANN computation system 10100 will be described based on receiving an image file as the input dataset. In general, the size of the input dataset can vary greatly, from hundreds of data points to millions of data points or larger. For example, a digital image file with a resolution of 1 megapixel has approximately one million pixels, and each of the one million pixels may be a data point to be processed by the ANN. Due to the large number of data points in a typical input dataset, the input dataset is typically divided into multiple digital input vectors of smaller size to be individually processed by the optical processor 140. As an example, for a greyscale digital image, the elements of the digital input vectors may be 8-bit values representing the intensity of the image, and the digital input vectors may have a length that ranges from 10's of elements (e.g., 32 elements, 64 elements) to hundreds of elements (e.g., 256 elements, 512 elements). In general, input dataset of arbitrary size can be divided into digital input vectors of a size suitable for processing by the optical processor 140. In cases where the number of elements of the input dataset is not divisible by the length of the digital input vector, zero padding can be used to fill out the data set to be divisible by the length of the digital input vector. The processed outputs of the individual digital input vectors can be processed to reconstruct a complete output that is a result of processing the input dataset through the ANN. In some implementations, the dividing of the input data set into multiple input vectors and subsequent vector-level processing may be implemented using block matrix multiplication techniques.

The neural network weights are a set of values that define the connectivity of the artificial neurons of the ANN, including the relative importance, or weights, of those connections. An ANN may include one or more hidden layers with respective sets of nodes. In the case of an ANN with a single hidden layer, the ANN may be defined by two sets of neural network weights, one set corresponding to the connectivity between the input nodes and the nodes of the hidden layer, and a second set corresponding to the connectivity between the hidden layer and the output nodes. Each set of neural network weights that describes the connectivity corresponds to a matrix to be implemented by the optical processor 140. For ANNs with two or more hidden layers, additional sets of neural network weights are needed to define the connectivity between the additional hidden layers. As such, in general, the neural network weights included in the ANN computation request may include multiple sets of neural network weights that represent the connectivity between various layers of the ANN.

As the input dataset to be processed is typically divided into multiple smaller digital input vectors for individual processing, the input dataset is typically stored in a digital memory. However, the speed of memory operations between a memory and a processor of the computer 10102 is significantly slower than the rate at which the ANN computation system 10100 can perform ANN computations. For example, the ANN computation system 10100 can perform tens to hundreds of ANN computations during a typical memory read cycle of the computer 10102. As such, the rate at which ANN computations can be performed by the ANN computation system 10100 may be limited below its full processing rate if an ANN computation by the ANN computation system 10100 involves multiple data transfers between the system 10100 and the computer 10102 during the course of processing an ANN computation request. For example, if the computer 10102 were to access the input dataset from its own memory and provide the digital input vectors to the controller 10110 when requested, the operation of the ANN computation system 10100 would likely be greatly slowed down by the time needed for the series of data transfers that would be needed between the computer 10102 and the controller 10110. It should be noted that a memory access latency of the computer 10102 is typically non-deterministic, which further complicates and degrades the speed at which digital input vectors can be provided to the ANN computation system 10100. Further, the processor cycles of the computer 10102 may be wasted on managing the data transfer between the computer 10102 and the ANN computation system 10100.

Instead, in some implementations, the ANN computation system 10100 stores the entire input dataset in the memory unit 10120, which is a part of and is dedicated for use by the ANN computation system 10100. The dedicated memory unit 10120 allows transactions between the memory unit 10120 and the controller 10110 to be specifically adapted to allow a smooth and uninterrupted flow of data between the memory unit 10120 and the controller 10110. Such uninterrupted flow of data may significantly improve the overall throughput of the ANN computation system 10100 by allowing the optical processor 140 to perform matrix multiplication at its full processing rate without being limited by slow memory operations of a conventional computer such as the computer 10102. Further, because all of the data needed in performing the ANN computation is provided by the computer 10102 to the ANN computation system 10100 in a single transaction, the ANN computation system 10100 may perform its ANN computation in a self-contained manner independent of the computer 10102. This self-contained operation of the ANN computation system 10100 offloads the computation burden from the computer 10102 and removes external dependencies in the operation of the ANN computation system 100, improving the performances of both the system 10100 and the computer 10102.

The internal operations of the ANN computation system 10100 will now be described. The optical processor 140 includes a laser unit 142, a modulator array 144, a detection unit 146, and an optical matrix multiplication (OMM) unit 150. The optical processor 140 operates by encoding a digital input vector of length N onto an optical input vector of length N and propagating the optical input vector through the OMM unit 150. The OMM unit 150 receives the optical input vector of length N and performs, in the optical domain, an N×N matrix multiplication on the received optical input vector. The N×N matrix multiplication performed by the OMM unit 150 is determined by an internal configuration of the OMM unit 150. The internal configuration of the OMM unit 150 may be controlled by electrical signals, such as those generated by the DAC unit 130.

Figure 46B:
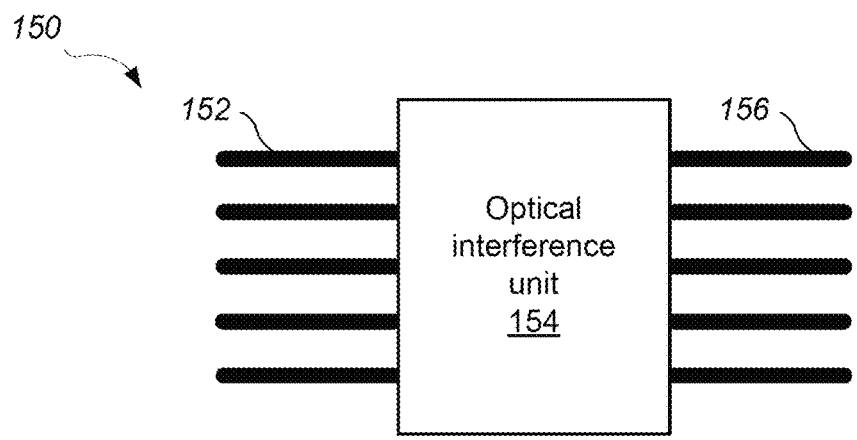
FIG. 46B is a schematic diagram of an example of an optical matrix multiplication unit.

The OMM unit 150 may be implemented in various ways. FIG. 46B shows a schematic diagram of an example of the OMM unit 150. The OMM unit 150 may include an array of input waveguides 152 to receive the optical input vector; an optical interference unit 154 in optical communication with the array of input waveguides 152; and an array of output waveguides 156 in optical communication with the optical interference unit 154. The optical interference unit 154 performs a linear transformation of the optical input vector into a second array of optical signals. The array of output waveguides 156 guides the second array of optical signals output by the optical interference unit 154. At least one input waveguide in the array of input waveguides 152 is in optical communication with each output waveguide in the array of output waveguides 156 via the optical interference unit 154. For example, for an optical input vector of length N, the OMM unit 150 may include N input waveguides 152 and N output waveguides 156.

Figure 46C:
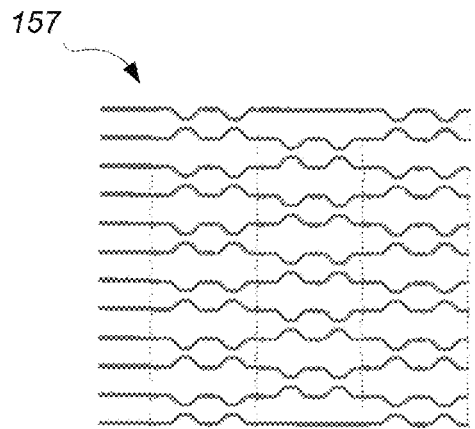
FIGS. 46C and 46D are schematic diagrams of example configurations of interconnected Mach-Zehnder interferometers (MZIs).
Figure 46D:
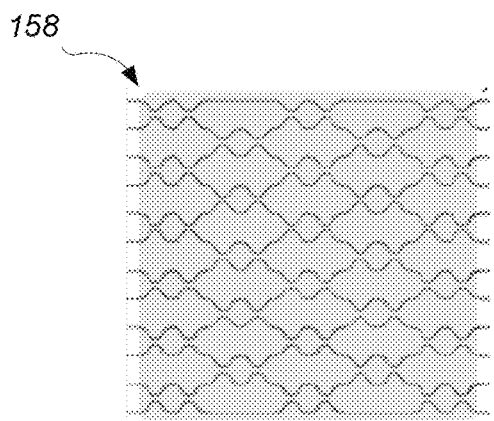

The optical interference unit may include a plurality of interconnected Mach-Zehnder interferometers (MZIs). FIGS. 46C and 46D shows schematic diagrams of example configurations 157 and 158 of interconnected MZIs. The MZIs can be interconnected in various ways, such as in configurations 157 or 158 to achieve linear transformation of the optical input vectors received through the array of input waveguides 152.

Figure 46E:
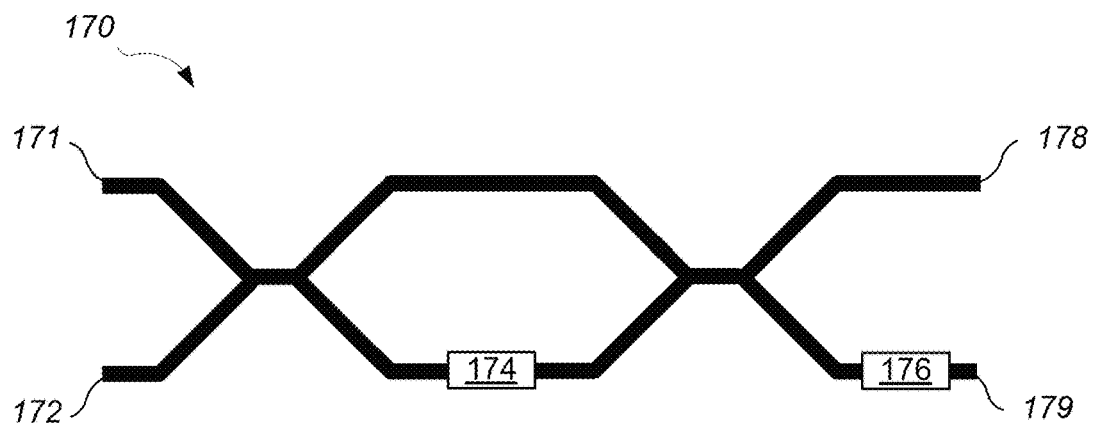
FIG. 46E is a schematic diagram of an example of an MZI.

FIG. 46E shows a schematic diagram of an example of an MZI 170. The MZI 170 includes a first input waveguide 171, a second input waveguide 172, a first output waveguide 178, and a second output waveguide 179. Further, each MZI 170 in the plurality of interconnected MZIs include a first phase shifter 174 configured to change a splitting ratio of the MZI 170; and a second phase shifter 176 configured to shift a phase of one output of the MZI 170, such as the light exiting the MZI 170 through the second output waveguide 179. The first phase shifters 174 and the second phase shifters 176 of the MZIs 170 are coupled to the plurality of weight control signals generated by the DAC unit 130. The first and second phase shifters 174 and 176 are examples of reconfigurable elements of the OMM unit 150. Examples of the reconfiguring elements include thermo-optic phase shifters or electro-optic phase shifters. Thermo-optic phase shifters operate by heating the waveguide to change the refractive index of the waveguide and cladding materials, which translates to a change in phase. Electro-optic phase shifters operate by applying an electric field (e.g., LiNbO3, reverse bias PN junctions) or electrical current (e.g., forward bias PIN junctions), which changes the refractive index of the waveguide material. By varying the weight control signals, the phase delays of the first and second phase shifters 174 an 176 of each of the interconnected MZIs 170 can be varied, which reconfigures the optical interference unit 154 of the OMM unit 150 to implement a particular matrix multiplication that is determined by the phase delays set across the entire optical interference unit 154. Additional embodiments of the OMM unit 150 and the optical interference unit 154 are disclosed in U.S. Patent Publication No. US 2017/0351293 A1 titled "APPARATUS AND METHODS FOR OPTICAL NEURAL NETWORK," which is fully incorporated by reference herein.

The optical input vector is generated through the laser unit 142 and the modulator array 144. The optical input vector of length N has N independent optical signals that each have an intensity that corresponds to the value of respective element of the digital input vector of length N. As an example, the laser unit 142 may generate N light outputs. The N light outputs are of the same wavelength, and are optically coherent. Optical coherence of the light outputs allow the light outputs to optically interfere with each other, which is a property utilized by the OMM unit 150 (e.g., in the operation of the MZIs). Further, the light outputs of the laser unit 142 may be substantially identical to each other. For example, the N light outputs may be substantially uniform in their intensities (e.g., within 5%, 3%, 1%, 0.5%, 0.1% or 0.01%) and in their relative phases (e.g., within 10 degrees, 5 degrees, 3 degrees, 1 degree, 0.1 degree). The uniformity of the light outputs may improve the faithfulness of the optical input vector to the digital input vector, improving the overall accuracy of the optical processor 140. In some implementations, the light outputs of the laser unit 142 may have optical powers that range from 0.1 mW to 50 mW per output, wavelengths in the near infrared range (e.g., between 900 nm and 1600 nm), and linewidths less than 1 nm. The light outputs of the laser unit 142 may be single transverse-mode light outputs.

In some implementations, the laser unit 142 includes a single laser source and an optical power splitter. The single laser source is configured to generate laser light. The optical power splitter is configured to split the light generated by the laser source into N light outputs of substantially equal intensities and phase. By splitting a single laser output into multiple outputs, optical coherence of the multiple light outputs may be achieved. The single laser source may be, for example, a semiconductor laser diode, a vertical-cavity surface-emitting laser (VCSEL), a distributed feedback (DFB) laser, or a distributed Bragg reflector (DBR) laser. The optical power splitter may be, for example, a 1:N multimode interference (MMI) splitter, a multi-stage splitter including multiple 1:2 MMI splitter or directional-couplers, or a star coupler. In some other implementations, a master-slave laser configuration may be used, where the slave lasers are injection locked by the master laser to have a stable phase relationship to the master laser.

The light outputs of the laser unit 142 are coupled to the modulator array 144. The modulator array 144 is configured to receive the light inputs from the laser unit 142 and modulate the intensities of the received light inputs based on modulator control signals, which are electrical signals. Examples of modulators include Mach-Zehnder Interferometer (MZI) modulators, ring resonator modulators, and electro-absorption modulators. The modulator array 144 has N modulators that each receives one of the N light outputs of the laser unit 142. A modulator receives a control signal that corresponds to an element of the digital input vector and modulates the intensity of the light. The control signal may be generated by the DAC unit 130.

The DAC unit 130 is configured to generate multiple modulator control signals and to generate multiple weight control signals under the control of the controller 10110. For example, the DAC unit 130 receives, from the controller 10110, a first DAC control signal that corresponds to the digital input vectors to be processed by the optical processor 140. The DAC unit 130 generates, based on the first DAC control signal, the modulator control signals, which are analog signals suitable for driving the modulator array 144 and the OMM 150. The analog signals may be voltages or currents, for example, depending on the technology and design of the modulators of the array 144 and the OMM 150. The voltages may have an amplitude that ranges from, e.g., +0.1 V to ±10 V, and the current may have an amplitude that ranges from, e.g., 100 µA to 100 mA. In some implementations, the DAC unit 130 may include modulator drivers that are configured to buffer, amplify, or condition the analog signals so that the modulators of the array 144 and the OMM 150 may be adequately driven. For example, some types of modulators may be driven with a differential control signal. In such cases, the modulator drivers may be differential drivers that produce a differential electrical output based on a single-ended input signal. As another example, some types of modulators may have a 3 dB bandwidth that is less than a desired processing rate of the optical processor 140. In such cases, the modulator drivers may include pre-emphasis circuits or other bandwidth-enhancing circuits that are designed to extend the operating bandwidth of the modulators. Such bandwidth-enhancement can be useful, for example, with modulators that are based on PIN diode structures forward-biased to use carrier injection for modulating a refractive index of a portion of a waveguide that is guiding an optical wave being modulated. For example, if the modulator is an MZI modulator, the PIN diode structure can be used to implement a phase shifter in one or both arms of the MZI modulator. Configuring the phase shifter for forward-biased operation facilitates shorter modulator lengths and more compact overall design, which may be useful for an OMM unit 150 with a large number of modulators.

For example, in a pre-emphasis form of bandwidth-enhancement, an analog electrical signal (e.g., voltage or current) that drives a modulator can be shaped to include a transient pulse that overshoots a change in an analog signal level that represents a given digital data value of a DAC control signal in a series of digital data values. Each digital data value may have any number of bits, including a single 1-bit data value, as assumed for the rest of this example. Thus, if a value of a bit is the same as a previous value, the analog electrical signal driving a modulator is maintained at a steady-state level (e.g., a signal level $X_0$ for a bit value of 0, and a higher signal level $X_1$ for a bit value of 1). However, if a bit changes from 0 to 1, the corresponding analog electrical signal used to drive the modulator can include a transient pulse with a peak value of $X_1+(X_1-X_0)$ at the onset of the bit transition before leveling off to a steady state value of $X_1$. Likewise, if a bit changes from 1 to 0, the corresponding analog electrical signal used to drive the modulator can include a transient pulse with a peak value of $X_0+(X_0-X_1)$ at the onset of the bit transition before leveling off to a steady state value of $X_0$. The size and length of the transient pulse can be selected to optimize the bandwidth enhancement (e.g., maximizing an open area of an eye diagram of a non-return-to-zero (NRZ) modulation pattern).

Figure 44:
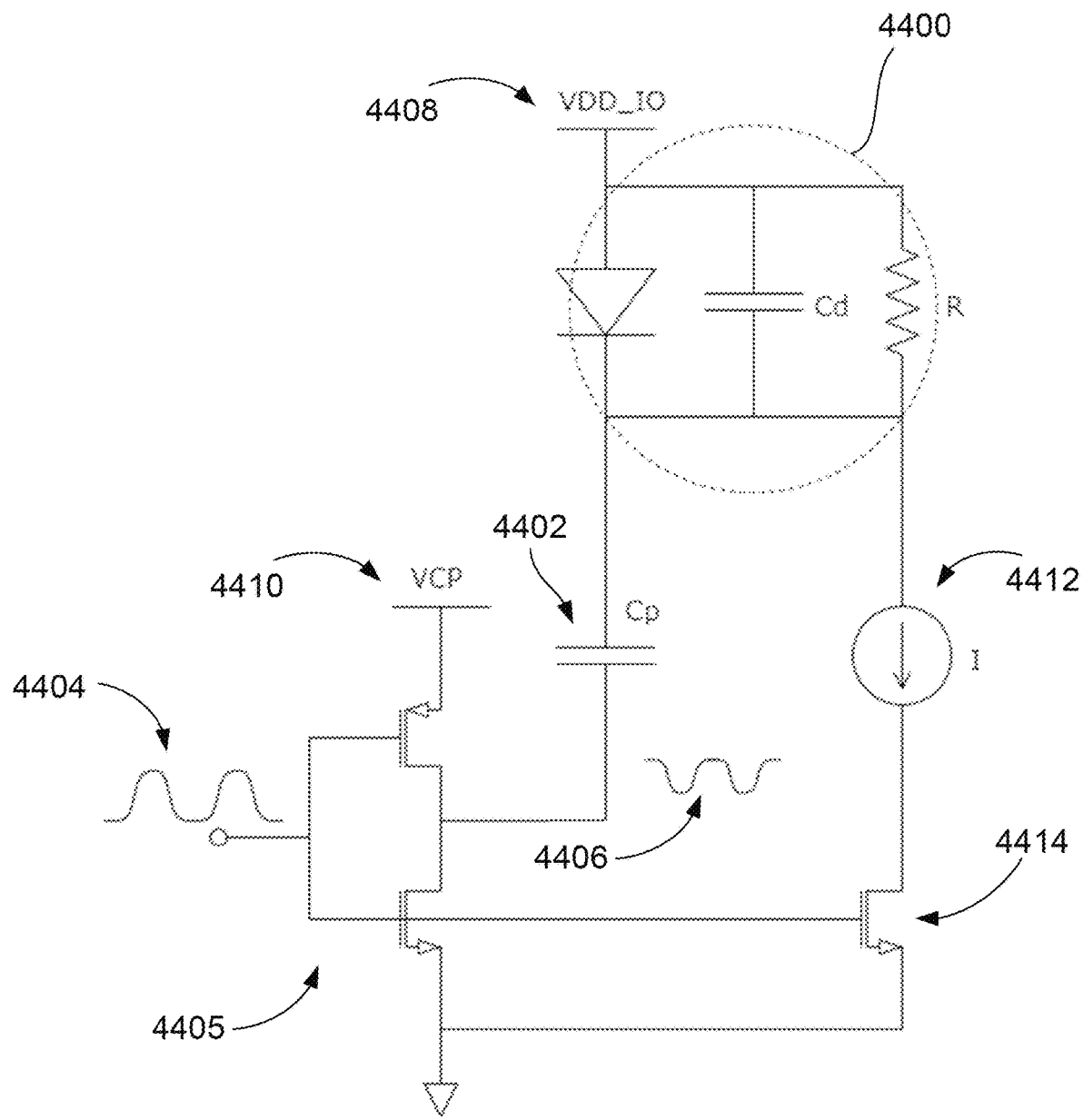
FIG. 44 is a diagram of an example of a charge-pump bandwidth-enhancing circuit.

In a charge-pump form of bandwidth-enhancement, an analog current signal that drives a modulator can be shaped to include a transient pulse that moves a precisely determined amount of charge. FIG. 44 shows an example implementation a charge-pump bandwidth-enhancing circuit that uses a capacitor connected in series between a voltage source and a modulator for precise control of charge flow. A portion of the circuit shown in FIG. 44 can be included in the modulator drivers discussed above. In this example, the modulator is represented by a modulator circuit 4400 that models the electrical characteristics of the modulator's phase shifter as a PIN diode. The modulator circuit 4400 includes a parallel connection of an ideal diode, a capacitor having capacitance $C_d$, and a resistor having resistance R. A pump capacitor 4402 has a capacitance $C_p$. A control voltage waveform 4404 is provided to an inverter circuit 4405 to generate a driving voltage waveform 4406 whose amplitude can be precisely calibrated to move a predetermined amount of charge to or from the modulator circuit 4400 via the pump capacitor 4402. The PIN diode modeled by the modulator circuit 4400 is forward-biased by applying a constant voltage VDD_IO at a terminal 4408. A charge-pump control voltage VCP is applied at a terminal 4410 of the inverter 4405 to control the amount of charge pumped upon transitions in the driving voltage waveform 4406, and the corresponding optical phase shift applied by the modulator.

The value of the voltage VCP can be tuned before operation such that a nominal charge Q stored in the charge pump capacitor 4402 is precisely calibrated based on a measured value of the capacitance $C_p$ (which may have some variability due to uncertainties during manufacturing, for example). For example, the voltage VCP may be equal to the nominal charge Q divided by the capacitance $C_p$. The resulting change in the refractive index of a portion of a waveguide intersecting the PIN diode can then provide a shift in phase of a guided optical wave that is linearly proportional to the amount of charge Q that is moved between the PIN diode (e.g., stored via the internal capacitance Ca) and the charge pump capacitor 4402. If the driving voltage is changing from a low value to a high value, an inflow of current from the charge pump capacitor 4402 to the PIN diode delivers a predetermined quantity of charge in a short amount of time (i.e., the integral of the positive current over time). If the driving voltage is changing from a high value to a low value, an outflow of current from the PIN diode to the charge pump capacitor 4402 removes a predetermined quantity of charge in a short amount of time (i.e., the integral of the negative current over time). After this relatively short switching time, a steady state current is provided by a current source 4412, controlled by a switch 4414, to replace the charge that was lost due to the internal capacitor losing current through the internal resistance R while the driving voltage is held (e.g., during a hold time of a particular digital value). The use of such a charge-pump configuration can have advantages such as better precision over other techniques (including some pre-emphasis techniques) since the amount of charge that moves in the short switching time is dependent on a constant physical parameter ($C_p$) and a steady state control value (VCP), and therefore is precisely controllable and repeatable.

In some implementations, reduced power consumption can be achieved by designing the modulators of the array 144 and/or the OMM 150 such that less power is consumed when operating the modulators to generate modulation values that represent coefficients that appear more frequently, and more power is consumed when operating the modulators to generate modulation values that represent coefficients that appear less frequently. For example, power consumption can be reduced for certain data sets that are known to have certain characteristics. FIG. 42 shows an example of a modulation value probability distribution plot 4200 (dashed line) superimposed on a modulator power plot 4202 (solid line) for a particular design of the modulators of the array 144 and/or the OMM 150. Both plots are a function of a modulation value (on the horizontal axis) given in normalized units to represent a coefficient between −1 and 1. In this example, a data set includes various coefficients (e.g., vector coefficients, and/or matrix coefficients) for an artificial neural network computation such that the probability distribution function (PDF) of the coefficients yields higher probabilities for (and thus more frequent instances of) small coefficients (i.e., coefficients with relatively small absolute values). For such data sets ("low-coefficient weighted data sets"), reduced power consumption can be achieved by designing the modulators such that the modulators operate in lower power states for computations using smaller coefficients (which appear more often in the data sets), and operate in higher power states for computations using larger coefficients (which appear less often in the data sets).

Some optical amplitude modulators use a relatively high power to modulate an optical signal by small modulation values. For example, for a coherence-insensitive optical amplitude modulator, a modulation value near zero may require a relatively high modulator power, such as for an electro-absorption modulator that drives a diode-based absorber with a relatively high current for large absorption of optical power to reduce the optical amplitude of a modulated optical signal. For a coherence-sensitive optical amplitude modulator, a modulation value near zero may require a relatively high modulator power, such as for an MZI modulator that drives a diode-based phase shifter with a relatively high current to provide a relative phase shift between two MZI arms for destructive optical interference to reduce the optical amplitude of the modulated signal.

Figure 43:
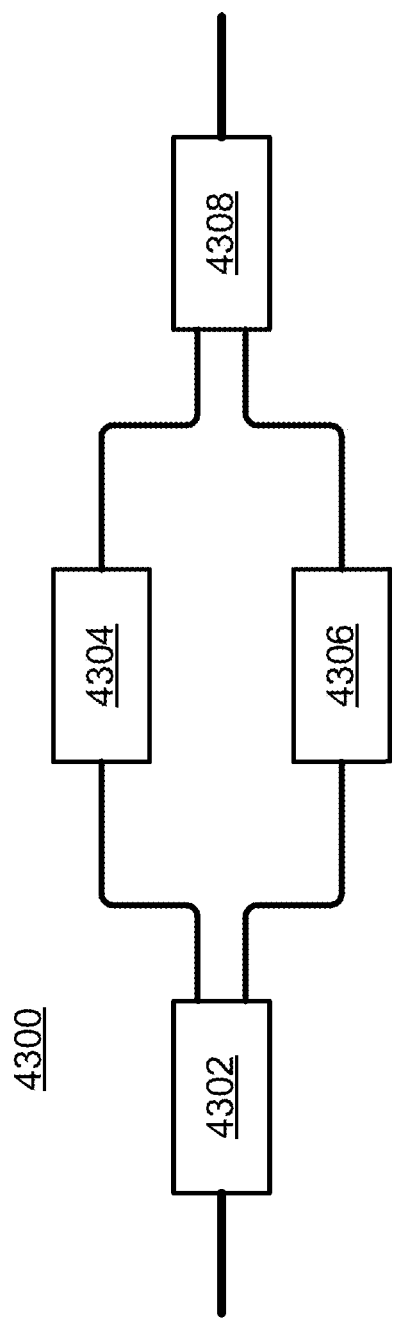
FIG. 43 is a diagram of an example of a Mach-Zehnder modulator.

Optical amplitude modulators can be configured to overcome this power relationship and achieve a modulator power as shown in FIG. 42, which assigns a low-power modulator state to a modulation value near zero. For example, as shown in FIG. 43, an MZI modulator 4300 can be configured with asymmetric arms that provide a built-in passive relative phase shift (e.g., a phase shift near 180 degrees) such that only a small active relative phase shift (and thus low modulator power) is needed for destructive optical interference. The modulator 4300 includes an input optical splitter 4302 that splits an incoming optical signal to provide 50% of the power to a first arm, and 50% of the power to a second arm. An active phase shifter 4304 in the first arm provides a way to vary the modulation value over the range of possible values (for unsigned modulation values between 0 and 1 in this example) using a variable phase shift. The variable phase shift is determined based on a magnitude of an applied electrical signal, which calls for a certain amount of supplied electrical power (e.g., a diode-based phase shifter formed from doped semiconductor material that is within or in proximity to a waveguide of the first arm). A passive phase shifter 4306 in the second arm provides a relative phase shift between the first and second arms, even when no electrical power is being supplied to the modulator 4300. For example, an optical material with a high refractive index can be configured to impose a relative phase shift of 180 degrees between the arms, so that an output optical combiner 4308 provides optical interference such that no significant optical power is coupled to its output. A variety of alternative configurations of the active phase shifter and passive phase shifter can be implemented, which include but are not limited to: both the active phase shifter and the passive phase shifter can be in one arm with no modulator or shifter in the other arm; both arms can have an active phase shifter and passive phase shifter (in a push-pull arrangement); or both arms can have active phase shifters and one arm can have a passive phase shifter.

Alternatively, an MZI modulator configured according to the symmetric differential configurations described herein can be used to provide a coefficient near zero using only a small active relative phase shift (and thus low modulator power). For example, FIG. 22A shows an optical amplitude modulator built using an MZI configured according to the symmetric differential configuration, where the optical outputs are detected as shown in FIG. 22B. A low modulation power is used to perform multiplication (using optical amplitude modulation) by a modulation value having a low magnitude (i.e., absolute value). In particular, a low power applied to the phase modulator 2204 corresponds to modulation by a low magnitude modulation value, yielding a corresponding near even (e.g., near 50%/50%) split in the output of the coupler 2206 and low magnitude current at the junction 2216 representing the result of the multiplication. The symmetric differential configuration also has the advantage of being able to provide signed modulation values between −1 to +1 (as described in more detail below). While this implementation uses a phase modulator in a single arm of the MZI, other implementations can have other arrangements, such as a push-pull arrangement that has a phase modulator in both arms providing phase shifts of opposite sign.

The example power distribution illustrated in FIG. 42 shows zero modulation power being used to achieve a modulation value of zero, but in other examples there may be a residual low but non-zero modulation power at a modulation value of zero. The reduced power consumption can generally be achieved for these low-coefficient weighted data sets by using modulators that are designed such that they modulate an optical signal by a modulation value using a power that increases with respect to an absolute value of the modulation value. The exact shape of the modulation power as a function of modulation value as the modulation value increases in magnitude may be different for different implementations, and is not necessarily a linear increase. There may be different power consuming elements in the optical amplitude modulators that contribute to the overall power consumption. In some implementations, modulators are designed such that they modulate an optical signal by a modulation value using a power that monotonically increases with respect to an absolute value of the modulation value.

In some cases, the modulators of the array 144 and/or the OMM 150 may have nonlinear transfer functions. For example, an MZI optical modulator may have a nonlinear relationship (e.g., a sinusoidal dependence) between the applied control voltage and its transmission. In such cases, the first DAC control signals may be adjusted, or compensated, based on the nonlinear transfer function of the modulators such that a linear relationship between the digital input vectors and the generated optical input vectors can be maintained. Maintaining such linearity is typically important in ensuring that the input to the OMM unit 150 is an accurate representation of the digital input vector. In some implementations, the compensation of the first DAC control signal may be performed by the controller 10110 by a lookup table that maps a value of the digital input vector to a value to be output by the DAC unit 130 such that the resulting modulated optical signals are linearly proportional to the elements of the digital input vector. The lookup table may be generated by characterizing the nonlinear transfer function of the modulator and calculating an inverse function of the nonlinear transfer function.

In some implementations, the nonlinearity of the modulators and resulting nonlinearity in the generated optical input vectors can be compensated by ANN computation algorithms.

The optical input vector generated by the modulator array 144 is input to the OMM unit 150. The optical input vector may be N spatially separated optical signals that each have an optical power corresponding to the elements of the digital input vector. The optical power of the optical signals typically range from, e.g., 1 µW to 10 mW. The OMM unit 150 receives the optical input vector and performs an N×N matrix multiplication based on its internal configuration. The internal configuration is controlled by electrical signals generated by the DAC unit 130. For example, the DAC unit 130 receives, from the controller 10110, a second DAC control signal that corresponds to the neural network weights to be implemented by the OMM unit 150. The DAC unit 130 generates, based on the second DAC control signal, the weight control signals, which are analog signals suitable for controlling the reconfigurable elements within the OMM unit 150. The analog signals may be voltages or currents, for example, depending on the type of the reconfiguring elements of the OMM unit 150. The voltages may have an amplitude that ranges from, e.g., 0.1 V to 10 V, and the current may have an amplitude that ranges from, e.g., 100 µA to 10 mA.

The modulator array 144 may operate at a modulation rate that is different from a reconfiguration rate at which the OMM unit 150 can be reconfigured. The optical input vector generated by the modulator array 144 propagates through the OMM unit at a substantial fraction of the speed of light (e.g., 80%, 50%, or 25% of the speed of light), depending on the optical properties (e.g., effective index) of the OMM unit 150. For a typical OMM unit 150, the propagation time of the optical input vector is in the range of 1 to 10's of picoseconds, which corresponds to 10's to 100's of GHz in processing rate. As such, the rate at which the optical processor 140 can perform matrix multiplication operations is limited in part by the rate at which the optical input vector can be generated. Modulators having bandwidths of 10's of GHz are readily available, and modulators having bandwidth exceeding 100 GHz are being developed. As such, the modulation rate of the modulator array 144 may range, for example, from 5 GHz, 8 GHz, or 10's of GHz to 100's of GHz. In order to sustain the operation of the modulator array 144 at such modulation rate, the integrated circuitry of the controller 10110 may be configured to output control signals for the DAC unit 130 at a rate greater than or equal to, for example, 5 GHz, 8 GHz, 10 GHz, 20 GHz, 25 GHz, 50 GHz, or 100 GHz.

The reconfiguration rate of the OMM unit 150 may be significantly slower than the modulation rate depending on the type of the reconfigurable elements implemented by the OMM unit 150. For example, the reconfigurable elements of the OMM unit 150 may be a thermo-optic type that uses a micro-heater to adjust a temperature of an optical waveguide of the OMM unit 150, which in turn affects the phase of an optical signal within the OMM unit 150 and leads to matrix multiplication. Due to the thermal time constants associated with heating and cooling of structures, the reconfiguration rate may be limited to 100's of kHz to 10's of MHz, for example. As such, the modulator control signals for controlling the modulator array 144 and the weight control signals for reconfiguring the OMM unit 150 may have significantly different requirements in speed. Further, the electrical characteristics of the modulator array 144 may differ significantly from those of the reconfigurable elements of the OMM unit 150.

To accommodate the different characteristics of the modulator control signals and the weight control signals, in some implementations, the DAC unit 130 may include a first DAC subunit 132, and a second DAC subunit 134. The first DAC subunit 132 may be specifically configured to generate the modulator control signals, and the second DAC subunit 134 may be specifically configured to generate the weight control signals. For example, the modulation rate of the modulator array 144 may be 25 GHz, and the first DAC subunit 132 may have a per-channel output update rate of 25 giga-samples per second (GSPS) and a resolution of 8 bits or higher. The reconfiguration rate of the OMM unit 150 may be 1 MHz, and the second DAC subunit 134 may have an output update rate of 1 mega-samples per second (MSPS) and a resolution of 10 bits. Implementing separate DAC subunits 132 and 134 allows independent optimization of the DAC subunits for respective signals, which may reduce the total power consumption, complexity, cost, or combination thereof of the DAC unit 130. It should be noted that while the DAC subunits 132 and 134 are described as sub elements of the DAC unit 130, in general, the DAC subunits 132 and 134 may be integrated on a common chip, or be implemented as separate chips.

Based on the different characteristics of the first DAC subunit 132 and the second DAC subunit 134, in some implementations, the memory unit 10120 may include a first memory subunit and a second memory subunit. The first memory subunit may be a memory dedicated to storing of the input dataset and the digital input vectors, and may have an operating speed sufficient to support the modulation rate. The second memory subunit maybe a memory dedicated to storing of the neural network weights, and may have an operation speed sufficient to support the reconfiguration rate of the OMM unit 150. In some implementations, the first memory subunit may be implemented using SRAM and the second memory subunit may be implemented using DRAM. In some implementations, the first and second memory subunits may be implemented using DRAM. In some implementations, the first memory unit may be implemented as a part of or as a cache of the controller 10110. In some implementations, the first and second memory subunits may be implemented by a single physical memory device as different address spaces.

The OMM unit 150 outputs an optical output vector of length N, which corresponds to the result of the N×N matrix multiplication of the optical input vector and the neural network weights. The OMM unit 150 is coupled to the detection unit 146, which is configured to generate N output voltages corresponding to the N optical signals of the optical output vector. For example, the detection unit 146 may include an array of N photodetectors configured to absorb the optical signals and generate photocurrents, and an array of N transimpedance amplifiers configured to convert the photocurrents into the output voltages. The bandwidths of the photodetectors and the transimpedance amplifiers may be set based on the modulation rate of the modulator array 144. The photodetectors may be formed from various materials based on the wavelengths of the optical output vector being detected. Examples of the materials for photodetectors include germanium, silicon-germanium alloy, and indium gallium arsenide (InGaAs).

The detection unit 146 is coupled to the ADC unit 160. The ADC unit 160 is configured to convert the N output voltages into N digitized optical outputs, which are quantized digital representations of the output voltages. For example, the ADC unit 160 may be an N channel ADC. The controller 10110 may obtain, from the ADC unit 160, the N digitized optical outputs corresponding to the optical output vector of the optical matrix multiplication unit 150. The controller 10110 may form, from the N digitized optical outputs, a digital output vector of length N that corresponds to the result of the N×N matrix multiplication of the input digital vector of length N.

Various electrical components of the ANN computation system 10100 may be integrated in various ways. For example, the controller 10110 may be an application specific integrated circuit that is fabricated on a semiconductor die. Other electrical components, such as the memory unit 10120, the DAC unit 130, the ADC unit 160, or combination thereof may be monolithically integrated on the semiconductor die on which the controller 10110 is fabricated. As another example, two or more electrical components can be integrated as a System-on-Chip (SoC). In a SoC implementation, the controller 10110, the memory unit 10120, the DAC unit 130, and the ADC unit 160 may be fabricated on respective dies, and the respective dies may be integrated on a common platform (e.g., an interposer) that provides electrical connections between the integrated components. Such SoC approach may allow faster data transfer between the electronic components of the ANN computation system 10100 relative to an approach where the components are separately placed and routed on a printed circuit board (PCB), thereby improving the operating speed of the ANN computation system 10100. Further, the SoC approach may allow use of different fabrication technologies optimized for different electrical components, which may improve the performance of the different components and reduce overall costs over a monolithic integration approach. While the integration of the controller 10110, the memory unit 10120, the DAC unit 130, and the ADC unit 160 has been described, in general, a subset of the components may be integrated while other components are implemented as discrete components for various reasons, such as performance or cost. For example, in some implementations, the memory unit 10120 may be integrated with the controller 10110 as a functional block within the controller 110.

Various optical components of the ANN computation system 10100 may also be integrated in various ways. Examples of the optical components of the ANN computation system 10100 include the laser unit 142, the modulator array 144, the OMM unit 150, and the photodetectors of the detection unit 146. These optical components may be integrated in various ways to improve performance and/or reduce cost. For example, the laser unit 142, the modulator array 144, the OMM unit 150, and the photodetectors may be monolithically integrated on a common semiconductor substrate as a photonic integrated circuit (PIC). On a photonic integrated circuit formed based on a compound semiconductor material system (e.g., III-V compound semiconductors such as InP), lasers, modulators such as electro-absorption modulators, waveguides, and photodetectors may be monolithically integrated on a single die. Such monolithic integration approach may reduce the complexities of aligning the inputs and outputs of various discrete optical components, which may require alignment accuracies ranging from sub-micron to a few microns. As another example, the laser source of the laser unit 142 may be fabricated on a compound-semiconductor die, while the optical power splitter of the laser unit 142, the modulator array 144, the OMM unit 150, and the photodetectors of the detection unit 146 may be fabricated on a silicon die. PICs fabricated on a silicon wafer, which may be referred to as silicon photonics technology, typically has a greater integration density, higher lithographic resolution, and lower cost relative to the III-V based PICs. Such greater integration density may be beneficial in fabrication of the OMM unit 150, as the OMM unit 150 typically includes 10's to 100's of optical components such as power splitters and phase shifters. Further, the higher lithographic resolution of the silicon photonics technology may reduce fabrication variation of the OMM unit 150, improving the accuracy of the OMM unit 150.

The ANN computation system 10100 may be implemented in a variety of form factors. For example, the ANN computation system 10100 may be implemented as a co-processor that is plugged into a host computer. Such system 10100 may have, for example, a form factor of a PCI express card and communicate with the host computer over the PCIe bus. The host computer may host multiple co-processor type ANN computation systems 10100, and be connected to the computer 10102 over a network. This type of implementation may be suitable for a use in a cloud datacenter where racks of servers may be dedicated to processing ANN computation requests received from other computers or servers. As another example, the co-processor type ANN computation system 10100 may be plugged directly into the computer 10102 issuing the ANN computation requests.

In some implementations, the ANN computation system 10100 may be integrated onto a physical system that requires real-time ANN computation capability. For example, systems that rely heavily on real-time artificial intelligence tasks such as autonomous vehicles, autonomous drones, object- or face-recognizing security cameras, and various Internet-of-Things (IoT) devices may benefit from having ANN computation system 10100 directly integrated with other subsystems of such systems. Having directly-integrated ANN computation system 10100 can enable real-time artificial intelligence in devices with poor or no internet connectivity, and enhance the reliability and availability of mission-critical artificial intelligence systems.

While the DAC unit 130 and the ADC unit 160 are illustrated to be coupled to the controller 10110, in some implementations, the DAC unit 130, the ADC unit 160 or both may alternatively, or additionally, be coupled to the memory unit 10120. For example, a direct memory access (DMA) operation by the DAC unit 130 or the ADC unit 160 may reduce the computation burden on the controller 10110 and reduce latency in reading from and writing to the memory unit 10120, further improving the operating speed of the ANN computation unit 10100.

Figure 47A:
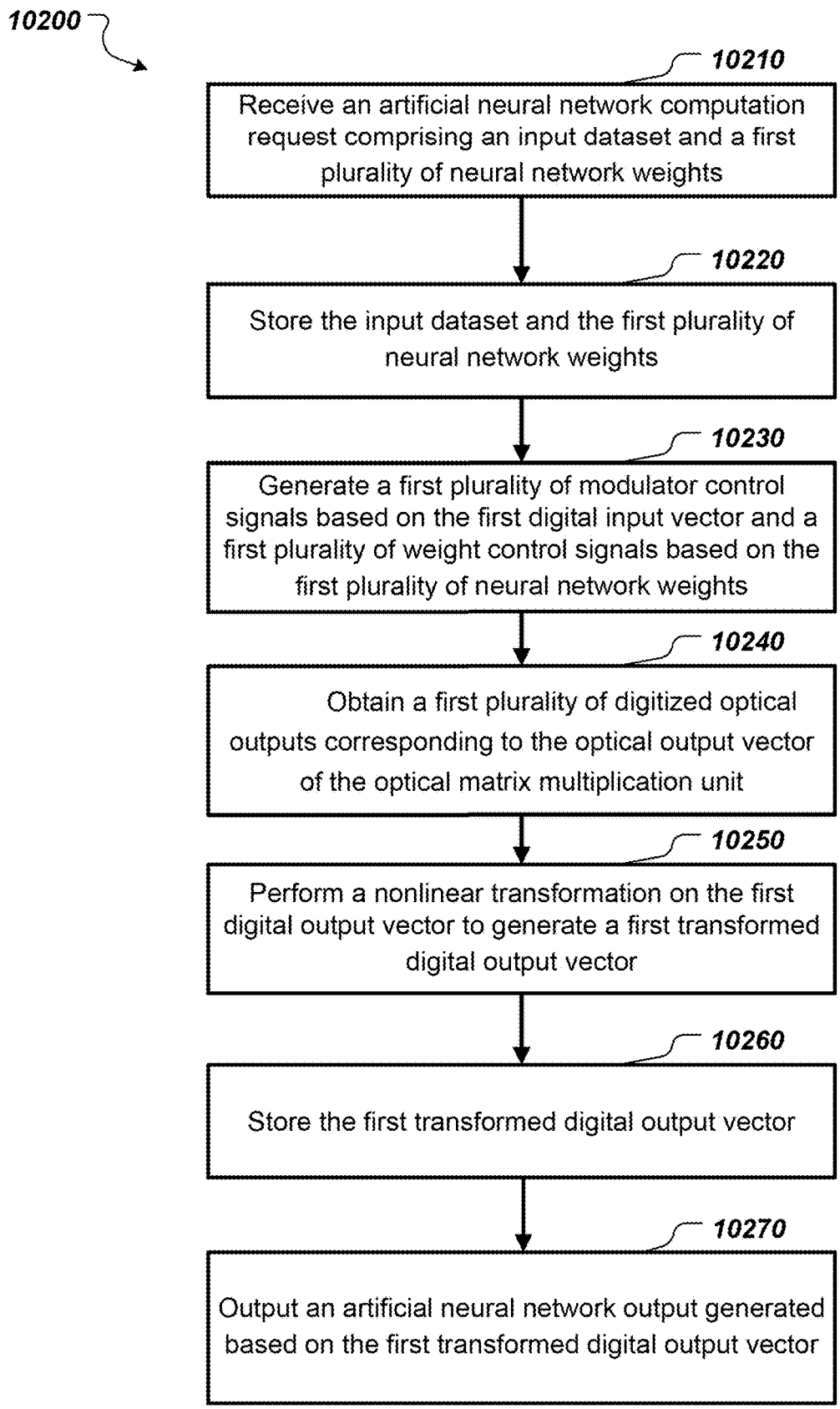
FIG. 47A is a flowchart showing an example of a method for performing an ANN computation.

FIG. 47A shows a flowchart of an example of a process 10200 for performing an ANN computation. The steps of the process 10200 may be performed by the controller 10110. In some implementations, various steps of process 10200 can be run in parallel, in combination, in loops, or in any order.

At 10210, an artificial neural network (ANN) computation request comprising an input dataset and a first plurality of neural network weights is received. The input dataset includes a first digital input vector. The first digital input vector is a subset of the input dataset. For example, it may be a sub-region of an image. The ANN computation request may be generated by various entities, such as the computer 10102. The computer may include one or more of various types of computing devices, such as a personal computer, a server computer, a vehicle computer, and a flight computer. The ANN computation request generally refers to an electrical signal that notifies or informs the ANN computation system 10100 of an ANN computation to be performed. In some implementations, the ANN computation request may be divided into two or more signals. For example, a first signal may query the ANN computation system 10100 to check whether the system 10100 is ready to receive the input dataset and the first plurality of neural network weights. In response to a positive acknowledgement by the system 10100, the computer may send a second signal that includes the input dataset and the first plurality of neural network weights.

At 10220, the input dataset and the first plurality of neural network weights are stored. The controller 10110 may store the input dataset and the first plurality of neural network weights in the memory unit 10120. Storing of the input dataset and the first plurality of neural network weights in the memory unit 10120 may allow flexibilities in the operation of the ANN computation system 10100 that, for example, can improve the overall performance of the system. For example, the input dataset can be divided into digital input vectors of a set size and format by retrieving desired portions of the input dataset from the memory unit 10120. Different portions of the input dataset can be processed in various order, or be shuffled, to allow various types of ANN computations to be performed. For example, shuffling may allow matrix multiplication by block matrix multiplication technique in cases where the input and output matrix sizes are different. As another example, storing of the input dataset and the first plurality of neural network weights in the memory unit 10120 may allow queuing of multiple ANN computation requests by the ANN computation system 10100, which may allow the system 10100 to sustain operation at its full speed without periods of inactivity.

In some implementations, the input dataset may be stored in the first memory subunit, and the first plurality of neural network weights may be stored in the second memory subunit.

At 10230, a first plurality of modulator control signals is generated based on the first digital input vector and a first plurality of weight control signals is generated based on the first plurality of neural network weights. The controller 10110 may send a first DAC control signal to the DAC unit 130 for generating the first plurality of modulator control signals. The DAC unit 130 generates the first plurality of modulator control signals based on the first DAC control signal, and the modulator array 144 generates the optical input vector representing the first digital input vector.

The first DAC control signal may include multiple digital values to be converted by the DAC unit 130 into the first plurality of modulator control signals. The multiple digital values are generally in correspondence with the first digital input vector, and may be related through various mathematical relationships or look-up tables. For example, the multiple digital values may be linearly proportional to the values of the elements of the first digital input vector. As another example, the multiple digital values may be related to the elements of the first digital input vector through a look-up table configured to maintain a linear relationship between the digital input vector and the optical input vector generated by the modulator array 144.

The controller 10110 may send a second DAC control signal to the DAC unit 130 for generating the first plurality of weight control signals. The DAC unit 130 generates the first plurality of weight control signals based on the second DAC control signal, and the OMM unit 150 is reconfigured according to the first plurality of weight control signals, implementing a matrix corresponding to the first plurality of neural network weights.

The second DAC control signal may include multiple digital values to be converted by the DAC unit 130 into the first plurality of weight control signals. The multiple digital values are generally in correspondence with the first plurality of neural network weights, and may be related through various mathematical relationships or look-up tables. For example, the multiple digital values may be linearly proportional to the first plurality of neural network weights. As another example, the multiple digital values may be calculated by performing various mathematical operations on the first plurality of neural network weights to generate weight control signals that can configure the OMM unit 150 to perform a matrix multiplication corresponding to the first plurality of neural network weights.

In some implementations, the first plurality of neural network weights representing a matrix M may be decomposed through singular value decomposition (SVD) method into $M=USV^*$, where U is an M×M unitary matrix, S is an M×N diagonal matrix with non-negative real numbers on the diagonal, and $V^*$ is the complex conjugate of an N×N unitary matrix V. In such cases, the first plurality of weight control signals may include a first plurality of OMM unit control signals corresponding to the matrix V, and a second plurality of OMM unit control signal corresponding to the matrix S. Further, the OMM unit 150 may be configured to have a first OMM subunit configured to implement the matrix V, a second OMM subunit configured to implement matrix S, and a third OMM subunit configured to implement matrix U such that the OMM unit 150 as a whole implements the matrix M. The SVD method is further described in U.S. Patent Publication No. US 2017/0351293 A1 titled "APPARATUS AND METHODS FOR OPTICAL NEURAL NETWORK," which is fully incorporated by reference herein.

At 10240, a first plurality of digitized optical outputs corresponding to the optical output vector of the optical matrix multiplication unit is obtained. The optical input vector generated by the modulator array 144 is processed by the OMM unit 150 and transformed into an optical output vector. The optical output vector is detected by the detection unit 146 and converted into electrical signals that can be converted into digitized values by the ADC unit 160. The controller 10110 may, for example, send a conversion request to the ADC unit 160 to begin a conversion of the voltages output by the detection unit 146 into digitized optical outputs. Once the conversion is complete, the ADC unit 160 may send the conversion result to the controller 10110. Alternatively, the controller 10110 may retrieve the conversion result from the ADC unit 160. The controller 10110 may form, from the digitized optical outputs, a digital output vector that corresponds to the result of the matrix multiplication of the input digital vector. For example, the digitized optical outputs may be organized, or concatenated, to have a vector format.

In some implementations, the ADC unit 160 may be set or controlled to perform an ADC conversion based on a DAC control signal issued to the DAC unit 130 by the controller 10110. For example, the ADC conversion may be set to begin at a preset time following the generation of the modulation control signal by the DAC unit 130. Such control of the ADC conversion may simplify the operation of the controller 10110 and reduce the number of necessary control operations.

At 10250, a nonlinear transformation is performed on the first digital output vector to generate a first transformed digital output vector. A node, or an artificial neuron, of an ANN operates by first performing a weighted sum of the signals received from nodes of a previous layer, then performing a nonlinear transformation ("activation") of the weighted sum to generate an output. Various types of ANN may implement various types of differentiable, nonlinear transformations. Examples of nonlinear transformation functions include a rectified linear unit (RELU) function, a Sigmoid function, a hyperbolic tangent function, an $X^2$ function, and a $|X|$ function. Such nonlinear transformations are performed on the first digital output by the controller 10110 to generate the first transformed digital output vector. In some implementations, the nonlinear transformations may be performed by a specialized digital integrated circuitry within the controller 10110. For example, the controller 10110 may include one or more modules or circuit blocks that are specifically adapted to accelerate the computation of one or more types of nonlinear transformations.

At 10260, the first transformed digital output vector is stored. The controller 10110 may store the first transformed digital output vector in the memory unit 10120. In cases where the input dataset is divided into multiple digital input vectors, the first transformed digital output vector corresponds to a result of the ANN computation of a portion of the input dataset, such as the first digital input vector. As such, storing of the first transformed digital output vector allows the ANN computation system 10100 to perform and store additional computations on other digital input vectors of the input dataset to later be aggregated into a single ANN output.

At 10270, an artificial neural network output generated based on the first transformed digital output vector is output. The controller 10110 generates an ANN output, which is a result of processing the input dataset through the ANN defined by the first plurality of neural network weights. In cases where the input dataset is divided into multiple digital input vectors, the generated ANN output is an aggregated output that includes the first transformed digital output, but may further include additional transformed digital outputs that correspond to other portions of the input dataset. Once the ANN output is generated, the generated output is sent to a computer, such as the computer 10102, that originated the ANN computation request.

Various performance metrics can be defined for the ANN computation system 10100 implementing the process 10200. Defining performance metrics may allow a comparison of performance of the ANN computation system 10100 that implements the optical processor 140 with other systems for ANN computation that instead implement electronic matrix multiplication units. In one aspect, the rate at which an ANN computation can be performed may be indicated in part by a first loop period defined as a time elapsed between the step 10220 of storing, in the memory unit, the input dataset and the first plurality of neural network weights, and the step 10260 of storing, in the memory unit, the first transformed digital output vector. This first loop period therefore includes the time taken in converting the electrical signals into optical signals (e.g., step 10230), performing the matrix multiplication in the optical domain, and converting the result back into the electrical domain (e.g., step 10240). Steps 10220 and 10260 both involves storing of data into the memory unit 10120, which are steps shared between the ANN computation system 10100 and conventional ANN computation system systems without the optical processor 140. As such, the first loop period measuring the memory-to-memory transaction time may allow a realistic or fair comparison of ANN computation throughput to be made between the ANN computation system 10100 and ANN computation systems without the optical processor 140, such as systems implementing electronic matrix multiplication units.

Due to the rate at which the optical input vectors can be generated by the modulator array 144 (e.g., at 25 GHz) and the processing rate of the OMM unit 150 (e.g., >100 GHz), the first loop period of the ANN computation system 10100 for performing a single ANN computation of a single digital input vector may approach the reciprocal of the speed of the modulator array 144, e.g., 40 ps. After accounting for latencies associated with the signal generation by the DAC unit 130 and the ADC conversion by the ADC unit 160, the first loop period may, for example, be less than or equal to 100 ps, less than or equal to 200 ps, less than or equal to 500 ps, less than or equal to 1 ns, less than or equal to 2 ns, less than or equal to 5 ns, or less than or equal to 10 ns.

As a comparison, execution time of a multiplication of an M×1 vector and an M×M matrix by an electronic matrix multiplication unit is typically proportional to $M^2-1$ processor clock cycles. For M=32, such multiplication would take approximately 1024 cycles, which at 3 GHz clock speed results in an execution time exceeding 300 ns, which is orders of magnitude slower than the first loop period of the ANN computation system 100.

In some implementations, the process 10200 further includes a step of generating a second plurality of modulator control signals based on the first transformed digital output vector. In some types of ANN computations, a single digital input vector may be repeatedly propagated through, or processed by, the same ANN. An ANN that implements multi-pass processing may be referred to as a recurrent neural network (RNN). A RNN is a neural network in which the output of the network during a (k)th pass through the neural network is recirculated back to the input of the neural network and used as the input during the (k+1)th pass. RNNs may have various applications in pattern recognition tasks, such as speech or handwriting recognition. Once the second plurality of modulator control signals are generated, the process 10200 may proceed from step 10240 through step 10260 to complete a second pass of the first digital input vector through the ANN. In general, the recirculation of the transformed digital output to be the digital input vector may be repeated for a preset number of cycles depending of the characteristics of the RNN received in the ANN computation request.

In some implementations, the process 10200 further includes a step of generating a second plurality of weight control signals based on a second plurality of neural network weights. In some cases, the artificial neural network computation request further includes a second plurality of neural network weights. In general, an ANN has one or more hidden layers in addition to the input and output layers. For ANN with two hidden layers, the second plurality of neural network weights may correspond, for example, to the connectivity between the first layer of the ANN and the second layer of the ANN. To process the first digital input vector through the two hidden layers of the ANN, the first digital input vector may first be processed according to the process 10200 up to step 10260, at which the result of processing the first digital input vector through the first hidden layer of the ANN is stored in the memory unit 10120. The controller 10110 then reconfigures the OMM unit 150 to perform the matrix multiplication corresponding to the second plurality of neural network weights associated with the second hidden layer of the ANN. Once the OMM unit 150 is reconfigured, the process 10200 may generate the plurality of modulator control signals based on the first transformed digital output vector, which generates an updated optical input vector corresponding to the output of the first hidden layer. The updated optical input vector is then processed by the reconfigured OMM unit 150 which corresponds to the second hidden layer of the ANN. In general, the described steps can be repeated until the digital input vector has been processed through all hidden layers of the ANN.

As previously described, in some implementations of the OMM unit 150, the reconfiguration rate of the OMM unit 150 may be significantly slower than the modulation rate of the modulator array 144. In such cases, the throughput of the ANN computation system 10100 may be adversely impacted by the amount of time spent in reconfiguring the OMM unit 150 during which ANN computations cannot be performed. To mitigate the impact of the relatively slow reconfiguration time of the OMM unit 150, batch processing techniques may be utilized in which two or more digital input vectors are propagated through the OMM unit 150 without a configuration change to amortize the reconfiguration time over a larger number of digital input vectors.

Figure 47B:
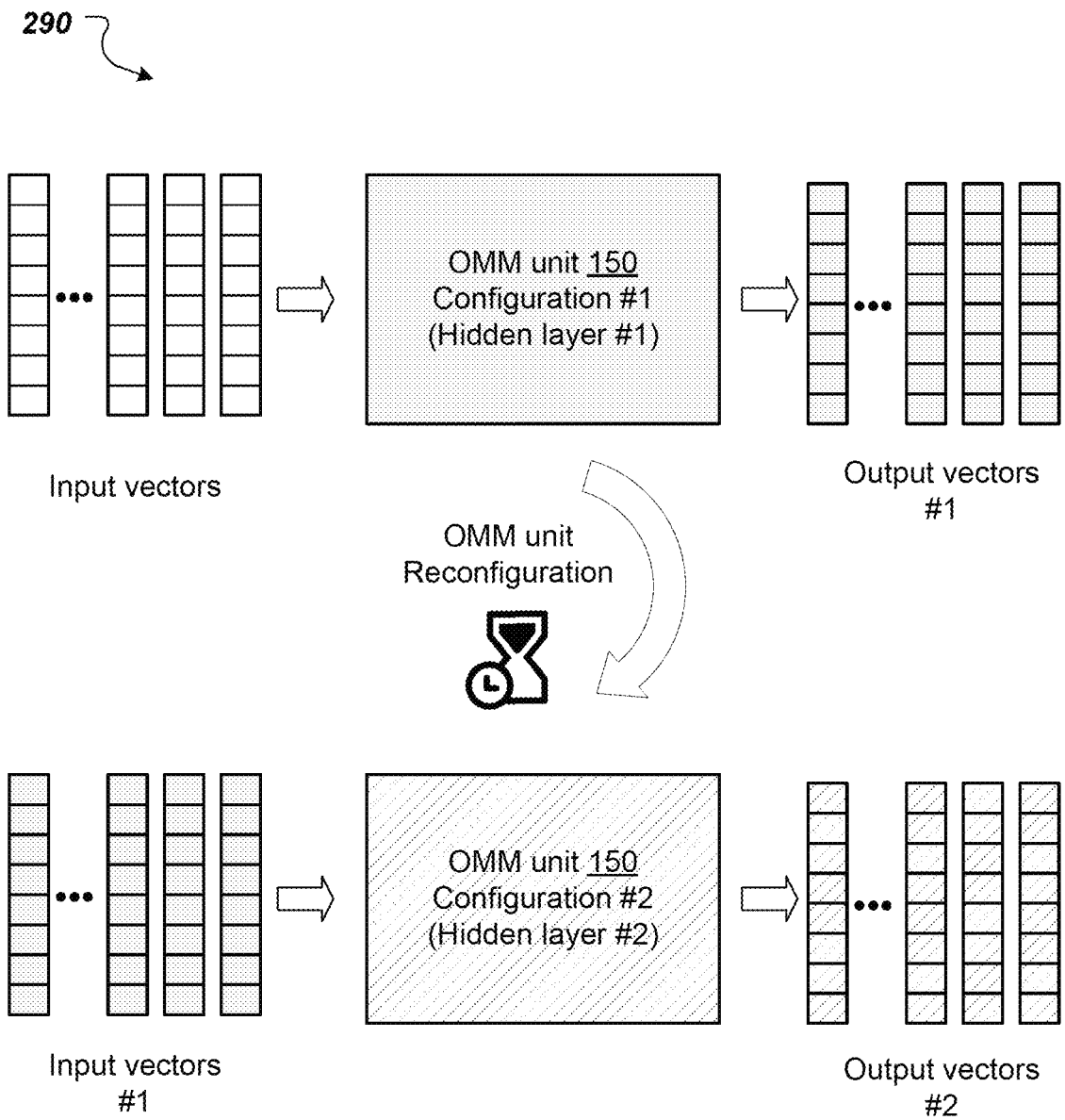
FIG. 47B is a diagram illustrating an aspect of the method of FIG. 47A.

FIG. 47B shows a diagram 290 illustrating an aspect of the process 10200 of FIG. 47A. For an ANN with two hidden layers, instead of processing the first digital input vector through the first hidden layer, reconfiguring the OMM unit 150 for the second hidden layer, processing the first digital input vector through the reconfigured OMM unit 150, and repeating the same for the remaining digital input vectors, all digital input vectors of the input dataset can be first processed through the OMM unit 150 configured for the first hidden layer (configuration #1) as shown in the upper portion of the diagram 290. Once all digital input vectors have been processed by the OMM unit 150 having configuration #1, the OMM unit 150 is reconfigured into configuration #2, which correspond to the second hidden layer of the ANN. This reconfiguration can be significantly slower than the rate at which the input vectors can be processed by the OMM unit 150. Once the OMM unit 150 is reconfigured for the second hidden layer, the output vectors from the previous hidden layer can be processed by the OMM unit 150 in a batch. For large input datasets having tens or hundreds of thousands of digital input vectors, the impact of the reconfiguration time may be reduced by approximately the same factor, which may substantially reduce the portion of the time spent by the ANN computation system 100 in reconfiguration.

To implement batch processing, in some implementations, the process 10200 further includes steps of generating, through the DAC unit, a second plurality of modulator control signals based on the second digital input vector; obtaining, from the ADC unit, a second plurality of digitized optical outputs corresponding to the optical output vector of the optical matrix multiplication unit, the second plurality of digitized optical outputs forming a second digital output vector; performing a nonlinear transformation on the second digital output vector to generate a second transformed digital output vector; and storing, in the memory unit, the second transformed digital output vector. The generating of the second plurality of modulator control signals may follow the step 10260, for example. Further, the ANN output of step 10270 in this case is now based on both the first transformed digital output vector and the second transformed digital output vector. The obtaining, performing, and storing steps are analogous to the steps 10240 through 10260.

The batch processing technique is one of several techniques for improving the throughput of the ANN computation system 10100. Another technique for improving the throughput of the ANN computation system 10100 is through parallel processing of multiple digital input vectors by utilizing wavelength division multiplexing (WDM). WDM is a technique of simultaneously propagating multiple optical signals of different wavelengths through a common propagation channel, such as a waveguide of the OMM unit 150. Unlike electrical signals, optical signals of different wavelengths can propagate through a common channel without affecting other optical signals of different wavelengths on the same channel. Further, optical signals can be added (multiplexed) or dropped (demultiplexed) from a common propagation channel using well-known structures such as optical multiplexers and demultiplexers.

Figure 46F:
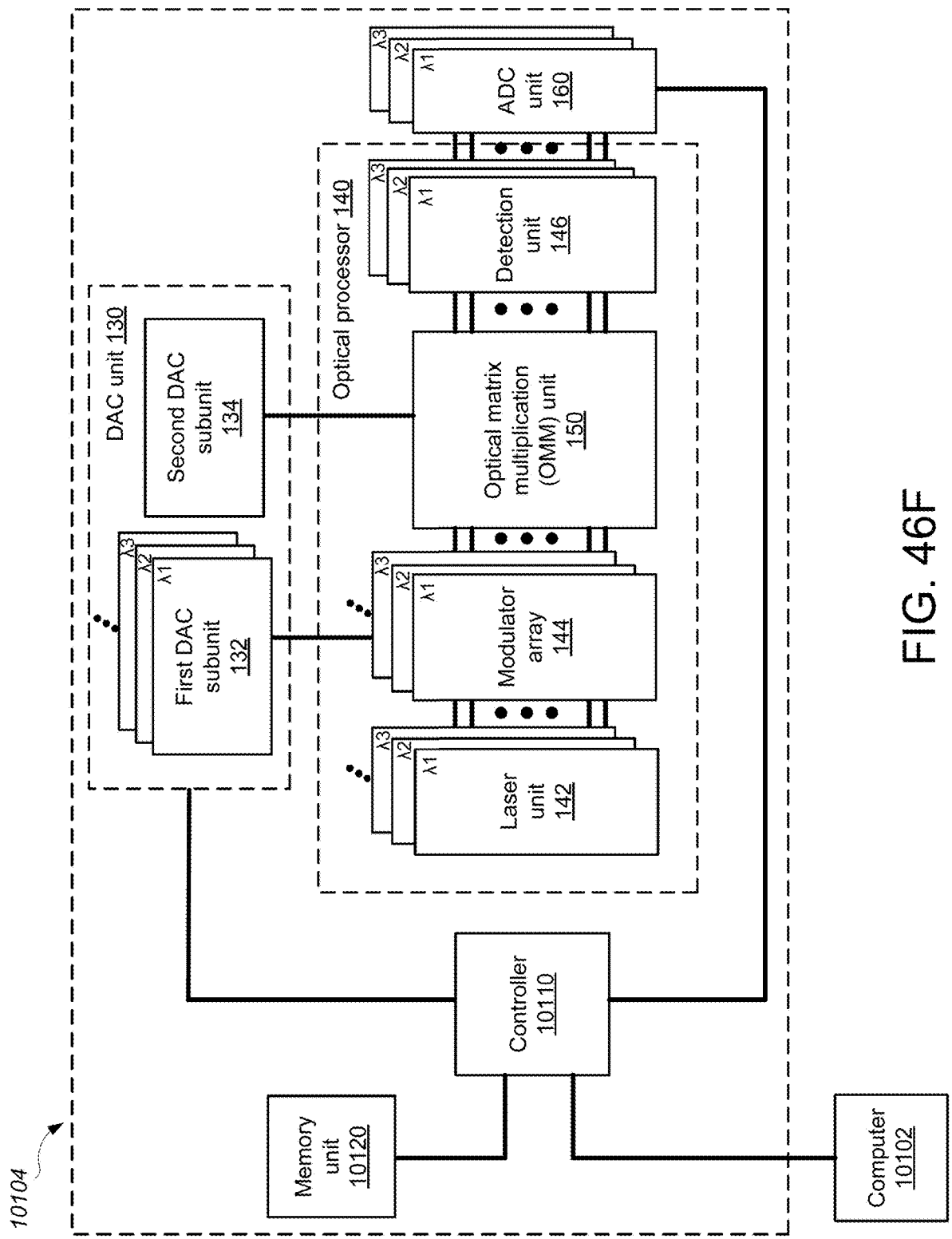
FIG. 46F is a schematic diagram of an example of a wavelength division multiplexed ANN computation system.

In context of the ANN computation system 10100, multiple optical input vectors of different wavelengths can be independently generated, simultaneously propagated through the OMM unit 150, and independently detected to enhance the throughput of the ANN computation system 10100. Referring to FIG. 46F, a schematic diagram of an example of a wavelength division multiplexed (WDM) artificial neural network (ANN) computation system 10104 is shown. The WDM ANN computation system 10104 is similar to the ANN computation system 10100 unless otherwise described. In order to implement the WDM technique, in some implementations of the ANN computation system 10104, the laser unit 142 is configured to generate multiple wavelengths, such as $\lambda 1$, $\lambda 2$, and $\lambda 3$. The multiple wavelengths may preferably be separated by a wavelength spacing that is sufficiently large to allow easy multiplexing and demultiplexing onto a common propagation channel. For example, the wavelength spacing greater than 0.5 nm, 1.0 nm, 2.0 nm, 3.0 nm, or 5.0 nm may allow simple multiplexing and demultiplexing. On the other hand, the range between the shortest wavelength and the longest wavelength of the multiple wavelengths ("WDM bandwidth") may preferably be sufficiently small such that the characteristics or performance of the OMM unit 150 remain substantially the same across the multiple wavelengths. Optical components are typically dispersive, meaning that their optical characteristics change as a function of wavelength. For example, a power splitting ratio of an MZI may change over wavelength. However, by designing the OMM unit 150 to have a sufficiently large operating wavelength window, and by limiting the wavelengths to be within that operating wavelength window, the optical output vector output by the OMM unit 150 at each wavelength may be a sufficiently accurate result of the matrix multiplication implemented by the OMM unit 150. The operating wavelength window may be, for example, 1 nm, 2 nm, 3 nm, 4 nm, 5 nm, 10 nm, or 20 nm.

Figure 39B:
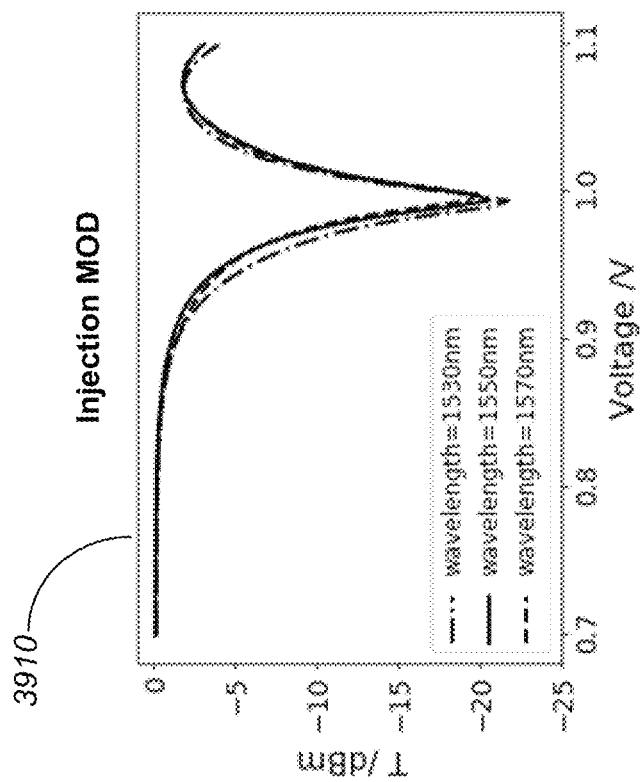
FIG. 39B is a graph showing the intensity-vs-voltage curves for the Mach-Zehnder modulator of FIG. 39A.
Figure 39A:
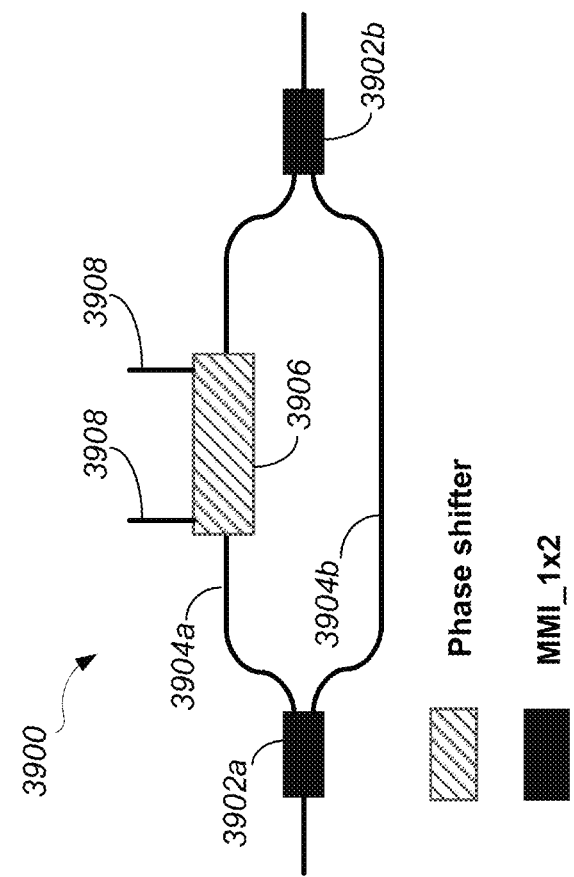
FIG. 39A is a diagram of an example of a Mach-Zehnder modulator.

FIG. 39A shows a diagram of an example of a Mach-Zehnder modulator 3900 that can be used to modulate the amplitude of an optical signal. The Mach-Zehnder modulator 3900 includes two 1×2 port multi-mode interference couplers (MMI 1×2) 3902*a* and 3902*b*, two balanced arms 3904*a* and 3904*b*, and a phase shifter 3906 in one arm (or one phase shifter in each arm). When a voltage is applied to the phase shifter in one arm through signal lines 3908, there will be a phase difference between the two arms 3904*a* and 3904*b* that will convert to the amplitude modulation. The 1×2 port multi-mode interference couplers 3902*a* and 3902*b* and the phase shifter 3906 are configured to be broadband photonic components, and the optical path lengths of the two arms 3904*a* and 3904*b* are configured to be equal. This enables the Mach-Zehnder modulator 3900 to work in a broad wavelength range.

FIG. 39B is a graph 3910 that shows the intensity-vs-voltage curves for the Mach-Zehnder modulator 3900 using the configuration shown in FIG. 39A for wavelengths 1530 nm, 1550 nm, and 1570 nm. The graph 3910 shows that the Mach-Zehnder modulator 3900 has similar intensity-vs-voltage characteristics for different wavelengths in the range from 1530 nm to 1570 nm.

Referring back to FIG. 46F, the modulator array 144 of the WDM ANN computation system 104 includes banks of optical modulators configured to generate a plurality of optical input vectors, each of the banks corresponding to one of the multiple wavelengths and generating respective optical input vector having respective wavelength. For example, for a system with an optical input vector of length 32 and 3 wavelengths (e.g., $\lambda 1$, $\lambda 2$, and $\lambda 3$), the modulator array 144 may have 3 banks of 32 modulators each. Further, the modulator array 144 also includes an optical multiplexer configured to combine the plurality of optical input vectors into a combined optical input vector including the plurality of wavelengths. For example, the optical multiplexer may combine the outputs of the three banks of modulators at three different wavelengths into a single propagation channel, such as a waveguide, for each element of the optical input vector. As such, returning to the example above, the combined optical input vector would have 32 optical signals, each signal containing 3 wavelengths.

Additionally, the detection unit 146 of the WDM ANN computation system 10104 is further configured to demultiplex the multiple wavelengths and to generate a plurality of demultiplexed output voltages. For example, the detection unit 146 may include a demultiplexer configured to demultiplex the three wavelengths contained in each of the 32 signals of the multi-wavelength optical output vector, and route the 3 single-wavelength optical output vectors to three banks of photodetectors coupled to three banks of transimpedance amplifiers.

Additionally, the ADC unit 160 of the WDM ANN computation system 104 includes banks of ADCs configured to convert the plurality of demultiplexed output voltages of the detection unit 146. Each of the banks corresponds to one of the multiple wavelengths, and generates respective digitized demultiplexed optical outputs. For example, the banks of ADCs may be coupled to the banks of transimpedance amplifiers of the detection unit 146.

The controller 10110 may implement a method analogous to the process 10200 but expanded to support the multi-wavelength operation. For example, the method may include the steps of obtaining, from the ADC unit 160, a plurality of digitized demultiplexed optical outputs, the plurality of digitized demultiplexed optical outputs forming a plurality of first digital output vectors, wherein each of the plurality of first digital output vectors corresponds to one of the plurality of wavelengths; performing a nonlinear transformation on each of the plurality of first digital output vectors to generate a plurality of transformed first digital output vectors; and storing, in the memory unit, the plurality of transformed first digital output vectors.

In some cases, the ANN may be specifically designed, and the digital input vectors may be specifically formed such that the multi-wavelength optical output vector can be detected without demultiplexing. In such cases, the detection unit 146 may be a wavelength-insensitive detection unit that does not demultiplex the multiple wavelengths of the multi-wavelength optical output vector. As such, each of the photodetectors of the detection unit 146 effectively sums the multiple wavelengths of an optical signal into a single photocurrent, and each of the voltages output by the detection unit 146 corresponds to an element-by-element sum of the matrix multiplication results of the multiple digital input vectors.

So far, the nonlinear transformations of the weighted sums performed as part of the ANN computation was performed in the digital domain by the controller 10110. In some cases, the nonlinear transformations may be computationally intensive or power hungry, add significantly to the complexity of the controller 10110, or otherwise limit the performance of the ANN computation system 10100 in terms of throughput or power efficiency. As such, in some implementations of the ANN computation system, the nonlinear transformation may be performed in the analog domain through analog electronics.

FIG. 48A shows a schematic diagram of an example of an ANN computation system 300. The ANN computation system 300 is similar to the ANN computation system 10100, but differs in that an analog nonlinearity unit 310 has been added. The analog nonlinearity unit 310 is arranged between the detection unit 146 and the ADC unit 160. The analog nonlinearity unit 310 is configured to receive the output voltages from the detection unit 146, apply a nonlinear transfer function, and output transformed output voltages to the ADC unit 160.

As the ADC unit 160 receives voltages that have been nonlinearly transformed by the analog nonlinearity unit 310, the controller 10110 may obtain, from the ADC unit 160, transformed digitized output voltages corresponding to the transformed output voltages. Because the digitized output voltages obtained from the ADC unit 160 have already been nonlinearly transformed ("activated"), the nonlinear transformation step by the controller 10110 can be omitted, reducing the computation burden by the controller 10110. The first transformed voltages obtained directly from the ADC unit 160 may then be stored as the first transformed digital output vector in the memory unit 10120.

The analog nonlinearity unit 310 may be implemented in various ways. For example, high-gain amplifiers in feedback configuration, comparators with adjustable reference voltage, nonlinear IV characteristics of a diode, breakdown behavior of a diode, nonlinear CV characteristics of a variable capacitor, or nonlinear IV characteristics of a variable resistor can be used to implement the analog nonlinearity unit 310.

Use of the analog nonlinearity unit 310 may improve the performance, such as throughput or power efficiency, of the ANN computation system 300 by reducing a step to be performed in the digital domain. The moving of the nonlinear transformation step out of the digital domain may allow additional flexibility and improvements in the operation of the ANN computation systems. For example, in a recurrent neural network, the output of the OMM unit 150 is activated, and recirculated back to the input of the OMM unit 150. The activation is performed by the controller 10110 in the ANN computation system 10100, which necessitates digitizing the output voltages of the detection unit 146 at every pass through the OMM unit 150. However, because the activation is now performed prior to digitization by the ADC unit 160, it may be possible to reduce the number of ADC conversions needed in performing recurrent neural network computations.

In some implementations, the analog nonlinearity unit 310 may be integrated into the ADC unit 160 as a nonlinear ADC unit. For example, the nonlinear ADC unit can be a linear ADC unit with a nonlinear lookup table that maps the linear digitized outputs of the linear ADC unit into desired nonlinearly transformed digitized outputs.

FIG. 48B shows a schematic diagram of an example of an ANN computation system 302. The ANN computation system 302 is similar to the system 300 of FIG. 48A, but differs in that it further includes an analog memory unit 320. The analog memory unit 320 is coupled to the DAC unit 130 (e.g., through the first DAC subunit 132), the modulator array 144, and the analog nonlinearity unit 310. The analog memory unit 320 includes a multiplexer that has a first input coupled to the DAC unit 130 and a second input coupled to the analog nonlinearity unit 310. This allows the analog memory unit 320 to receive signals from either the DAC unit 130 or the analog nonlinearity unit 310. The analog memory unit 320 is configured to store analog voltages and to output the stored analog voltages.

The analog memory unit 320 may be implemented in various ways. For example, arrays of capacitors may be used as analog voltage storing elements. A capacitor of the analog memory unit 320 may be charged to an input voltage by a charging circuit. The storing of the input voltage may be controlled based on a control signal received from the controller 10110. The capacitor may be electrically isolated from the surrounding environment to reduce charge leakage that causes unwanted discharging of the capacitor. Additionally, or alternatively, a feedback amplifier can be used to maintain the voltage stored on the capacitor. The stored voltage of the capacitor may be read out by a buffer amplifier, which allows the charge stored by the capacitor to be preserved while outputting the stored voltage. These aspects of the analog memory unit 320 may be similar to operation of a sample and hold circuit. The buffer amplifier may implement the functionality of the modulator driver for driving the modulator array 144.

The operation of the ANN computation system 302 will now be described. The first plurality of modulator control signals output by the DAC unit 130 (e.g., by the first DAC subunit 132) is first input to the modulator array 144 through the analog memory unit 320. At this step, the analog memory unit 320 may simply pass on or buffer the first plurality of modulator control signals. The modulator array 144 generates an optical input vector based on the first plurality of modulator control signals, which propagates through the OMM unit 150 and is detected by the detection unit 146. The output voltages of the detection unit 146 are nonlinearly transformed by the analog nonlinearity unit 310. At this point, instead of being digitized by the ADC unit 160, the output voltages of the detection unit 146 are stored by the analog memory unit 320, which is then output to the modulator array 144 to be converted into the next optical input vector to be propagated through the OMM unit 150. This recurrent processing can be performed for a preset amount of time or a preset number of cycles, under the control of the controller 10110. Once the recurrent processing is complete for a given digital input vector, the transformed output voltages of the analog nonlinearity unit 310 are converted by the ADC unit 160.

The use of analog memory unit 320 can significantly reduce the number of ADC conversions during recurrent neural network computations, such as down to a single ADC conversion per RNN computation of a given digital input vector. Each ADC conversion takes a certain period of time, and consumes a certain amount of energy. As such, the throughput of RNN computation by the ANN computation system 302 may be higher than the throughput of RNN computation by the ANN computation system 100.

The execution of the recurrent neural network computation may be controlled, for example, by controlling the analog memory unit 320. For example, the controller may control the analog memory unit 320 to store a voltage at a certain time, and output the stored voltage at a different time. As such, the circulation of a signal from the analog memory unit 320 to the modulator array 144 through the analog nonlinearity unit 310 and back to the analog memory unit 320 can be controlled by the controller 10110 by controlling the storing and readout of the analog memory unit 320.

As such, in some implementations, the controller 10110 of the ANN computation system 302 may perform the steps of: based on generating the first plurality of modulator control signals and the first plurality of weight control signals, storing, through the analog memory unit, the plurality of transformed output voltages of the analog nonlinearity unit; outputting, through the analog memory unit, the stored transformed output voltages; obtaining, from the ADC unit, a second plurality of transformed digitized output voltages, the second plurality of transformed digitized output voltages forming a second transformed digital output vector; and storing, in the memory unit, the second transformed digital output vector.

Input datasets to be processed by the ANN computation systems typically include data with resolution greater than 1 bit. For example, a typical pixel of a greyscale digital image may have a resolution of 8 bits, i.e., 256 different levels. One way of representing and processing this data in the optical domain is to encode the 256 different intensity levels of a pixel as 256 different power levels of the optical signal being input to the OMM unit 150. An optical signal is inherently an analog signal, and is therefore susceptible to noise and detection errors. Referring back to FIG. 46A, in order to maintain the 8 bit resolution of the digital input vector throughout the ANN computation system 10100 and generate true 8 bit digitized optical outputs at the output of the ADC unit 160, every part of the signal chain may preferably be designed to reproduce and maintain the 8 bit resolution.

For example, the DAC unit 130 may preferably be designed to support conversion of 8 bit digital input vectors into modulator control signals of at least 8 bits of resolution such that the modulator array 144 can generate optical input vectors that faithfully represent the 8 bits of the digital input vectors. In general, the modulator control signals may need to have additional resolution beyond 8 bits of the digital input vector to compensate for the nonlinear response of the modulator array 144. Further, the internal configuration of the OMM unit 150 may preferably be sufficiently stabilized to ensure that the values of optical output vector are not corrupted by any fluctuations in the configuration of the OMM unit 150. For example, the temperature of the OMM unit 150 may need to be stabilized within, for example, 5 degrees, 2 degrees, 1 degree, or 0.1 degree. Yet further, the detection unit 146 may preferably be sufficiently low in noise to not corrupt the 8 bit resolution of the optical output vector, and the ADC unit 160 may preferably be designed to support digitization of analog voltages with at least 8 bits of resolution.

Power consumptions and design complexities of various electronic components typically increase with the bit resolution, operating speed, and bandwidth. For example, as a first-order approximation, a power consumption of an ADC unit 160 may scale linearly with the sampling rate, and scale by a factor of $2^N$ where N is the bit resolution of the conversion result. Further, design considerations of the DAC unit 130 and the ADC unit 160 typically result in a tradeoff between the sampling rate and the bit resolution. As such, in some cases, an ANN computation system that internally operates at a bit resolution lower than the resolution of the input dataset while maintaining the resolution of the ANN computation output may be desired.

Referring to FIG. 49A, a schematic diagram of an example of an artificial neural network (ANN) computation system 400 with 1-bit internal resolution is shown. The ANN computation system 400 is similar to the ANN computation system 10100, but differs in that the DAC unit 130 is now replaced by a driver unit 430, and the ADC unit 160 is now replaced by a comparator unit 460.

The driver unit 430 is configured to generate 1-bit modulator control signals and multi-bit weight control signals. For example, a driver circuitry of the driver unit 430 may directly receive a binary digital output from the controller 110 and condition the binary signal into a two-level voltage or current output suitable for driving the modulator array 144.

The comparator unit 460 is configured to convert the output voltages of the detection unit 146 into digitized 1-bit optical outputs. For example, a comparator circuitry of the comparator unit 460 may receive a voltage from the detection unit 146, compare the voltage to a preset threshold voltage, and either output a digital 0 or a 1 when the received voltage is less than or greater than the preset threshold voltage, respectively.

Referring to FIG. 49B, a mathematical representation of the operation of the ANN computation system 400 is shown. Operation of the ANN computation system 400 will now be described in reference to FIG. 49B. For a given ANN computation to be performed by the ANN computation system 400, there exist a corresponding digital input vector V and a neural network weight matrix U. In this example, the input vector V is a vector of length 4 having elements $V_0$ through $V_3$, and the matrix U is a 4×4 matrix with weights $U_{00}$ through $U_{33}$. Each elements of the vector V has a resolution of 4 bits. Each 4 bit vector element has $0^{th}$ bit ($bit_0$) through $3^{rd}$ bit ($bit_3$) that correspond to the $2^0$ to $2^3$ locations, respectively. As such, decimal (base 10) value of a 4 bit vector element is calculated by the summation of $2^0*bit_0+2^1*bit_1+2^2*bit_2+2^3*bit_3$. Accordingly, the input vector V can analogously be decomposed into $V_{bit0}$ through $V_{bit3}$ by the controller 10110 as shown.

Certain ANN computation may then be performed by performing a series of matrix multiplication of 1-bit vectors followed by summation of the individual matrix multiplication result. For example, each of the decomposed input vectors $V_{bit0}$ through $V_{bit3}$ may be multiplied with the matrix U by generating, through the driver unit 430, a sequence of 4 1-bit modulator control signals corresponding to the 4 1-bit input vectors. This in turn generates a sequence of 4 1-bit optical input vectors, which propagates through the OMM unit 150 configured through the driver unit 430 to implement matrix multiplication of matrix U. The controller 10110 may then obtain, from the comparator unit 460, a sequence of 4 digitized 1-bit optical outputs corresponding to the sequence of the 4 1-bit modulator control signals.

In this case where a 4-bit vector is decomposed into 4 1-bit vectors, each vector should be processed by the ANN computation system 400 at four times the speed at which a single 4-bit vector can be processed by other ANN computation systems, such as the system 100, to maintain the same effective ANN computation throughput. Such increased internal processing speed may be viewed as time-division multiplexing of the 4 1-bit vectors into a single timeslot for processing a 4-bit vector. The needed increase in the processing speed may be achieved at least in part by the increased operating speeds of the driver unit 430 and the comparator unit 460 relative to the DAC unit 130 and the ADC unit 160, as a decrease in the resolution of a signal conversion process typically leads to an increase in the rate of signal conversion that can be achieved.

While the signal conversion rates are increased by a factor of four in 1-bit operations, the resulting power consumption may be significantly reduced relative to 4-bit operations. As previously described, power consumption of signal conversion processes typically scale exponentially with the bit resolution, while scaling linearly with the conversion rate. As such, a 16 fold reduction in power per conversion may result from the 4 fold reduction in the bit resolution, followed by a 4 fold increase in power from the increased conversion rate. Overall, a 4 fold reduction in operating power may be achieved by the ANN computation system 400 over, for example, the ANN computation system 10100 while maintaining the same effective ANN computation throughput.

The controller 10110 may then construct a 4-bit digital output vector from the 4 digitized 1-bit optical outputs by multiplying each of the digitized 1-bit optical outputs with respective weights of $2^0$ through $2^3$. Once the 4-bit digital output vector is constructed, the ANN computation may proceed by performing a nonlinear transformation on the constructed 4-bit digital output vector to generate a transformed 4-bit digital output vector; and storing, in the memory unit 10120, the transformed 4-bit digital output vector.

Alternatively, or additionally, in some implementations, each of the 4 digitized 1-bit optical outputs may be nonlinearly transformed. For example, a step-function nonlinear function may be used for the nonlinear transformation. Transformed 4-bit digital output vector may then be constructed from the nonlinearly transformed digitized 1-bit optical outputs.

While a separate ANN computation system 400 has been illustrated and described, in general, the ANN computation system 10100 of FIG. 46A may be designed to implement functionalities analogous to that of the ANN computation system 400. For example, the DAC unit 130 may include a 1-bit DAC subunit configured to generate 1-bit modulator control signals, and the ADC unit 160 may be designed to have a resolution of 1-bit. Such a 1-bit ADC may be analogous to, or effectively equivalent to, a comparator.

Further, while operation of an ANN computation system with 1-bit internal resolution has been described, in general, the internal resolution of an ANN computation system may be reduced to an intermediate level lower than the N-bit resolution of the input dataset. For example, the internal resolution may be reduced to $2^Y$ bits, where Y is an integer greater than or equal to 0.

Figure 26:
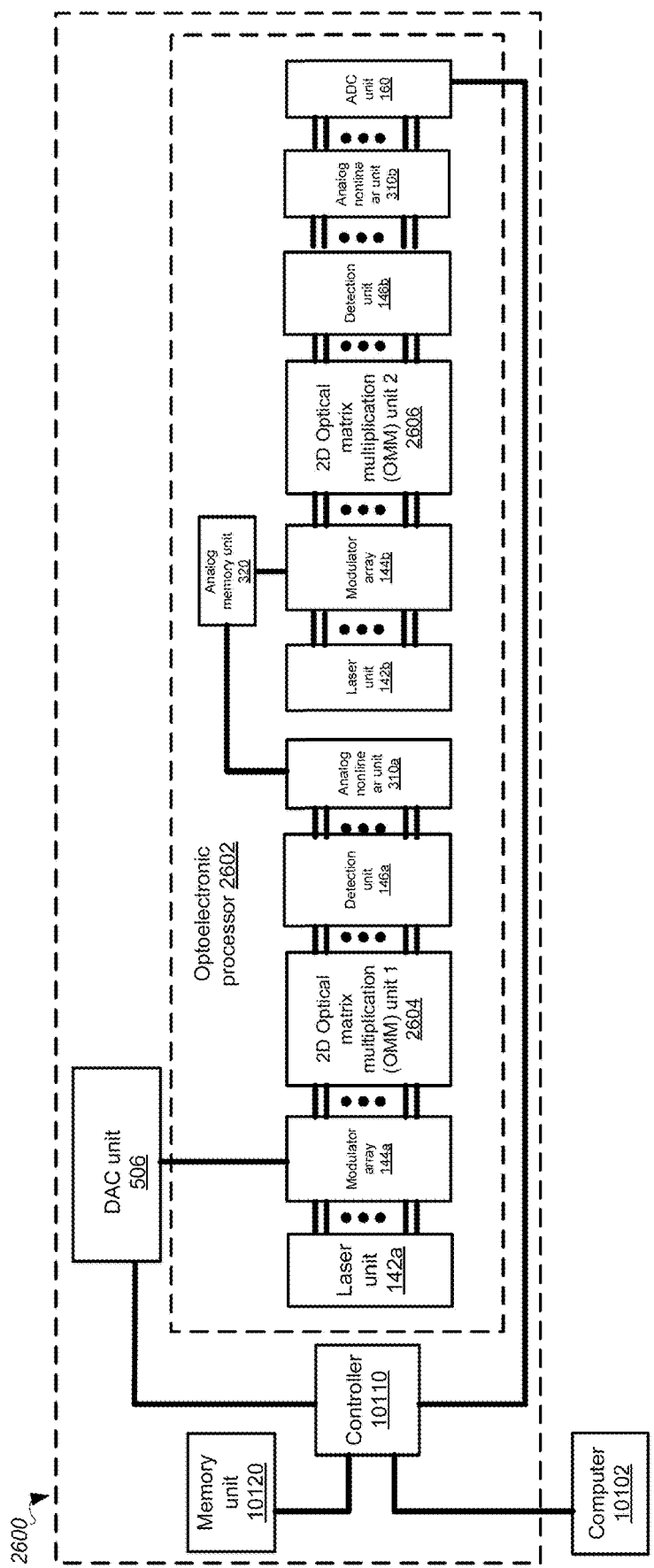
FIGS. 26 and 27 are schematic diagrams of examples of ANN computation systems.
Figure 27:
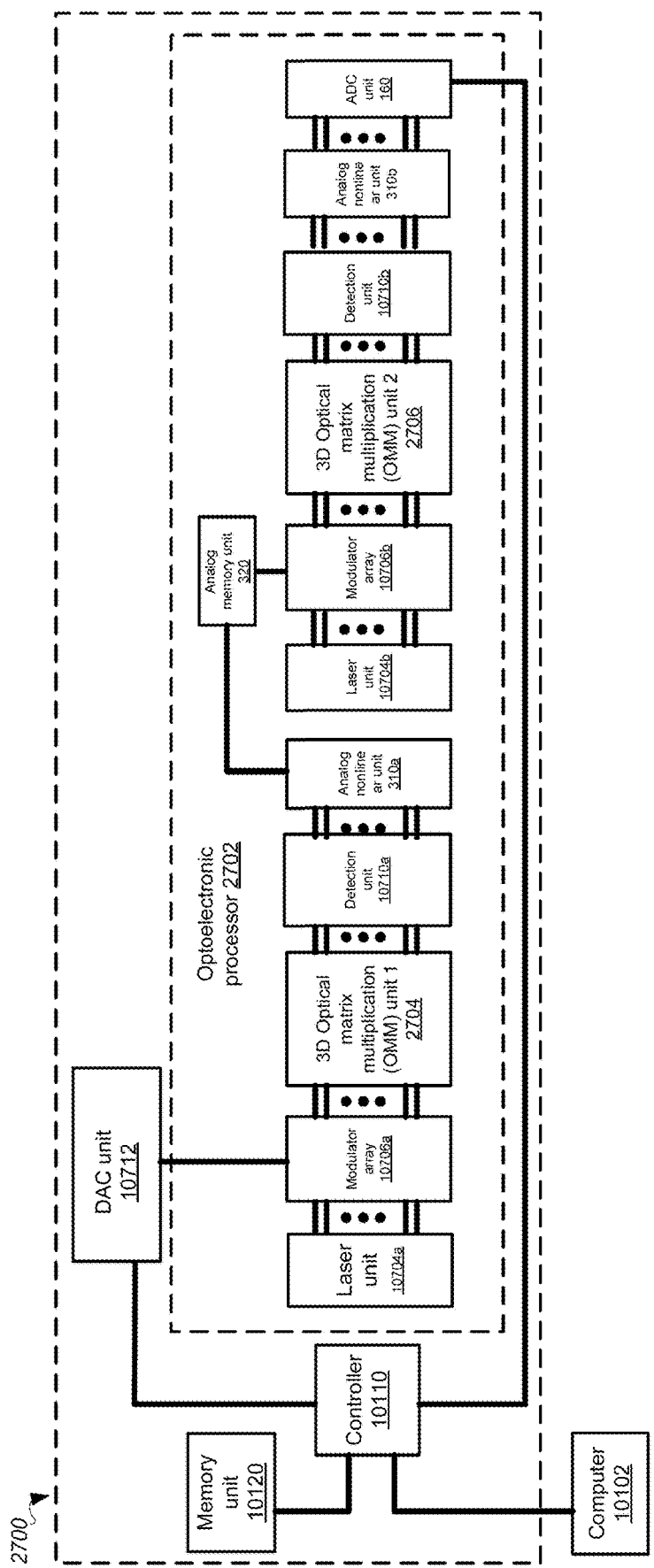
Figure 28:
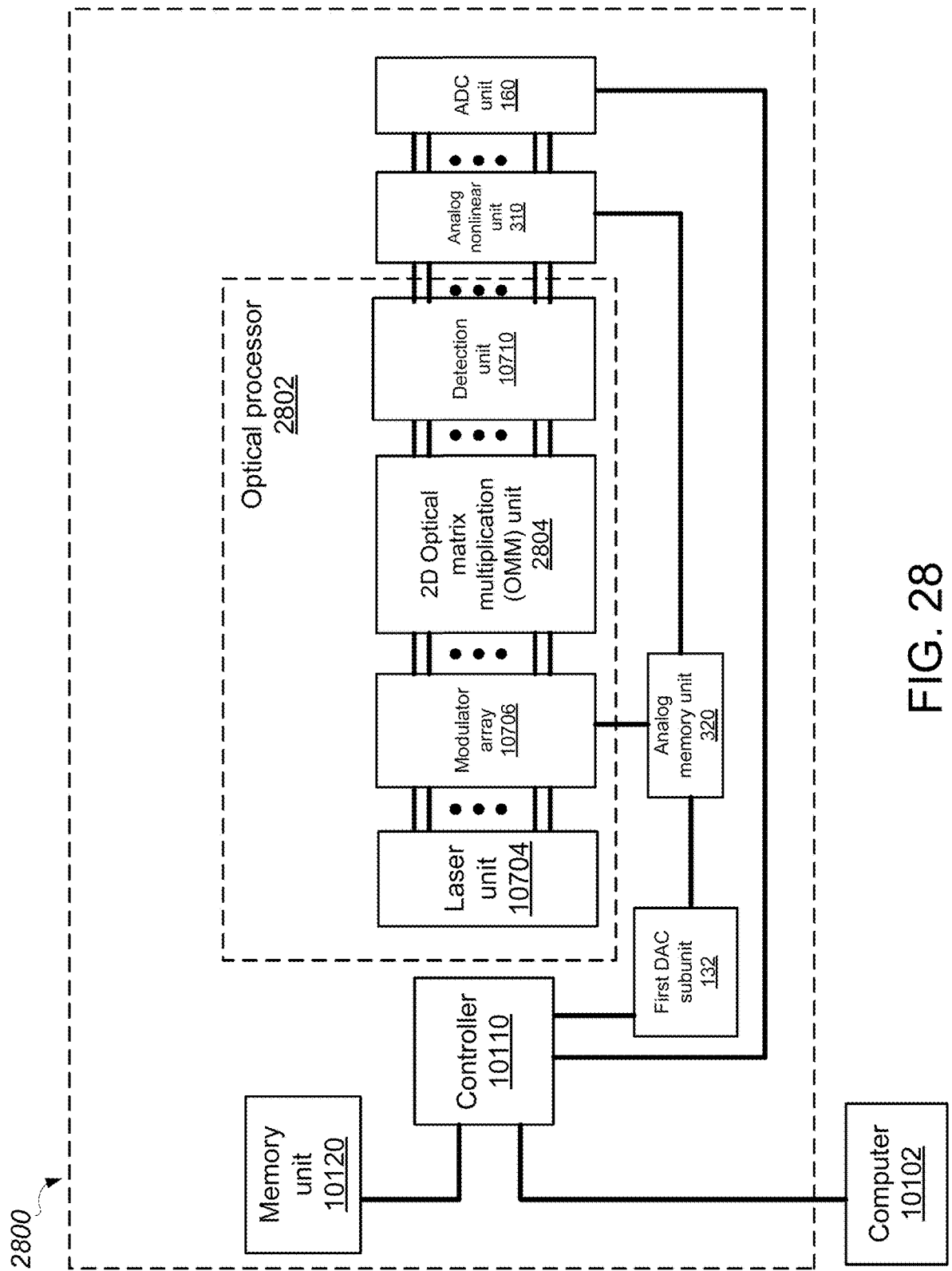
FIG. 28 is a schematic diagram of an example of a neural network computation system that uses a passive 2D optical matrix multiplication unit.
Figure 29:
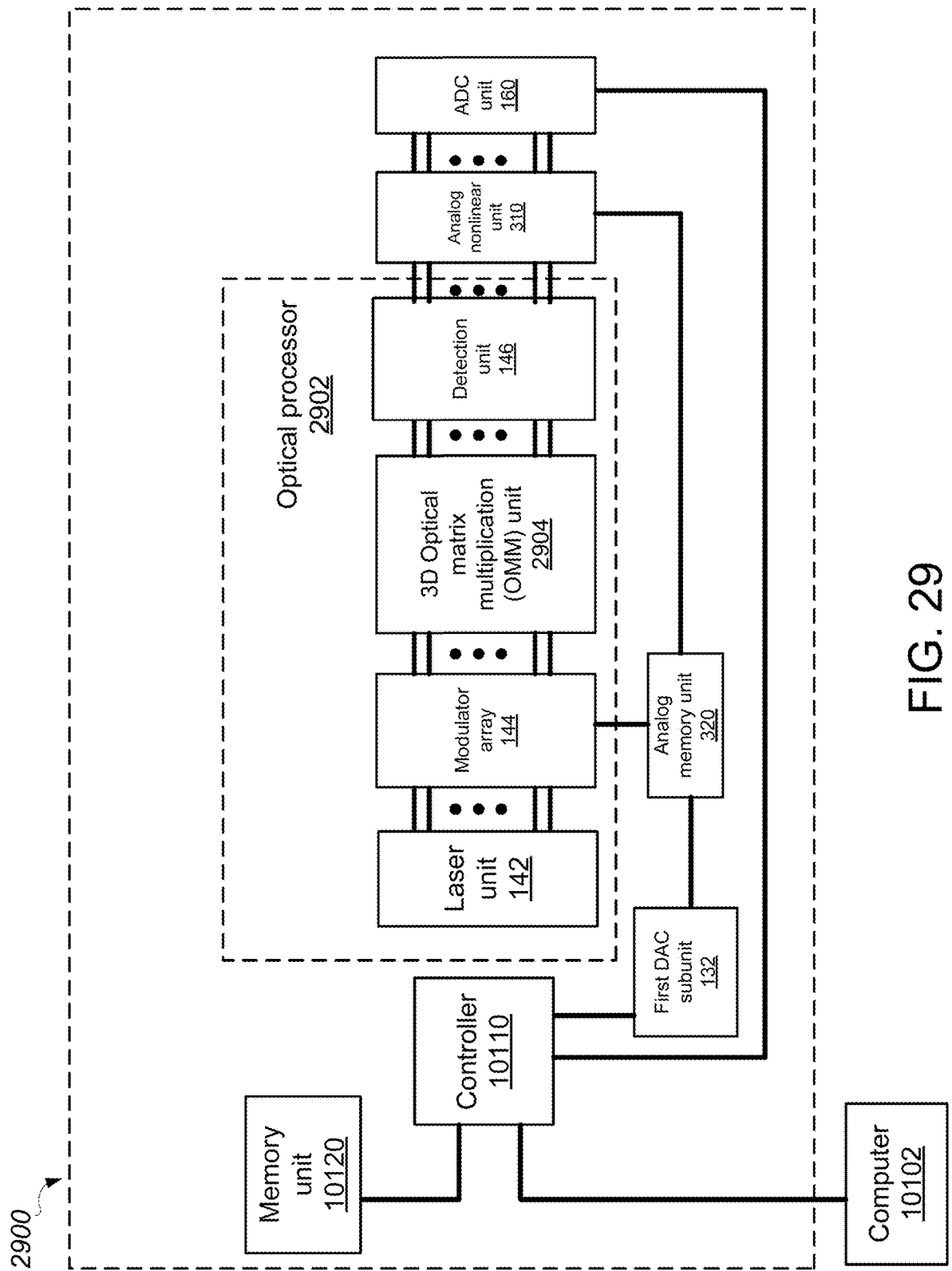
FIG. 29 is a schematic diagram of an example of a neural network computation system that uses a passive 3D optical matrix multiplication unit.
Figure 30:
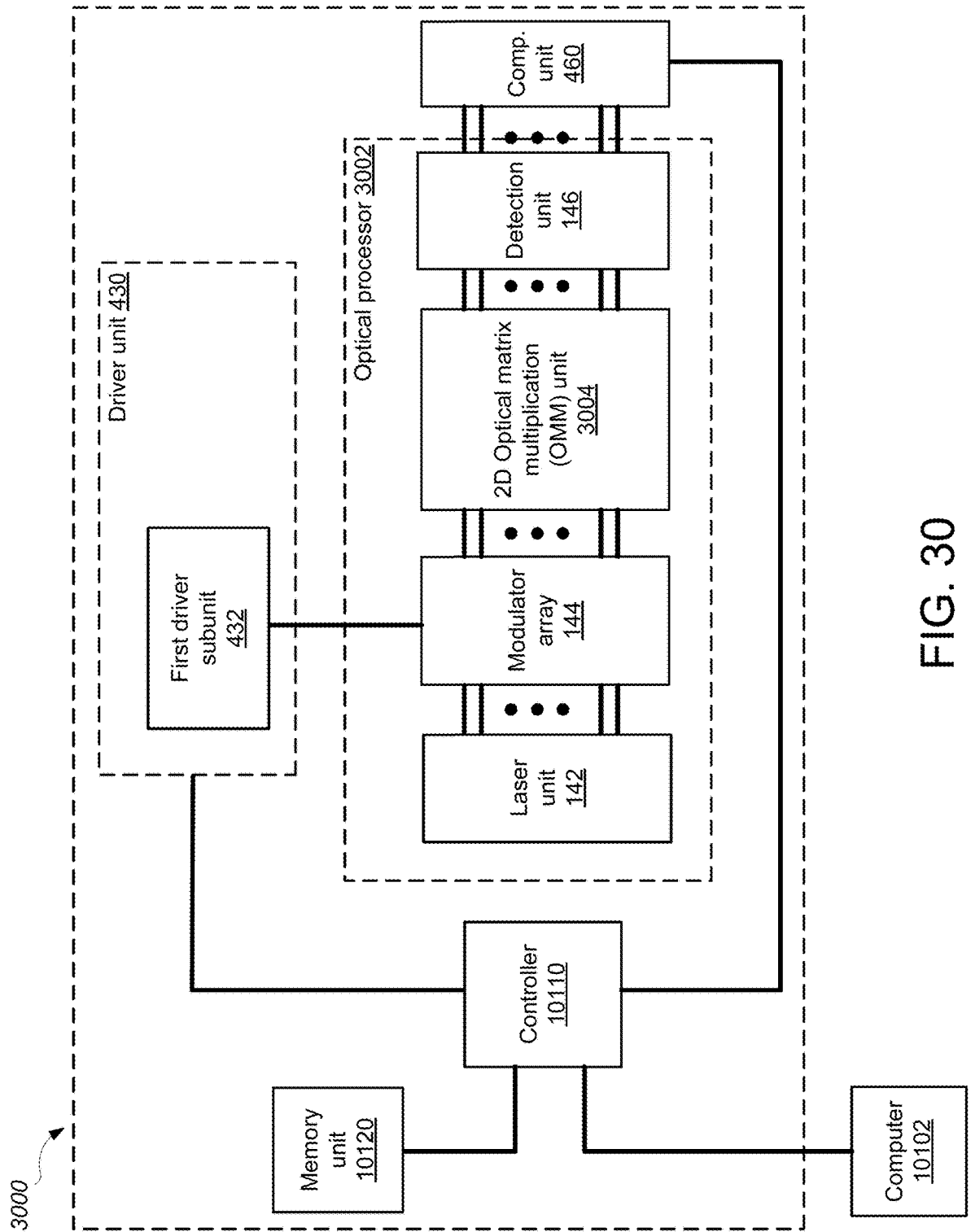
FIG. 30 is a schematic diagram of an example of an artificial neural network computation system with 1-bit internal resolution, in which the system uses a passive 2D optical matrix multiplication unit.
Figure 31:
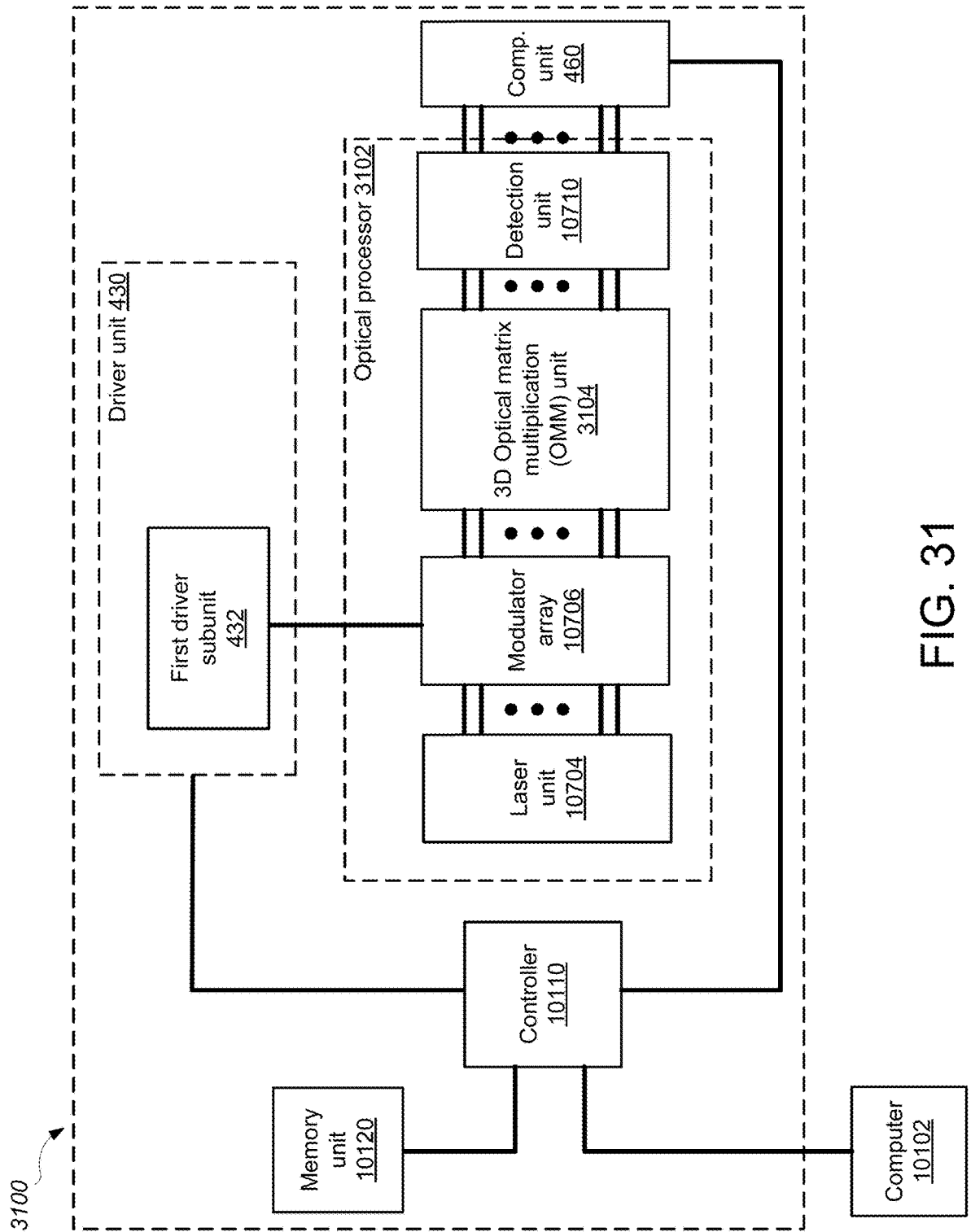
FIG. 31 is a schematic diagram of an example of an artificial neural network computation system with 1-bit internal resolution, in which the system uses a passive 3D optical matrix multiplication unit.
Figure 41:
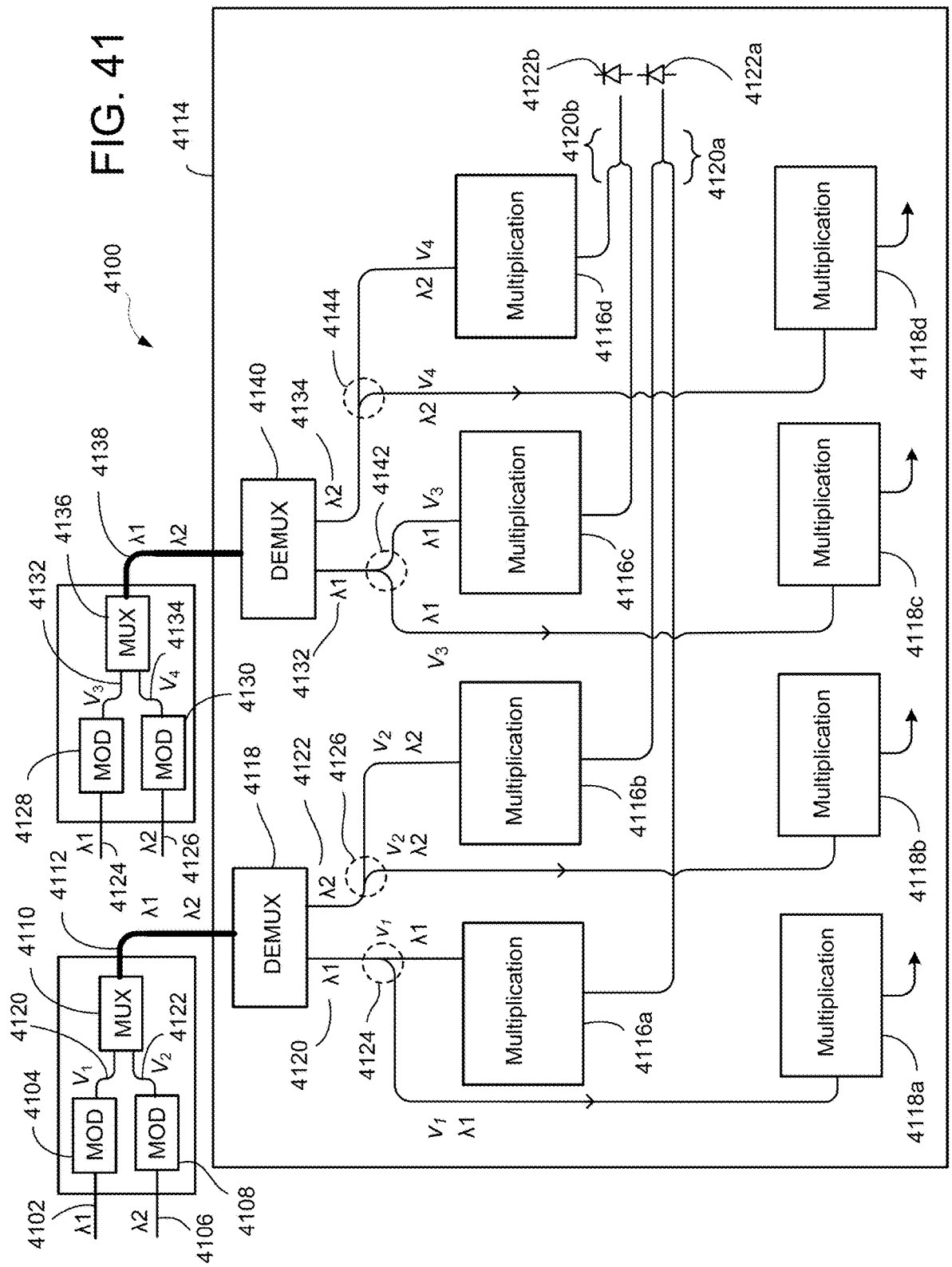
FIG. 41 is a schematic diagram of a computation system that includes optical fibers that each carry signals having multiple wavelengths.

For example, the photonic integrated circuit 110 of FIG. 1, 224 of FIGS. 2A to 2G, 3, 4, 5A to 5E, 706 of FIG. 7, 802 of FIGS. 8A, 8B, 902 of FIGS. 9A, 9B, 1012 of FIGS. 10A to 10C, and 224 of FIGS. 11A, 11B can include one or more of the components shown in FIGS. 18 to 24E, the modulator array 144a, the OMM unit 1 2604, the modulator array 144b, and the OMM unit 2 2606 of FIG. 26, the modulator array 1706a, the OMM unit 1 2704, the modulator array 1706b, the OMM unit 2 2706 of FIG. 27, the modulator array 1706 and the OMM unit 2804 of FIG. 28, the modulator array 144 and the OMM unit 2904 of FIG. 29, the modulator array 144 and the OMM unit 3004 of FIG. 30, the modulator array 1706 and the OMM unit 3104 of FIG. 31, the modulator array 144 and the OM unit 3220 of FIGS. 32A, 32B, the modulator array 144 and the OMM unit 3520 of FIGS. 35A, 35B, the components shown in FIG. 35C, the modulator array 144 and the OMM unit 3220 of FIGS. 36, 37, 38, the components of the system 4100 of FIG. 41, and the modulator array 144 and the OMM unit 150 of FIGS. 46A, 46F, 48A to 49A. For example, the digital storage module 234 of FIGS. 2A, 2B, 2D-2G, 3, 7, 804 of FIGS. 8A, 8B, 906 of GI. 9A, 9C, and 234 of FIGS. 11A, 11B can include one or more of the memory unit 10120 of FIGS. 26 to 32A, 35A, 36 to 38, 46A, 46F, and 48A to 49A. For example, the analog integrated circuit 236 and the digital electronic integrated circuit 232 of FIGS. 2A to 2G, 3, the hybrid digital/analog chip 708 of FIG. 7, the hybrid digital/analog chip 806 of FIGS. 8A, 8B, the hybrid digital/analog chip 908 of FIGS. 9A, 9B, and the digital electronic integrated circuit 232 of FIGS. 11A, 11B can include one or more of the controller 10110 of FIGS. 26 to 32A, 35A, 36 to 38, 46a, 46F, and 48A to 49A, one or more of the DAC unit 506 of FIG. 26, 1712 of FIG. 27, 132 of FIGS. 28, 29, 430 of FIGS. 30, 31, 130 of FIG. 32A, 134 of FIG. 32B, 130 of FIG. 35A, 134 of FIG. 35B, 130 of FIG. 36, 134 of FIG. 37, 430 of FIG. 38, 130 of FIGS. 46A, 46F, 48A, 134 of FIG. 48B, 430 of FIG. 49A, and one or more of the ADC unit 160 of FIGS. 26 to 29, 460 of FIGS. 30, 31, 160 of FIGS. 32A, 160 of FIGS. 35A, 36, 37, 460 of FIG. 38, 160 of FIGS. 46A, 46F, 48A, 48B, and 460 of FIG. 49A.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

While this specification contains many implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Figure 25:
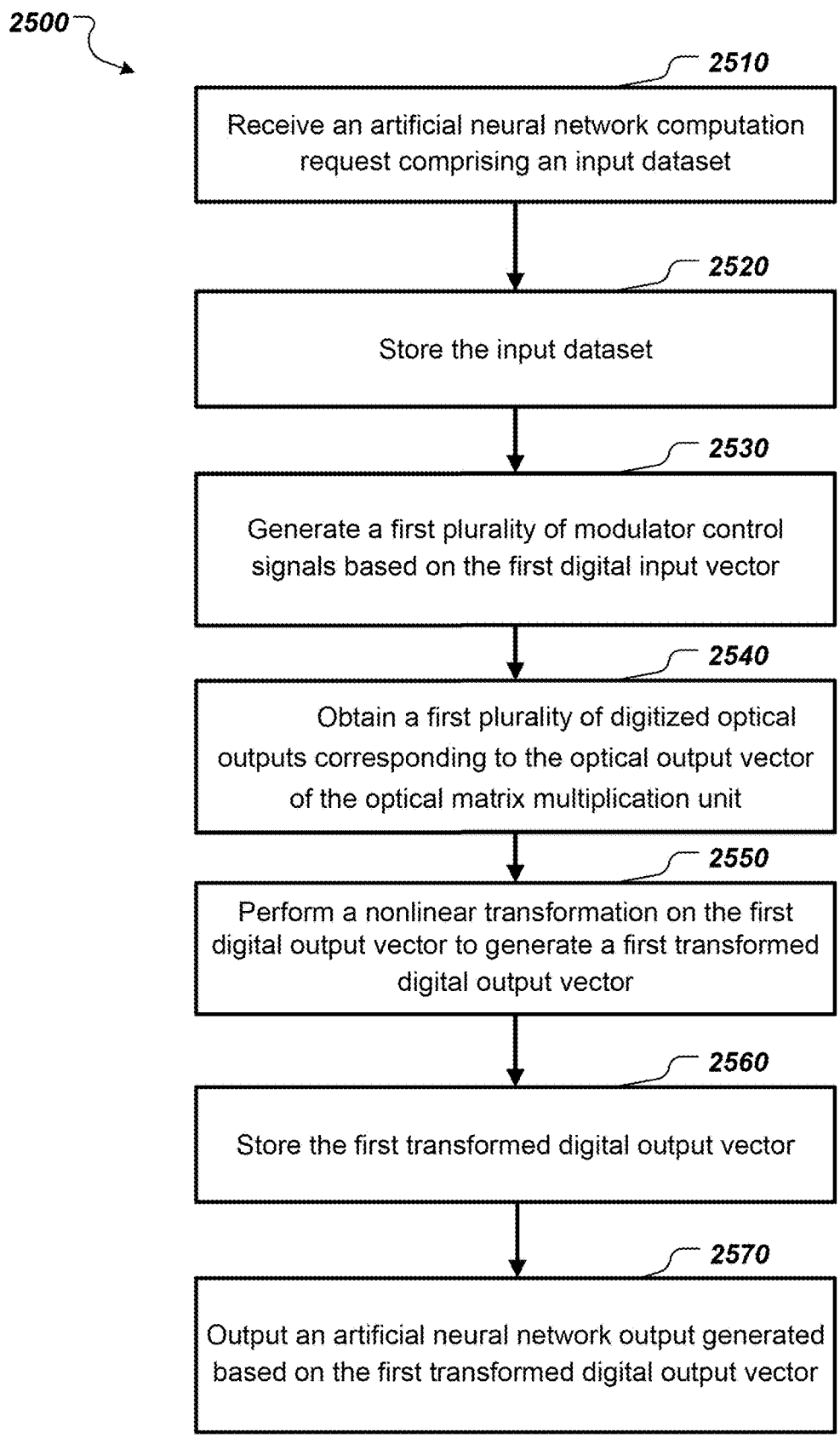
FIG. 25 is a flowchart showing an example of a method for performing an ANN computation.

FIG. 25 shows a flowchart of an example of a method 2500 for performing an ANN computation using the ANN computation system 500, 700, or 900 (described in PCT application PCT/US2020/023674) that include one or more optical matrix multiplication units or optical multiplication units that have passive diffractive elements, such as the 2D OMM unit, the 3D OMM unit, or the 1D OM unit. The steps of the process 2500 may be performed at least in part by the controller 10110. In some implementations, various steps of method 2500 can be run in parallel, in combination, in loops, or in any order.

At 2510, an artificial neural network (ANN) computation request comprising an input dataset is received. The input dataset includes a first digital input vector. The first digital input vector is a subset of the input dataset. For example, it may be a sub-region of an image. The ANN computation request may be generated by various entities, such as the computer 10102. The computer may include one or more of various types of computing devices, such as a personal computer, a server computer, a vehicle computer, and a flight computer. The ANN computation request generally refers to an electrical signal that notifies or informs the ANN computation system of an ANN computation to be performed. In some implementations, the ANN computation request may be divided into two or more signals. For example, a first signal may query the ANN computation system to check whether the system is ready to receive the input dataset. In response to a positive acknowledgement by the system, the computer may send a second signal that includes the input dataset.

At 2520, the input dataset is stored. The controller 10110 may store the input dataset in the memory unit 10120. Storing of the input dataset in the memory unit 10120 may allow flexibilities in the operation of the ANN computation system that, for example, can improve the overall performance of the system. For example, the input dataset can be divided into digital input vectors of a set size and format by retrieving desired portions of the input dataset from the memory unit 10120. Different portions of the input dataset can be processed in various order, or be shuffled, to allow various types of ANN computations to be performed. For example, shuffling may allow matrix multiplication by block matrix multiplication technique in cases where the input and output matrix sizes are different. As another example, storing of the input dataset in the memory unit 10120 may allow queuing of multiple ANN computation requests by the ANN computation system, which may allow the system to sustain operation at its full speed without periods of inactivity.

At 2530, a first plurality of modulator control signals is generated based on the first digital input vector. The controller 10110 may send a first DAC control signal to the DAC unit for generating the first plurality of modulator control signals. The DAC unit generates the first plurality of modulator control signals based on the first DAC control signal, and the modulator array 144 generates the optical input vector representing the first digital input vector.

The first DAC control signal may include multiple digital values to be converted by the DAC unit into the first plurality of modulator control signals. The multiple digital values are generally in correspondence with the first digital input vector, and may be related through various mathematical relationships or look-up tables. For example, the multiple digital values may be linearly proportional to the values of the elements of the first digital input vector. As another example, the multiple digital values may be related to the elements of the first digital input vector through a look-up table configured to maintain a linear relationship between the digital input vector and the optical input vector generated by the modulator array 144.

In some implementations, the 2D OMM unit, 3D OMM unit, or 1D OM unit is configured to performing optical matrix processing or optical multiplication based on the optical input vector and a plurality of neural network weights implemented using passive diffractive elements. The plurality of neural network weights representing a matrix M may be decomposed through singular value decomposition (SVD) method into M=USV*, where U is an M×M unitary matrix, S is an M×N diagonal matrix with non-negative real numbers on the diagonal, and V* is the complex conjugate of an N×N unitary matrix V. In such cases, the passive diffractive elements may be configured to implement the matrix V, the matrix S, and the matrix U such that the OMM unit 502 or 708 as a whole implements the matrix M.

At 2540, a first plurality of digitized optical outputs corresponding to the optical output vector of the optical matrix multiplication unit or optical multiplication is obtained. The optical input vector generated by the modulator array 144 is processed by the 2D OMM unit, 3D OMM unit, or the 1D OM unit and transformed into an optical output vector. The optical output vector is detected by the detection unit 146 and converted into electrical signals that can be converted into digitized values by the ADC unit 160. The controller 10110 may, for example, send a conversion request to the ADC unit 160 to begin a conversion of the voltages output by the detection unit 146 into digitized optical outputs. Once the conversion is complete, the ADC unit 160 may send the conversion result to the controller 10110. Alternatively, the controller 10110 may retrieve the conversion result from the ADC unit 160. The controller 10110 may form, from the digitized optical outputs, a digital output vector that corresponds to the result of the matrix multiplication or vector multiplication of the input digital vector. For example, the digitized optical outputs may be organized, or concatenated, to have a vector format.

In some implementations, the ADC unit 160 may be set or controlled to perform an ADC conversion based on a DAC control signal issued to the DAC unit by the controller 10110. For example, the ADC conversion may be set to begin at a preset time following the generation of the modulation control signal by the DAC unit. Such control of the ADC conversion may simplify the operation of the controller 10110 and reduce the number of necessary control operations.

At 2550, a nonlinear transformation is performed on the first digital output vector to generate a first transformed digital output vector. A node, or an artificial neuron, of an ANN operates by first performing a weighted sum of the signals received from nodes of a previous layer, then performing a nonlinear transformation ("activation") of the weighted sum to generate an output. Various types of ANN may implement various types of differentiable, nonlinear transformations. Examples of nonlinear transformation functions include a rectified linear unit (RELU) function, a Sigmoid function, a hyperbolic tangent function, an $X^2$ function, and a IX function. Such nonlinear transformations are performed on the first digital output by the controller 10110 to generate the first transformed digital output vector. In some implementations, the nonlinear transformations may be performed by a specialized digital integrated circuitry within the controller 10110. For example, the controller 10110 may include one or more modules or circuit blocks that are specifically adapted to accelerate the computation of one or more types of nonlinear transformations.

At 2560, the first transformed digital output vector is stored. The controller 10110 may store the first transformed digital output vector in the memory unit 10120. In cases where the input dataset is divided into multiple digital input vectors, the first transformed digital output vector corresponds to a result of the ANN computation of a portion of the input dataset, such as the first digital input vector. As such, storing of the first transformed digital output vector allows the ANN computation system to perform and store additional computations on other digital input vectors of the input dataset to later be aggregated into a single ANN output.

At 2570, an artificial neural network output generated based on the first transformed digital output vector is output. The controller 10110 generates an ANN output, which is a result of processing the input dataset through the ANN defined by the first plurality of neural network weights. In cases where the input dataset is divided into multiple digital input vectors, the generated ANN output is an aggregated output that includes the first transformed digital output, but may further include additional transformed digital outputs that correspond to other portions of the input dataset. Once the ANN output is generated, the generated output is sent to a computer, such as the computer 10102, that originated the ANN computation request.

The 2D OMM unit, 3D OMM unit, or 1D OM unit can represent the weight coefficients of one hidden layer of a neural network. If the neural network has several hidden layers, additional 2D OMM unit, 3D OMM unit, or 1D OM unit can be coupled in series. FIG. 26 shows an example of an ANN computation system 2600 for implementing a neural network having two hidden layers. A first 2D optical matrix multiplication unit 2604 represents the weight coefficients of the first hidden layer, and a second 2D optical matrix multiplication unit 2606 represents the weight coefficients of the second hidden layer. The ANN computation system 2600 includes a controller 10110, a memory unit 10120, a DAC unit 506, and an optoelectronic processor 2602. The optoelectronic processor 2602 is configured to perform matrix computations using optical and electronic components.

The optoelectronic processor 2602 includes a first laser unit 142*a*, a first modulator array 144*a*, the first 2D optical matrix multiplication unit 2604, a first detection unit 146*a*, a first analog non-linear unit 310*a*, an analog memory unit 320, a second laser unit 142*b*, a second modulator array 144*b*, the second 2D optical matrix multiplication unit 2606, a second detection unit 146*b*, a second analog non-linear unit 310*b*, and an ADC unit 160. The operations of the first laser unit 142, the first modulator array 144*a*, the first detection unit 146*a*, the first analog non-linear unit 310*a*, and the analog memory unit 320 are similar to corresponding components shown in FIG. 48B. The output of the analog memory unit 320 drives the second modulator array 144*b*, which modulates the laser light from the second laser unit 142*b* to generate an optical vector. The optical vector from the second modulator array 144*b* is processed by the second 2D OMM unit 2606, which performs a matrix multiplication and generates an optical output vector that is detected by the second detection unit 246*b*. The second detection unit 246*b* is configured to generate output voltages corresponding to the optical signals of the optical output vector from the second 2D OMM unit 2606. The ADC unit 160 is configured to convert the output voltages into digitized output voltages. The controller 10110 may obtain, from the ADC unit 160, the digitized outputs corresponding to the optical output vector of the second 2D OMM unit 2606. The controller 10110 may form, from the digitized outputs, a digital output vector that corresponds to the result of the second matrix multiplication of the nonlinear transformation of the result of the first matrix multiplication of the input digital vector. The second laser unit 142*b* can be combined with the first laser unit 142*a* by using optical splitters to divert some of the light from the first laser unit 142*a* to the second modulator array 144*b*.

The principle described above can be applied to implementing a neural network having three or more hidden layers, in which the weight coefficients of each hidden layer is represented by a corresponding 2D OMM unit.

FIG. 27 shows an example of an ANN computation system 2700 for implementing a neural network having two hidden layers. A first 3D optical matrix multiplication unit 2704 represents the weight coefficients of the first hidden layer, and a second 3D optical matrix multiplication unit 2706 represents the weight coefficients of the second hidden layer. The ANN computation system 2700 includes a controller 10110, a memory unit 10120, a DAC unit 10712, and an optoelectronic processor 2702. The optoelectronic processor 2702 is configured to perform matrix computations using optical and electronic components.

The optoelectronic processor 2702 includes a first laser unit 10704*a*, a first modulator array 10706*a*, the first 3D optical matrix multiplication unit 2704, a first detection unit 10710*a*, a first analog non-linear unit 310*a*, an analog memory unit 320, a second laser unit 10704*b*, a second modulator array 10706*b*, the second 2D optical matrix multiplication unit 2706, a second detection unit 10710*b*, a second analog non-linear unit 310*b*, and an ADC unit 160. The operations of the first laser unit 10704*a*, the first modulator array 10706*a*, the first detection unit 10710*a*, the first analog non-linear unit 310*a*, and the analog memory unit 320 are similar to corresponding components shown in FIG. 48B. The output of the analog memory unit 320 drives the second modulator array 10706*b*, which modulates the laser light from the second laser unit 10704*b* to generate an optical vector. The optical vector from the second modulator array 10706*b* is processed by the second 3D OMM unit 2706, which performs a matrix multiplication and generates an optical output vector that is detected by the second detection unit 10710*b*. The second detection unit 10710*b* is configured to generate output voltages corresponding to the optical signals of the optical output vector from the 3D OMM unit 2706. The ADC unit 160 is configured to convert the output voltages into digitized output voltages. The controller 10110 may obtain, from the ADC unit 160, the digitized outputs corresponding to the optical output vector of the second 3D OMM unit 2706. The controller 10110 may form, from the digitized outputs, a digital output vector that corresponds to the result of the second matrix multiplication of the nonlinear transformation of the result of the first matrix multiplication of the input digital vector. The second laser unit 10704*b* can be combined with the first laser unit 10704*a* by using optical splitters to divert some of the light from the first laser unit 10704*a* to the second modulator array 10706*b*.

The principle described above can be applied to implementing a neural network having three or more hidden layers, in which the weight coefficients of each hidden layer is represented by a corresponding 3D OMM unit.

The 2D OMM units 502 and 3D OMM units 10708 having passive diffractive optical elements are suitable for use in recurrent neural networks (RNN) in which the output of the network during a (k)th pass through the neural network is recirculated back to the input of the neural network and used as the input during the (k+1)th pass, such that the weight coefficients of the neural network remain the same during the multiple passes.

FIG. 28 shows an example of a neural network computation system 2800, which can be used to implement a recurrent neural network. The system 2800 includes an optical processor 2802 that operates in a manner similar to that of the optical processor 140 of FIG. 48B, except that the OMM unit 150 is replaced by the 2D OMM unit 2804. The neural network weights for the 2D OMM unit 2804 are fixed, so the system 2800 does not need the second DAC subunit 134 that is used in the system 302 of FIG. 48B.

FIG. 29 shows an example of a neural network computation system 2900, which can be used to implement a recurrent neural network. The system 2900 includes an optical processor 2902 that operates in a manner similar to that of the optical processor 140 of FIG. 48B. The neural network weights for the 3D OMM unit 2904 are fixed, so the system 2900 does not need the second DAC subunit 134 that is used in the system 302 of FIG. 48B.

FIG. 30 shows a schematic diagram of an example of an artificial neural network computation system 3000 with 1-bit internal resolution. The ANN computation system 3000 is similar to the ANN computation system 400 of FIG. 49A, except that the OMM unit 150 is replaced by the 2D OMM unit 3004, and the second driver subunit 434 is omitted. The ANN computation system 3000 operates in a manner similar to that of the ANN computation system 400, in which the input vector is decomposed into several 1-bit vectors, and certain ANN computation may then be performed by performing a series of matrix multiplication of the 1-bit vectors followed by summation of the individual matrix multiplication result.

FIG. 31 shows a schematic diagram of an example of an artificial neural network computation system 3100 with 1-bit internal resolution. The ANN computation system 3100 is similar to the ANN computation system 400 of FIG. 49A, except that the OMM unit 150 is replaced by the 3D OMM unit 3104, and the second driver subunit 434 is omitted. The ANN computation system 3100 operates in a manner similar to that of the ANN computation system 400, in which the input vector is decomposed into several 1-bit vectors, and certain ANN computation may then be performed by performing a series of matrix multiplication of the 1-bit vectors followed by summation of the individual matrix multiplication result.

Some background information for the various systems described in this specification is disclosed in U.S. Provisional Application 62/680,944, filed on Jun. 5, 2018, U.S. Provisional Application 62/744,706, filed on Oct. 12, 2018, and U.S. application Ser. No. 16/431,167, filed on Jun. 4, 2019. The entire disclosures of the above applications are hereby incorporated by reference.

For example, an optical copying distribution network can include a plurality of optical splitters, a plurality of directional couplers, or both. For example, the optical copying distribution network can include cascaded directional couplers that has N output ports, in which each output port outputs 1/N of the input power to the optical copying distribution network.

Some of the systems, components, and/or functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented using one or more modules of computer program instructions encoded on a computer-readable medium for execution by, or to control the operation of, data processing apparatus. The computer-readable medium can be a manufactured product, such as hard drive in a computer system or an optical disc sold through retail channels, or an embedded system. The computer-readable medium can be acquired separately and later encoded with the one or more modules of computer program instructions, such as by delivery of the one or more modules of computer program instructions over a wired or wireless network. The computer-readable medium can be a machine-readable storage device, a machine-readable storage substrate, a memory device, or a combination of one or more of them.

A computer program (also known as a program, software, software application, script, or code) can be written in any form of programming language, including compiled or interpreted languages, declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

Although the present invention is defined in the attached claims, it should be understood that the present invention can also be defined in accordance with the following embodiments:

Embodiment 1: A method for assembling a photonic computing system, the method comprising:
  attaching a photonic source to a support structure, the photonic source comprising:
    a first laser die on a substrate and configured to provide a first optical beam, and
    a second laser die on the substrate and configured to provide a second optical beam;
  attaching a photonic integrated circuit to the support structure, the photonic integrated circuit comprising:
    a first waveguide and a first coupler coupled to the first waveguide, and
    a second waveguide and a second coupler coupled to the second waveguide; and
  attaching a plurality of beam-shaping optical elements to the support structure, the substrate, or the photonic integrated circuit, the attaching comprising:
    providing, using the first laser die, the first optical beam, aligning a first beam-shaping optical element during attachment so that the first optical beam is coupled to the first coupler, and providing, using the second laser die, the second optical beam, aligning a second beam-shaping optical element during attachment so that the second optical beam is coupled to the second coupler.

Embodiment 2: The method of embodiment 1, wherein aligning the first beam-shaping optical element during attachment of the first beam-shaping optical element includes translating the first beam-shaping optical element with respect to the support structure, the substrate, or the photonic integrated circuit.

Embodiment 3: The method of embodiment 2, wherein the translation is substantially within a plane parallel to a common plane.

Embodiment 4: The method of any one of embodiments 1 to 3, wherein aligning the first beam-shaping optical element during attachment of the first beam-shaping optical element includes monitoring feedback indicating a coupling efficiency of the first beam into the first waveguide through the first coupler.

Embodiment 5: The method of any one of embodiments 1 to 4, wherein aligning the second beam-shaping optical element during attachment of the second beam-shaping optical element occurs after attachment of the first beam-shaping optical element has been completed.

Embodiment 6: The method of embodiment 1, wherein the photonic source comprises a third laser die on the substrate configured to provide a third optical beam, the first laser die is configured to provide the first optical beam from a first emitting location, the second laser die is configured to provide the second optical beam from a second emitting location, the third laser die is configured to provide the third optical beam from a third emitting location, wherein the first, second, and third emitting locations are substantially aligned along a line.

Embodiment 7: The method of embodiment 6, wherein the photonic source comprises a fourth laser die on the substrate configured to provide a fourth optical beam from a fourth emitting location, wherein the first, second, third, and fourth emitting locations are substantially aligned along a plane.

Embodiment 8: The method of any of embodiments 1 to 7, wherein the first laser die and the second laser die are oriented such that the first optical beam and the second optical beam are substantially aligned along a plane.

Embodiment 9: The method of any of embodiments 6 to 8, wherein the first, second, and third laser dies are oriented such that the first, second, and third optical beams are substantially aligned along a plane.

Embodiment 10: The method of any of embodiments 1 to 9, wherein the photonic source comprises a chip-on-submount structure that includes a laser diode bar that comprises a plurality of laser dies, including the first and second laser dies, attached to a structure that includes at least one of a heatsink or a thermoelectric cooler.

Embodiment 11: The method of embodiment 10 in which the chip-on-submount structure is attached to a structure that includes the thermoelectric cooler, and the method comprises providing a thermoelectric cooler controller that is configured to control a temperature of the thermoelectric cooler.

Embodiment 12: The method of any of embodiments 1 to 11, wherein the first and second beam-shaping optical elements comprise lenses.

Embodiment 13: The method of any of embodiments 1 to 12, wherein the first and second couplers comprise waveguide grating couplers coupled to the respective first and second waveguides.

Embodiment 14: The method of any of embodiments 1 to 12, wherein the first and second couplers comprise edge couplers coupled to the respective first and second waveguides.

Embodiment 15: The method of any of embodiments 1 to 14, wherein the support structure comprises an interposer that provides electrical signal paths for electrical signals from the photonic integrated circuit.

Embodiment 16: The method of embodiment 15, wherein the interposer comprises an optoelectronic interposer that provides optical signal paths for optical signals from the photonic integrated circuit.

Embodiment 17: The method of embodiment 15 or 16, comprising attaching the interposer to an LGA substrate.

Embodiment 18: The method of embodiment 16, wherein the photonic integrated circuit is attached to the optoelectronic interposer in a controlled collapse chip connection.

Embodiment 19: The method of any of embodiments 1 to 14, wherein the support structure comprises an LGA substrate.

Embodiment 20: The method of any of embodiments 1 to 19, comprising electrically coupling a first electronic integrated circuit to a top side of the photonic integrated circuit, and electrically coupling a second electronic integrated circuit to a bottom side of the photonic integrated circuit.

Embodiment 21: The method of embodiment 20, wherein the second electronic integrated circuit comprises a digital storage module, and the first electronic integrated circuit comprises a hybrid digital/analog integrated circuit that is configured to provide analog control signals for controlling photonic computing elements in the photonic integrated circuit and send/receive digital data to/from the digital storage module.

Embodiment 22: The method of embodiment 20 or 21, wherein the photonic integrated circuit comprises a substrate, and the method comprises providing conductive vias that pass through the substrate of the photonic integrated circuit to enable electrical signals to be transmitted between the first electronic integrated circuit and the second electronic integrated circuit through the conductive vias.

Embodiment 23: An apparatus comprising:
a photonic source attached to a support structure, the photonic source comprising:
 a first laser die on a first substrate in which the first laser die is configured to provide a first optical beam, and
 a second laser die on the first substrate or a second substrate in which the second laser die is configured to provide a second optical beam;
a photonic integrated circuit attached to the support structure, the photonic integrated circuit comprising:
 a first waveguide and a first coupler coupled to the first waveguide, and
 a second waveguide and a second coupler coupled to the second waveguide; and
a plurality of beam-shaping optical elements attached to at least one of the support structure, the first substrate, respective first and second substrates, or the photonic integrated circuit, wherein the beam-shaping optical elements comprise:
 a first beam-shaping optical element configured to couple the first optical beam to the first coupler on the photonic integrated circuit, and a second beam-shaping optical element configured to couple the second optical beam to the second coupler on the photonic integrated circuit.

Embodiment 24: The apparatus of embodiment 23, further comprising a beam-redirecting optical element attached to the photonic integrated circuit, the beam-redirecting element configured to redirect the first optical beam into the first coupler and to redirect the second optical beam into the second coupler.

Embodiment 25: The apparatus of embodiment 24, wherein the beam-redirecting element comprises a first surface that is configured to reflect the first optical beam into the first coupler, and a second surface that is configured to reflect the second optical beam into the second coupler.

Embodiment 26: The apparatus of embodiment 25, wherein the first surface of the beam-redirecting element overlaps the second surface of the beam-redirecting element.

Embodiment 27: The apparatus of any of embodiments 24 to 26, wherein the beam-redirecting optical element comprises a prism.

Embodiment 28: The apparatus of any of embodiments 24 to 26, wherein the beam-redirecting optical element comprises a mirror.

Embodiment 29: The apparatus of any of embodiments 23 to 28, wherein the photonic source comprises a third laser die disposed on the substrate and configured to provide a third optical beam, the first laser die is configured to provide the first optical beam from a first emitting location, the second laser die is configured to provide the second optical beam from a second emitting location, the third laser die is configured to provide the third optical beam from a third emitting location,
   wherein the first, second, and third emitting locations are substantially aligned along a line, and a distance between any of the first, second, and third emitting locations and the line is less than a specified distance.

Embodiment 30: The apparatus of embodiment 29, wherein the photonic source comprises a fourth laser die on the substrate, the fourth laser die is configured to provide a fourth optical beam from a fourth emitting location,
   wherein the first, second, third, and fourth emitting locations are substantially aligned along a plane, and a distance between any of the first, second, third, and fourth emitting locations and the plane is less than a specified distance.

Embodiment 31: The apparatus of any of embodiments 23 to 30, wherein the photonic source comprises at least eight laser dies on the first substrate or respective substrates, including the first and second laser dies, with the first substrate or the respective substrates attached to one or more heatsink structures.

Embodiment 32: The apparatus of embodiment 31, wherein the laser dies are configured to provide optical beams from corresponding emitting locations that are substantially aligned along a plane, and a distance between any of the emitting locations and the plane is less than a specified distance.

Embodiment 33: The apparatus of any of embodiments 23 to 32, wherein the first and second beam-shaping optical elements comprise lenses.

Embodiment 34: The apparatus of any of embodiments 23 to 33, wherein the first and second couplers comprise waveguide grating couplers coupled to the respective first and second waveguides.

Embodiment 35: The apparatus of any of embodiments 23 to 33, wherein the first and second couplers comprise edge couplers coupled to the respective first and second waveguides.

Embodiment 36: The apparatus of any of embodiments 23 to 35, wherein the support structure comprises an optoelectronic interposer that provides electrical signal paths for electrical signals from the photonic integrated circuit, and optical signal paths for optical signals from the photonic integrated circuit.

Embodiment 37: The apparatus of embodiment 36, wherein the photonic integrated circuit is attached to the optoelectronic interposer in a controlled collapse chip connection.

Embodiment 38: The apparatus of embodiment 37, further comprising an electronic integrated circuit.

Embodiment 39: The apparatus of embodiment 38, wherein the photonic integrated circuit comprises optoelectronic computing elements, and the electronic integrated circuit comprises control circuitry configured to provide electronic control signals for controlling the optoelectronic computing elements.

Embodiment 40: The apparatus of embodiment 39, wherein the optoelectronic computing elements comprise at least one optical modulator that modulates an optical signal based on at least one of the electronic control signals.

Embodiment 41: The apparatus of any of embodiments 38 to 40, wherein the electronic integrated circuit is attached to the optoelectronic interposer in a controlled collapse chip connection.

Embodiment 42: The apparatus of any of embodiments 38 to 40, wherein the electronic integrated circuit is attached to the photonic integrated circuit in a controlled collapse chip connection.

Embodiment 43: The apparatus of any of embodiments 36 to 42, further comprising a high bandwidth memory (HBM) stack of two or more dynamic random access memory (DRAM) integrated circuits attached to the optoelectronic interposer Embodiment 44: The apparatus of any of embodiments 23 to 43 in which the first laser die is configured such that the first optical beam has a first wavelength, the second laser die is configured such that the second optical beam has a second wavelength, the first wavelength is different from the second wavelength, and the photonic integrated circuit includes a wavelength division multiplexed computation module that concurrently processes a first optical signal derived from the first optical beam and a second optical signal derived from the second optical beam.

Embodiment 45: An apparatus comprising:
   a photonic source attached to a support structure, the photonic source comprising:
      a laser module that is configured to provide an optical beam;
   a photonic integrated circuit attached to the support structure, the photonic integrated circuit comprising:
      a first waveguide and a coupler coupled to the first waveguide, and
      optoelectronic circuitry that is in optical communication with the first waveguide and is configured to receive one or more electrical signals from one or more control electrodes;
   at least one beam-shaping optical element attached to the support structure, the photonic source, or the photonic integrated circuit, in which the beam-shaping optical element is configured to couple the optical beam to the coupler on the photonic integrated circuit;

a digital electronic module in electrical contact with the photonic integrated circuit; and an electrical integrated circuit in electrical contact with the photonic integrated circuit, and comprising analog circuitry and digital circuitry, wherein the analog circuitry is in electrical contact with at least one of the one or more control electrodes;

wherein the photonic integrated circuit further comprises a plurality of metal paths through at least a portion of the photonic integrated circuit configured to provide electrical contact between the digital circuitry in the electrical integrated circuit and the digital electronic module.

Embodiment 46: The apparatus of embodiment 45, wherein the digital electronic module is in electrical contact with the photonic integrated circuit on a same surface as the electrical integrated circuit.

Embodiment 47: The apparatus of embodiment 45, wherein the digital electronic module is in electrical contact with a first surface of the photonic integrated circuit, the electrical integrated circuit is in electrical contact with a second surface of the photonic integrated circuit, the second surface is opposite the first surface.

Embodiment 48: The apparatus of any of embodiments 45 to 47, wherein the digital electronic module comprises a stack of two or more dynamic random access memory (DRAM) dies.

Embodiment 49: The apparatus of any of embodiments 45 to 48, wherein the support structure comprises a substrate comprising an array of surface-mount electrical contacts in communication with electrical contacts of the photonic integrated circuit.

Embodiment 50: A method for assembling a photonic computing system, the method comprising:

attaching a plurality of laser dies to a first support structure, in which each laser die is configured to generate an optical beam;

attaching a photonic integrated circuit to the first support structure, in which the photonic integrated circuit comprises:
  a plurality of optical waveguides configured to carry optical signals, wherein a set of multiple input values are encoded on respective optical signals carried by the optical waveguides,
  a plurality of couplers, each coupler coupled to a corresponding waveguide,
  an optical network comprising a plurality of optical splitters or directional couplers, and
  an array of optoelectronic circuitry sections, in which each optoelectronic circuitry section is configured to receive an optical wave from one of the output ports of the optical network, and each optoelectronic circuitry section includes:
    at least one photodetector configured to detect at least one optical wave from an operation; and
    at least one conductive path integrated in the photonic integrated circuit electrically coupled to the photodetector and electrically coupled to an electrical output port; and attaching a plurality of beam-shaping optical elements to the first support structure or the photonic integrated circuit, in which each beam-shaping optical element is associated with a laser die and a coupler, and the attaching comprises aligning each beam-shaping optical element to cause the optical beam generated by the corresponding laser die to be coupled, through the corresponding coupler, to the corresponding waveguide.

Embodiment 51: The method of embodiment 50, wherein attaching the plurality of laser dies to the support structure comprises attaching the plurality of laser dies to a second support structure that includes at least one of a heatsink or a thermoelectric cooler, and attaching the second support structure to the first support structure.

Embodiment 52: The method of embodiment 50 or 51, wherein aligning each beam-shaping optical element during attachment of the beam-shaping optical element includes monitoring feedback indicating a coupling efficiency of the corresponding optical beam into the corresponding waveguide through the corresponding coupler.

Embodiment 53: The method of embodiment 52, comprising sequentially aligning the beam-shaping optical elements, wherein a second beam-shaping optical element is aligned based on monitoring the feedback indicating the coupling efficiency after completion of alignment of a first beam-shaping optical element based on monitoring the feedback indicating the coupling efficiency, and a third beam-shaping optical element is aligned based on monitoring the feedback indicating the coupling efficiency after completion of alignment of the second beam-shaping optical element based on monitoring the feedback indicating the coupling efficiency.

Embodiment 54: The method of any of embodiments 50 to 53, comprising electrically coupling a first electronic integrated circuit to a top side of the photonic integrated circuit, and electrically coupling a second electronic integrated circuit to a bottom side of the photonic integrated circuit.

Embodiment 55: The method of embodiment 54, wherein the second electronic integrated circuit comprises a digital storage module, and the first electronic integrated circuit comprises a hybrid digital/analog integrated circuit that is configured to provide analog control signals for controlling photonic computing elements in the photonic integrated circuit and send/receive digital data to/from the digital storage module.

Embodiment 56: The method of embodiment 54 or 55, wherein the photonic integrated circuit comprises a substrate, and the method comprises providing conductive vias that pass through the substrate of the photonic integrated circuit to enable electrical signals to be transmitted between the first electronic integrated circuit and the second electronic integrated circuit through the conductive vias.

Embodiment 57: The method of embodiment 55, wherein each optoelectronic circuitry section comprises a Mach-Zehnder interferometer configured to perform a multiplication operation between (1) a value based on one of the input values scaled by the optical network and (2) an electrical value provided by an electrical input port electrically coupled to the hybrid digital/analog integrated circuit, and
  wherein the hybrid digital/analog integrated circuit is configured to provide the electrical value to the electrical input port of the optoelectronic circuitry section.

Embodiment 58: The method of any of embodiments 50 to 57, comprising:
  attaching the first support structure to an LGA substrate;
  wherein attaching the plurality of laser dies to the first support structure is performed after the first support structure is attached to the LGA substrate.

Embodiment 59: An apparatus comprising:
  a first support structure;
  a plurality of laser dies that are attached to the first support structure, in which each laser die is configured to generate an optical beam;

a photonic integrated circuit that is attached to the first support structure, in which the photonic integrated circuit comprises:
  a plurality of optical waveguides configured to carry optical signals, wherein a set of multiple input values are encoded on respective optical signals carried by the optical waveguides,
  a plurality of couplers, each coupler coupled to a corresponding waveguide,
  an optical network comprising a plurality of optical splitters or directional couplers, and
  an array of optoelectronic circuitry sections, in which each optoelectronic circuitry section is configured to receive an optical wave from one of the output ports of the optical network, and each optoelectronic circuitry section includes:
    at least one photodetector configured to detect at least one optical wave from an operation; and
    at least one conductive path integrated in the photonic integrated circuit electrically coupled to the photodetector and electrically coupled to an electrical output port; and
  a plurality of beam-shaping optical elements that are attached to the support structure or the photonic integrated circuit, in which each beam-shaping optical element is associated with a laser die and a coupler, and is configured to cause the optical beam generated by the corresponding laser die to be coupled, through the corresponding coupler, to the corresponding waveguide.

Embodiment 60: The apparatus of embodiment 59, comprising a second support structure that includes at least one of a heatsink or a thermoelectric cooler, in which the plurality of laser dies are attached to the second support structure, and the second support structure is attached to the first support structure.

Embodiment 61: The apparatus of embodiment 59 or 60, wherein the photonic integrated circuit comprises a feedback photodetector and a tap waveguide associated with one of the optical waveguides, the tap waveguide is configured to provide a portion of the optical power being coupled into the corresponding optical waveguide to the feedback photodetector;
wherein the apparatus comprises feedback monitor circuitry that is configured to monitor a feedback signal generated by the feedback photodetector.

Embodiment 62: The apparatus of any of embodiments 59 to 61, comprising a first electronic integrated circuit electrically coupled to a top side of the photonic integrated circuit, and a second electronic integrated circuit electrically to a bottom side of the photonic integrated circuit.

Embodiment 63: The apparatus of embodiment 62, wherein the second electronic integrated circuit comprises a digital storage module, and the first electronic integrated circuit comprises a hybrid digital/analog integrated circuit that is configured to provide analog control signals for controlling photonic computing elements in the photonic integrated circuit and send/receive digital data to/from the digital storage module.

Embodiment 64: The apparatus of embodiment 62 or 63, wherein the photonic integrated circuit comprises a substrate and conductive vias that pass through the substrate, the conductive vias enable electrical signals to be transmitted between the first electronic integrated circuit and the second electronic integrated circuit through the conductive vias.

Embodiment 65: The apparatus of embodiment 63 or 64, wherein each optoelectronic circuitry section comprises a Mach-Zehnder interferometer configured to perform a multiplication operation between (1) a value based on one of the input values scaled by the optical network and (2) an electrical value provided by an electrical input port electrically coupled to the hybrid digital/analog integrated circuit, and
wherein the hybrid digital/analog integrated circuit is configured to provide the electrical value to the electrical input port of the optoelectronic circuitry section.

Embodiment 66: The apparatus of any of embodiments 59 to 65, wherein the couplers comprise at least one of a guided-mode resonance coupler or an edge coupler.

Embodiment 67: The apparatus of any of embodiments 59 to 66 in which the plurality of laser dies are configured to generate optical beams that have multiple wavelengths, including at least two optical beams that have different wavelengths, and the photonic integrated circuit includes a wavelength division multiplexed computation module that concurrently processes a first optical signal having a first wavelength and representing a first value, and a second optical signal having a second wavelength and representing a second value.

Embodiment 68: A method for assembling a photonic computing system, the method comprising:
  attaching a plurality of laser dies to a first support structure, in which each laser die is configured to generate a laser beam;
  attaching a photonic integrated circuit to the first support structure, in which the photonic integrated circuit comprises:
    a plurality of input waveguides configured to carry input optical signals,
    a plurality of couplers, each coupler coupled to a corresponding input waveguide,
    a plurality of operation photodetectors, in which each operation photodetector is configured to detect an optical signal derived from an operation based on at least one input optical signal,
    a plurality of feedback photodetectors, in which each feedback photodetector is associated with an input waveguide,
    a plurality of tap waveguides, in which each tap waveguide is associated with an input waveguide and is configured to provide a portion of the optical power coupled into the input waveguide to the feedback photodetector;
  attaching a plurality of beam-shaping optical elements to the first support structure or the photonic integrated circuit, in which each beam-shaping optical element is associated with one of the laser dies and one of the couplers;
  driving the laser dies to generate laser beams sequentially or in parallel;
  using each feedback photodetector to generate a feedback signal to indicate a coupling efficiency of the laser beam into the corresponding waveguide through the corresponding coupler; and
  aligning each beam-shaping optical element to cause the laser beam generated by the corresponding laser die to be coupled through the corresponding coupler to the corresponding input waveguide in the photonic integrated circuit, in which the aligning of the beam-shaping optical element is based on the feedback signal generated by the corresponding feedback photodetector.

Embodiment 69: The method of embodiment 68, wherein the aligning of the beam-shaping optical element comprises aligning the beam-shaping optical element to maximize the coupling of the laser beam into the corresponding waveguide.

Embodiment 70: The method of embodiment 68 or 69, wherein attaching a plurality of laser dies comprises attaching at least eight laser dies, the photonic integrated circuit is configured to perform operations on input vectors each having at least eight parallel bits, and each bit is represented by a modulated version of the laser beam generated by one of the laser dies.

Embodiment 71: The method of any of embodiments 68 to 70, wherein the beam-shaping optical elements comprise lenses.

Embodiment 72: An apparatus comprising:
a photonic integrated circuit attached to a support structure by an array of first conducting structures on a first surface of the photonic integrated circuit, the photonic integrated circuit comprising:
 a waveguide and a coupler configured to couple an optical beam into the waveguide; and
an electronic integrated circuit attached to the photonic integrated circuit by an arrangement of second conducting structures that are coupled to the photonic integrated circuit and to the electronic integrated circuit, where the arrangement of second conducting structures provide electrical communication between the electronic integrated circuit and the photonic integrated circuit;
wherein the photonic integrated circuit further comprises:
 a plurality of conductive vias through at least a portion of the photonic integrated circuit extending from the arrangement of second conducting structures to the first surface of the photonic integrated circuit.

Embodiment 73: The apparatus of embodiment 72, wherein the coupler is in proximity to the first surface of the photonic integrated circuit.

Embodiment 74: The apparatus of embodiment 73, wherein the photonic integrated circuit further comprises optoelectronic computing elements including at least one optoelectronic computing element coupled to the waveguide.

Embodiment 75: The apparatus of embodiment 74, wherein the optoelectronic computing elements are in one or more layers of the photonic integrated circuit that are closer to the first surface than to the arrangement of second conducting structures.

Embodiment 76: The apparatus of any of embodiments 73 to 75, wherein the arrangement of second conducting structures include a plurality of backside redistribution layers (RDLs) in proximity to a second surface of the photonic integrated circuit.

Embodiment 77: The apparatus of embodiment 76, wherein the arrangement of second conducting structures include a plurality of backside redistribution layers (RDLs) in proximity to a surface of the electronic integrated circuit.

Embodiment 78: The apparatus of any of embodiments 72 to 77, wherein the photonic integrated circuit further comprises optoelectronic computing elements including at least one optoelectronic computing element coupled to the waveguide.

Embodiment 79: The apparatus of embodiment 78, wherein the electronic integrated circuit comprises control circuitry configured to provide electronic control signals for controlling the optoelectronic computing elements.

Embodiment 80: The apparatus of embodiment 79, wherein the optoelectronic computing elements comprise at least one optical modulator that modulates an optical signal based on at least one of the electronic control signals.

Embodiment 81: The apparatus of any of embodiments 72 to 80, wherein the support structure comprises a land grid array substrate that includes an array of contacts on a surface of the land grid array substrate that provide electrical connectivity to the array of first conducting structures on the first surface of the photonic integrated circuit.

Embodiment 82: The apparatus of embodiment 81, further comprising a photonic source configured to provide the optical beam.

Embodiment 83: The apparatus of embodiment 82, wherein the photonic source is attached to a portion of the land grid array substrate or an interposer attached to the land grid array substrate.

Embodiment 84: The apparatus of embodiment 83, wherein the coupler comprises an edge coupler.

Embodiment 85: The apparatus of any of embodiments 82 to 84, wherein the land grid array substrate defines an opening, and a portion of a module is inserted within a portion of the opening and is attached to the first surface of the photonic integrated circuit.

Embodiment 86: The apparatus of embodiment 85, wherein the portion of the module comprises an optical connector coupled to the photonic source.

Embodiment 87: The apparatus of embodiment 86, wherein the coupler comprises a waveguide grating coupler.

Embodiment 88: The apparatus of embodiment 85, wherein the module comprises a digital storage module.

Embodiment 89: The apparatus of embodiment 88, wherein the digital storage module comprises a high bandwidth memory (HBM) stack of two or more dynamic random access memory (DRAM) integrated circuits.

Embodiment 90: The apparatus of any of embodiments 72 to 89, wherein the coupler comprises a waveguide grating coupler.

Embodiment 91: The apparatus of any of embodiments 72 to 89, wherein the coupler comprises an edge coupler.

Embodiment 92: An apparatus comprising:
an electronic integrated circuit; and
a photonic integrated circuit comprising:
 a plurality of conductive vias through at least a portion of the photonic integrated circuit, in which the conductive vias extend to a first surface of the photonic integrated circuit facing away from the electronic integrated circuit, and the conductive vias are configured to provide electrical conductive paths for the electronic integrated circuit to a component coupled to the first surface of the photonic integrated circuit.

Embodiment 93: The apparatus of embodiment 92, wherein a plurality of the conductive vias are configured to provide electrical contacts to a substrate for the electronic integrated circuit, in which the photonic integrated circuit is disposed between the electronic integrated circuit and the substrate.

Embodiment 94: The apparatus of embodiment 93, wherein the substrate comprises a land grid array substrate that includes an array of contacts on a surface of the land grid array substrate that provide electrical connectivity to an array of conducting structures on the first surface of the photonic integrated circuit.

Embodiment 95: The apparatus of embodiment 94, comprising the land grid array substrate.

Embodiment 96: The apparatus of any of embodiments 92 to 95 in which the photonic integrated circuit comprises:
 a waveguide,
 a coupler configured to couple an optical beam into the waveguide, and
 optoelectronic computing elements including at least one optoelectronic computing element coupled to the waveguide.

Embodiment 97: The apparatus of embodiment 96 in which the electronic integrated circuit comprises control circuitry configured to provide electronic control signals for controlling the optoelectronic computing elements in the photonic integrated circuit.

Embodiment 98: The apparatus of embodiment 96 or 97, comprising a photonic source configured to provide the optical beam.

Embodiment 99: The apparatus of any of embodiments 92 to 97, comprising a storage device electrically coupled to the first surface of the photonic integrated circuit, in which the electronic integrated circuit is electrically coupled to a second surface of the photonic integrated circuit, and the electronic integrated circuit is electrically coupled to the storage device through at least some of the conductive vias.

Embodiment 100: The apparatus of embodiment 99 in which the storage device comprises a high bandwidth memory (HBM) stack of two or more dynamic random access memory (DRAM) integrated circuits.

Embodiment 101: A method for fabricating an integrated optoelectronic device, the method comprising:
  forming a plurality of layers of a photonic integrated circuit, including forming a plurality of redistribution layers (RDLs) on a layer at which ends of conductive vias are exposed;
  forming a plurality of layers of an electronic integrated circuit, including forming a plurality of redistribution layers (RDLs) on a layer at which electronic signals are provided; and
  bonding together a plurality of the RDLs of the photonic integrated circuit and a plurality of the RDLs of the electronic integrated circuit.

Embodiment 102: The method of embodiment 101, wherein forming the plurality of layers of the photonic integrated circuit further includes:
  forming in one or more layers a waveguide and a coupler coupled to the waveguide,
  forming in one or more layers optoelectronic computing elements including at least one optoelectronic computing element coupled to the waveguide, and
  forming the conductive vias through a plurality of layers including the one or more layers in which the waveguide, coupler, and optoelectronic computing elements are formed.

Embodiment 103: The method of embodiment 102, wherein forming the plurality of layers of the electronic integrated circuit further includes forming in one or more layers circuitry configured to provide the electronic signals.

Embodiment 104: The method of embodiment 102 or 103, further comprising removing a portion of the photonic integrated circuit to expose ends of the conductive vias and to expose the coupler.

Embodiment 105: The method of embodiment 104, further comprising attaching the exposed ends of the conductive vias to a support structure by an array of conducting structures.

Embodiment 106: The method of embodiment 105, wherein the support structure comprises a land grid array substrate that includes an array of contacts on a surface of the land grid array substrate that provide electrical connectivity to the array of conducting structures.

Embodiment 107: The method of embodiment 106, further comprising forming an opening in the land grid array substrate, and attaching a module to a surface of the photonic integrated circuit with a portion of the module inserted within a portion of the opening.

Embodiment 108: The method of embodiment 107, wherein the module comprises a photonic source positioned to provide an optical beam to the coupler.

Embodiment 109: The method of embodiment 107, wherein the module comprises a high bandwidth memory (HBM) stack of two or more dynamic random access memory (DRAM) integrated circuits.

Embodiment 110: The method of any of embodiments 102 to 109, wherein the coupler comprises a waveguide grating coupler.

Embodiment 111: An artificial neural network computation system comprising the apparatus of any of embodiments 23 to 49, 59 to 67, and 72 to 100.

Embodiment 112: A system comprising at least one of a robot, an autonomous vehicle, an autonomous drone, a medical diagnosis system, a fraud detection system, a weather prediction system, a financial forecast system, a facial recognition system, a speech recognition system, a metaverse generator, or a product defect detection system,
  wherein the at least one of a robot, an autonomous vehicle, an autonomous drone, a medical diagnosis system, a fraud detection system, a weather prediction system, a financial forecast system, a facial recognition system, a speech recognition system, a metaverse generator, or a product defect detection system comprises the apparatus of any of embodiments 23 to 49, 59 to 67, and 72 to 100.

Embodiment 113: A system comprising at least one of a mobile phone or a portable computer, in which the mobile phone or the portable computer comprises the apparatus of any of embodiments 23 to 49, 59 to 67, and 72 to 100.

Embodiment 114: A supercomputer comprising at least 10 of the apparatuses of any of embodiments 23 to 49, 59 to 67, and 72 to 100.

Embodiment 115: A supercomputer comprising at least 100 of the apparatuses of any of embodiments 23 to 49, 59 to 67, and 72 to 100.

Embodiment 116: A supercomputer comprising at least 1000 of the apparatuses of any of embodiments 23 to 49, 59 to 67, and 72 to 100.

Embodiment 117: A supercomputer comprising at least 10,000 of the apparatuses of any of embodiments 23 to 49, 59 to 67, and 72 to 100.

Embodiment 118: A data center comprising at least 10 of the apparatuses of any of embodiments 23 to 49, 59 to 67, and 72 to 100.

Embodiment 119: A data center comprising at least 100 of the apparatuses of any of embodiments 23 to 49, 59 to 67, and 72 to 100.

Embodiment 120: A data center comprising at least 1000 of the apparatuses of any of embodiments 23 to 49, 59 to 67, and 72 to 100.

Embodiment 121: A data center comprising at least 10,000 of the apparatuses of any of embodiments 23 to 49, 59 to 67, and 72 to 100.

Embodiment 122: The supercomputer of any of embodiments 114 to 117, comprising a plurality of two or more of the embodiments of 23 to 49, 59 to 67, and 72 to 100.

Embodiment 123: The data center of any of embodiments 118 to 121, comprising a plurality of two or more of the embodiments of 23 to 49, 59 to 67, and 72 to 100.

Embodiment 124: A method comprising operating the apparatus of any of embodiments 23 to 49, 59 to 67, and 72 to 100, the supercomputer of any of the embodiments 114 to 117 and 122, or the data center of any of the embodiments 118 to 121 and 123.

Embodiment 125: A method of operating a photonic computing system, the method comprising:
sending, from a first electronic integrated circuit, modulation control signals to a photonic integrated circuit, wherein the photonic integrated circuit comprises a plurality of modulators, a plurality of waveguides, and a plurality of photodetectors, wherein the photonic integrated circuit comprises a plurality of conductive vias through at least a portion of the photonic integrated circuit, wherein the first electronic integrated circuit is electrically coupled to a first surface of the photonic integrated circuit, wherein the conductive vias extend from the first surface of the photonic integrated circuit to a second surface of the photonic integrated circuit, the second surface is opposite the first surface;
performing matrix computation at the photonic integrate circuit based on input optical signals and the modulation control signals provided by the electronic integrated circuit;
transmitting data representing results of the matrix computation from the photonic integrated circuit to the first electronic integrated circuit; and
transmitting the data from the first electronic integrated circuit to a second electronic integrated circuit electrically coupled to the second surface of the photonic integrated circuit through the conductive vias in the photonic integrated circuit.

Embodiment 126: The method of embodiment 125 in which the second electronic integrated circuit comprises a storage device.

Embodiment 127: The method of embodiment 126 in which the storage device comprises a high bandwidth memory (HBM) stack of two or more dynamic random access memory (DRAM) integrated circuits.

Embodiment 128: An apparatus comprising:
a first support structure;
a photonic integrated circuit attached to the first support structure, in which the photonic integrated circuit comprises a plurality of waveguides and a plurality of optical modulators, wherein the photonic integrated circuit comprises a first edge and a second edge, wherein the photonic integrated circuit comprises a first set of couplers and a second set of couplers, each of the first and second sets of couplers is optically coupled to a corresponding waveguide;
a first set of laser dies that are positioned near the first edge of the photonic integrated circuit;
a second set of laser dies that are positioned near the second edge of the photonic integrated circuit;
a first set of beam-shaping optical elements, in which each beam-shaping optical element in the first set of beam-shaping optical elements is associated with a laser die in the first set of laser dies and a coupler in the first set of couplers, and is configured to cause an optical beam generated by the corresponding laser die to be coupled, through the corresponding coupler, to the corresponding waveguide, and
a second set of beam-shaping optical elements, in which each beam-shaping optical element in the second set of beam-shaping optical elements is associated with a laser die in the second set of laser dies and a coupler in the second set of couplers, and is configured to cause an optical beam generated by the corresponding laser die to be coupled, through the corresponding coupler, to the corresponding waveguide.

Embodiment 129: The apparatus of embodiment 128 in which the photonic integrated circuit has an overall rectangular shape, the first edge extends along a length direction, and the second edge extends along a width direction.

Embodiment 130: The apparatus of embodiment 128 or 129 in which the first set of laser dies are attached to the first support structure.

Embodiment 131: The apparatus of any of embodiments 128 to 130 in which the first set of beam-shaping optical elements are attached to the first support structure.

Embodiment 132: The apparatus of any of embodiments 128 to 131 in which the first set of couplers are positioned in a vicinity of the first edge and the second set of couplers are positioned in a vicinity of the second edge.

What is claimed is:

1. An apparatus comprising:
a support structure;
a photonic source attached to the support structure, the photonic source comprising:
a first laser die on a first substrate in which the first laser die is configured to provide a first optical beam,
a second laser die on the first substrate or a second substrate in which the second laser die is configured to provide a second optical beam, and
a third laser die on the first substrate or a third substrate in which the third laser die is configured to provide a third optical beam;
a photonic integrated circuit having a bottom side attached to the support structure, the photonic integrated circuit comprising:
a first waveguide and a first coupler coupled to the first waveguide,
a second waveguide and a second coupler coupled to the second waveguide, and
a third waveguide and a third coupler coupled to the third waveguide; and
a plurality of beam-shaping optical elements attached to at least one of the support structure, the first substrate, respective first, second, and third substrates, or the photonic integrated circuit, wherein the beam-shaping optical elements comprise:
a first beam-shaping optical element configured to couple the first optical beam to the first coupler on the photonic integrated circuit,
a second beam-shaping optical element configured to couple the second optical beam to the second coupler on the photonic integrated circuit, and
a third beam-shaping optical element configured to couple the third optical beam to the third coupler on the photonic integrated circuit,
wherein each of the plurality of beam-shaping optical elements is independently movable relative to the corresponding laser die, the corresponding coupler, and the other beam-shaping optical elements prior to alignment,
wherein each of the plurality of beam-shaping optical elements is individually aligned with the corresponding laser die and the corresponding coupler independent of the other beam-shaping optical elements; and
an electronic integrated circuit attached to a top side of the photonic integrated circuit;
wherein the photonic integrated circuit comprises at least one optical modulator, and the electronic integrated circuit comprises control circuitry configured to provide electronic control signals for controlling the at least one optical modulator;
wherein the support structure comprises an optoelectronic interposer that provides electrical signal paths for electrical signals from the photonic integrated circuit, and optical signal paths for optical signals from the photonic integrated circuit.

2. The apparatus of claim 1, further comprising a beam-redirecting optical element attached to the photonic integrated circuit, the beam-redirecting element configured to redirect the first optical beam into the first coupler and to redirect the second optical beam into the second coupler.

3. The apparatus of claim 2, wherein the beam-redirecting element comprises a first surface that is configured to reflect the first optical beam into the first coupler, and a second surface that is configured to reflect the second optical beam into the second coupler.

4. The apparatus of claim 3, wherein the first surface of the beam-redirecting element overlaps the second surface of the beam-redirecting element.

5. The apparatus of claim 2, wherein the beam-redirecting optical element comprises a prism.

6. The apparatus of claim 2, wherein the beam-redirecting optical element comprises a mirror.

7. The apparatus of claim 1, wherein the first laser die is configured to provide the first optical beam from a first emitting location, the second laser die is configured to provide the second optical beam from a second emitting location, the third laser die is configured to provide the third optical beam from a third emitting location,
wherein the first, second, and third emitting locations are substantially aligned along a line, and a distance between any of the first, second, and third emitting locations and the line is less than a specified distance.

8. The apparatus of claim 7, wherein the photonic source comprises a fourth laser die on the substrate, the fourth laser die is configured to provide a fourth optical beam from a fourth emitting location,
wherein the first, second, third, and fourth emitting locations are substantially aligned along a plane, and a distance between any of the first, second, third, and fourth emitting locations and the plane is less than a specified distance.

9. The apparatus of claim 1, wherein the photonic source comprises at least eight laser dies on the first substrate or respective substrates, including the first and second laser dies, with the first substrate or the respective substrates attached to one or more heatsink structures.

10. The apparatus of claim 9, wherein the laser dies are configured to provide optical beams from corresponding emitting locations that are substantially aligned along a plane, and a distance between any of the emitting locations and the plane is less than a specified distance.

11. The apparatus of claim 1, wherein the first and second beam-shaping optical elements comprise lenses.

12. The apparatus of claim 1, wherein the first and second couplers comprise waveguide grating couplers coupled to the respective first and second waveguides.

13. The apparatus of claim 1, wherein the first and second couplers comprise edge couplers coupled to the respective first and second waveguides.

14. The apparatus of claim 1, wherein the photonic integrated circuit is attached to the optoelectronic interposer in a controlled collapse chip connection.

15. The apparatus of claim 1, wherein the photonic integrated circuit comprises optoelectronic computing elements, and the electronic integrated circuit comprises control circuitry configured to provide electronic control signals for controlling the optoelectronic computing elements.

16. The apparatus of claim 15, wherein the optoelectronic computing elements comprise the at least one optical modulator, and the at least one optical modulator is configured to modulate an optical signal based on at least one of the electronic control signals.

17. The apparatus of claim 1, comprising a second electronic integrated circuit that is attached to the optoelectronic interposer in a controlled collapse chip connection.

18. The apparatus of claim 1, wherein the electronic integrated circuit is attached to the photonic integrated circuit in a controlled collapse chip connection.

19. The apparatus of claim 1, further comprising a high bandwidth memory (HBM) stack of two or more dynamic random access memory (DRAM) integrated circuits attached to the optoelectronic interposer.

20. The apparatus of claim 1 in which the first laser die is configured such that the first optical beam has a first wavelength, the second laser die is configured such that the second optical beam has a second wavelength, the first wavelength is different from the second wavelength, and the photonic integrated circuit includes a wavelength division multiplexed computation module that concurrently processes a first optical signal derived from the first optical beam and a second optical signal derived from the second optical beam.

21. The apparatus of claim 1 wherein the photonic integrated circuit comprises one or more electrically conductive vias extending from the at least one optical modulator to a bottom side of the photonic integrated circuit, the one or more electrically conductive vias have end or ends that are bonded to conducting structures on the bottom side of the photonic integrated circuit.

* * * * *